United States Patent
Lindemann

(10) Patent No.: US 10,237,070 B2
(45) Date of Patent: Mar. 19, 2019

(54) SYSTEM AND METHOD FOR SHARING KEYS ACROSS AUTHENTICATORS

(71) Applicant: NOK NOK LABS, INC., Palo Alto, CA (US)

(72) Inventor: Rolf Lindemann, Steele (DE)

(73) Assignee: Nok Nok Labs, Inc., San Jose, CA (US)

(*) Notice: Subject to any disclaimer, the term of this patent is extended or adjusted under 35 U.S.C. 154(b) by 146 days.

(21) Appl. No.: 15/396,454

(22) Filed: Dec. 31, 2016

(65) Prior Publication Data
US 2018/0191501 A1 Jul. 5, 2018

(51) Int. Cl.
*G06F 21/32* (2013.01)
*H04L 9/32* (2006.01)
(Continued)

(52) U.S. Cl.
CPC .......... *H04L 9/3231* (2013.01); *G06F 3/0608* (2013.01); *G06F 3/0647* (2013.01);
(Continued)

(58) Field of Classification Search
CPC ..... H04L 9/32; H04L 9/08; H04L 9/14; G06F 3/06; G06F 21/32
See application file for complete search history.

(56) References Cited

U.S. PATENT DOCUMENTS 5,280,527 A 1/1994 Gullman et al.
5,764,789 A 6/1998 Pare, Jr. et al.
(Continued)

FOREIGN PATENT DOCUMENTS

CN 1705925 A 12/2005
CN 101394283 A 3/2009
(Continued)

OTHER PUBLICATIONS

Abate A., et al.,"2D and 3D face recognition: A survey", 2007, pp. 1885-1906.
(Continued)

*Primary Examiner* — Wasika Nipa
(74) *Attorney, Agent, or Firm* — Nicholson De Vos Webster & Elliott LLP

(57) ABSTRACT

A system, apparatus, method, and machine readable medium are described for sharing authentication data. For example, one embodiment of a method comprises: generating and storing a persistent group identification code (Group-ID) for a group of authenticators sharing a common set of authorization (Uauth) keys, an initial Group-ID to be generated on a first use of a first authenticator and/or following a factory reset of the first authenticator generating and storing an individual asymmetric wrapping key encryption key (WKEK) on a first use of the first authenticator and/or following each factory reset of the first authenticator; generating and storing a symmetric wrapping key (WK), the wrapping key to be generated on a first use of the first authenticator and/or following each factory reset of the first authenticator; generating a join-block using an authenticator identification code for the first authenticator and the WKEK, the join-block usable to join an existing authenticator group, the join block to be sent to a second authenticator; verifying the join-block at the second authenticator and generating a join response block responsive to user approval, the join response block generated by encrypting the WK and Group-ID using the WKEK, the join response block to be transmitted to the first authenticator; and decrypting the join response block and storing the WK and Group-ID.

22 Claims, 77 Drawing Sheets

(51) Int. Cl.
*H04L 9/08* (2006.01)
*H04L 9/14* (2006.01)
*G06F 3/06* (2006.01)

(52) U.S. Cl.
CPC ............ *G06F 3/0683* (2013.01); *G06F 21/32* (2013.01); *H04L 9/0861* (2013.01); *H04L 9/0894* (2013.01); *H04L 9/14* (2013.01)

(56) References Cited

U.S. PATENT DOCUMENTS

| | | |
|---|---|---|
| 6,035,406 A | 3/2000 | Moussa et al. |
| 6,088,450 A | 7/2000 | Davis et al. |
| 6,178,511 B1 | 1/2001 | Cohen et al. |
| 6,270,011 B1 | 8/2001 | Gottfried |
| 6,377,691 B1 | 4/2002 | Swift et al. |
| 6,510,236 B1 | 1/2003 | Crane et al. |
| 6,588,812 B1 | 7/2003 | Garcia et al. |
| 6,618,806 B1 | 9/2003 | Brown et al. |
| 6,751,733 B1 | 6/2004 | Nakamura et al. |
| 6,801,998 B1* | 10/2004 | Hanna .................. H04L 63/045 713/155 |
| 6,842,896 B1 | 1/2005 | Redding et al. |
| 6,938,156 B2 | 8/2005 | Wheeler et al. |
| 7,155,035 B2 | 12/2006 | Kondo et al. |
| 7,194,761 B1 | 3/2007 | Champagne |
| 7,194,763 B2 | 3/2007 | Potter et al. |
| 7,263,717 B1 | 8/2007 | Boydstun et al. |
| 7,444,368 B1 | 10/2008 | Wong et al. |
| 7,487,357 B2 | 2/2009 | Smith et al. |
| 7,512,567 B2 | 3/2009 | Bemmel et al. |
| 7,698,565 B1 | 4/2010 | Bjorn et al. |
| 7,865,937 B1 | 1/2011 | White et al. |
| 7,941,669 B2 | 5/2011 | Foley et al. |
| 8,060,922 B2 | 11/2011 | Crichton et al. |
| 8,166,531 B2 | 4/2012 | Suzuki |
| 8,245,030 B2 | 8/2012 | Lin |
| 8,284,043 B2 | 10/2012 | Judd et al. |
| 8,291,468 B1 | 10/2012 | Chickering |
| 8,353,016 B1 | 1/2013 | Pravetz et al. |
| 8,359,045 B1 | 1/2013 | Hopkins, III |
| 8,412,928 B1 | 4/2013 | Bowness |
| 8,458,465 B1 | 6/2013 | Stern et al. |
| 8,489,506 B2 | 7/2013 | Hammad et al. |
| 8,516,552 B2 | 8/2013 | Raleigh |
| 8,526,607 B2* | 9/2013 | Liu ...................... H04L 9/3093 380/277 |
| 8,555,340 B2 | 10/2013 | Potter et al. |
| 8,561,152 B2 | 10/2013 | Novak et al. |
| 8,584,219 B1 | 11/2013 | Toole et al. |
| 8,584,224 B1 | 11/2013 | Pei et al. |
| 8,607,048 B2 | 12/2013 | Nogawa |
| 8,646,060 B1 | 2/2014 | Ben |
| 8,713,325 B2 | 4/2014 | Ganesan |
| 8,719,905 B2 | 5/2014 | Ganesan |
| 8,776,180 B2 | 7/2014 | Kumar et al. |
| 8,843,997 B1 | 9/2014 | Hare |
| 8,856,541 B1 | 10/2014 | Chaudhury et al. |
| 8,949,978 B1 | 2/2015 | Lin et al. |
| 8,958,599 B1 | 2/2015 | Starner |
| 8,978,117 B2 | 3/2015 | Bentley et al. |
| 9,015,482 B2 | 4/2015 | Baghdasaryan et al. |
| 9,032,485 B2 | 5/2015 | Chu et al. |
| 9,083,689 B2 | 7/2015 | Lindemann et al. |
| 9,161,209 B1 | 10/2015 | Ghoshal et al. |
| 9,171,306 B1 | 10/2015 | He et al. |
| 9,172,687 B2 | 10/2015 | Baghdasaryan et al. |
| 9,219,732 B2 | 12/2015 | Baghdasaryan et al. |
| 9,306,754 B2 | 4/2016 | Baghdasaryan et al. |
| 9,317,705 B2 | 4/2016 | O'Hare et al. |
| 9,367,678 B2 | 6/2016 | Pal et al. |
| 9,396,320 B2 | 7/2016 | Lindemann |
| 9,698,976 B1* | 7/2017 | Statica .................. H04L 9/083 |
| 2001/0037451 A1 | 11/2001 | Bhagavatula et al. |
| 2002/0010857 A1 | 1/2002 | Karthik |
| 2002/0016913 A1 | 2/2002 | Wheeler et al. |
| 2002/0037736 A1* | 3/2002 | Kawaguchi ............. H04W 4/08 455/518 |
| 2002/0040344 A1 | 4/2002 | Preiser et al. |
| 2002/0054695 A1 | 5/2002 | Bjorn et al. |
| 2002/0073316 A1 | 6/2002 | Collins et al. |
| 2002/0073320 A1 | 6/2002 | Rinkevich et al. |
| 2002/0087894 A1 | 7/2002 | Foley et al. |
| 2002/0112170 A1 | 8/2002 | Foley et al. |
| 2002/0174344 A1 | 11/2002 | Ting |
| 2002/0174348 A1 | 11/2002 | Ting |
| 2002/0190124 A1 | 12/2002 | Piotrowski |
| 2003/0021283 A1 | 1/2003 | See et al. |
| 2003/0055792 A1 | 3/2003 | Kinoshita et al. |
| 2003/0065805 A1 | 4/2003 | Barnes et al. |
| 2003/0084300 A1 | 5/2003 | Koike |
| 2003/0087629 A1 | 5/2003 | Juitt et al. |
| 2003/0115142 A1 | 6/2003 | Brickell et al. |
| 2003/0135740 A1 | 7/2003 | Talmor et al. |
| 2003/0152252 A1 | 8/2003 | Kondo et al. |
| 2003/0226036 A1 | 12/2003 | Bivens et al. |
| 2003/0236991 A1 | 12/2003 | Letsinger |
| 2004/0039909 A1 | 2/2004 | Cheng |
| 2004/0101170 A1 | 5/2004 | Tisse et al. |
| 2004/0123153 A1 | 6/2004 | Wright et al. |
| 2005/0021964 A1 | 1/2005 | Bhatnagar et al. |
| 2005/0080716 A1 | 4/2005 | Belyi et al. |
| 2005/0097320 A1 | 5/2005 | Golan et al. |
| 2005/0100166 A1 | 5/2005 | Smetters et al. |
| 2005/0125295 A1 | 6/2005 | Tidwell et al. |
| 2005/0160052 A1 | 7/2005 | Schneider et al. |
| 2005/0187883 A1 | 8/2005 | Bishop et al. |
| 2005/0223217 A1 | 10/2005 | Howard et al. |
| 2005/0223236 A1 | 10/2005 | Yamada et al. |
| 2005/0278253 A1 | 12/2005 | Meek et al. |
| 2006/0026671 A1 | 2/2006 | Potter et al. |
| 2006/0029062 A1 | 2/2006 | Rao et al. |
| 2006/0101136 A1 | 5/2006 | Akashika et al. |
| 2006/0156385 A1 | 7/2006 | Chiviendacz et al. |
| 2006/0161435 A1 | 7/2006 | Atef et al. |
| 2006/0161672 A1 | 7/2006 | Jolley et al. |
| 2006/0177061 A1 | 8/2006 | Orsini et al. |
| 2006/0213978 A1 | 9/2006 | Geller et al. |
| 2006/0282670 A1 | 12/2006 | Karchov |
| 2007/0005988 A1 | 1/2007 | Zhang et al. |
| 2007/0077915 A1 | 4/2007 | Black et al. |
| 2007/0088950 A1 | 4/2007 | Wheeler et al. |
| 2007/0094165 A1 | 4/2007 | Gyorfi et al. |
| 2007/0100756 A1 | 5/2007 | Varma |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0198435 A1 | 8/2007 | Siegal et al. |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2008/0005562 A1 | 1/2008 | Sather et al. |
| 2008/0025234 A1 | 1/2008 | Zhu et al. |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0184351 A1 | 7/2008 | Gephart et al. |
| 2008/0189212 A1 | 8/2008 | Kulakowski et al. |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |

(56) References Cited

U.S. PATENT DOCUMENTS

| | | |
|---|---|---|
| 2008/0289020 A1 | 11/2008 | Cameron et al. |
| 2008/0313719 A1 | 12/2008 | Kaliski, Jr. et al. |
| 2008/0320308 A1 | 12/2008 | Kostiainen et al. |
| 2009/0049510 A1 | 2/2009 | Zhang et al. |
| 2009/0055322 A1 | 2/2009 | Bykov, I et al. |
| 2009/0064292 A1 | 3/2009 | Carter et al. |
| 2009/0083850 A1 | 3/2009 | Fadell et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1 | 6/2009 | Chan et al. |
| 2009/0164797 A1 | 6/2009 | Kramer et al. |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0271618 A1 | 10/2009 | Camenisch et al. |
| 2009/0271635 A1 | 10/2009 | Liu et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0121855 A1 | 5/2010 | Dalia et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0191612 A1 | 7/2010 | Raleigh |
| 2010/0192209 A1 | 7/2010 | Steeves et al. |
| 2010/0205658 A1 | 8/2010 | Griffin |
| 2010/0223663 A1 | 9/2010 | Morimoto et al. |
| 2010/0242088 A1 | 9/2010 | Thomas |
| 2010/0266128 A1 | 10/2010 | Asokan et al. |
| 2010/0287369 A1 | 11/2010 | Monden |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0099361 A1 | 4/2011 | Shah et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0047555 A1 | 2/2012 | Xiao et al. |
| 2012/0066757 A1 | 3/2012 | Vysogorets et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0013931 A1 | 1/2013 | O'Hare et al. |
| 2013/0042115 A1 | 2/2013 | Sweet et al. |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1 | 2/2013 | Radhakrishnan et al. |
| 2013/0054336 A1 | 2/2013 | Graylin |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1 | 6/2013 | Langley |
| 2013/0167196 A1 | 6/2013 | Spencer et al. |
| 2013/0191884 A1 | 7/2013 | Leicher et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0246272 A1 | 9/2013 | Kirsch et al. |
| 2013/0262305 A1 | 10/2013 | Jones et al. |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326215 A1 | 12/2013 | Leggette et al. |
| 2013/0337777 A1 | 12/2013 | Deutsch et al. |
| 2013/0346176 A1 | 12/2013 | Alolabi et al. |

(56) References Cited

U.S. PATENT DOCUMENTS

| | | |
|---|---|---|
| 2014/0002238 A1 | 1/2014 | Taveau et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0114857 A1 | 4/2014 | Griggs et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1 | 9/2014 | Rellas et al. |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289116 A1 | 9/2014 | Polivanyi et al. |
| 2014/0289117 A1 | 9/2014 | Baghdasaryan |
| 2014/0289820 A1 | 9/2014 | Lindemann |
| 2014/0289833 A1 | 9/2014 | Briceno |
| 2014/0289834 A1 | 9/2014 | Lindemann |
| 2014/0298419 A1 | 10/2014 | Boubez et al. |
| 2014/0304505 A1 | 10/2014 | Dawson |
| 2014/0333413 A1 | 11/2014 | Kursun et al. |
| 2014/0335824 A1 | 11/2014 | Abraham |
| 2014/0337948 A1 | 11/2014 | Hoyos |
| 2015/0046340 A1 | 2/2015 | Dimmick |
| 2015/0058931 A1 | 2/2015 | Miu et al. |
| 2015/0095999 A1 | 4/2015 | Toth et al. |
| 2015/0096002 A1 | 4/2015 | Shuart et al. |
| 2015/0121068 A1 | 4/2015 | Lindemann et al. |
| 2015/0134330 A1 | 5/2015 | Baldwin et al. |
| 2015/0142628 A1 | 5/2015 | Suplee et al. |
| 2015/0180869 A1 | 6/2015 | Verma |
| 2015/0244525 A1 | 8/2015 | McCusker et al. |
| 2015/0244696 A1 | 8/2015 | Ma |
| 2015/0269050 A1 | 9/2015 | Filimonov et al. |
| 2015/0326529 A1 | 11/2015 | Morita |
| 2015/0373039 A1 | 12/2015 | Wang |
| 2015/0381580 A1 | 12/2015 | Graham, III et al. |
| 2016/0036588 A1 | 2/2016 | Thackston |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0188958 A1 | 6/2016 | Martin |
| 2016/0292687 A1 | 10/2016 | Kruglick et al. |
| 2017/0004487 A1 | 1/2017 | Hagen et al. |
| 2017/0011406 A1 | 1/2017 | Tunnell et al. |
| 2017/0048070 A1 | 2/2017 | Gulati et al. |
| 2017/0109751 A1 | 4/2017 | Dunkelberger et al. |
| 2017/0195121 A1 | 7/2017 | Frei et al. |
| 2017/0221068 A1 | 8/2017 | Krauss et al. |
| 2018/0039990 A1 | 2/2018 | Lindemann et al. |
| 2018/0191695 A1 | 7/2018 | Lindemann |

FOREIGN PATENT DOCUMENTS

| | | |
|---|---|---|
| CN | 101495956 A | 7/2009 |
| CN | 102713922 A | 10/2012 |
| CN | 102763111 A | 10/2012 |
| CN | 103999401 A | 8/2014 |
| EP | 2357754 A1 | 8/2011 |
| JP | 2003143136 A | 5/2003 |
| JP | 2004348308 A | 12/2004 |
| JP | 2007220075 A | 8/2007 |
| JP | 2008065844 A | 3/2008 |
| JP | 2013016070 A | 1/2013 |
| TW | 200701120 A | 1/2007 |
| TW | 201121280 A | 6/2011 |
| WO | 03017159 A1 | 2/2003 |
| WO | 2005003985 A1 | 1/2005 |
| WO | 2007023756 A1 | 3/2007 |
| WO | 2009158530 A2 | 12/2009 |
| WO | 2013082190 A1 | 6/2013 |
| WO | 2014105994 A2 | 7/2014 |
| WO | 2015130734 A1 | 9/2015 |

OTHER PUBLICATIONS

Advisory Action from U.S. Appl. No. 13/730,791 dated Jan. 23, 2015, 4 pages.

Akhtar Z., et al., "Spoof Attacks on Multimodal Biometric Systems", International Conference on Information and Network Technology, 2011, vol. 4, pp. 46-51.

Bao, W., et al., "A liveness detection method for face recognition based on optical flow field", 2009, pp. 233-236, http://ieeexplore.ieee.org/stamp/stamp.jsp?tp=&arnumber=5054589&isnumber=5054562.

Barker E., et al., "Recommendation for key management Part 3: Application—Specific Key Management Guidance", NIST Special Publication 800-57, 2009, pp. 1-103.

BehavioSec, "Measuring FAR/FRR/EER in Continuous Authentication," Stockholm, Sweden (2009), 8 pages.

Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.

Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359- 0/11.

Chen L., et al., "Flexible and scalable digital signatures in TPM 2.0." Proceedings of the 2013 ACM SIGSAC conference on Computer & communications security. ACM, 2013, 12 pages.

Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.

Communication pursuant to Rules 161(2) and 162 EPC for EP Application No. 15826364.0, dated Mar. 7, 2017, 2 pages.

Continuous User Authentication Using Temporal Information, http://www.cse.msu.edu/biometrics/Publications/Face/NiinumaJain_ContinuousAuth_SPIE10.pdf, 11 pages.

crazy Egg Heatmap Shows Where People Click on Your Website, 2012, 3 pages, www.michaelhartzell.com/Blog/bid/92970/Crazy-Egg-Heatmap-shows-where-people-click-on-your-website).

Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.

Delac K. et al., Eds., InTech, Jun. 1, 2008, Retrieved from the Internet: URL: http://cdn.intechopen.com/finals/81/inTech-Recent_advances_in_face_recognition.zip, ISBN 978-953-7619-34-3, Uploaded as individual Chapters 1-15, 15 pages.

(56) References Cited

OTHER PUBLICATIONS

Doherty, et al., Internet Engineering Task Force (IETF), "Dynamic Symmetric Key Provisioning Protocol (DSKPP)", Dec. 2010, 105 pages.
Extended European Search Report for Application No. 13867269, dated Nov. 4, 2016, 10 pages.
Extended European Search Report for Application No. 14803988.6, dated Dec. 23, 2016, 10 pages.
Extended European Search Report from European Patent Application No. 14770682.4, dated Jan. 17, 2017, 14 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/066,273 dated Feb. 11, 2016, 29 pages.
Final Office Action from U.S. Appl. No. 14/066,273, dated Jan. 10, 2017, 24 pages.
Final Office Action from U.S. Appl. No. 14/066,384 dated Aug. 20, 2015, 23 pages.
Final Office Action from U.S. Appl. No. 14/145,466, dated Apr. 13, 2017, 61 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,611, dated Jan. 27, 2017, 14 pages.
Final Office Action from U.S. Appl. No. 14/218,646 dated Aug. 11, 2016, 25 pages.
Final Office Action from U.S. Appl. No. 14/218,692, dated Feb. 28, 2017, 27 pages.
Final Office Action from U.S. Appl. No. 14/218,692 dated Mar. 2, 2016, 24 pages.
Final Office Action from U.S. Appl. No. 14/218,743, dated Mar. 3, 2017, 67 pages.
Final Office Action from U.S. Appl. No. 14/268,619 dated Dec. 14, 2015, 10 pages.
Final Office Action from U.S. Appl. No. 14/268,733 dated Jan. 15, 2016, 14 pages.
Final Office Action from U.S. Appl. No. 14/448,747, dated Feb. 13, 2017, 74 pages.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,868 dated Aug. 19, 2016, 11 pages.
Final Office Action from U.S. Appl. No. 14/859,328, dated Mar. 6, 2017, 26 pages.
Grother, P.J., et al., NIST. Report on the Evaluation of 2D Still-Image Face Recognition Algorithms, NIST IR 7709. s.I, NIST, 2011, Jun. 22, 2010, pp. 1-58.
GSM Arena. [Online] Nov. 13, 2011, [Cited: Sep. 29, 2012], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila M., et al., "A Texture-Based Method for Modeling the Background and Detecting Moving Objects", Oulu : IEEE , Jun. 22, 2005, DRAFT, Retrieved from the Internet: http://www.ee.oulu.fi/mvg/files/pdf/pdf_662.pdf, 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
International Search Report and Written Opinion for Application No. PCT/US2015/028924 dated Jul. 30, 2015, 10 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kim et al., "Secure User Authentication based on the Trusted Platform for Mobile Devices," EURASIP Journal on Wireless Communications and Networking, pp. 1-15.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition-Livdet 2009," Image Analysis and Processing-ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.

(56) References Cited

OTHER PUBLICATIONS

Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,273 dated May 18, 2017, 46 pages.
Non-Final Office Action from U.S. Appl. No. 14/066,384 dated Jan. 7, 2015, 24 pages.
Non-Final Office Action from U.S. Appl. No. 14/066,384 dated Mar. 17, 2016, 40 pages.
Non-Final Office Action from U.S. Appl. No. 14/145,439 dated Feb. 12, 2015, 18 pages.
Non-Final Office Action from U.S. Appl. No. 14/145,466 dated Sep. 9, 2016, 13 pages.
Non-Final Office Action from U.S. Appl. No. 14/145,533 dated Jan. 26, 2015, 13 pages.
Non-Final Office Action from U.S. Appl. No. 14/145,607 dated Mar. 20, 2015, 22 pages.
Non-Final Office Action from U.S. Appl. No. 14/218,504 dated Feb. 27, 2017, 12 pages.
Non-Final Office Action from U.S. Appl. No. 14/218,551 dated Apr. 23, 2015, 9 pages.
Non-Final Office Action from U.S. Appl. No. 14/218,551 dated Jan. 21, 2016, 11 pages.
Non-Final Office Action from U.S. Appl. No. 14/218,551 dated May 12, 2016, 11 pages.
Non-Final Office Action from U.S. Appl. No. 14/218,575 dated Feb. 10, 2015, 17 pages.
Non-Final Office Action from U.S. Appl. No. 14/218,575 dated Jan. 29, 2016, 25 pages.
Non-Final Office Action from U.S. Appl. No. 14/218,575 dated May 4, 2017, 88 pages.
Non-Final Office Action from U.S. Appl. No. 14/218,611 dated Jun. 16, 2016, 13 pages.
Non-Final Office Action from U.S. Appl. No. 14/218,646 dated Mar. 10, 2016, 23 pages.
Non-Final Office Action from U.S. Appl. No. 14/218,646 dated Mar. 27, 2017, 24 pages.
Non-Final Office Action from U.S. Appl. No. 14/218,677 dated Aug. 2, 2016, 15 pages.
Non-Final Office Action from U.S. Appl. No. 14/218,677 dated Feb. 10, 2017, 18 pages.
Non-Final Office Action from U.S. Appl. No. 14/218,692 dated Nov. 4, 2015, 16 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.
Non-Final Office Action from U.S. Appl. No. 14/218,743 dated Jan. 21, 2016, 12 pages.
Non-final Office Action from U.S. Appl. No. 14/268,563 dated Apr. 21, 2017, 83 pages.
Non-Final Office Action from U.S. Appl. No. 14/268,619 dated Aug. 24, 2015, 17 pages.
Non-Final Office Action from U.S. Appl. No. 14/268,619 dated Mar. 21, 2016, 7 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,814 dated Apr. 5, 2017, 57 pages.
Non-Final Office Action from U.S. Appl. No. 14/448,814 dated Aug. 4, 2015, 13 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/066,384, dated May 23, 2017, 50 pages.
Notice of Allowance from U.S. Appl. No. 14/145,439 dated Jul. 6, 2015, 6 pages.
Notice of Allowance from U.S. Appl. No. 14/145,439 dated Mar. 14, 2016, 17 pages.
Notice of Allowance from U.S. Appl. No. 14/145,439 dated Oct. 28, 2015, 12 pages.
Notice of Allowance from U.S. Appl. No. 14/145,533 dated Jan. 20, 2016, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Feb. 1, 2016, 28 pages.
Notice of Allowance from U.S. Appl. No. 14/145,607 dated Sep. 2, 2015, 19 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.

(56) References Cited

OTHER PUBLICATIONS

Notice of Allowance from U.S. Appl. No. 14/268,686 dated Mar. 30, 2016, 38 pages.
Notice of Allowance from U.S. Appl. No. 14/268,686 dated Nov. 5, 2015, 23 pages.
Notice of Allowance from U.S. Appl. No. 14/268,733 dated Sep. 23, 2016, 8 pages.
Notice of Allowance from U.S. Appl. No. 14/268,733, dated Jan. 20, 2017, 62 pages.
Notice of Allowance from U.S. Appl. No. 14/448,641 dated Jun. 7, 2016, 13 pages.
Notice of Allowance from U.S. Appl. No. 14/448,697 dated Jan. 14, 2016, 23 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/448,868, dated Apr. 27, 2017, 52 pages.
Notice of Allowance from U.S. Appl. No. 14/448,868, dated Mar. 23, 2017, 57 pages.
Notice of Allowance from U.S. Appl. No. 14/487,992, dated Apr. 12, 2017, 14 pages.
Notice of Allowance from U.S. Appl. No. 14/487,992, dated Dec. 27, 2016, 28 pages.
Notice of Allowance from U.S. Appl. No. 14/487,992 dated Sep. 6, 2016, 26 pages.
Notification Concerning Transmittal of International Preliminary Report on Patentability for Application No. PCT/US14/39627, dated Dec. 10, 2015, 8 pages.
Notification of Transmittal of the International Search Report and the Written Opinion from counterpart Patent cooperation Treaty Application No. PCT/US13/77888, dated Aug. 4, 2014, 10 pages.
Notification of Transmittal of the International Search Report and the Written Opinion from counterpart Patent Cooperation Treaty Application No. PCT/US14/31344, dated Nov. 3, 2014, 16 pages.
Notification of Transmittal of the International Search Report and the Written Opinion from counterpart Patent Cooperation Treaty Application No. PCT/US14/39627, dated Oct. 16, 2014, 10 pages.
Notification of Transmittal of the International Search Report and the Written Opinion from counterpart Patent Cooperation Treaty Application No. PCT/US15/50348, dated Dec. 22, 2015, 9 pages.
Notification of Transmittal of the International Search Report and the Written Opinion from counterpart Patent Cooperation Treaty Application No. PCT/US2015/042786, dated Oct. 16, 2015, 3 pages.
Notification of Transmittal of the International Search Report and the Written Opinion from counterpart Patent Cooperation Treaty Application No. PCT/US2015/042799, dated Oct. 16, 2015, 8 pages.
Notification of Transmittal of the International Search Report and the Written Opinion from counterpart Patent Cooperation Treaty Application No. PCT/US2015/042870, dated Oct. 30, 2015, 9 pages.
Notification of Transmittal of the International Search Report and the Written Opinion from counterpart Patent Cooperation Treaty Application No. PCT/US2015/42783, dated Oct. 19, 2015, 13 pages.
Notification of Transmittal of the International Search Report and the Written Opinion from counterpart Patent Cooperation Treaty Application No. PCT/US2015/42827, dated Oct. 30, 2015, 9 pages.
Notification of Transmittal or International Search Report and Written Opinion from PCT/US2015/028927, dated Jul. 30, 2015, 12 pages.
Office Action from foreign counterpart Taiwan Patent Application No. 102148853, dated Feb. 17, 2017, 9 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.I. : Springer Science+Business Media, LLC, Aug. 4, 2010. Retrieved from the Internet: URL: http://www.cs.zju.edu.cn/-gpan/publication/2011-TeleSysliveness.pdf.
Partial Supplementary European Search Report from European Patent Application No. 14770682.4, dated Oct. 14, 2016, 8 pages.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.I. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 dated Aug. 16, 2016, 11 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverviewEUSIPC004.pdf.
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Supplementary Partial European Search Report for Application No. 13867269, dated Aug. 3, 2016, 7 pages.

(56) References Cited

OTHER PUBLICATIONS

T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
TechTarget, What is network perimeter? Definition from WhatIs. com downloaded from http://searchnetworking.techtarget.com/definition/network-perimeter on Apr. 14, 2017, 5 pages.
The Extended M2VTS Database, [retrieved on Sep. 29, 2012], Retrieved from the Internet: URL: http://www.ee.surrey.ac.uk/CVSSP/xm2vtsdb/, 1 page.
The Online Certificate Status Protocol, OCSP, RFC2560, 22 pages.
The source for Linux information, Linux.com, [online], [retrieved on Jan. 28, 2015], 2012, 3 pages.
Transmittal of International Preliminary Report on Patentability for Patent Application No. PCT/US2013/077888 dated Jul. 9, 2015, 7 pages.
Transmittal of International Preliminary Report on Patentability from foreign counterpart PCT Patent Application No. PCT/US2014/031344 dated Oct. 1, 2015, 9 pages.
Tresadern P., et al., "Mobile Biometrics (MoBio): Joint Face and Voice Verification for a Mobile Platform", 2012, 7 pages Retrieved from the Internet: URL: http://personal.ee.surrey.ac.uk/Personai/Norman.Poh/data/tresadem_PervComp2012draft.pdf.
Tronci R., et al., "Fusion of Multiple Clues for Photo-Attack Detection in Face Recognition Systems," International Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Validity, OSTP Framework, 24 pages, 2010.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How to Trick Google's New Face Unlock on Android 4.1 Jelly Bean," Aug. 6, 2012, 5 pages, [online], [retrieved Aug. 13, 2015]. Retrieved from the Internet: http://printscreenmac.info/how-to-trick-android-jelly-bean-faceunlock/.
Norld Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/268,563, dated Nov. 3, 2017, 46 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Search Report and Written Opinion for Application No. PCT/US2017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Martins R A., et al., "A Potpourri of Authentication Mechanisms the Mobile Device Way," CISTI, Jan. 2013, pp. 843-848.
Non-Final Office Action from U.S. Appl. No. 14/218,611, dated Sep. 19, 2017, 76 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 9 pages.
Notice of Allowance from U.S. Appl. No. 14/066,384, dated Dec. 1, 2017, 23 pages.
Notice of Allowance from U.S. Appl. No. 14/066,384, dated Jul. 26, 2017, 20 pages.
Notice of Allowance from U.S. Appl. No. 14/218,551, dated Aug. 16, 2017, 24 pages.
Notice of Allowance from U.S. Appl. No. 14/218,551, dated Dec. 13, 2017, 13 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.
Notice of Allowance from U.S. Appl. No. 14/448,868, dated Nov. 17, 2017, 15 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Office Action and Search Report from foreign counterpart Chinese Patent Application No. 201480031042.X, dated Dec. 4, 2017, 20 pages.

(56) References Cited

OTHER PUBLICATIONS

Starnberger G., et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.
Communication Pursuant to Rules 70(2) and 70a(2) EPC for European Application No. 15786487.7, dated Nov. 9, 2017, 1 page.
Communication Pursuant to Rules 70(2) and 70a(2) EPC for European Application No. 15827363.7, dated Mar. 13, 2018, 1 page.
Corrected Notice of Allowance from U.S. Appl. No. 15/396,452, dated Aug. 30, 2018, 17 pages.
Corrected Notice of Allowance from U.S. Appl. No. 14/066,273, dated Feb. 8, 2018, 4 pages.
Decision to Grant from foreign counterpart Japanese Patent Application No. 2015-550778, dated Jul. 25, 2018, 6 pages.
Extended European Search Report for Application No. 15826364.0, dated Feb. 20, 2018, 6 pages.
Extended European Search Report for Application No. 15827363.1, dated Feb. 22, 2018, 7 pages.
Extended European Search Report for Application No. 15828152.7, dated Feb. 20, 2018, 8 pages.
Extended European Search Report for Application No. 15841530.7, dated Mar. 26, 2018, 8 pages.
Final Office Action from U.S. Appl. No. 14/218,677, dated May 31, 2018, 16 pages.
Final Office Action from U.S. Appl. No. 15/229,254, dated Aug. 23, 2018, 16 pages.
Final Office Action from U.S. Appl. No. 14/218,575 dated Sep. 5, 2018, 19 pages.
Final Office Action from U.S. Appl. No. 14/218,611, dated May 3, 2018, 20 pages.
Final Office Action from U.S. Appl. No. 14/218,646, dated Aug. 9, 2018, 23 pages.
Final Office Action from U.S. Appl. No. 14/218,692, dated Apr. 17, 2018, 99 pages.
Final Office Action from U.S. Appl. No. 14/218,743, dated Feb. 7, 2018, 27 pages.
Final Office Action from U.S. Appl. No. 15/396,452, dated Feb. 27, 2018, 24 pages.
Final Office Action from U.S. Appl. No. 15/595,460, dated Jan. 11, 2018, 19 pages.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
Non-Final Office Action from U.S. Appl. No. 14/218,692, dated Jul. 31, 2018, 40 pages.
Non-Final Office Action from U.S. Appl. No. 14/145,466, dated May 11, 2018, 33 pages.
Non-Final Office Action from U.S. Appl. No. 14/268,563, dated Jun. 28, 2018, 56 pages.
Non-Final Office Action from U.S. Appl. No. 15/881,522, dated Jun. 6, 2018, 87 pages.
Non-Final Office Action from U.S. Appl. No. 15/900,620, dated Oct. 19, 2018, 66 pages.
Non-Final Office Action from U.S. Appl. No. 14/218,575, dated Mar. 8, 2018, 29 pages.
Non-Final Office Action from U.S. Appl. No. 14/218,646, dated Mar. 7, 2018, 32 pages.
Non-Final Office Action from U.S. Appl. No. 14/218,677, dated Feb. 2, 2018, 25 pages.
Non-Final Office Action from U.S. Appl. No. 15/229,254, dated Feb. 14, 2018, 75 pages.
Non-Final Office Action from U.S. Appl. No. 15/595,460, dated May 3, 2018, 20 pages.
Non-Final Office Action from U.S. Appl. No. 15/954,188, dated Sep. 7, 2018, 41 pages.
Notice of Allowance from foreign counterpart Chinese Patent Application No. 201480031042.X, dated Jul. 23, 2018, 5 pages.
Notice of Allowance from foreign counterpart Taiwan Patent Application No. 106125986, dated Jul. 6, 2018, 7 pages.
Notice of Allowance from U.S. Appl. No. 14/218,743, dated Aug. 1, 2018, 18 pages.
Notice of Allowance from U.S. Appl. No. 14/448,814, dated May 9, 2018, 42 pages.
Notice of Allowance from U.S. Appl. No. 15/396,452, dated Jul. 2, 2018, 23 pages.
Notice of Allowance from U.S. Appl. No. 14/066,273, dated Jan. 18, 2018, 26 pages.
Notice of Allowance from U.S. Appl. No. 14/218,504, dated May 31, 2018, 95 pages.
Notice of Allowance from U.S. Appl. No. 14/859,328, dated Feb. 1, 2018, 18 pages.
Notice of Allowance from U.S. Appl. No. 15/595,460, dated Oct. 9, 2018, 8 pages.
Notification for Granting Patent Right and Search Report from foreign counterpart Chinese Patent Application No. 201380068869.3, dated May 4, 2018, 10 pages.
Notification of Reason for Rejection from foreign counterpart Japanese Patent Application No. 2016-505506, dated Feb. 13, 2018, 6 pages.
Notification of Reasons for Rejection from foreign counterpart Japanese Patent Application No. 2016-0516743, dated Apr. 23, 2018, 12 pages.
Office Action and Search Report from foreign counterpart Taiwan Patent Application No. 106125986, dated Mar. 19, 2018, 6 pages.
Office Action from foreign counterpart Japanese Patent Application No. 2015-550778, dated Feb. 7, 2018, 14 pages.
Watanabe H., et al., "The Virtual Wearable Computing System Assumed Widely Movement," the multimedia, distribution and cooperation which were taken into consideration, mobile (DICOMO2009) symposium collected-papers [CD-ROM], Japan, Information Processing Society of Japan, Jul. 1, 2009, and vol. 2009 (1), pp. 1406-1414. (Abstract only in English).
OASIS Standard, "Authentication Context for the OASIS Security Assertion Markup Language (SAML) V2.0," Mar. 15, 2005, 70 pages.
"OpenID Connect Core 1.0—draft 17," Feb. 3, 2014, 70 pages.
Corrected Notice of Allowability from U.S. Appl. No. 15/595,460, dated Nov. 20, 2018, 38 pages.
Corrected Notice of Allowance from U.S. Appl. No. 15/595,460, dated Dec. 11, 2018, 70 pages.
Final Office Action from U.S. Appl. No. 14/145,466, dated Nov. 20, 2018, 28 pages.
Final Office Action from U.S. Appl. No. 14/268,563, dated Dec. 27, 2018, 47 pages.
Non-Final Office Action from U.S. Appl. No. 14/218,646, dated Dec. 31, 2018, 42 pages.
Non-Final Office Action from U.S. Appl. No. 14/218,677, dated Dec. 26, 2018, 32 pages.
Notice of Allowance from U.S. Appl. No. 14/218,692, dated Dec. 5, 2018, 13 pages.
Communication pursuant to Article 94(3) EPC for Application No. 15786796.1, dated Oct. 23, 2018, 4 pages.

\* cited by examiner

Authentication Policy 1711

| Rule | Location Class | Minimum Authentication Required |
|---|---|---|
| 1 | Location Class 1 | Authentication Technique(s) 1 |
| 2 | Location Class 2 | Authentication Technique (s) 2 |
| 3 | Location Class 3 | Authentication Technique (s) 3 |
| 4 | Location Class 4 | Authentication Technique (s) 4 |
| 5 | Location Class 5 | Authentication Technique (s) 5 |
| ------ | ------ | ------ |

FIG. 18

Text, Blank Spaces, and Images/Videos
Displayed in Known Order and Locations

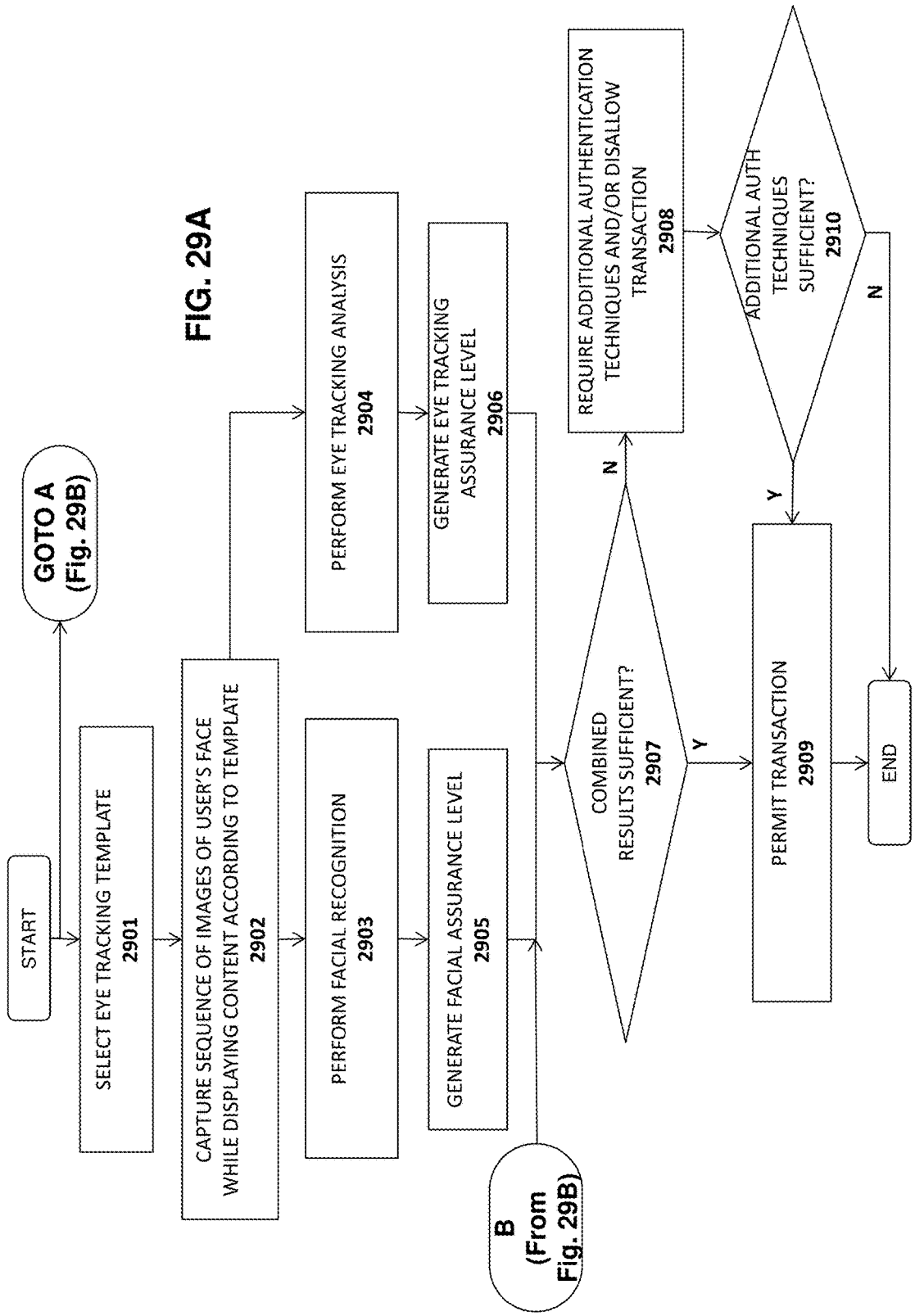

SYSTEM AND METHOD FOR SHARING KEYS ACROSS AUTHENTICATORS

BACKGROUND

Field of the Invention

This invention relates generally to the field of data processing systems. More particularly, the invention relates to advanced user authentication techniques and associated applications.

Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score 153 based on the similarity between the extracted features and the biometric reference data 110. The biometric reference data 110 is typically the result of an enrollment process in which the user enrolls a fingerprint, voice sample, image or other biometric data with the device 100. An application 105 may then use the score 135 to determine whether the authentication was successful (e.g., if the score is above a certain specified threshold).

Systems have also been designed for providing secure user authentication over a network using biometric sensors. In such systems, the score 135 generated by the application 105, and/or other authentication data, may be sent over a network to authenticate the user with a remote server. For example, Patent Application No. 2011/0082801 ("801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US Patent Applications ("Co-pending Applications"), all filed Dec. 29, 1012, which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending Applications describe authentication techniques in which a user enrolls with biometric devices of a client to generate biometric template data (e.g., by swiping a finger, snapping a picture, recording a voice, etc); registers the biometric devices with one or more servers over a network (e.g., Websites or other relying parties equipped with secure transaction services as described in the Co-Pending Applications); and subsequently authenticates with those servers using data exchanged during the registration process (e.g., encryption keys provisioned into the biometric devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's client device (e.g., smartphone, notebook computer, etc) to protect a user's privacy.

Authenticators such as those described above require some form of user interaction such as swiping the finger, or entering a secret code. These "normal" authenticators are intended to authenticate the user at a given point in time. In addition, "silent" authenticators may also be used which are designed to authenticate the user's device at a given point in time (rather than the user). These silent authenticators may rely on information extracted from the user's device without interaction by the user (e.g., sending a Machine-ID).

However, there are certain use cases where requiring explicit user interaction presents too much friction (e.g., near field communication (NFC) payments, frequently used apps requiring authentication without being tied to high value transactions), whereas a "silent" authentication technique such as sending a Machine-ID does not provide enough certainty that the legitimate user is still in possession of the device.

Several "continuous" authentication methods have been proposed by the research community such as Anthony J. Nicholson, "Mobile Device Security Using Transient Authentication," IEEE TRANSACTIONS ON MOBILE COMPUTING VOL. 5, NO. 11, pp. 1489-1502 (November 2006); Mohammad O. Derawi, "Unobtrusive User-Authentication on Mobile Phones using Biometric Gait Recognition" (2010); and Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf).

Some of these methods have even been adopted by the industry such as BehavioSec, "Measuring FAR/FRR/EER in Continuous Authentication," Stockholm, Sweden (2009). These methods generally provide an assurance level that the legitimate user is still in possession a device without adding friction to the authentication process, but they focus on a single modality (i.e. using a wearable token, gait recognition, face and color of clothing recognition and user's keyboard input).

One problem which exists, however, is that directly providing location data or other personal (e.g. face image, color of clothing, gait or typing characteristics, . . . ) or environmental data (e.g. temperature, humidity, WLAN SSIDs, . . . ) to the relying party for supplementing the risk estimation violates the user's privacy in some regions of the world. Consequently, more advanced remote authentication techniques are needed which are both non-intrusive and adequately protect the end user's privacy.

In addition, the strength of current authentication methods (e.g. passwords, fingerprint authentication, etc) is mostly constant over time, but the resulting risk varies based on the current environment in which authentication is performed (e.g. the machine being used, the network the machine is connected to, etc). It would be beneficial to select and/or combine authentication modalities based on the current detected risk.

When considering increasing the assurance level of authentication, typical methods for enhancing the level of explicit authentication methods like requiring more complex passwords or use more accurate biometric methods like fingerprint or face recognition come to mind. In reality, the authentication assurance level (or the transaction risk derived from it) also depends on other data, such as whether the authentication performed from the same device as before and whether the location of the authentication is realistically near to the location of the last successful authentication (e.g., authentication at 1 pm in San Francisco and at 2 pm same day in Tokyo doesn't seem to be realistic for one person).

Passwords still are the predominant explicit authentication methods. Unfortunately they are attacked easily and those attacks scale well. Additionally, entering passwords is cumbersome especially on small devices like smartphones. As a consequence many users do not use password based protection methods to lock their phones at all or they use trivial PIN code.

Some smartphones are using fingerprint sensors in order to provide a more convenient way to authentication. Using biometric modalities for authentication has been criticized for not providing sufficient spoofing attack resistance and for introducing privacy issues by potentially not protecting biometric reference data properly.

Various "fusion" methods for combining biometric modalities have been proposed. Some of them address usability issues by reducing the false rejection rate (FRR); other address the security issue by reducing the false acceptance rate (FAR). These methods thus far have proposed static fusion algorithms. Unfortunately this approach still leads to varying assurance levels depending on the "other inputs" (as discussed above).

For certain classes of transactions, the riskiness associated with the transaction may be inextricably tied to the location where the transaction is being performed. For example, it may be inadvisable to allow a transaction that appears to originate in a restricted country, such as those listed on the US Office of Foreign Asset Control List (e.g., Cuba, Libya, North Korea, etc). In other cases, it may only be desirable to allow a transaction to proceed if a stronger authentication mechanism is used; for example, a transaction undertaken from within the corporation's physical premises may require less authentication than one conducted from a Starbucks located in a remote location where the company does not have operations.

However, reliable location data may not be readily available for a variety of reasons. For example, the end user's device may not have GPS capabilities; the user may be in a location where Wifi triangulation data is unavailable or unreliable; the network provider may not support provide cell tower triangulation capabilities to augment GPS, or Wifi triangulation capabilities. Other approaches to divine the device's location may not have a sufficient level of assurance to meet the organization's needs; for example, reverse IP lookups to determine a geographic location may be insufficiently granular, or may be masked by proxies designed to mask the true network origin of the user's device.

In these cases, an organization seeking to evaluate the riskiness of a transaction may require additional data to provide them with additional assurance that an individual is located in a specific geographic area to drive authentication decisions.

Another challenge for organizations deploying authentication is to match the "strength" of the authentication mechanism to the inherent risks presented by a particular user's environment (location, device, software, operating system), the request being made by the user or device (a request for access to restricted information, or to undertake a particular operation), and the governance policies of the organization.

To date, organizations have had to rely on a fairly static response to the authentication needs of its users: the organization evaluates the risks a user will face during operations they normally perform and the requirements of any applicable regulatory mandate, and then deploys an authentication solution to defend against that risk and achieve compliance. This usually requires the organization to deploy multiple authentication solutions to address the multitude and variety of risks that their different users may face, which can be especially costly and cumbersome to manage.

The techniques described in the Co-pending Applications provide an abstraction that allows the organization to identify existing capabilities on the user's device that can be used for authentication. This abstraction shields an organization from the need to deploy a variety of different authentication solutions. However, the organization still needs a way to invoke the "correct" authentication mechanism when necessary. Existing implementations provide no capabilities for the organization to describe what authentication mechanism is appropriate under which circumstances. As a result, an organization would likely need to codify their authentication policy in code, making the solution brittle and necessitating code changes in the future to enable use of new authentication devices/tokens.

Electronic financial transactions today are conducted primarily through the World Wide Web using browser applications. Sites like Amazon.com, Dell, and Wal-Mart sell billions of dollars of merchandise via their online portals and banks and brokerages allow their customers to move billions of dollars of funds from account to account online. One challenge for web sites such as these is how to detect fraudulent activity. Fraudulent transactions can cost these companies billions of dollars.

The first line of defense against fraudulent transactions is the user's password. However, criminals can obtain passwords through a variety of techniques. Sometimes the password is weak in complexity and can easily be guessed or determined by a brute force attack. Other times, malware, worms, or viruses can infect a users computer. Passwords are then obtained by recording keystrokes or scanning memory or hard disk storage. If the actual device is stolen, passwords can be recovered from data that remains in memory or in storage. Once the password is compromised, criminals have the ability to access accounts and withdraw or move funds.

To try to prevent damage caused by the breach of a user's password, sites that deal with financial transactions employ risk assessment in which various metrics are used to determine if the person initiating the transaction is actually the user that owns the account. Factors such as the time of the transaction, the location of the transaction, and the circumstances of the transactions are all good ways to assess whether a transaction has risk. For example, it would be more unlikely for a transaction to be initiated at 3:00 AM versus 3:00 PM if the user does not typically have any activity on their account at night. Likewise, if the user lives in the United States but the transaction is initiated in Korea, that location difference would be a warning sign. Finally, if the amount of money being processed is significantly different in magnitude than normal, this is another signal of potential fraud.

Unfortunately, Web browsers place very strict limits on what information websites can obtain about the client system. Because browsers expose a user's machine to the outside (and possibly malicious) world, leaking any more data than necessarily is a security risk of its own. Certainly, it is possible to record the time of transactions, the location of the transaction (via the user's IP address for example), and the magnitude of the transaction. Web sites currently use all of this data to determine whether a transaction is fraudulent. However, beyond these basic pieces of information provided by the browser, web sites have no other information to utilize for risk assessment. Because of the limitations on what information the browsers can obtain, risk assessments for a user's transaction are not very precise.

BRIEF DESCRIPTION OF THE DRAWINGS

A better understanding of the present invention can be obtained from the following detailed description in conjunction with the following drawings, in which:

FIG. 18 illustrates an exemplary set of authentication policy rules;

FIGS. 29A-B illustrate embodiments of a method for performing eye-tracking and facial recognition-based authentication as well as voice recognition and lip movement analysis authentication;

DETAILED DESCRIPTION OF PREFERRED EMBODIMENTS

Figure 1:
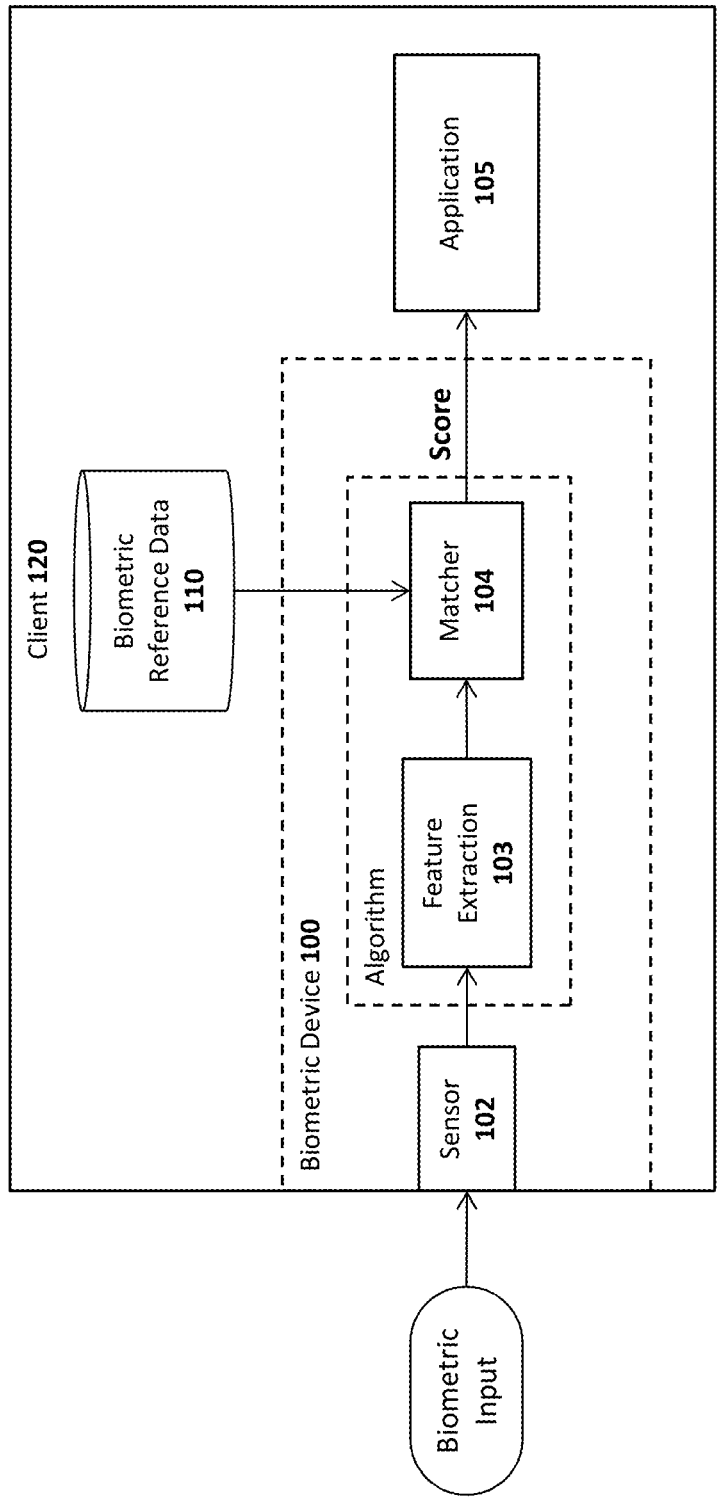
FIG. 1 illustrates an exemplary client equipped with a biometric device.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The authentication capabilities may also include non-biometric devices such as trusted platform modules (TPMs) and smartcards.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

A. Non-Intrusive, Privacy Preserving Authentication

One embodiment of the invention uses "normal" authentication techniques (e.g., swiping a finger, entering a code, etc) in order to train the authentication system to recognize non-intrusive authentication situations. In addition, one embodiment returns the authentication state of the device to the relying party rather than sensitive information such as a Machine ID when authentication is required.

Some embodiments of the invention described below may work completely frictionless (i.e. without requiring any explicit user authentication). Behavioral or other techniques may be used to continuously measure an assurance level which indicates the current assurance that an authorized user is in possession of the device. The assurance level may be calculated, for example, based on the time which has passed since the last explicit user authentication (e.g., to SIM card or phone unlock with PIN or finger swipe). Assuming that amount of time which has passed is within a particular threshold (e.g., 5 seconds, 5 minutes, 1 hour, etc), the device may be considered to be in a "legitimate user state" and the assurance level set to a maximum value (e.g., 100 on a normalized scale of −100 to 100).

Following the legitimate user state, the assurance level may be measured based on a combination of the elapsed time since explicit user authentication and other variables which indicate that the authorized user is in possession of the device (e.g., based on non-intrusive input detected from device sensors). For example, the biometric gait of the user may be measured using an accelerometer or other type of sensor in combination with software and/or hardware designed to generate a gait "fingerprint" from the user's normal walking pattern. In addition, the distance to frequently visited destinations of the legitimate user may be tracked, stored and subsequently used to determine the assurance level. For example, if the user is connecting to a relying party from a location known to be the user's home or office, then the assurance level may be set to a relatively high value, whereas if the device is connecting from an unknown or distant location, then the assurance level may be adjusted to a lower level.

Various other types of non-intrusive measurements may be performed to determine whether the authorized user is in possession of the device including, for example, the identity of networks or devices to which the client device is connected such as Bluetooth devices, near field communication (NFC) devices, Wifi devices such as routers or access points, smart watches, other computing devices, Nymi bracelets, to name a few. Wifi devices may include the visibility of Wifi networks in reach such as a personal Wifi router at home and Wifi-enabled computers used by colleagues or family members. In addition, certain specific characteristics of the client device such as acceleration sensor characteristics and digital camera sensor pattern noise, may be used for non-intrusive measurements. Touch screen gestures of normal user interaction may also be analyzed and stored as reference data as well as user typing behavior from normal user interaction. Of course, the foregoing are merely examples; the underlying principles of the invention are not limited to any set of non-intrusive variables.

The end result is that an assurance level that the legitimate user still is in the possession of the device may be sent to the relying party in the authentication response. In one embodiment, the assurance level is "signed" or otherwise authenticated by a key (e.g., a relying-party specific key established and attested in a registration phase as discussed below). In one embodiment, the assurance level is normalized to a value between −100 and 100, where −100 means "almost certain it is not the legitimate user," 0 means "don't know," and 100 means "almost certain that it is the legitimate user."

In one embodiment, the relying party may ask the client device for using an additional "normal" authenticator response if the assurance level is not acceptable for the envisioned transaction. Regardless of what level of authentication is required, one embodiment does not disclose personal data to the relying party. Instead, it uses a cryptographic key dedicated to one specific relying party in order to authenticate the authenticator to the relying party.

Figure 2:
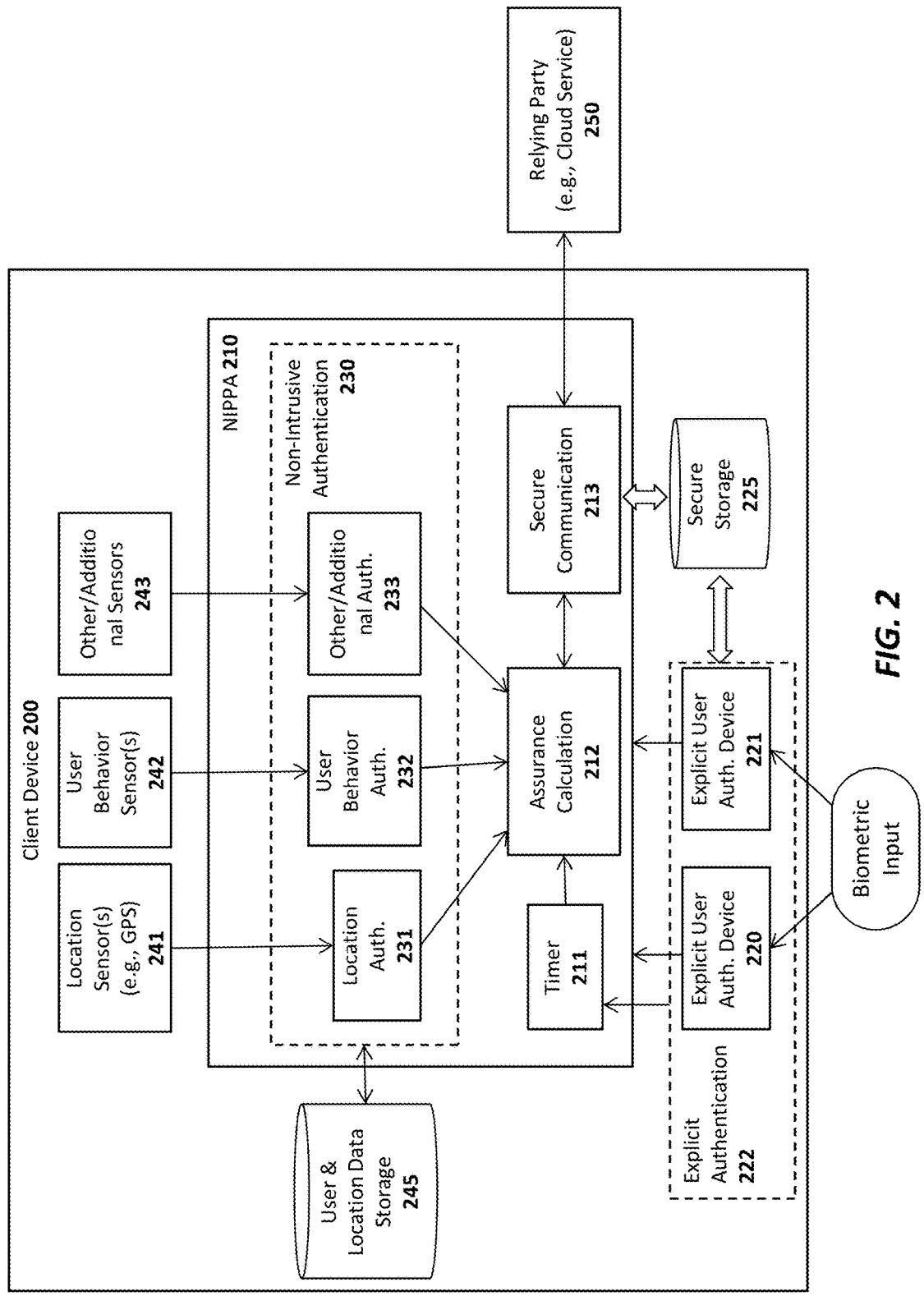
FIG. 2 illustrates one embodiment of a non-intrusive privacy-preserving authenticator (NIPPA)

One embodiment of an architecture for providing non-intrusive privacy-protecting authentication is illustrated in FIG. 2 which includes a non-intrusive privacy-preserving authenticator (NIPPA) 210 including an assurance calculator 212 for determining the current assurance level based on input from non-intrusive authentication mechanisms 230 (e.g., location, gait measurements, etc) and one or more explicit user authentication devices 220-221 (e.g., fingerprint sensors, input devices for entering ID codes, etc). In one embodiment, the explicit user authentication devices 220-221 include the same or similar architecture as shown in FIG. 1.

In the embodiment illustrated in FIG. 2, the non-intrusive authentication 230 includes a location authentication module 231 for performing location-based authentication using a location sensor(s) 241 and historical or user-specified location data stored within a user/location data storage device 245 (e.g., which may be implemented as a file system or database). By way of example and not limitation the location sensor 241 may include a GPS device and/or a module for detecting a current access point or cell tower to which the client 200 is connected (which can be used to estimate the device's current location). Any sensor capable of providing data related to a user's location may be used. The location authentication module 231 determines the effect that the current location of the client device has on the assurance level. For example, if the device is currently at a "home" or "office" location (according to historical or user-specified location data 245) then the assurance level may be adjusted upwards; whereas if device is currently at a distant, unknown location, then the assurance level may be adjusted downwards. In addition to automatically training the system during the "legitimate user state" (as described herein) in one embodiment, the user is provided with the ability to manually specify certain locations as "trusted" and therefore having a high assurance level (e.g. when the user is at home or at the office). The results of the location authentication module 231 are provided to the assurance calculation module 212 to that it may be factored into current assurance level calculations.

The user behavior authentication module 232 relies on one or more user behavior sensors 242 to determine the extent to which the current user behavior is consistent with historical user behavior (stored in user & location data storage 245). For example, the user behavior sensors 242 may provide accelerometer measurements that the user behavior authentication module may use to determine the gait of the user currently in possession of the device 200. It may then compare these measurements with the known gait of the user (collected following prior explicit user authentications and stored in storage device 245) to arrive at a level of confidence that the legitimate user is in possession of the device. The results are provided to the assurance calculation module 212 to that it may be factored into current assurance level calculations.

Various other/additional authentication devices 233 may collect data from other/additional sensors 243 to perform authentication calculations, the results of which are provided to the assurance calculation module 212 to factor into current assurance level calculations.

Although illustrated as separate modules in FIG. 2, the location authentication module 231, the user behavior module 232 and any other authentication modules 233 may form part of the assurance calculation module 212. The underlying principles of the invention may be implemented using various different logical arrangements of modules.

As illustrated, in one embodiment, the assurance calculation module 212 relies on a timer 211 when measuring the amount of time which has passed since the last explicit user authentication. As discussed in detail below, the amount of time which has passed since the last explicit user authentication may be used to determine whether the device is currently in a "legitimate user state" and to adjust the assurance measurement accordingly.

Once the assurance calculation module 212 has arrived at a current assurance measurement, it may communicate the measurement to a relying party (a cloud service in one embodiment) established via a secure communication module 213. For example, each authenticator 220-221, including the non-intrusive authenticator 230 may exchange a relying-party-specific and attested key in a registration operation (preceding authentication). The assurance level returned in the authentication operation may be part of a message signed/encrypted by the relying-party-specific authentication key. In addition, as discussed below, the message may also include nonce (e.g., a random challenge) generated by the relying party.

In one embodiment, secure storage 225 is a secure storage device provided for storing the authentication keys associated with each of the authenticators and used by the secure communication module 213 to establish secure communication with the relying party.

As mentioned, in one embodiment, the NIPPA 210 leverages existing (explicit) user authentication techniques (e.g. password based system login, SIM card unlock, etc) to maintain a "legitimate user" state within a defined time window after each of such successful authentication (up to T1 seconds). The NIPPA 210 may periodically measure user behavior from the various sensors 241-243 and while in the "legitimate user" state, may update its internal reference data vector according to the measurement. While not in the "legitimate user" state, the NIPPA 210 may compute the normalized "distance" to the reference data vector based on the current measurement. This "distance" is considered the certainty that the legitimate user is still in possession of the authenticator.

When asked to authenticate a user, the NIPPA 210 may check to determine whether it is in the "legitimate user" state. If so, authentication is considered successful and the maximum assurance level (e.g., 100) is returned. If not in the "legitimate user" state, the NIPPA 210 may return an assurance level computed by the assurance calculation module 212 based on the latest measurements. The NIPPA 210 may then combine the assurance level with the time difference td of that measurement tm to current time tc (td=tc−tm). In one embodiment, this is done using the following logic:

(1) if (assurance-level>=0) then resulting-assurance-level=assurance-level*(max (T0−td, 0)/T0), where T0 is the maximum acceptable time difference; and (2) if (assurance-level<0) then resulting-assurance-level=assurance-level.

Figure 3:
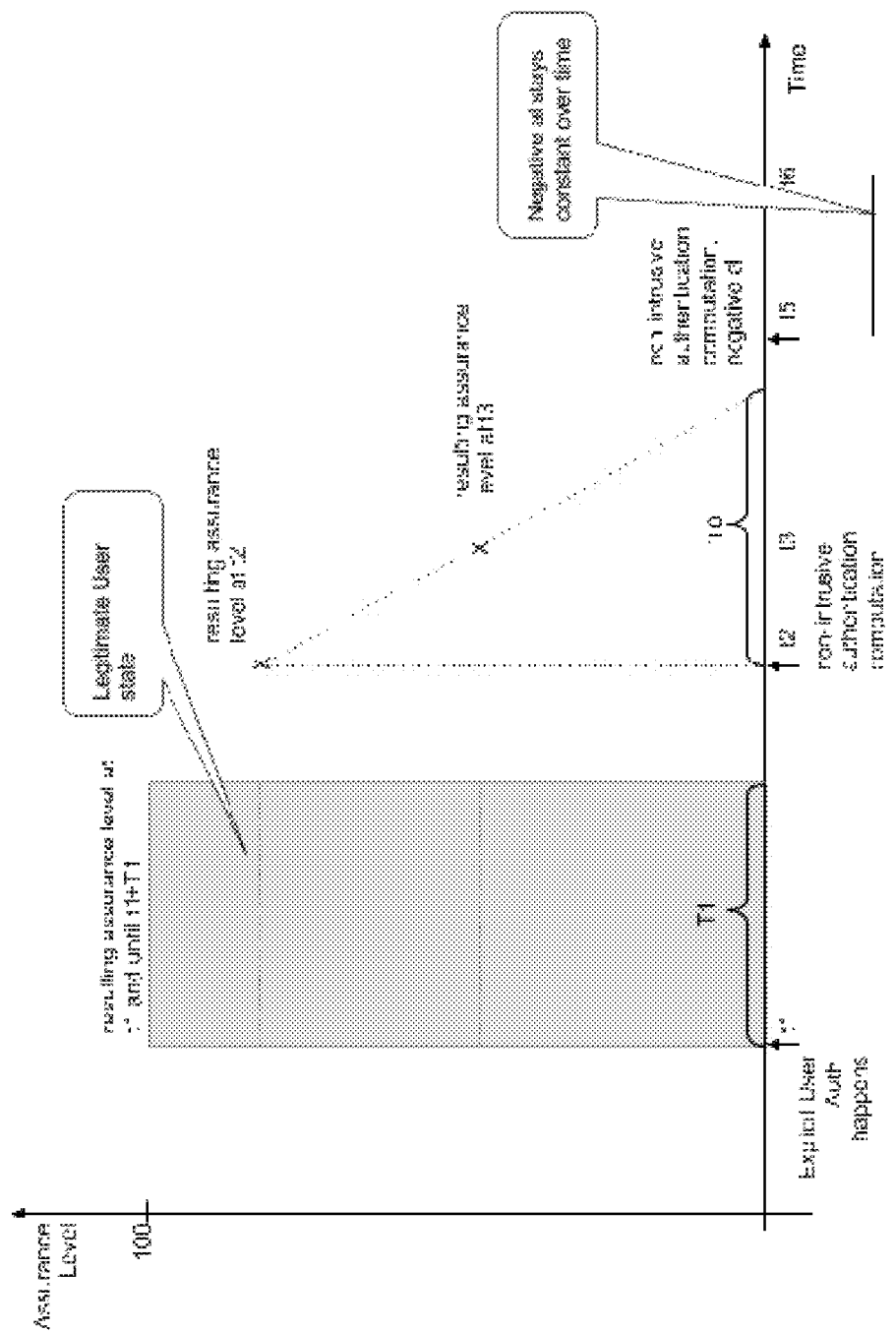
FIG. 3 graphically illustrates the operation of one embodiment of the invention during a "legitimate user state" and following the legitimate user state.

The operation of one embodiment of the invention according to the above equations is illustrated in FIG. 3. At time t1 the user performs an explicit authentication (e.g., swipes a finger, enters a PIN in order to unlock the SIM card, etc). The time window until t1+T1 is considered the "Legitimate User" state. As mentioned, the non-intrusive authenticators may be trained within the legitimate user state. For example, the user's gait may be measured, and/or locations visited by the user may be recorded and subsequently used to perform non-intrusive authentication.

At time t2 (outside of the legitimate user state) the assurance calculation module 212 computes the assurance level based on the non-intrusive authenticator. The result is positive, indicating that it the device is likely in full control of the legitimate user. After this computation, the assurance level decreases over time (e.g., the legitimate user may expose the device to non-legitimate people). For example, at time t3 the assurance level has dropped significantly from time t2. In one embodiment, the non-intrusive assurance level is only computed periodically in order to avoid excessive power and CPU performance consumption.

At t5 another non-intrusive assurance level computation occurs. This time the result is negative, indicating a likelihood that the device is not under full control of the legitimate user. This negative assurance level does not change until another computation is performed based on the non-intrusive authenticator (e.g., at time t6).

Figure 4:
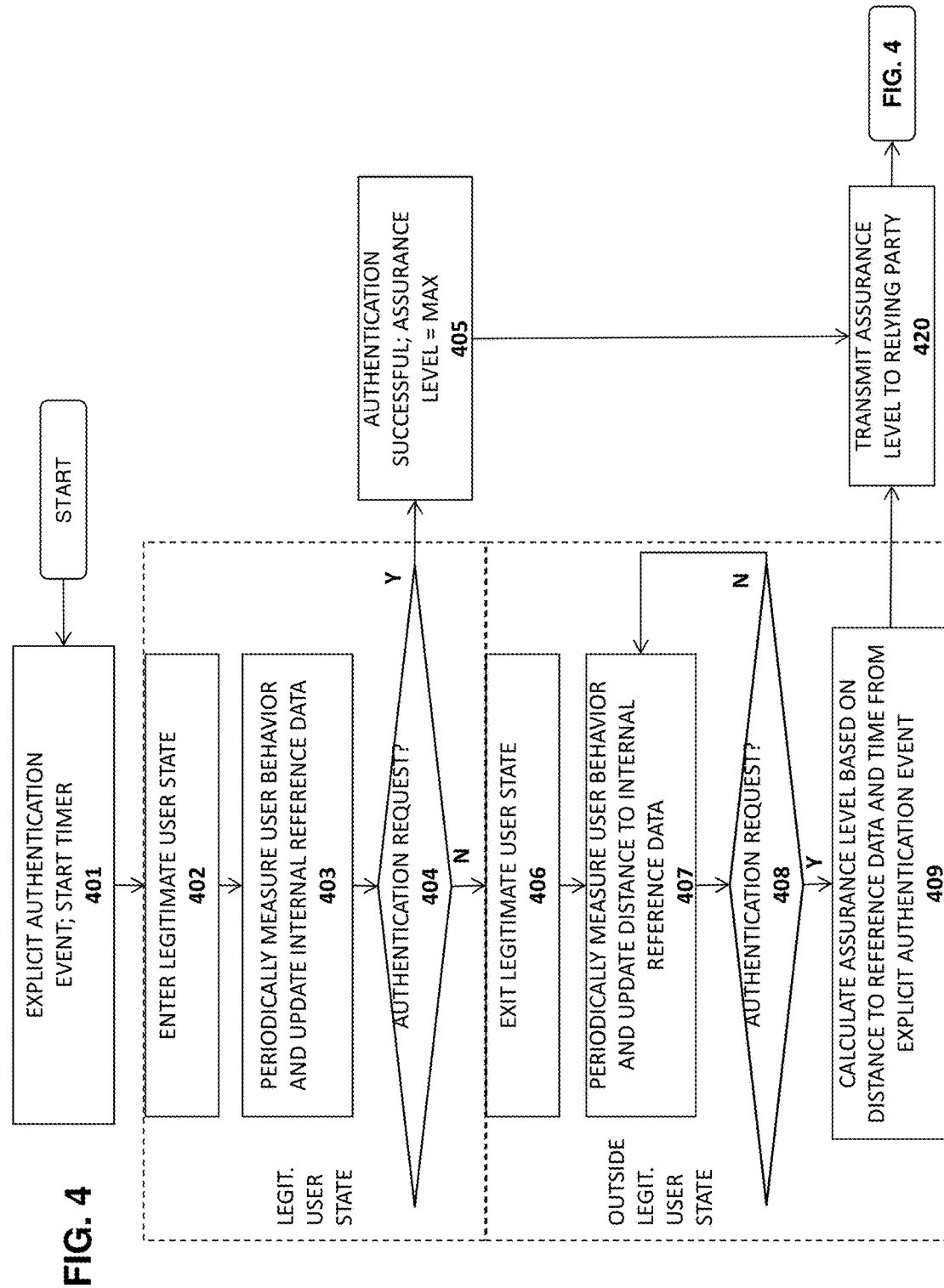
FIG. 4 illustrate one embodiment of a method for non-intrusive privacy-preserving authentication.
Figure 5:
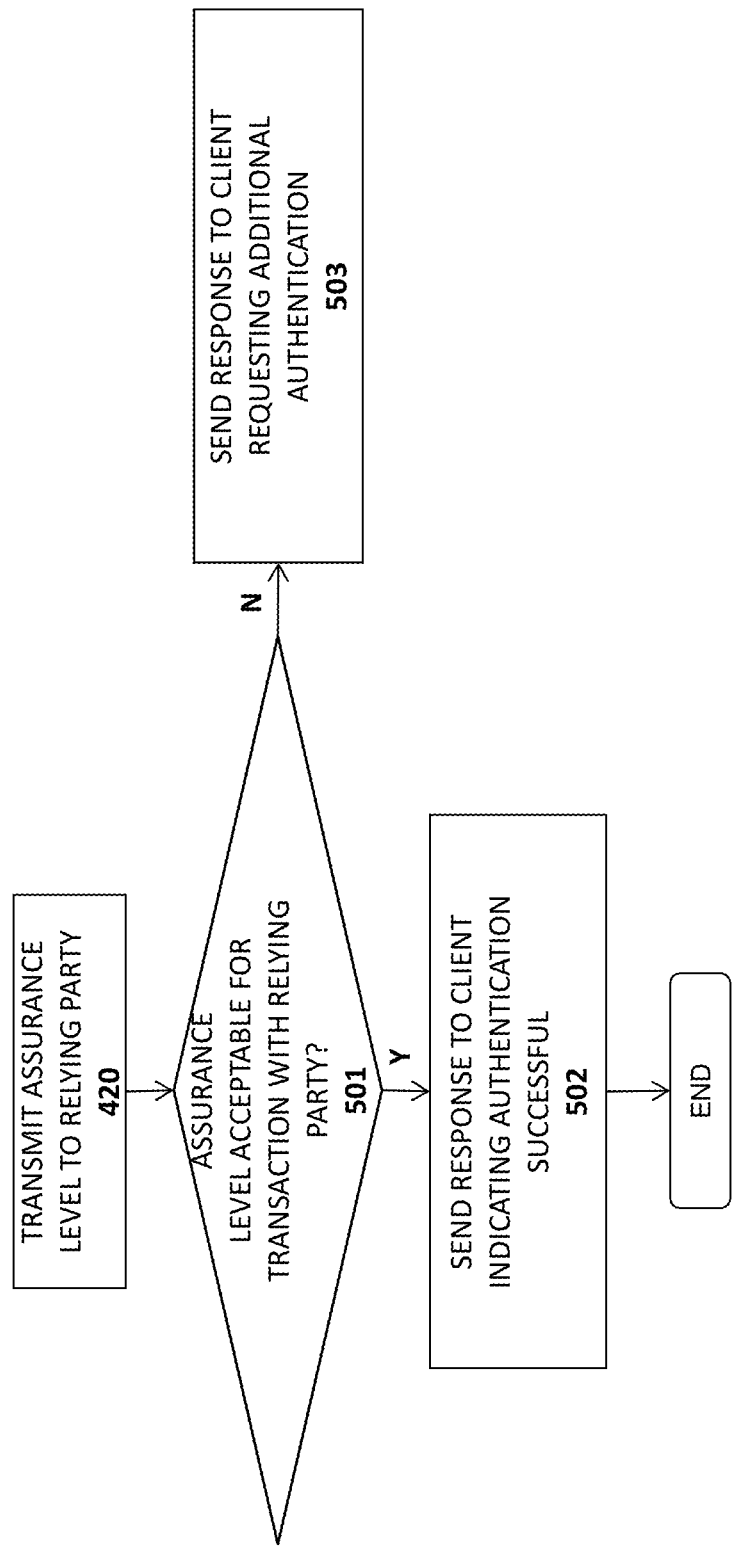
FIG. 5 illustrates a distance function employed for location-based authentication in one embodiment.

A method in accordance with one embodiment is illustrated in FIGS. 4-5. The method may be implemented within the system architecture such as that shown in FIG. 2, but is not limited to any particular system architecture.

At 401, an explicit authentication event occurs such as a swipe on a fingerprint sensor or the entry of a PIN to unlock the device. A timer may also be started to measure the time which has elapsed from the explicit authentication event. At 402, the legitimate user state is entered and at 403, various aspects of user behavior may be measured and stored for later reference (e.g., locations, user gait, etc). If an authentication request occurs during the legitimate user state, determined at 404 (e.g., resulting from a transaction with a relying party), then at 405 the maximum assurance level is selected and sent to the relying party at 420.

At 406, the system exits the legitimate user state (e.g., because the timer indicates that a specified amount of time has elapsed). At 407, the system periodically measures the user behavior by comparing data from sensors against internal reference data stored in operation 403. By way of example, measurements associated with the gait of the user (collected when in the legitimate user state) may be compared with current gait measurements (collected at 407) and a correlation between the two may be calculated (referred to as the "distance" to the reference data). If an authentication request is received when outside of the legitimate user state, determined at 408, then at 409 the current assurance level is calculated based on the distance to the internal reference data and potentially the time from the explicit authentication event. The assurance level is then transmitted to the relying party at 420.

Turning to FIG. 5, if the assurance level transmitted to the relying party is acceptable for the current transaction with the user, determined at 501, then the relying party may send a response to the client device indicating a successful authentication. If not, then at 503, the relying party may send a response to the client indicating that additional authentication is needed (e.g., potentially explicit user authentication if non-intrusive authentication is insufficient).

In an alternate embodiment, the relying party may initially specify an assurance level required for a particular transaction and the system will ensure that the required assurance level is met, potentially using explicit user authentication if the non-intrusive authentication techniques are insufficient. The system may then send the relying party an indication of successful authentication (rather than an assurance level).

Figure 6:
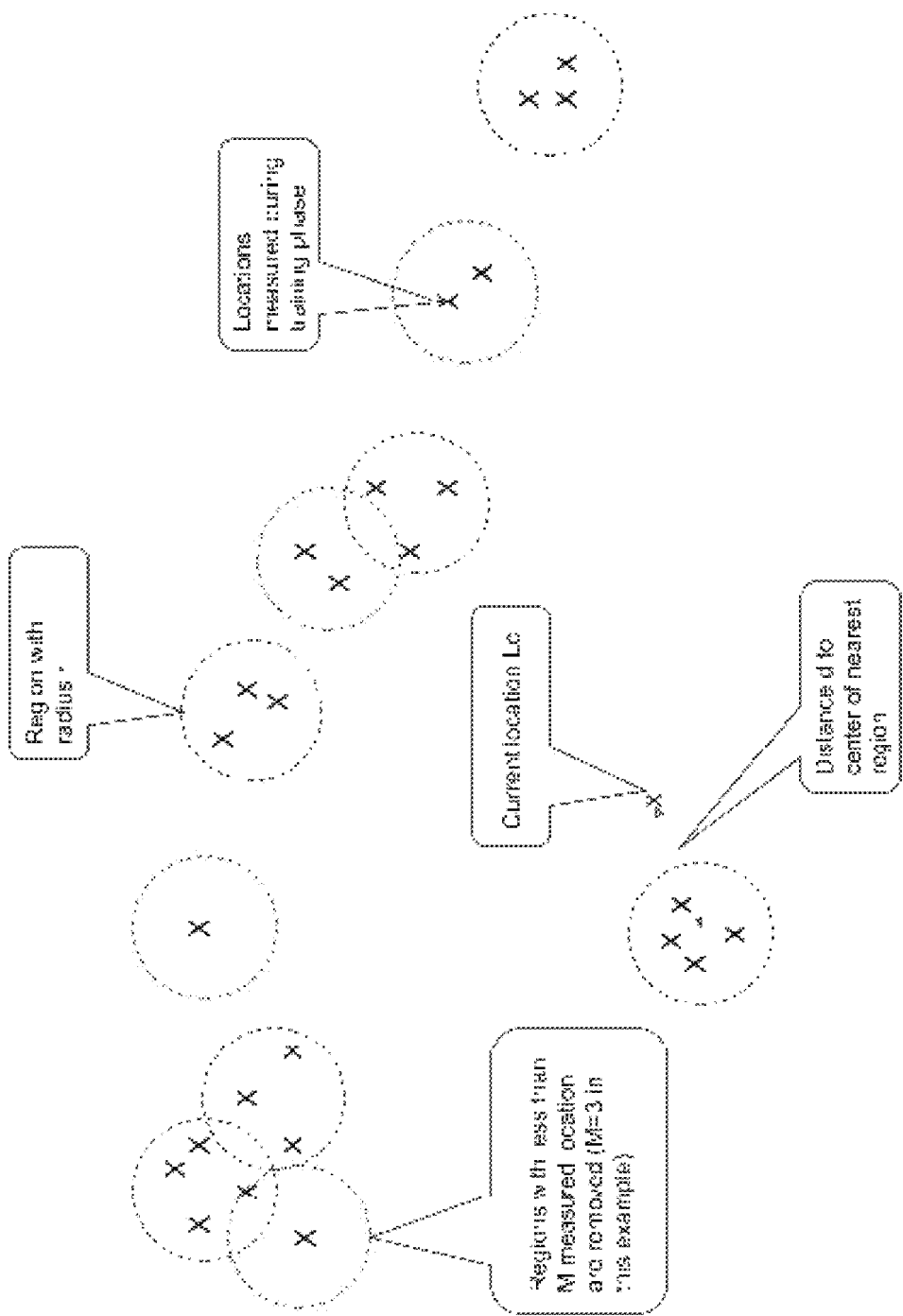
FIG. 6 graphically illustrates the operation of one embodiment of the invention using an extended legitimate user state window.

As mentioned above, one embodiment of the invention calculates a distance from a set of known user locations to determine the assurance level. Referring to FIG. 6, location-based measurements (e.g., such as GPS) may be used to calculate the "distance" function as follows.

In a preprocessing operation, all measured locations (Ln) are assigned to their nearest "regions." A region is defined as a circle with a radius of r (e.g. 10 meters). The Regions are placed such that a minimal number of Regions covers all Ln. All regions which cover fewer than M locations are removed from the set of Regions (i.e., as they are not considered "frequent" locations of the user).

The "distance" (d) is then determined using distance=(distance of the current location (Lc) to the nearest center of a Region (Rn))/r where r is the radius of a region. This value is smaller or equal to 1 if Lc is inside an existing region and may get very big if Lc is outside. The assurance level is then calculated using: Assurance-Level=Max(100−50*floor(d), −100), which will be in the range of −100 to 100.

In some of the embodiments above, it is assumed that the legitimate user is still in possession of the client device within a specific time window following an explicit authentication or if current behavior is very similar to measured behavior. However, the above embodiments only update the behavioral reference data inside a specific time window after an explicit authentication.

Figure 7:
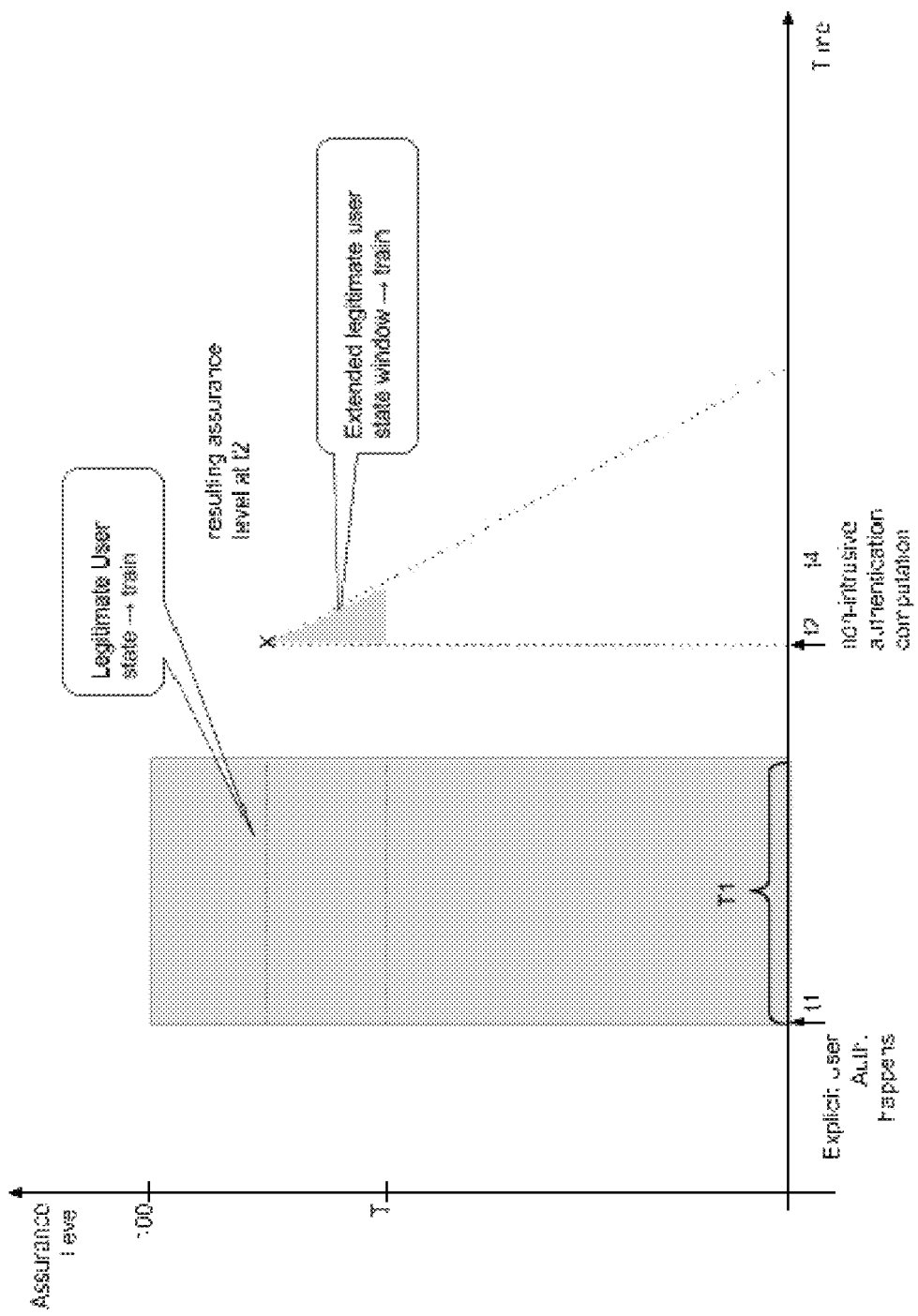
FIG. 7 illustrates an adaptive authentication module in accordance with one embodiment of the invention.

As illustrated in FIG. 7, one embodiment of the invention uses an extended time window to update behavioral reference data (i.e., train the system) in addition to the standard time window for the legitimate user state. As a result, the complete time window (including the standard time window and extended time window) may be defined as follows: (1) if inside the legitimate user state time window following a successful explicit user authentication (i.e. t1 . . . t1+T1), or (2) if the returned assurance level would be above a certain threshold T (e.g., T=90 at, e.g., t2, t4, etc). Setting the threshold to 0 is undesirable because it would make it very easy for an attacker to "shift" the behavioral reference to his favor.

B. Adaptive Authentication Techniques

Figure 8:
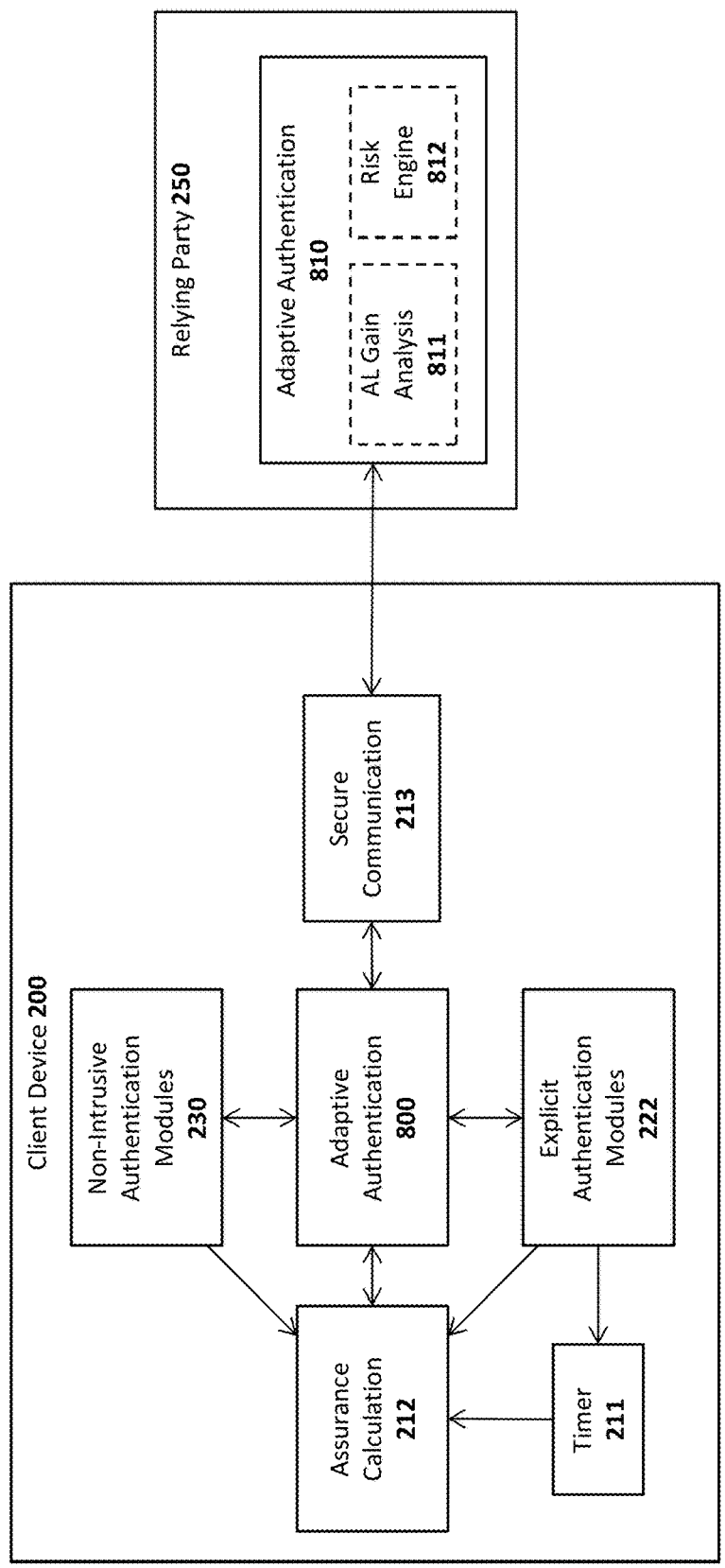
FIG. 8 illustrates one embodiment of an adaptive authentication method.

FIG. 8 illustrates one embodiment of the invention for implementing adaptive authentication techniques. As in the embodiments discussed above, this embodiment includes one or more non-intrusive authentication modules 230 for performing non-intrusive authentication (e.g., based on location, sensed user behavior, etc) and one or more explicit authentication modules 222 for performing explicit user authentication (e.g., requiring a PIN, fingerprint scan, etc). In addition, as in prior embodiments, an assurance calculation module 212 performs assurance calculations based on, for example, the time since the last explicit authentication (provided by timer 211) and/or authentication data provided by the various authentication modules 230, 222. The secure communication module 213 establishes secure communication with the relying party 250 (e.g., using a secure encryption key as discussed above).

In one embodiment, an adaptive authentication module 800 dynamically selects among the available non-intrusive authentication techniques and explicit/intrusive authentication techniques to arrive at an assurance level sufficient for a current transaction with the relying party 250. Alternatively, or in addition, an adaptive authentication module 810 on the relying party 250 may perform the authentication selection techniques to arrive at a sufficient assurance level. The underlying principles of the invention remain the same regardless of whether the authentication selection techniques are implemented on the client device 200 (by adaptive authentication module 800) or the relying party 250 (by the adaptive authentication module 810).

Moreover, the "relying party" 250 illustrated in FIG. 8 may represent a trusted third party server which may implement the authentication techniques described herein on behalf of the relying party, and provide the results to the relying party. Thus, while the embodiments of the invention are described in terms of a "relying party," the underlying principles of the invention may be implemented using servers outside of the perimeter of the network operated by the relying party.

As discussed in greater detail below, in one embodiment, the adaptive authentication module 810 includes a risk engine 812 to determine a risk level based on variables associated with the client device (e.g., based on current IP address, IP packet round-trip delay times, etc). In addition, an assurance level gain analysis component 811 may determine the amount by which a current assurance level must be increased to arrive at an acceptable assurance level. While these elements are illustrated in FIG. 8 as components of the adaptive authentication module 810 of the relying party, they may also be implemented within the adaptive authentication module 800 of the client while still complying with the underlying principles of the invention.

In one embodiment, once a client device 200 connects to the relying party 250 (e.g., to initiate a transaction), the risk engine 812 determines the risk (or an assurance level) based on all data currently available. This may include, for example, a geo-location of the client device 200 (e.g., as derived from the IP address, or provided by a mobile network operator), the round-trip delay times of packets transmitted between the client device 200 and relying party 250, the number of hops for network packets sent between the client device 200 and relying party 250, a specific "user agent" string sent by a user agent executed on the client device 200, to name a few. In one embodiment, the risk engine 812 then evaluates this data to arrive at an implicit "risk score" (or a preliminary assurance level inversely related to the risk score), which may be used to determine the amount of additional assurance required to authenticate the user for a given transaction.

In one embodiment, based on the implicit risk score, the adaptive authentication module on the relying party 810 or the client device 800 determines a set of one or more authentication modules 222, 230 with the potential of increasing the overall assurance level to the required level for an intended transaction (i.e., when combined with the preliminary assurance level/implicit risk score). In one embodiment, the assurance level gain analysis module 811 determines the amount of gain required and the adaptive authentication module 800, 810 is provided with an indication of the required assurance level gain as a parameter. The adaptive authentication module 800, 810 then uses this "gain" parameter in order to determine the most convenient set of authentication techniques (non-intrusive 230 and/or explicit 222) in order to achieve (at least) the required gain. The adaptive authentication module 800 may include a formal description of the selected set of authentication techniques in a response to the relying party 250 (e.g. as an authenticated extension). The relying party 250 may then verify whether the resulting overall assurance level meets the required level.

By way of example, and not limitation, the adaptive authentication module 800 may combine authentication modalities such as device fingerprinting (e.g. recognizing sensor flaws, or camera sensor pattern noise); environmental information (e.g. GPS based location; location derived from WIFI networks; existence of wired or wireless connections to other gadgets like Nymi, smart watches (pebble), or peripherals like headsets, . . . etc.); behavioral data (e.g. the way the user takes the device out of a pocket, typing behavior, gait, . . . etc); the time since the device was in a "trusted" state; and potentially the result of a new explicit authentication using one or more authentication modalities (biometric or otherwise) required to achieve the required (remaining) gain in the assurance level.

The result of the above techniques is that users may opt for the most convenient authentication method. In the case of smartphones this may simply be having access to the phone (see above). Instead of asking the user to select an authentication method and subsequently, requiring the user for another explicit authentication, the relying party 250 sends an indication of the required assurance level gain to the adaptive authenticator 800, 810 which identifies the least intrusive set of authentication techniques. The adaptive authentication module 800, 810 does not always require an explicit (intrusive) user authentication (like entering a PIN or swiping a finger), nor is it solely based on non-intrusive modalities. Instead, the authenticator chooses the appropriate combination of all available modalities (on the client side) such that the required assurance level gain is achieved.

As discussed in detail above, the time since the device was in trusted state is important as hacking/spoofing modalities may take time. For example, if a user loses a phone and someone attempts to hack it, it may take a day before the fingerprint can be captured from the display, an appropriate rubber finger created and subsequently used to gain access. Consequently, requiring a PIN entry after 24 hours or less since last trusted state, would be a sufficient protection against this type of attack. The next level of attack is one in which the fingerprint is captured before having access to the device. These attacks are seen less frequently in practice. However, if the relying party 250 needs protection against such attacks, the adaptive authentication module 800, 810 may need to factor in location data or the existence of other gadgets or peripherals in order to accept the biometric modality.

Figure 9:
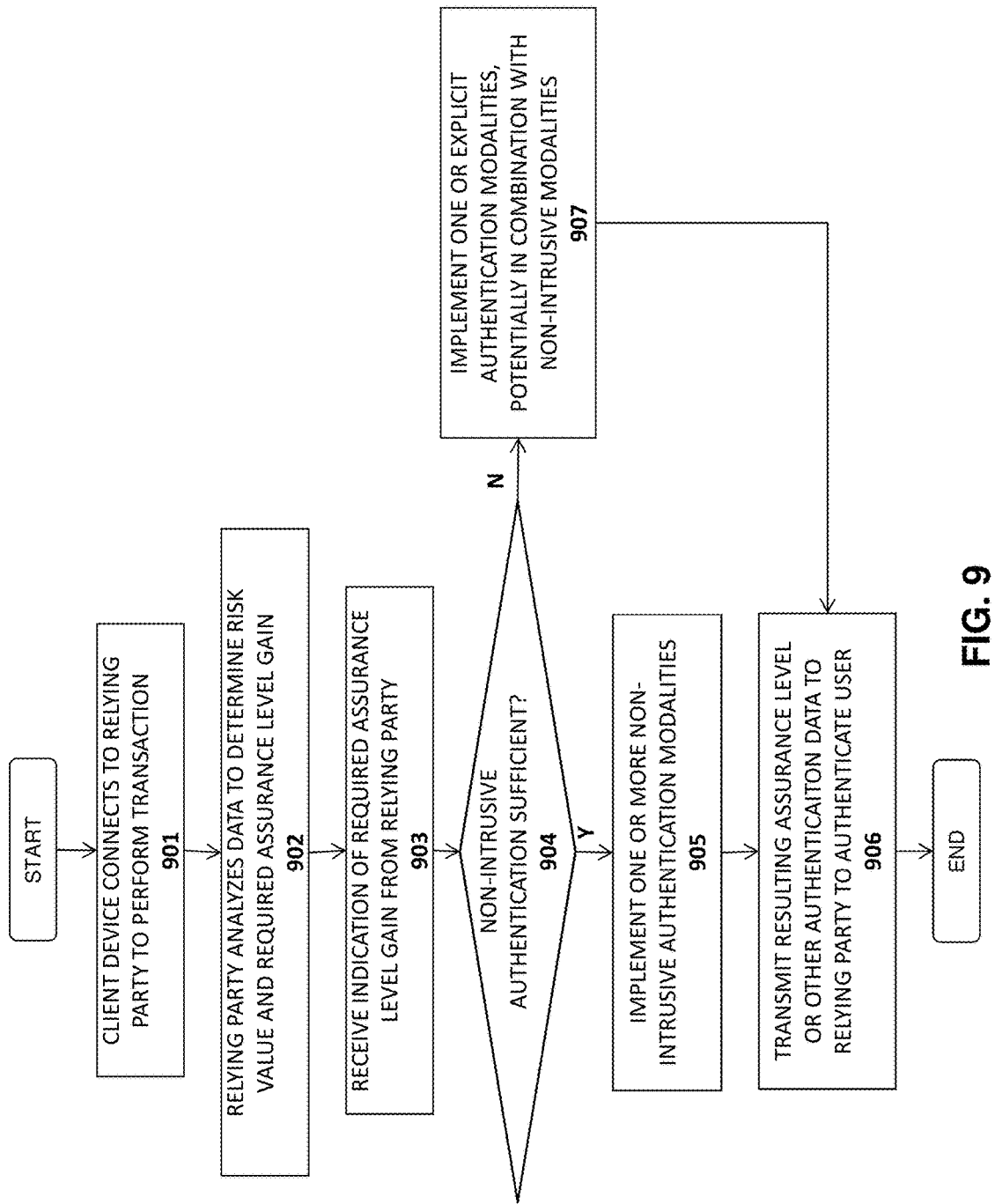
FIG. 9 graphically illustrates adaptive authentication in accordance with one embodiment.

A method in accordance with one embodiment of the invention is illustrated in FIG. 9. As discussed above, the "relying party" as used herein may be the actual party relying on the accurate authentication of the user or may be a third party service authenticating the user on behalf of the relying party.

At 901, the client device connects to the relying party to perform a transaction (e.g., a transaction to log in to an online account, a monetary transaction, etc). At 902, the relying party analyzes any available data related to the client device to determine a risk value and the required assurance level gain needed to authenticate the user. For example, the data may indicate that the user is connecting to the relying party from an unknown network location (e.g., a foreign country never previously visited by the user) and/or that the number of network routing hops or latency between the client and relying party is above a threshold. In such a case, the risk value may be set to a relatively high value (or, conversely, the implicit assurance level may be low). However, if the user has just recently explicitly authenticated to the device (e.g., entering a PIN), then this would tend to decrease the risk level (or raise the implicit assurance level).

Based on the assurance level required to complete the transaction, the assurance level gain may be determined. This may be accomplished, for example, using an equation such as: Implicit Assurance Level+Assurance Level Gain=Required Assurance Level, or Assurance Level Gain=Required Assurance Level−Implicit Assurance Level. Various other equations may be used to determine the assurance level gain while still complying with the underlying principles of the invention.

At 903, an indication of the needed assurance level gain is received. If non-intrusive authentication techniques are sufficient to meet the assurance level gain, determined at 904, then they are used at 905 to authenticate the user. If not, then at 907, one or more explicit authentication modalities are implemented, potentially in combination with one or more non-intrusive authentication modalities. As mentioned, the modalities may be selected so as to be the least burdensome to the end user (e.g., based on user-specified preferences).

Figure 10:
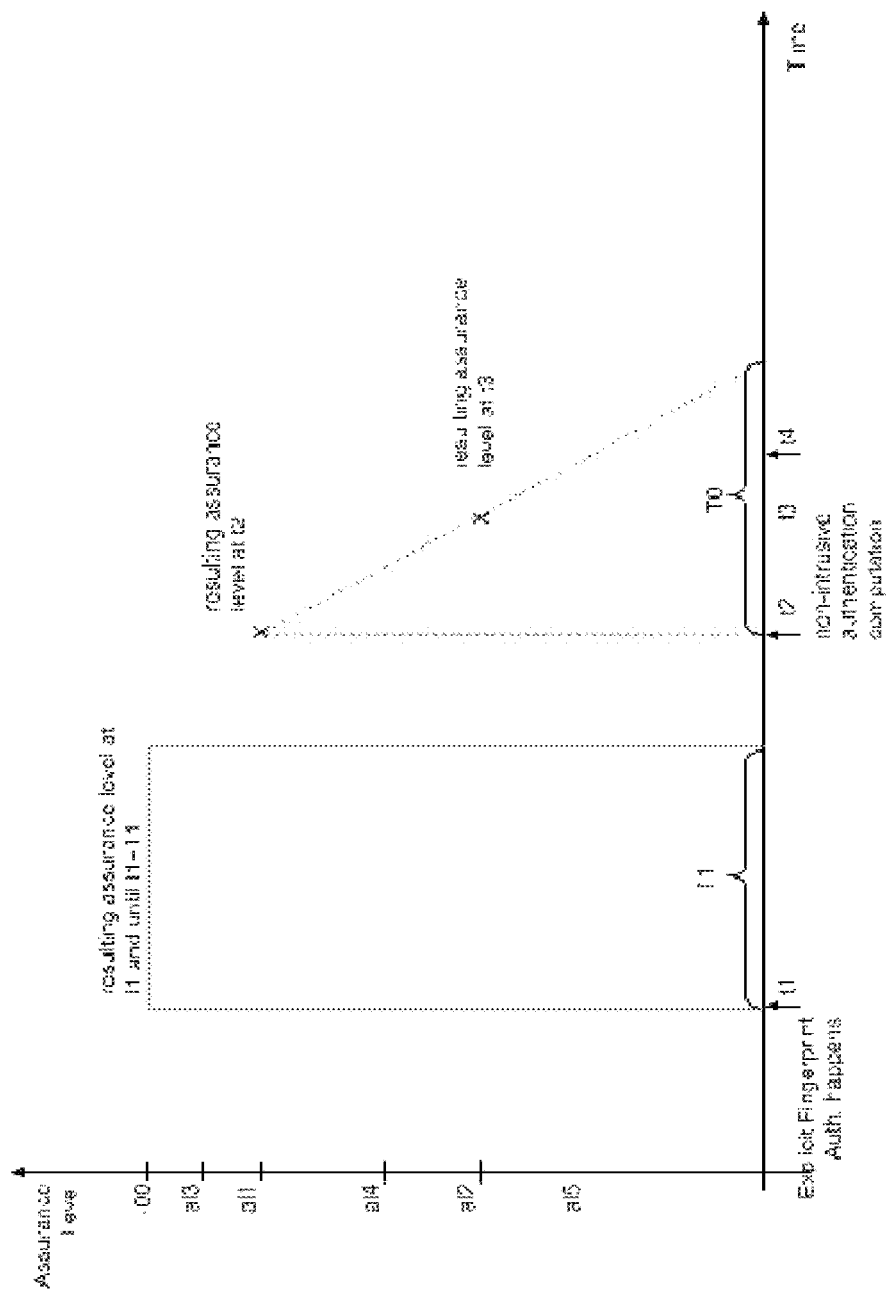
FIG. 10 illustrates one embodiment of a composite authenticator with a plurality of components.

FIG. 10 graphically illustrates how the embodiments of the invention described above may evaluate the assurance level to determine authentication modalities. At time t1, the user performs an explicit authentication (e.g., swiping a finger, entering a PIN, etc). At time t2, the relying party asks for authentication with an assurance level gain of al4. The non-intrusive authentication modality delivers assurance level all which is higher than al4, so there is no need to trigger an explicit authentication.

In contrast, at time t4, the relying party asks for authentication with an assurance level gain of al4. The non-intrusive authentication modality would only deliver al5 at that time (as illustrated by the graph). As a consequence, in this case, the adaptive authenticator module will select at least one explicit authentication modality to raise the assurance level from al5 to al4.

One embodiment of the invention employs implicit location-based authentication techniques in a manner which protects the end user's privacy. As mentioned above, sharing a user's current location (e.g., as provided by GPS) with relying parties raises significant privacy concerns. Consequently, users are often reluctant to share such data.

To address these issues, one embodiment of the invention uses geolocation as a factor when performing implicit user authentication but does not disclose the user's location to the relying party. This embodiment may be implemented alone or in combination with other non-intrusive 230 and/or explicit 222 authentication techniques described above (e.g., as part of a larger, comprehensive authentication process). Instead of transmitting the actual location from the client device, only an assurance level may be transmitted which is based (at least in part) on the geolocation data, thereby protecting the user's privacy.

One embodiment employs the following operations for user/device enrollment and registration with a relying party:

1. The user picks and specifies one or more locations where he/she usually performs authentication with websites. This may be a region within a predefined miles or specific locations (like office, home, transportation route, etc). These selected locations may be stored locally on the client device and will not be sent to the relying party. These operations may be performed by the location authentication module 231 described above.

2. In one embodiment, after enrollment is complete, the client device shares a key with the relying party over a secure communication channel (e.g., using secure communication module 213 and other registration techniques described herein).

In one embodiment, the following operations are performed during authentication:

1. The client device determines its current location using one or more geolocation techniques (e.g., retrieving the current location using a location sensor 241 such as an embedded GPS chip).

2. The location authentication module 231 on the client compares the current location with already enrolled locations and produces a score indicating the distance (e.g., from 0-100). The assurance calculation module 212 may then include the score in its assurance calculations (as described above).

3. the client device generates a signature, signs the score/assurance level and sends it to the relying party 250 for final authentication.

C. Composite Authenticators

Some of the embodiments of the invention described herein employ client-side "Authenticators" which encapsulate the following security-relevant functions:

1. Storing and using a cryptographic attestation key
2. Generating, storing and using cryptographic authentication keys
3. Local user verification or verification of user presence
4. Secure Display of information for the end user In one embodiment, some of the above functions (e.g., 3 and 4) are optional. In addition, one embodiment of the invention includes authenticators which implement the following security objectives:

1. Ensure that the Attestation Key: (a) is only used to attest Authentication Keys generated and protected by the FIDO Authenticator; and (b) never leaves the FIDO Authenticator boundary.
2. If local user verification (sometimes also referred to as "user authentication") is claimed to be supported, ensure that: (a) the Authentication cannot be bypassed/forged by a software application (e.g. malware "entering" a PIN into the authenticator); (b) the confidentiality of the Authentication data is protected (e.g. malware cannot access a PIN entered by the user nor the reference data); and (c) User Authentication is required before generating a new authentication key and reach time before using such authentication key.

One way to implement an authenticator is to implement all of the components responsible for the above functions in a single module which is protected by a single protective shell. For example the entire authenticator may be implemented in a Trusted Application (TA) running in a Trusted Execution Environment (TEE) (e.g., on a client platform which supports trusted execution). In this implementation, the TA is signed ensuring that the Authenticator cannot be modified and the TEE protects the TA when executed.

Figure 11:
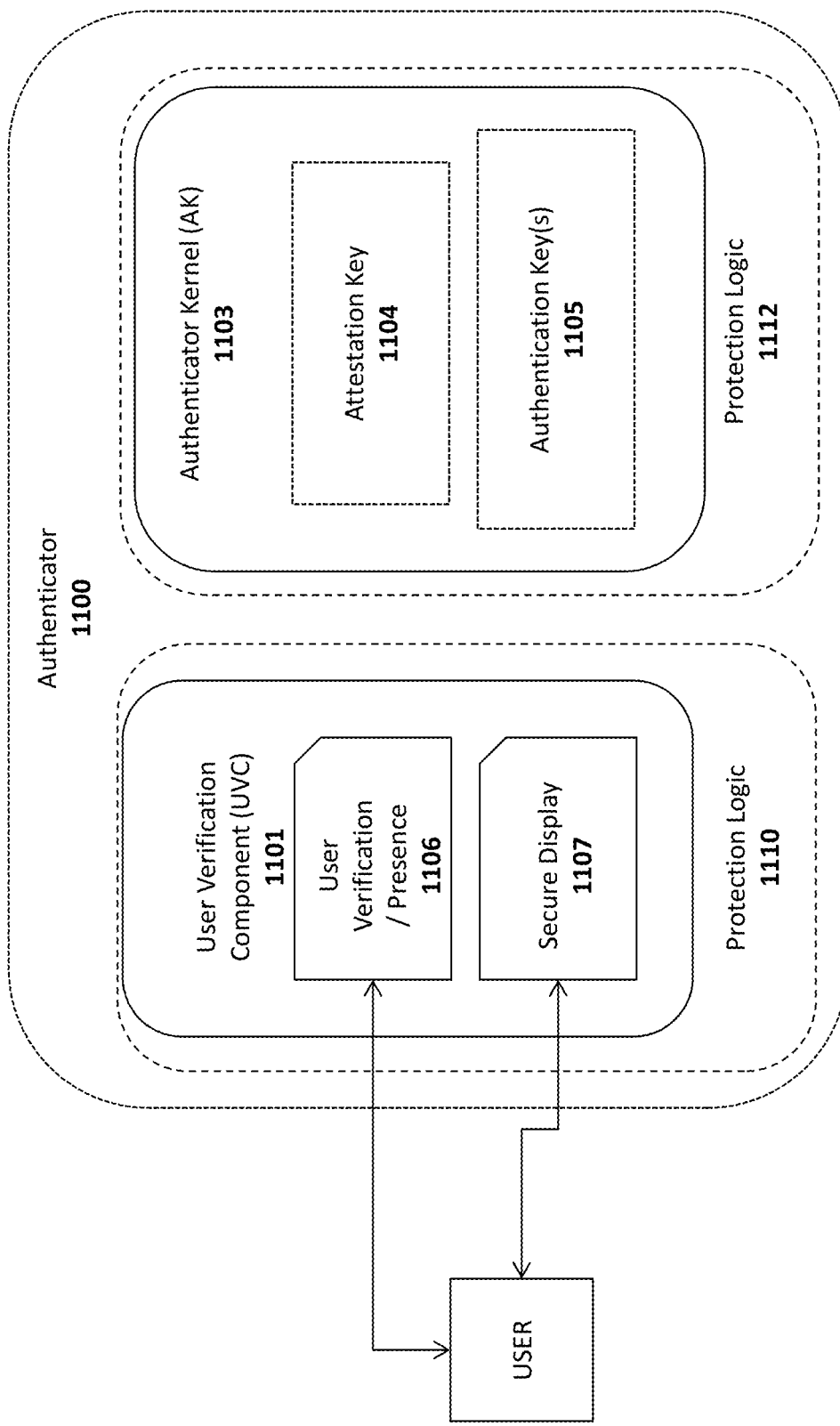
FIG. 11 illustrates one embodiment in which two authenticators share components.

In one embodiment of the invention, each authenticator is logically subdivided into a plurality of independent components each of which include independent security and authentication capabilities. For example, in FIG. 11, rather than implementing all of the components responsible for the above functions in a single module which is protected by a single shell, the authenticator 1100 is implemented with two separate, independent authenticator components: a user verification component (UVC) 1101 and an authenticator kernel (AK) 1103, each with its own protection logic 1110 and 1112, respectively. In this example, the AK 1103 securely manages attestation key(s) 1104 and authentication keys 1105 for the authenticator 1100 and the UVC 1101 manages user verification/presence functions 1106 and secure display functions 1107 (specific examples of which are described below and in the co-pending applications).

Figure 13:
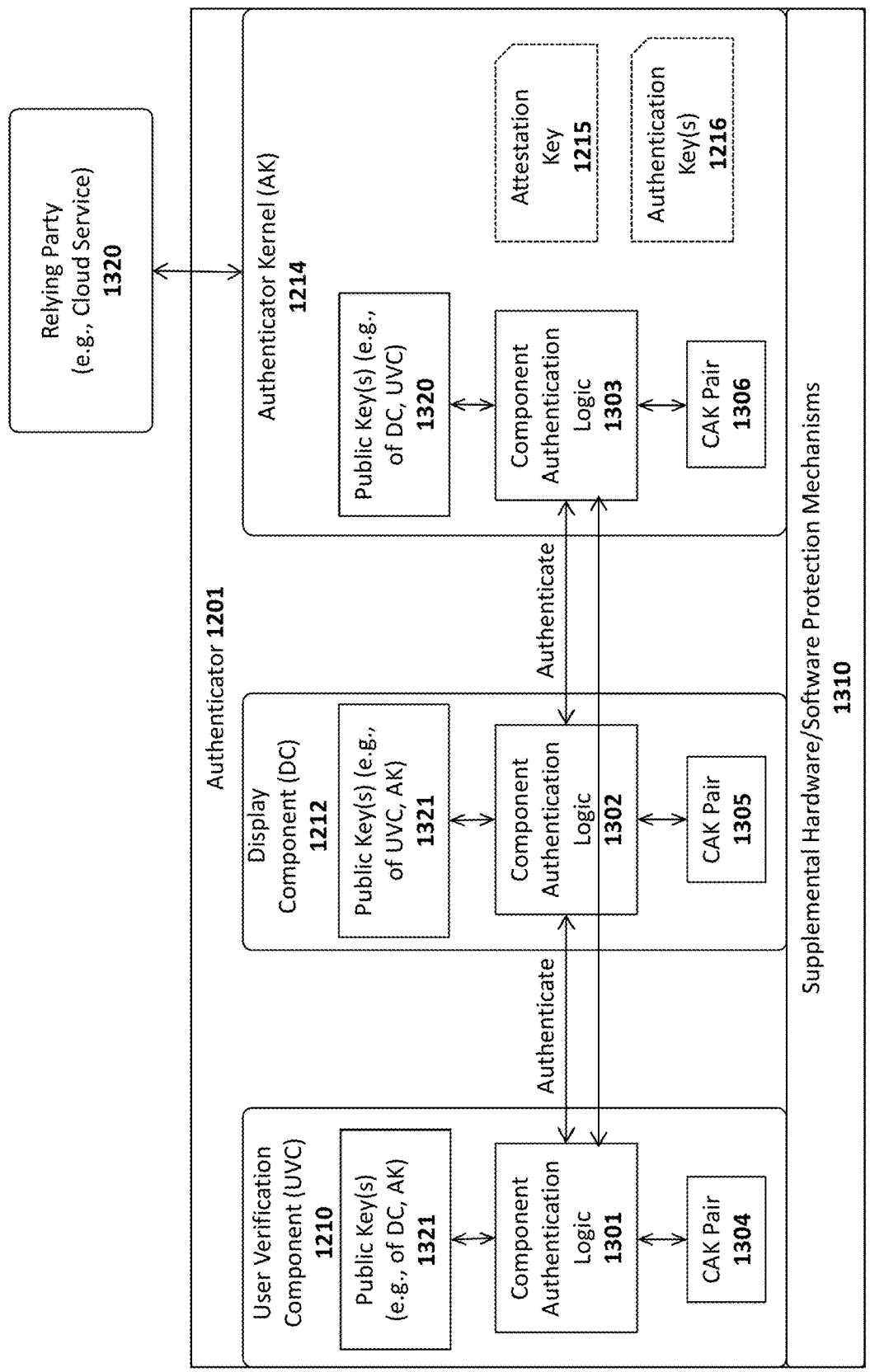
FIG. 13 illustrates a transaction diagram showing one embodiment of authentication between two components.

As discussed in detail below, the protection logic 1110, 1112 of each component may include a component authentication engine for authenticating every component with one or more other components executed on the client device (see, e.g., FIG. 13 and associated text). In addition, the protection logic may leverage additional hardware/software protection mechanisms built in to the client platform (e.g., such as secure elements (SEs), chain of trust technology, trusted user interface technology, OS based protection mechanisms, etc.). Details associated with each of these embodiments are set forth below.

Figure 12:
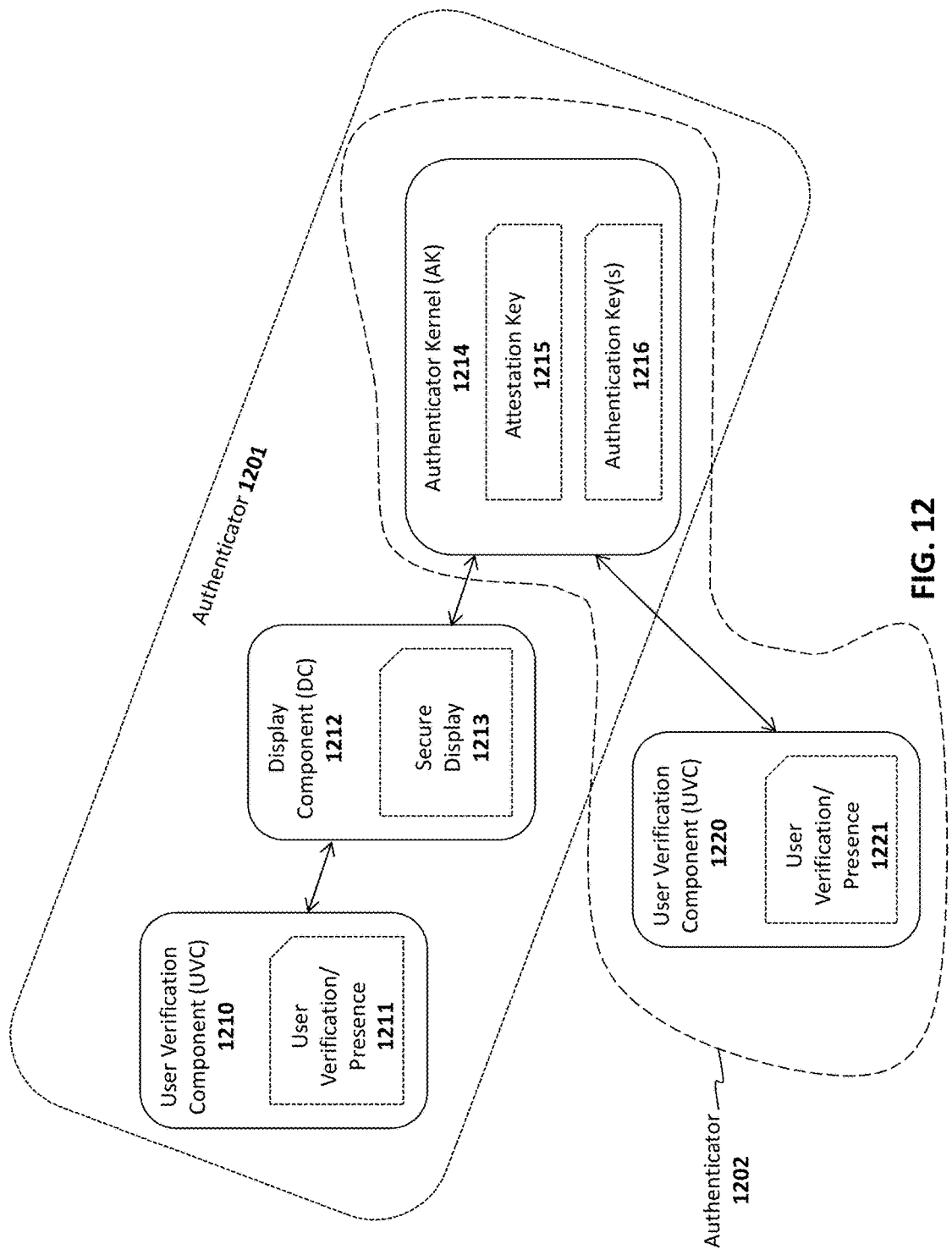
FIG. 12 illustrates one embodiment of an authenticator which includes component authentication logic for managing a component authentication key (CAK) pair for authenticating components.

FIG. 12 illustrates an embodiment of the invention in which multiple logical authenticators 1201-1202 are built from a set of protected authenticator components. In particular, the component building blocks for logical authenticator 1201 include a user verification component (UVC) 1210 for managing user verification and presence; a display component (DC) 1212 for ensuring that information displayed to the end user is exactly the information being confirmed by a transaction (i.e., "What you See is what you Sign" or WYSIWYS); and an authenticator kernel (AK) component 1214 for securely managing attestation keys 1215 (for attesting the model and/or integrity of the authenticators to a relying party as part of a registration process) and authentication keys 1216 (for establishing secure communications with relying parties using a unique authentication key for each relying party). The component building blocks for logical authenticator 1202 includes UVC 1220 for managing user verification and presence, and an authenticator kernel (AK) component 1214 for securely managing attestation keys 1215 and authentication keys 1216. Thus, in this example, multiple logical authenticators share the same underlying AK component 1214 for managing and protecting keys. In other embodiments of the invention, other types of components may be shared between multiple authenticators. As discussed above, each of the components is provided with its own, independent protection logic for ensuring that the security objectives set forth above are met.

An authenticator built from components in this manner is referred to as a "Composite Authenticator" because it is composed of separate individual components each having their own protective shell. One benefit to the composite authenticator approach is that once a component has been built for one authenticator, it may be used across multiple authenticators, thereby allowing new secure authenticators to be built more efficiently. For example, as shown in FIG. 12, the same authenticator kernel component 1214 is shared between two logical authenticators 1201-1202. In addition, each authenticator component may be implemented in a manner which is optimized for its specific needs. By way of example, and not limitation, a face recognition based authenticator, whose biometric segmentation and matching algorithm may be too big to implement within a Secure Elements (SEs) or Trusted Execution Environments (TEEs), can still leverage a SE/TEE for protecting its attestation and user authentication keys. In this example, a user verification component (e.g., including segmentation and matching algorithm) may be run outside of the SE/TEE while the authentication kernel component may be implemented within the SE/TEE. Similarly, a fingerprint based Authenticator implemented in a TEE could still leverage a SE authentication kernel for protecting its attestation and user authentication keys and hence protecting against hardware based attacks like differential power analysis (DPA), for example.

In one embodiment, the following security measures are implemented to provide an acceptable level of security for the component authenticators described herein (e.g., "acceptable" for meeting the security objectives specified above). These security measures will be described with reference to FIG. 13 which shows additional details associated with each of the components 1210, 1212, 1214 used to implement the authenticator 1201 in FIG. 12.

1. Security Measure (SM) 1: In one embodiment, each component (e.g., the user verification component 1210, display component 1212, or authentication kernel 1214 shown in FIGS. 12-13) has its own "component authentication key" pair (CAK) (e.g., CAK pairs 1304, 1305, and 1306, respectively), which is used to (potentially mutually) register with other components and authenticate messages sent to other components. As indicated in FIG. 13, each component 1210, 1212, 1214 includes component authentication logic 1301, 1302, 1303, respectively, for entering into inter-component authentication transactions using the CAK pairs 1304, 1305, 1306, respectively. In one embodiment, the CAK pairs 1304, 1305, 1306 are public/private key pairs, although the underlying principles of the invention are not limited to such an implementation. In this implementation, each of the components is provided with the public keys of those components with which it needs to authenticate. For example, the UVC 1210 knows the public keys (or at least can verify the public keys) 1321 of the DC and AK; the DC 1212 knows the public keys 1321 of the UVC and AK; and the AK 1214 knows the public keys of the DC and UVC. In one embodiment, on startup, a component initially enters into a registration transaction with the other components with which it must communicate by sharing its public keys with those components. It may then authenticate with those components using the techniques described below.

2. Security Measure (SM) 2: Each component is capable of authenticating other components it receives messages from by verifying the public CAK of these components. For example, in FIG. 13, the AK 1214 can verify the public CAKs of all UVCs 1210 and DCs 1212 it supports (i.e., the public key in CAK pairs 1304 and 1305). The UVC and DC may also verify the AK 1214's public CAK (i.e., in CAK pair 1306) if mutual authentication is implemented.

Figure 14:
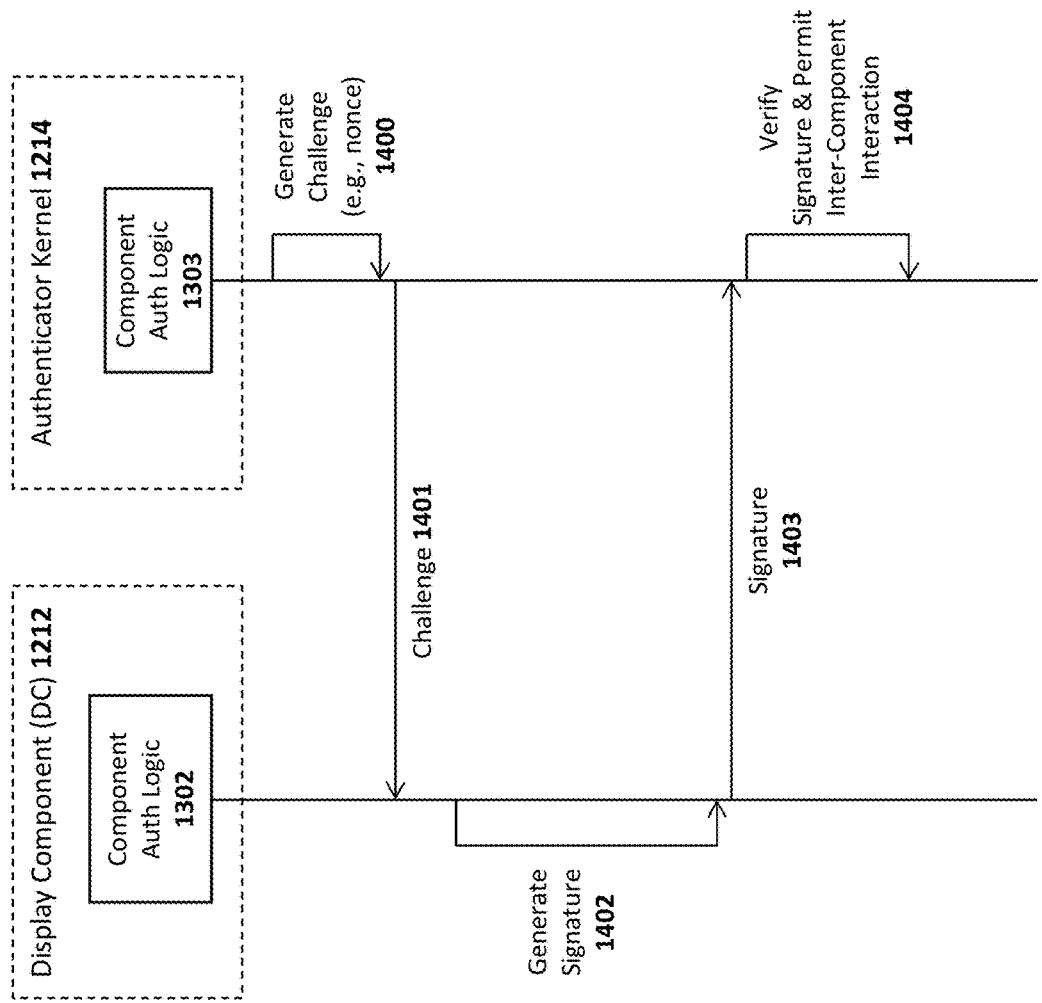
FIG. 14 illustrates static authenticator in accordance with one embodiment of the invention.

FIG. 14 is a transaction diagram illustrating how authentication between two components (the AK 1214 and DC 1212) may be implemented. At transaction 1400, the component authentication logic 1303 of the AK generates a challenge and sends it to the component authentication logic 1302 of the DC in transaction 1401. In one embodiment, the challenge is a random number or nonce selected by the component authentication logic 1303. In operation 1402, the component authentication logic 1302 of the DC generates a signature over the challenge and potentially additional data (e.g. whether user has approved the contents of the transaction) using the private key from its CAK pair 1305. As is understood by those of skill in the art, generating a signature may involve implementing a hash function over the challenge using the private key. At transaction 1403, the component authentication logic 1302 of the DC sends the signature back to the component authentication logic 1303 of the AK for verification. The component authentication logic 1303 of the AK now knows the challenge (e.g., the nonce which it previously generated), the signature generated using the private key of the DC's CAK pair, and the public key of the DC's CAK pair. In transaction 1404, it uses the public key of the DC's CAK pair to verify the signature using the random number, thereby authenticating the DC. The DC may also verify the AK 1214's public key using a similar set of transactions if mutual authentication is implemented.

3. Security Measure (SM) 3: Depending on the specific implementation, additional security mechanisms may be leveraged to protect the communication between the components. These additional security mechanisms are illustrated in FIG. 13 as supplemental hardware/software protection mechanisms 1310. By way of example, and not limitation, these hardware/software protection mechanisms 1310 may include those mechanisms built in to the client platform such as secure elements (SEs), Chain of Trust technology, Trusted User Interface technology, OS level access control mechanisms, white box encryption, code obfuscation and runtime integrity protection, to name a few. Using ARM® TrustZone™ or similar technology, for example, the operating system may restrict access to the AK's application programming interface (API) to only trusted programs (e.g., such as legitimate UVCs and DCs). As another example, the operating system may also add the UVC's or DC's package identifier to any API call to the AK. It should be noted, however, that the underlying principles of the invention are not limited to the specific hardware/software protection mechanisms discussed above.

By way of example, in one embodiment, the AK 1214 is implemented as an applet in a Secure Element which provides good protection mechanisms for cryptographic keys but has no user interface. A UVC 1210 may be implemented as a combination of hardware (e.g., a Fingerprint Sensor) and Trusted Application within a Trusted Execution Environment, both leveraging the ARM TrustZone or similar technology. A DC 1212 may be implemented as a Trusted Application using the "Trusted User Interface" capability as defined by the Global Platform. Thus, in this embodiment, when a user swipes a finger on the fingerprint sensor, the trusted application is started and verifies the fingerprint data against stored reference data. A score is then sent to the AK 1214, implemented as a Secure Element, which then enters into a series of authentication transactions with the relying party 1320 to authenticate the user (e.g., as described in the co-pending applications).

In addition, a different UVC may be implemented as software component running in a Rich-OS (e.g., Android) using a combination of white box encryption, code obfuscation and runtime integrity protection. It could for example use the integrated video camera in combination with face recognition software. Another UVC may be implemented either as a Trusted Application or software running on a Rich-OS using a combination of white box encryption, code obfuscation and runtime integrity protection and providing a PIN based user verification method.

Thus, the component-based approach described herein is easily adaptable to the requirements of different authentication techniques. For example, some types of authentication such as voice recognition and facial recognition need to be implemented as a software component using a normal, rich operating system, because of the significant storage requirements and hardware interface requirements of these authentication types. All of these different types of authentication may be implemented in a secure trusted manner using different UVC components which utilize the same AK component (which, as discussed, may be implemented as a Secure Element.

Note that with the above approach, the various components logically communicate using cryptographically protected (e.g. signed) messages. This logical communication may still be "facilitated" by some other entity (e.g., such as the secure transaction logic discussed below). Moreover, in one embodiment, the logical inter-component messaging described herein is transparent to the relying party 1320 which enters into attestation and authentication transactions directly with the authenticator kernel 1214 (e.g., using the attestation key 1215 and authentication keys 1216, respectively). In one embodiment, the AK uses the attestation key 1215 to validate the model and/or integrity of the authenticator during registration. For example, the relying party may send a challenge which the AK signs using the attestation key 1215. The relying party then uses a corresponding key to validate the signature (e.g., a public key if the attestation key is a private key). Once an authenticator has registered with a relying party, an authentication key 1216 is assigned to that relying party. The AK then uses the authentication key 1216 associated with a relying party to ensure secure communications with that relying party following registration.

As an additional security measure, in one embodiment, the component authentication logic 1301-1303 of each component may delete its CAK pair if a component compromise is detected.

Two different types of composite authenticators may be implemented utilizing the underlying principles of the invention: "static" composite authenticators and "dynamic" composite authenticators.

Static Composite Authenticators

Figure 15:
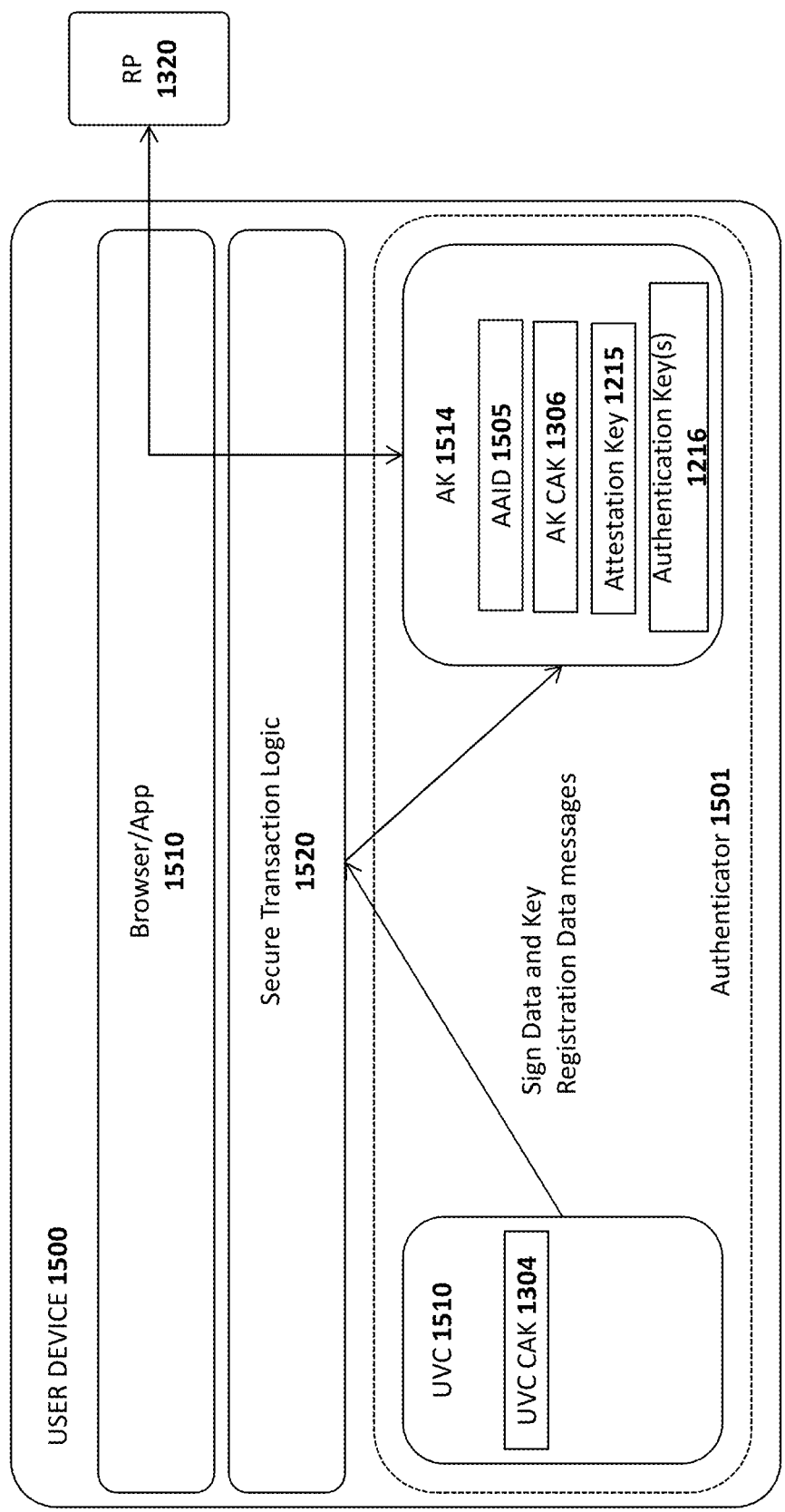
FIG. 15 illustrates a dynamic authenticator in accordance with one embodiment of the invention.

Referring to FIG. 15, in one embodiment, a composite authenticator 1501 with the following properties is referred to herein as a "static" composite authenticator:

1. for each authenticator 1501, the Relying Party 1320 has/needs access to a public attestation key (corresponding to attestation key pair 215, but not the public "Component Authentication Keys" (CAKs) 1304, 1306; and 2. for each supported combination of components (e.g., UVC, DC and AK) a specific Authenticator Attestation ID (AAID) 1505 has been specified in advance.

Thus, as illustrated in FIG. 15, for a static composite authenticator, each distinct authenticator 1501 is identified by its specific AAID 1505. The AK owns one or more attestation key(s) 215 and also selects one of the predefined AAIDs (and the related attestation key) to be used when performing transactions with the relying party 1320.

Because the CAK pair is never shared with the relying party 1320, it can be authenticator-specific without impacting the user's privacy. This also means that such keys could be revoked individually if successful hacks to individual components are detected. Because CAKs are not used as (publicly visible) "attestation keys," hacks of components are not considered equivalent to hacks of authenticators. In addition, as the communication and security mechanisms of the composite authenticator 1501 are not visible outside of the authenticator, the implementation of static composite authenticators doesn't affect the specifications defining the interactions between the authenticator 1501 and the relying party 1320. In one embodiment, each component 1510, 1514 is assigned a unique Component-ID which may be similar to an AAID, but it is only relevant to the AK 1514 (and not to the RP or any other external entity).

As an additional optimization, in one embodiment, the Online Certificate Status Protocol (OCSP, RFC2560) may be used as a revocation checking method (e.g., "validation") for each CAK certificate. More specifically, the AK 1514 may require a sufficiently recent OCSP response for the certificates of the UVCs or DCs related to the public CAK in order to accept the incoming message. The AK 1514 may also have one single Attestation Key used for all AAIDs, or it could optionally have one attestation key per AAID, or a combination thereof.

In one embodiment, the AK may maintain a static list of AAIDs. Alternatively, it may accept AAIDs received from an external entity (e.g. UVC/DC) if it is part of a signed "AAID-Update" message used to update the list. In one embodiment, the AAID-Update message has the following structure: Signature (signing_key, AAID|AK-Component-ID|UVC's/DC's public CAK). The private signing_key may be owned by the AK vendor. The public signing_key is either directly part of AK's TrustStore (in a TrustStore implementation) or it can be verified using some certificate stored in the TrustStore (i.e. is chained to such a certificate).

The architecture of the user device 1500 illustrated in FIG. 15 also includes a browser/application 1510 for establishing communication with the relying party 1320 and secure transaction logic 1520 for enabling communication with the authenticator. For example, as illustrated, in one embodiment the secure transaction logic 1520 enables message passing between the components 1510, 1514 of each authenticator 1501 by exposing an application programming interface (API) for the various components. Thus, in this embodiment, all communication among components such as the exchange of registration data and messages, occurs via the secure transaction logic 1520. By way of example, the secure transaction logic 1520 may be implemented as the "secure transaction service" described in the co-pending applications (portions of which are set forth below). The browser/application 1510 may be used to establish communication with the relying party 1320 over a network such as the Internet.

Dynamic Composite Authenticators

Figure 16:
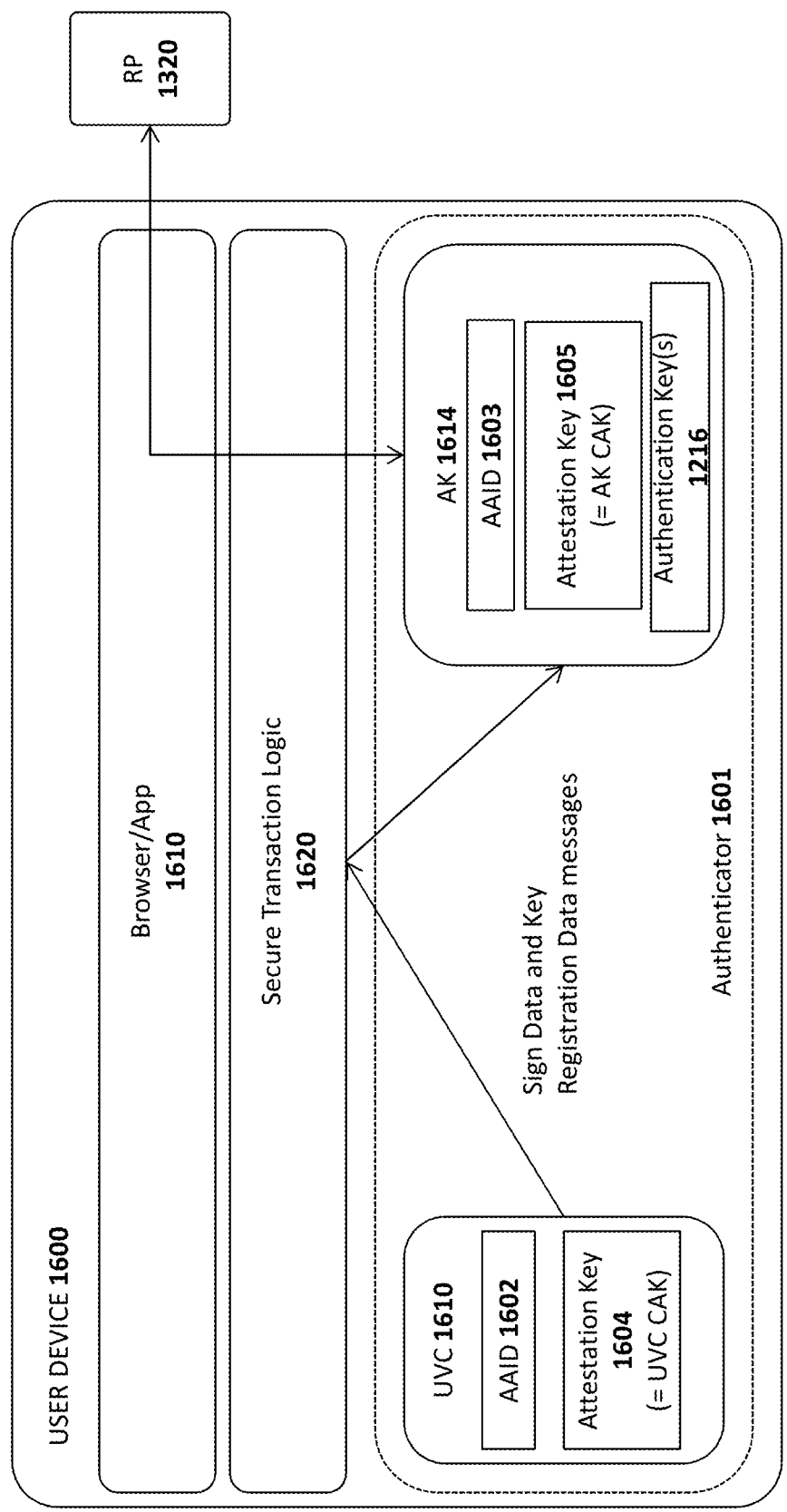
FIG. 16 illustrate an exemplary system architecture on which embodiments of the invention may be implemented.

Referring to FIG. 16, a composite authenticator 1601 with the following properties is a "dynamic composite authenticator" if:

1. the "Component Authentication Keys" (CAKs) 1604, 1604 are treated as attestation keys such that the relying party 1320 has and needs the related public key to verify the attestation messages (e.g., referred to as "Key Registration Data" in the OSTP specification); and 2. the relying party 1320 receives multiple AAIDs 1602, 1603 (depending on the number of components in the authenticator 1601). In one embodiment, it receives the AAIDs 1602, 1306 of all components 1610, 1614 of the authenticator 1601 as part of a registration message sent from the AK 1614 via the secure transaction logic 1620 and browser/application 1610. While FIG. 16 illustrates only a UVC 1610 and AK 1614, an alternate embodiment (such as shown in FIG. 3) sends the RP 1320 an AAID for the AK, DC, and UVC. As mentioned, however, the underlying principles of the invention are not limited to any particular set of components for implementing an authenticator. In one embodiment, the registration message sent to the RP 1320 also has multiple (chained) signatures, one with the AK's attestation key 1605 and one for each of the other components (e.g., the UVC's attestation key 1604 and the DC's attestation key (not shown)). As mentioned, in one embodiment, the AK 1614 includes the other components attestation message(s) in its own attestation message to the RP 1320 if and only if it trusts the communication with the other components.

Thus, a dynamically composed authenticator 1601 is implemented by dynamically combining multiple components (or, said another way, composing two authenticators to get a new authenticator). Because CAKs are relevant to RPs in this implementation, they should not be authenticator specific in one embodiment to protect the user's privacy. Instead they are either pre-generated/injected as shared keys or they are authenticated using a direct anonymous attestation (DAA) scheme, a cryptographic protocol which enables authentication of a trusted platform while preserving the user's privacy. As the multiple AAIDs and the chained attestation messages are visible to the RP, the implementation of dynamic composite authenticators affects the authentication specification used between the authenticator 1601 and relying party 1320.

UVC/DC Assertion Verification

Regardless of whether dynamic or static authenticators are used, in one embodiment, the UVC 210 and DC 212 send their output data such as user verification result (UVC) and the user's acceptance of the displayed transaction text (DC) to the AK 214 so that it may be processed according to the authentication specification employed between the AK 214 and the relying party 1320.

For registration, in an embodiment with static authenticators, the UVC 210 and DC 212 may send a key registration message to the AK 214 which contains the Component-ID (not the AAID), where the Component-ID is an identifier similar to the AAID, but only relevant to the AK. In one embodiment, the user authentication key of the key registration message is empty and the key registration message is signed by the CAK instead of the attestation key.

For authentication, in one embodiment, the UVC 210 and DC 212 create a message signed by the CAK (not the user authentication key).

The following verification steps are implemented by the AK in one embodiment of the invention:

1. Lookup the internal trust store containing a list of acceptable public CAKs. The public CAKs may either be directly stored in the TrustStore, or there may be a public key certificate for each of the CAKs chaining to a Root Certificate in the TrustStore.
2. The AK verifies the signature of the incoming data from UVC and/or DC using the public CAK (e.g., as discussed above with respect to SM1 and SM2).
3. Check additional platform-specific protection mechanisms such as the package ID of the incoming data or using similar platform-provided protection mechanisms.
4. Check the revocation status of the certificate containing the UVC's or DC's public CAK. As the AK is only interested in the revocation information of a very few number of certificates/keys (i.e. the current UVC's or DC's), Online Certificate Status Protocol (OCSP) (mentioned above) may be employed for revocation checking. The AK is not assumed to have network connection, so the OCSP response is expected as part of the incoming data from the UVC and/or DC.

Optimized Verification Method

A further optimization may be implemented in one embodiment where asymmetric key operations are too expensive compared to symmetric key operations. In such a case, the Key Registration message created by the UVC and/or DC sent to the AK contains a symmetric key SK (e.g. instead of an empty user authentication key field as mentioned above). The modified Key Registration Data message generated by the UVC and sent to the AK may be encrypted using the AK's public CAK (or some other trusted public key belonging to the target component). The modified signature message generated by the UVC and/or DC and sent to the AK is not asymmetrically signed using CAK, but instead it is secured using a hash-based message authentication code (HMAC) computed with the SK. The AK verifies the HMAC using the symmetric key received as part of the Key Registration Data message.

D. Location-Aware Authentication Techniques

One embodiment of the invention implements an authentication policy that allows authentication mechanisms to be selected based on the physical location of the client device being used for authentication. For example, the client and/or server may make a determination of the physical location of the client device, and feed that location to a policy engine that evaluates an ordered set of policy rules. In one embodiment, these rules specify classes of locations and the authentication mechanism or mechanisms that must be applied if the client location matches the location definition in the rule.

Figure 17:
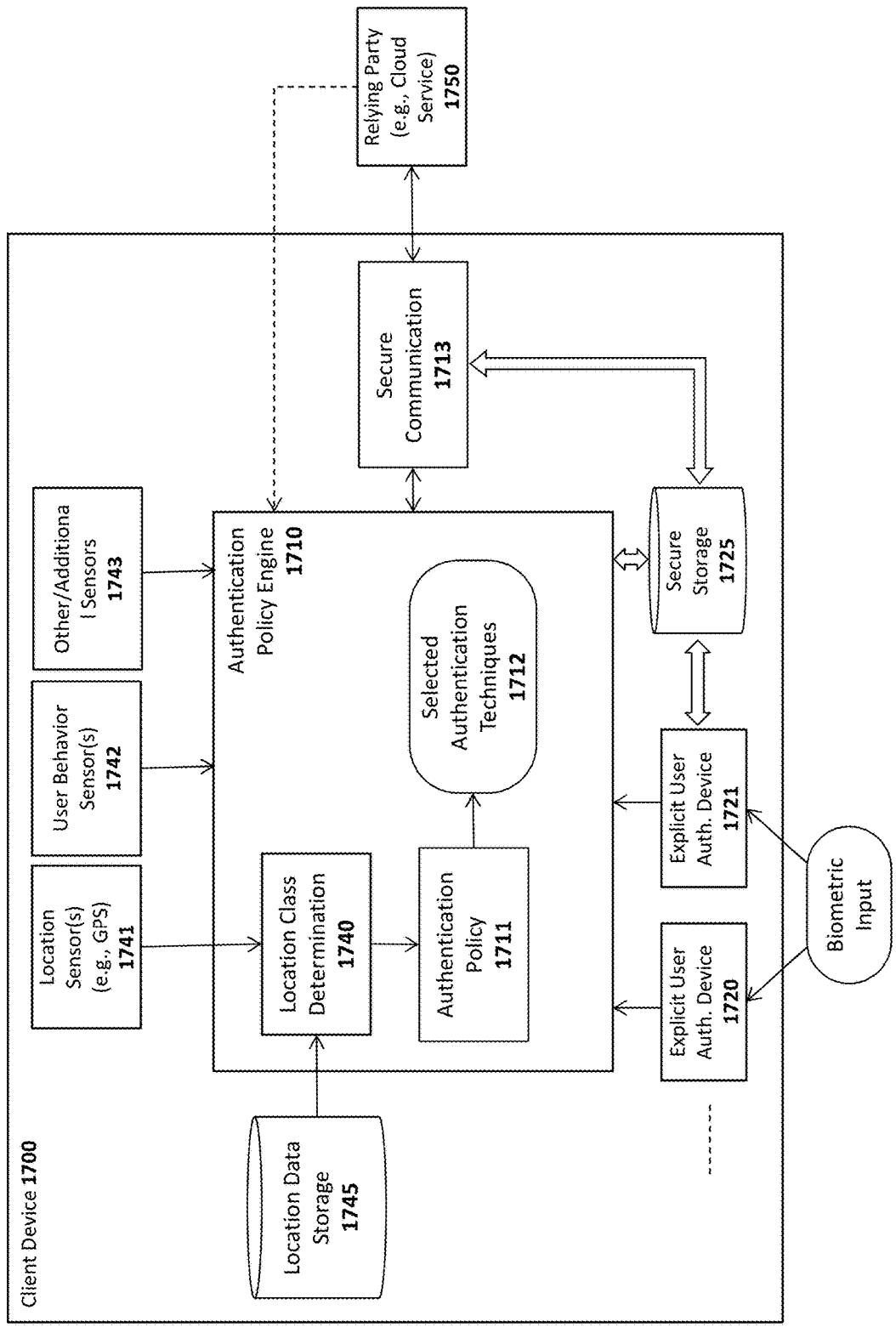
FIG. 17 illustrates one embodiment of a system for performing location-aware application of authentication policy.

As illustrated in FIG. 17, one embodiment of the invention includes a client device 1700 with an authentication policy engine 1710 for implementing the location-aware authentication policies described herein. In particular, this embodiment includes a location class determination module 1740 for using the current location of the client device 1700, provided by location sensors 1741 (e.g., a GPS device), to identify a current location "class." As discussed in detail below, different location "classes" may be defined comprising known geographical points and/or regions. Location class data may be continuously updated and stored in a persistent location data storage device 1745 (e.g., a flash storage or other persistent storage device). The location class determination module 1740 may then compare the current location provided by the sensor(s) 1741 against the defined "classes" to determine a current location class for the client device 1700.

In one embodiment, the relying party 1750 specifies the authentication policy to be implemented by the authentication policy engine 1710 for each transaction (as indicated by the dotted line from the relying party to the authentication policy engine). Thus, the authentication policy may be uniquely tailored to the authentication requirements of each relying party. In addition, the level of authentication required may be determined based on the current transaction (as defined by the authentication policy). For example, a transaction which requires a transfer of a significant amount of money may require a relatively high authentication assurance threshold, whereas non-monetary transaction may require a relatively lower authentication assurance threshold. Thus, the location-aware authentication techniques described herein may be sufficient for certain transactions but may be combined with more rigorous authentication techniques for other transactions.

In one embodiment, the location class determination module 1740 provides the determined class to an authentication policy module 1711 which implements a set of rules to identify the authentication techniques 1712 to be used for the determined class. By way of example, and not limitation, FIG. 18 illustrates an exemplary set of rules 1-5 specifying one or more authentication techniques 1-5 which may be used for each defined location class 1-5. Although illustrated as a table data structure in FIG. 18, the underlying principles of the invention are not limited to any particular type of data structure for implementing the rule set.

Once the authentication policy engine 1710 selects a set of authentication techniques 1712, the authentication policy engine 1710 may implement the techniques using one or more explicit user authentication devices 1720-1721 and/or non-intrusive authentication techniques 1742-1743 to authenticate the user with a relying party 1750. By way of example, and not limitation, the explicit user authentication 1720-1721 may include requiring the user to enter a secret code such as a PIN, fingerprint authentication, voice or facial recognition, and retinal scanning, to name a few.

The non-intrusive authentication techniques 1742-1743 may include user behavior sensors 1742 which collect data related to user behavior for authenticating the user. For example, the biometric gait of the user may be measured using an accelerometer or other type of sensor 1742 in combination with software and/or hardware designed to generate a gait "fingerprint" of the user's normal walking pattern. As discussed below, other sensors 1743 may be used to collect data used for authentication. For example, network data may be collected identifying network/computing devices within the local proximity of the client device 1700 (e.g., known peer computers, access points, cell towers, etc).

In one embodiment, secure storage 1725 is a secure storage device used to store authentication keys associated with each of the authentication devices 1720-1721. As discussed below, the authentication keys may be used to establish secure communication channels with the relying party 1750 via a secure communication module 1713.

Various different "classes" of locations may be defined consistent with the underlying principles of the invention. By way of example, and not limitation, the following classes of locations may be defined:

Class 1: The client is within a given radius of a specified location. In this class, the associated authentication policy is applied if the current client location is within an area bounded by a circle of a given radius, centered at a specified latitude and longitude.

Class 2: The client is within a specified boundary region. In this class, the associated authentication policy is applied if the client is located within an area bounded by a polygon defined by an ordered set of latitude and longitude pairs (e.g., a closed polygon).

Class 3: The client is outside a specified boundary. In this class, the associated authentication policy is applied if the client is located outside an area bounded by a polygon defined by an ordered set of latitude and longitude pairs (e.g., a closed polygon).

In one embodiment, additional classes are defined using Boolean combinations of the classes and policy rules defined above. For example, the Boolean operations AND, OR, NOT, and the nesting of Boolean operations allow the expression of complex conditions. Such policies could be used, for example, to implement a policy that applies when the client is located in one of a variety of facilities owned by a company.

Various different mechanisms may be used to determine the current physical location of the client (represented generally in FIG. 17 as location sensors 1741), including, but not limited to the following:

GPS: Embedded GPS sensors can directly provide details on the location of the client. New emerging standards seek to add authentication of the location provided as a capability that address this shortcoming in current GPS solutions.

Geo-IP Lookup: Reverse lookups of the client's IP address can be used to determine a coarse approximation of the client's location. However, the trustworthiness of the location obtained through this method requires the IP address to be cross-checked against blacklists of known compromised hosts, anonymizing proxy providers, or similar solutions designed to obfuscate the source IP address of the host.

Cell Tower Triangulation: Integration between the client, the server, and wireless carrier infrastructure could allow the client and server to perform high resolution determination of physical location using cellular signal strength triangulation.

Wi-Fi Access Point Triangulation: A higher resolution method to determine physical location is to triangulate the signal strength of nearby Wifi access points with known physical locations. This method is particularly effective in determining the location of a device within facilities.

Location Displacement Inference: A device's exact location may be unknown, but a statistical probability of location may be used as an approximation for the purpose of evaluating policy. This may be calculated by noting the change in the device's position relative to a starting point with a known location; the user's device may have, in the past, had a known starting point, and in the interim has moved a known or estimate distance and bearing, allowing an approximate location to be calculated. Possible methods to calculate the displacement from the starting point may include inferring distance travelled using measurements gathered from an accelerometer (i.e. using the accelerometer to measure how far the user walked based on gait measurement), changes in signal strength from a known, stationary set of signal sources, and other methods.

Figure 19:
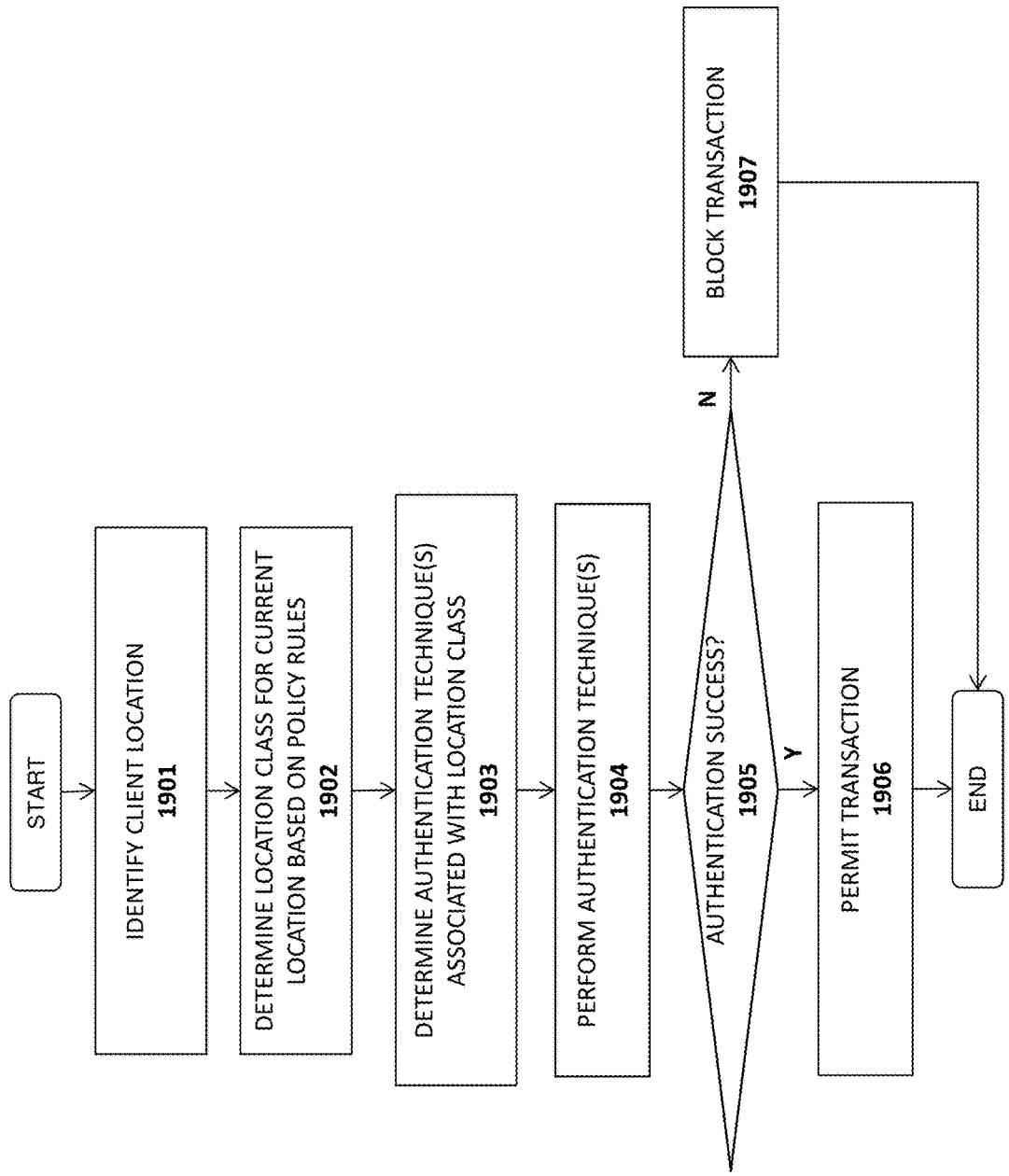
FIG. 19 illustrates a method in accordance with one embodiment of the invention.

FIG. 19 illustrates one embodiment of a method for implementing a location-aware authentication policy. The method may be executed within the context of the system architecture shown in FIGS. 17-18 but is not limited to any particular system architecture.

At 1901 the client's location is identified using one or more available techniques (e.g., GPS, triangulation, peer/network device detection, etc). At 1902, one or more location classes (and potentially Boolean combinations of classes) are identified for the current location based on an existing set of policy rules. At 1903, one or more authentication techniques are identified according to the location class(es). For example, if the client device is currently at a location known to be the user's home or office or within a defined radius of another trusted location, then minimal (or no) authentication may be required. By contrast, if the client device is currently at an unknown location and/or a location known to be untrusted, then more rigorous authentication may be required (e.g., biometric authentication such as a fingerprint scan, PIN entry, etc). At 1904, the authentication techniques are employed and if authentication is successful, determined at 1905, then the transaction requiring authentication is authorized at 1906.

As mentioned above, the level of authentication required may be determined based on the current transaction. For example, a transaction which requires a transfer of a significant amount of money may require a relatively high authentication assurance threshold, whereas non-monetary transaction may require a relatively lower authentication assurance threshold. Thus, the location-aware authentication techniques described herein may be sufficient for certain transactions but may be combined with more rigorous authentication techniques for other transactions.

If authentication is not successful, then the transaction is blocked at 1907. At this stage, the transaction may be permanently blocked or additional authentication steps may be requested. For example, if the user entered an incorrect PIN, the user may be asked to re-enter the PIN and/or perform biometric authentication.

The embodiments of the invention described herein provide numerous benefits to authentication systems. For example, the described embodiments may be used to efficiently block access from unauthorized locations, reducing unauthorized access by limiting the location from which users are permitted to attempt authentication (e.g., as defined by location classes). In addition, the embodiments of the invention may selectively require stronger authentication to respond to location-specific risks. For example, the relying party can minimize the inconvenience of authentication when a user is entering into a transaction from a known location, while retaining the ability to require stronger authentication when the user/client is connecting from an unknown or unexpected location. Moreover, the embodiments of the invention enable location-aware access to information. Alternatively, a location-centric policy may be used by a relying party to provide a user with additional access to location-specific information. By way of example, and not limitation, a user located in a Walmart may be granted access to special offers from Amazon.com when the user logs into their Amazon.com account on their mobile phone.

As mentioned above, the location of the client device 1700 may be determined using a variety of different techniques. In one particular embodiment, the definition of a "location" may not be tied to a set of physical coordinates (as with GPS), but instead be prescribed by the presence of a set of peer devices or other types of network devices. For example, when at work, the client's wireless network adapters (e.g., Wifi adapter, Bluetooth adapter, LTE adapter, etc) may "see" a set of peer network devices (e.g., other computers, mobile phones, tablets, etc) and network infrastructure devices (e.g., Wifi access points, cell towers, etc) on a consistent basis. Thus, the presence of these devices may be used for authentication when the user is at work. Other locations may be defined by the presence of devices in a similar manner such as when the user is at home.

For example, using the techniques described herein, a location may be defined as "with my work colleagues" or "at work" where the presence of a set of peer devices known to be owned by the user's work colleagues may be used as a proxy for the risk that needs to be mitigated by authentication policy. For example, if a user is surrounded by a set of known peer devices or other types of network devices, then the user may be deemed to be less of a risk than if no known devices are detected.

Figure 20:
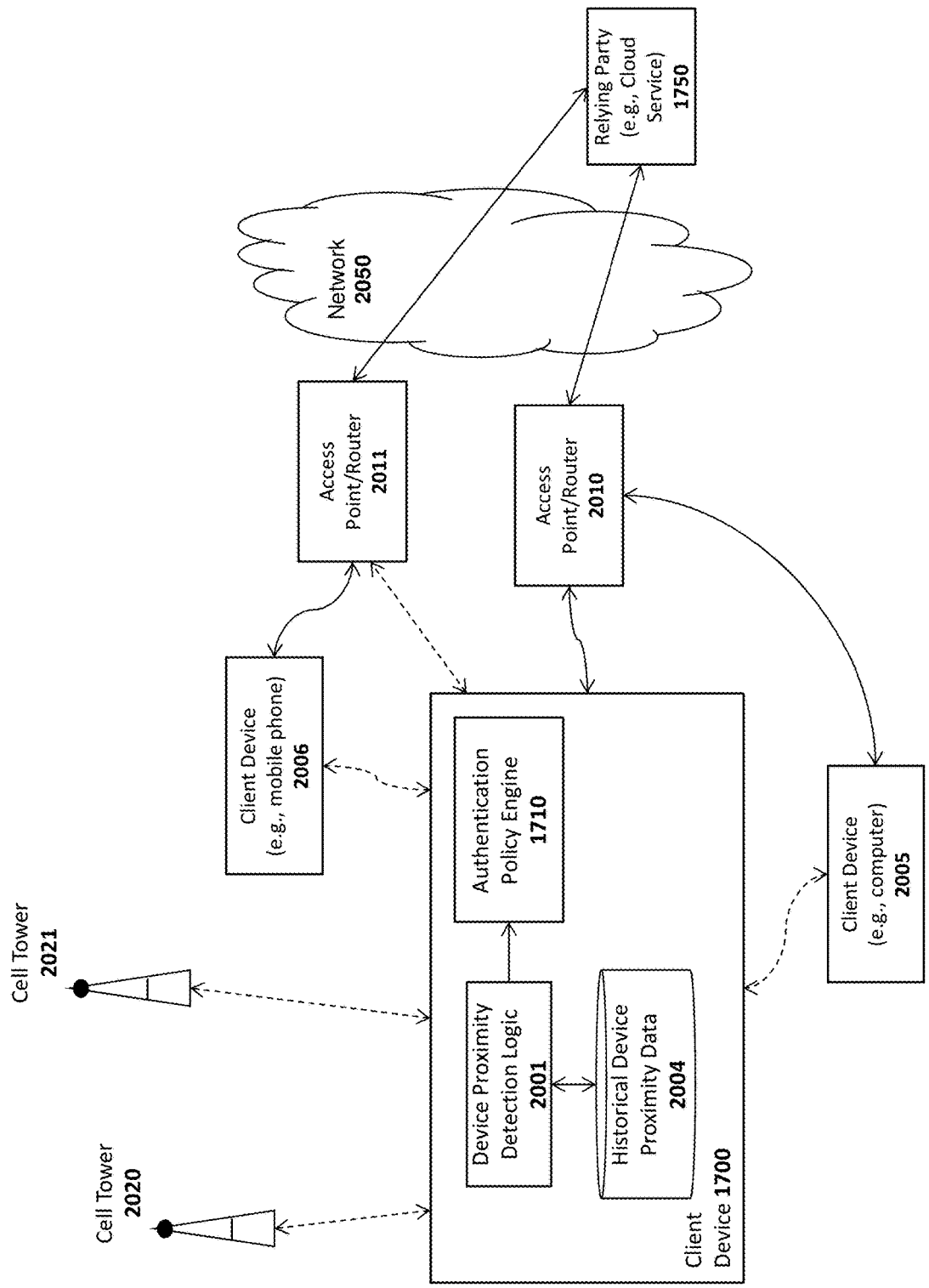
FIG. 20 illustrates one embodiment of the invention in which location is determined or confirmed by proximity of other peer or network devices.

FIG. 20 illustrates one embodiment in which a "location" is defined by a set of peer devices and other network devices. In the illustrated example, the client device 1700 "sees" two different peer devices 2005-2006 (e.g., client computers, mobile phones, tablets, etc); two different wireless access points 2010-2011; and two different cell towers 2020-2021. As used herein, the client device 1700 may "see" without formally establishing a connection with each of the other devices. For example, the client may see a variety of peer devices connected to the work LAN and/or may see the wireless signals generated by those devices regardless of whether the client connects to those devices. Similarly, the client device 1700 may see the basic service set identification (BSSID) for a variety of different Wifi access points (e.g., Wifi from nearby hotels, coffee shops, work Wifi access points). The client device 1700 may also see a variety of different cell towers 2020-2021, potentially even those operated by different cell carriers. The presence of these devices may be used to define a location "fingerprint" for the user's work location.

As illustrated, device proximity detection logic 2001 on the client device 1700 may capture data related to visible devices and compare the results against historical device proximity data 2004. The historical device proximity data 2004 may be generated over time and/or through a training process. For example, in one embodiment, the user may specify when he/she is at work, at home, or at other locations (either manually, or when prompted to do so by the client 1700). In response, the device proximity detection logic 2001 may detect the devices in the vicinity and persistently store the results as historical device proximity data 2004. When the user subsequently returns to the location, the device proximity detection logic 2001 may compare the devices that it currently "sees" against the devices stored as historical proximity data 2004 to generate a correlation between the two. In general, the stronger the correlation, the more likely it is that the client is at the specified location. Over time, devices which are seen regularly may be prioritized above other devices in the historical device proximity data 2004 (e.g., because these devices tend to provide a more accurate correlation with the user's work location).

In one embodiment, the authentication policy engine 1710 may use the correlation results provided by the device proximity detection logic 2001 to determine the level of authentication required by the user for each relying party 1750. For example, if a high correlation exists (i.e., above a specified threshold), then the authentication policy engine may not require explicit authentication by the end user. By contrast, if there is a low correlation between the user's current location and the historical device proximity data 2004 (i.e., below a specified threshold), then the authentication policy engine 1710 may require more rigorous authentication (e.g., a biometric authentication such as a fingerprint scan and/or requesting PIN entry).

In one embodiment, the device proximity detection logic 2001 identifies the set of other devices that are in the client's proximity which have been authenticated. For example, if several of a user's colleagues have already authenticated successfully, then there may be less risk associated with allowing the user to access certain data with a less reliable authenticator, simply because the user is operating in the presence of his/her peers. In this embodiment, peer-to-peer communication over standards such as 802.11n may be used to collect authentication tokens from peers that can be used to prove those peers have already authenticated.

In another embodiment, the device proximity detection logic 2001 may also detect a previously authenticated device that is paired with the user's client (e.g., such as the user's mobile phone or tablet). The presence of another authenticated device that is used by the same user that is attempting to authenticate may be used as an input to the authentication decision, particularly when accessing the same application.

In one embodiment, the historical device proximity data 2004 is collected and shared across multiple devices, and may be stored and maintained on an intermediate authentication service. For example, a history of groups of peers and network devices in each location may be tracked and stored in a central database accessible to the device proximity detection logic 2001 on each device. This database may then be used as an input to determine the risk of an attempted authentication from a particular location.

E. Embodiments for Confirming Location Using Supplemental Sensor and/or Location Data As mentioned above, one embodiment of the invention leverages data from additional sensors 1743 from the mobile device to provide supplemental inputs to the risk calculation used for authentication. These supplemental inputs may provide additional levels of assurance that can help to either confirm or refute claims of the location of the end user's device.

Figure 21:
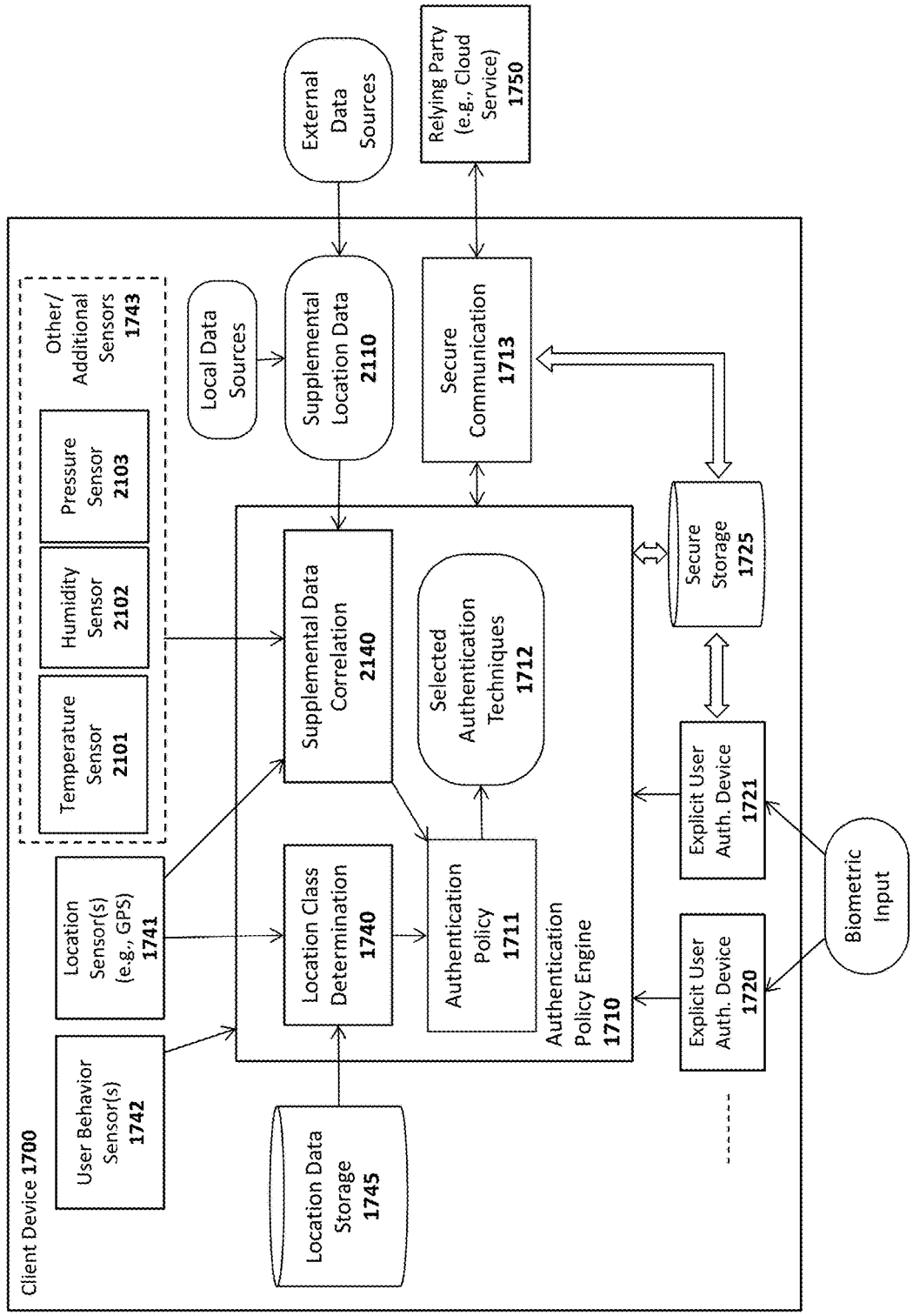
FIG. 21 illustrates one embodiment of a system for authentication which uses environmental sensors.

As illustrated in FIG. 21 the additional sensors 1743 which provide supplemental assurance of the device's location may include temperature sensors 2101, humidity sensors 2102 and pressure sensors 2103 (e.g., barometric or altimeter pressure sensors). In one embodiment, the sensors provide temperature, humidity, and pressure readings, respectively, which are used by a supplemental data correlation module 2140 of the authentication policy engine 1710 to correlate against supplemental data 2110 known about the location provided by the location sensor(s) 1741 (or the location derived using the various other techniques described herein). The results of the correlation are then used by the authentication policy module 1711 to select one or more authentication techniques 1712 for a given transaction. As indicated in FIG. 21, the supplemental location data 2110 may include data collected from external sources (e.g., the Internet or other mobile devices) and local data sources (e.g., historical data collected during periods when the device is known to be in possession of the legitimate user).

The supplemental data correlation module 2140 may use the data provided by the additional sensors 1743 in a variety of different ways to correlate against the supplemental location data 2110. For example, in one embodiment, the supplemental location data 2110 includes current local meteorological conditions at the location provided by the location sensor(s) 1741. By comparing the humidity, temperature, or barometric pressure gathered from the additional sensors 1743 against real-time local weather data 2110, the supplemental data correlation module 2140 identifies cases where the sensor data is inconsistent with local conditions. For example, if the client device's GPS reading indicates that the device is outside, yet the temperature, humidity, or barometric pressure are not consistent with the local weather conditions, then the supplemental data correlation module 2140 may generate a low correlation score and the location may be deemed less trustworthy. Consequently, the authentication policy module 1711 may require more rigorous authentication techniques 1712 (e.g., fingerprint, PIN entry, etc) to approve a transaction.

As another example, by comparing the altitude provided by an altimeter pressure sensor 2103 against the known geographical or network topology of the claimed location (provided with the supplemental location data 2110), the supplemental data correlation module 2140 may identify discrepancies that signal the claimed location is not genuine. For example, if a reverse IP lookup of the user's claimed location identifies them as being in the Andes Mountains, but altimeter data from the device indicates the device is at sea level, then the supplemental data correlation module 2140 may generate a low correlation score and the location may be deemed less trustworthy. As a result of the low correlation score, the authentication policy module 1711 may attempt to mitigate the higher risk with stronger authentication for the transaction.

In one embodiment, the supplemental data correlation module 2140 compares data gathered from sensors 1743 on the user's device against multiple other end users in the immediate area to identify anomalies that suggest the user is not operating in the same physical location as those known users. For example, if a set of authenticated users are identified who are operating the same physical area, and all of those users' devices note that the local temperature in the area is 10° C., the supplemental data correlation module 2140 may generate a low correlation score for an end user whose temperature sensor 2101 indicates the local temperature is 20° C. As a result, the authentication policy 1711 may require more rigorous authentication techniques 1712.

As yet another example, the supplemental data correlation module 2140 may compare current readings against historical data for a particular user. For example, as mentioned, sensor data may be analyzed during periods of time when the user is known to be in possession of the device 1700 (e.g., for a time period following an explicit authentication). The supplemental data correlation module 2140 may then look for discontinuities in the local data to identify suspicious behavior. For example, if the user's ambient temperature normally floats between 10° C. and 20° C. and it is currently at 30° C., this may indicate the user is not in a typical location, thereby generating a low correlation and causing the authentication policy module 1711 to require an additional level of scrutiny for a transaction.

The supplemental data correlation module 2140 may perform various different types of correlations between sensor data and supplemental location data while still complying with the underlying principles of the invention. For example, various known correlation mechanisms may be used to determine the statistical relationship between the two sets of data. In one embodiment, the correlation score provided to the authentication policy engine 1711 comprises a normalized value (e.g., between 0-1) indicating a level of correlation. In one embodiment, various threshold levels may be set for detected differences between the sensors 1743 and supplemental location data 2110. For example, if the temperature sensor 2101 measures a temperature of more than 3 degrees off of the current temperature (gathered from other devices or the Internet), then a first threshold may be triggered (resulting in a lowering of the correlation score). Each additional 3 degrees off from the current temperature may then result in a new threshold being met (resulting in a corresponding lowering of the correlation score). It should be noted, however, that these are merely examples of one embodiment of the invention; the underlying principles of the invention are not limited to any particular manner of performing a correlation.

Figure 22:
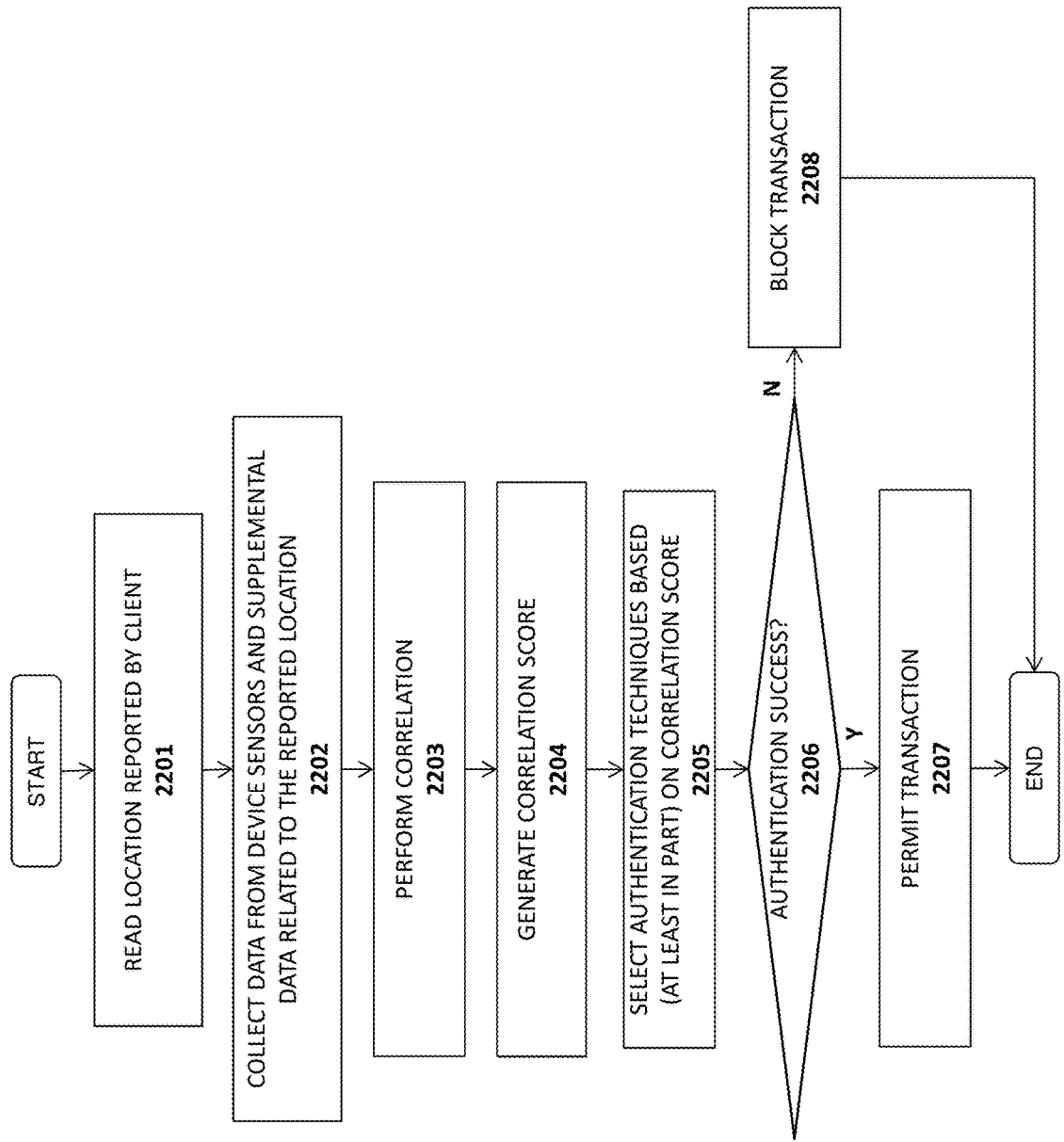
FIG. 22 illustrates one embodiment of a method for authentication which uses environmental sensors.

A method in accordance with one embodiment of the invention is illustrated in FIG. 22. At 2201, the current location being reported by the client device (e.g., via the GPS module on the device) is read. At 2202, supplemental location data is collected for the reported location along with sensor data from the client device. As mentioned above, the supplemental location data may be collected locally or remotely (e.g., from other clients and/or servers on the Internet) and may include data such as the current temperature, pressure and/or humidity for the reported location. The sensor data may be provided by temperature sensors, barometric or altimeter pressure sensors, and/or humidity sensors.

At 2203, a correlation is performed between the supplemental location data and the sensor data provided by the device sensors. In one embodiment, a relatively higher correlation will result in a relatively higher correlation score at 2204 whereas lower correlations will result in relatively lower correlation scores. As mentioned, in one embodiment, the correlation score is a normalized value (e.g., between 0-1) indicating the similarity between the sensor readings and supplemental data.

At 2205 one or more authentication techniques are selected based (at least in part) on the correlation score. For example, if a relatively low correlation score is provided, then more rigorous authentication techniques may be selected whereas if a relatively high correlation exists then less rigorous authentication techniques may be selected (potentially those which do not require explicit authentication by the end user).

If the user successfully authenticates using the selected techniques, determined at 2206, then the transaction is allowed to proceed at 2207. If not, then the transaction is blocked at 2208.

Numerous benefits are realized from the above embodiments. For example, these embodiments provide an additional level of assurance for location data gather from other sources: Allows the organization to supplement location data gathered from other sources (IP, GPS, etc) in order to gain additional assurance that the location is authentic. In addition, the embodiments of the invention may block a transaction from an unauthorized location, reducing unauthorized access by limiting the location from which users can even attempt authentication. Moreover, these embodiments may force stronger authentication to respond to location-specific risks (e.g., the relying party can minimize the inconvenience of authentication when the user is accessing information from a known location, while retaining the ability to require stronger authentication when the user/client is accessing from an unknown or unexpected location, or a location whose veracity can't be sufficiently qualified using multiple inputs).

Figure 23:
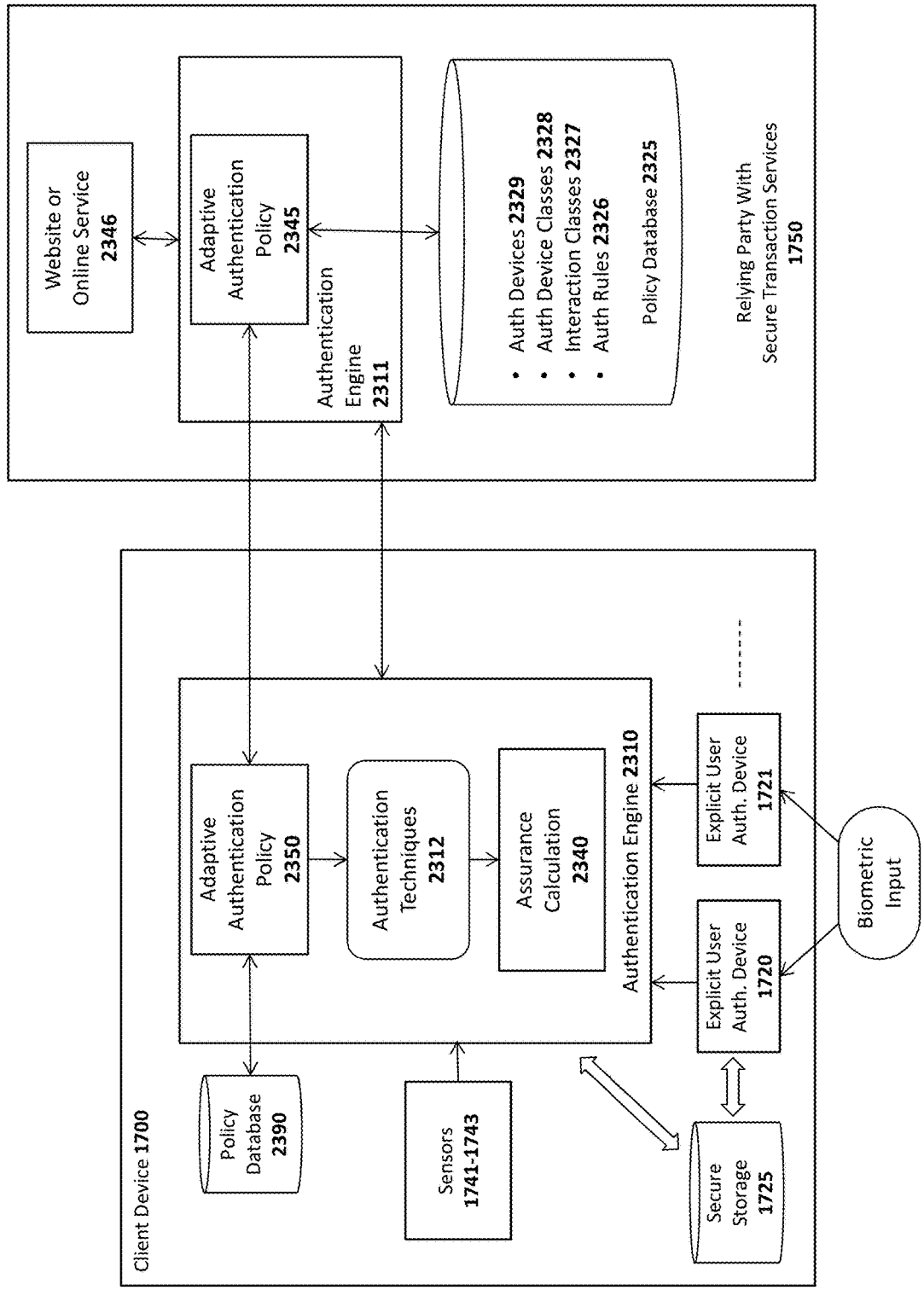
FIG. 23 illustrates one embodiment of a system for adaptively applying an authentication policy.

F. Adaptive Application of Authentication Policy Based on Client Authentication Capabilities As illustrated in FIG. 23, one embodiment of the invention includes an adaptive authentication policy engine 2345 that allows an organization—e.g., a relying party with secure transaction services 1750 (hereinafter simply referred to as the "relying party")—to specify which types of authentication are appropriate for a particular class of interactions. As illustrated, the adaptive authentication policy engine 2345 may be implemented as a module within the authentication engine 2311 executed at the relying party 1750. In this embodiment, the adaptive authentication policy engine 2345 executes in accordance with a policy database 2325 containing data for existing authentication devices 2329, authentication device classes 2328, interaction classes 2327, and authentication rules 2326.

In one embodiment, the authentication device data 2329 comprises data associated with each of the explicit user authentication devices 1720-1721 known to be used with clients 1700. For example, the policy database 2325 may include an entry for a "Validity Model 123" fingerprint sensor along with technical details related to this sensor such as the manner in which the sensor stores sensitive data (e.g., in cryptographically secure hardware, EAL 3 certification, etc) and the false acceptance rate (indicating how reliable the sensor is when generating a user authentication result).

In one embodiment, the authentication device classes 2328 specify logical groupings of authentication devices 2329 based on the capabilities of those devices. For example, one particular authentication device class 2328 may be defined for (1) fingerprint sensors (2) that store sensitive data in cryptographically secure hardware that has been EAL 3 certified, and (3) that use a biometric matching process with a false acceptance rate less than 1 in 1000. Another device class 2328 may be (1) facial recognition devices (2) which do not store sensitive data in cryptographically secure hardware, and (3) that use a biometric matching process with a false acceptance rate less than 1 in 2000. Thus, a fingerprint sensor or facial recognition implementation which meets the above criteria will be added to the appropriate authentication device class(es) 2328.

Various individual attributes may be used to define authentication device classes, such as the type of authentication factor (fingerprint, PIN, face, for example), the level of security assurance of the hardware, the location of storage of secrets, the location where cryptographic operations are performed by the authenticator (e.g., in a secure chip or Secure Enclosure), and a variety of other attributes. Another set of attributes which may be used are related to the location on the client where the "matching" operations are performed. For example, a fingerprint sensor may implement the capture and storage of fingerprint templates in a secure storage on the fingerprint sensor itself, and perform all validation against those templates within the fingerprint sensor hardware itself, resulting in a highly secure environment. Alternatively, the fingerprint sensor may simply be a peripheral that captures images of a fingerprint, but uses software on the main CPU to perform all capture, storage, and comparison operations, resulting in a less secure environment. Various other attributes associated with the "matching" implementation may also be used to define the authentication device classes (e.g., whether the matching is (or is not) performed in a secure element, trusted execution environment (TEE)), or other form of secure execution environment).

Of course, these are merely examples for illustrating the concept of authentication device classes. Various additional authentication device classes may be specified while still complying with the underlying principles. Moreover, it should be noted that, depending on how the authentication device classes are defined, a single authentication device may be categorized into multiple device classes.

In one embodiment, the policy database 2325 may be updated periodically to include data for new authentication devices 2329 as they come to market as well as new authentication device classes 2328, potentially containing new classes into which the new authentication devices 2329 may be classified. The updates may be performed by the relying party and/or by a third party responsible for providing the updates for the relying party (e.g., a third party who sells the secure transaction server platforms used by the relying party).

In one embodiment, interaction classes 2327 are defined based on the particular transactions offered by the relying party 2325. For example, if the relying party is a financial institution, then interactions may be categorized according to the monetary value of the transaction. A "high value interaction" may be defined as one in which an amount of $5000 or more is involved (e.g., transferred, withdrawn, etc); a "medium value interaction" may be defined as one in which an amount between $500 and $4999 is involved; and a "low value transaction" may be defined as one in which an amount of $499 or less is involved.

In addition to the amount of money involved, interaction classes may be defined based on the sensitivity of the data involved. For example, transactions disclosing a user's confidential or otherwise private data may be classified as "confidential disclosure interactions" whereas those which do not disclose such data may be defined as "non-confidential disclosure interactions." Various other types of interactions may be defined using different variables and a variety of minimum, maximum, and intermediate levels.

Finally, a set of authentication rules 2326 may be defined which involve the authentication devices 2329, authentication device classes 2327, and/or interaction classes 2327. By way of example, and not limitation, a particular authentication rule may specify that for "high value transactions" (as specified by an interaction class 2327) only fingerprint sensors that store sensitive data in cryptographically secure hardware that has been EAL 3 certified, and that use a biometric matching process with a false acceptance rate less than 1 in 1000 (as specified as an authentication device class 2328) may be used. If a fingerprint device is not available, the authentication rule may define other authentication parameters that are acceptable. For example, the user may be required to enter a PIN or password and also to answer a series of personal questions (e.g., previously provided by the user to the relying party). Any of the above individual attributes specified for authentication devices and/or authentication device classes may be used to define the rules, such as the type of authentication factor (fingerprint, PIN, face, for example), the level of security assurance of the hardware, the location of storage of secrets, the location where cryptographic operations are performed by the authenticator.

Alternatively, or in addition, a rule may specify that certain attributes can take on any value, as long as the other values are sufficient. For example, the relying party may specify that a fingerprint device must be used which stores its seed in hardware and performs computations in hardware, but does not care about the assurance level of the hardware (as defined by an authentication device class 2328 containing a list of authentication devices meeting these parameters).

Moreover, in one embodiment, a rule may simply specify that only specific authentication devices 2329 can be used for authenticating a particular type of interaction. For example, the organization can specify that only a "Validity Model 123 fingerprint sensor" is acceptable.

In addition, a rule or set of rules may be used to create ordered, ranked combinations of authentication policies for an interaction. For example, the rules may specify combinations of policies for individual authentication policies, allowing the creation of rich policies that accurate reflect the authentication preferences of the relying party. This would allow, for example, the relying party to specify that fingerprint sensors are preferred, but if none is available, then either trusted platform module (TPM)-based authentication or face recognition are equally preferable as the next best alternatives (e.g., in a prioritized order).

In one embodiment, the adaptive authentication policy engine 2345 implements the authentication rules 2326, relying on the interaction classes 2327, authentication device classes 2328, and/or authentication device data 2329, when determining whether to permit a transaction with the client 1700. For example, in response to the user of the client device 1700 attempting to enter into a transaction with the relying party website or other online service 2346, the adaptive authentication policy engine 2345 may identify a set of one or more interaction classes 2327 and associated authentication rules 2326 which are applicable. It may then apply these rules via communication with an adaptive authentication policy module 2350 on the client device 1700 (illustrated in FIG. 23 as a component within the client's authentication engine 2310). The adaptive authentication policy module 2350 may then identify a set of one or more authentication techniques 2312 to comply with the specified authentication policy. For example, if a prioritized set of authentication techniques are specified by the adaptive authentication policy engine 2345 of the relying party, then the adaptive authentication policy module 2350 may select the highest priority authentication technique which is available on the client 1700.

The results of the authentication techniques 2312 are provided to an assurance calculation module 2340 which generates an assurance level that the current user is the legitimate user. In one embodiment, if the assurance level is sufficiently high, then the client will communicate the results of the successful authentication to the authentication engine 2311 of the relying party, which will then permit the transaction.

In one embodiment, data from the client device sensors 1741-1743 may also be used by the assurance calculation module 2340 to generate the assurance level. For example, the location sensor (e.g., a GPS device) may indicate a current location for the client device 1700. If the client device is in an expected location (e.g., home or work), then the assurance calculation module 2340 may use this information to increase the assurance level. By contrast, if the client device 1700 is in an unexpected location (e.g., a foreign country not previously visited by the user), then the assurance calculation module 2340 may use this information to lower the assurance level (thereby requiring more rigorous explicit user authentication to reach an acceptable assurance level). As discussed above, various additional sensor data such as temperature, humidity, accelerometer data, etc, may be integrated into the assurance level calculation.

The system illustrated in FIG. 23 may operate differently based on specificity with which the client authentication capabilities and other information are communicated to the relying party. For example, in one embodiment, the specific models of each of the explicit user authentication devices 1720-1721 and specific details of the security hardware/software and sensors 1741-1743 on the client device 1700 may be communicated to the relying party 1750. As such, in this embodiment, the adaptive authentication policy engine 2345 may specifically identify the desired mode(s) of authentication, based on the authentication rules implemented for the current transaction and the risk associated with the client. For example, the adaptive authentication policy module 2345 may request authentication via the "Validity Model 123" fingerprint sensor installed on the client for a given transaction.

In another embodiment, only a generic description of the authentication capabilities of the client device 1700 may be provided to protect the user's privacy. For example, the client device may communicate that it has a fingerprint sensor that stores sensitive data in a cryptographically secure hardware that has been EAL 3 certified and/or that uses a biometric matching process with a false acceptance rate less than 1 in N. It may specify similar generic information related to the capabilities and specifications of other authentication devices, without disclosing the specific models of those devices. The adaptive authentication policy engine 2345 may then use this general information to categorize the authentication devices in applicable authentication device classes 2338 within the database 2325. In response to a request to perform a transaction, the adaptive authentication policy module 2345 may then instruct the client device 1700 to use a particular authentication device if its class is sufficient to complete the transaction.

In yet another embodiment, the client device 1700 does not communicate any data related to its authentication capabilities to the relying party. Rather, in this embodiment, the adaptive authentication policy module 2345 communicates the level of authentication required and the adaptive authentication policy module 2350 on the client selects one or more authentication techniques which meet that level of authentication. For example, the adaptive authentication policy module 2345 may communicate that the current transaction is classified as a "high value transaction" (as specified by an interaction class 2327) for which only certain classes of authentication devices may be used. As mentioned, it may also communicate the authentication classes in a prioritized manner. Based on this information, the adaptive authentication policy module 2350 on the client may then select one or more authentication techniques 2312 required for the current transaction.

As indicated in FIG. 23, the client device 1700 may include its own policy database(s) 2390 to store/cache policy data for each relying party. The policy database 2390 may comprise a subset of the data stored within the policy database 2325 of the relying party. In one embodiment, a different set of policy data is stored in the database 2390 for each relying party (reflecting the different authentication policies of each relying party). In these embodiments, the mere indication of a particular category of transaction (e.g., a "high value transaction," "low value transaction", etc) may be sufficient information for the adaptive authentication policy module 2350 on the client device 1700 to select the necessary authentication techniques 2312 (i.e., because the rules associated with the various transaction types are available within the local policy database 2390). As such, the adaptive authentication policy module 2345 may simply indicate the interaction class of the current transaction, which the adaptive authentication policy module 2350 uses to identify the authentication techniques 2312 based on the rules associated with that interaction class.

Figure 24:
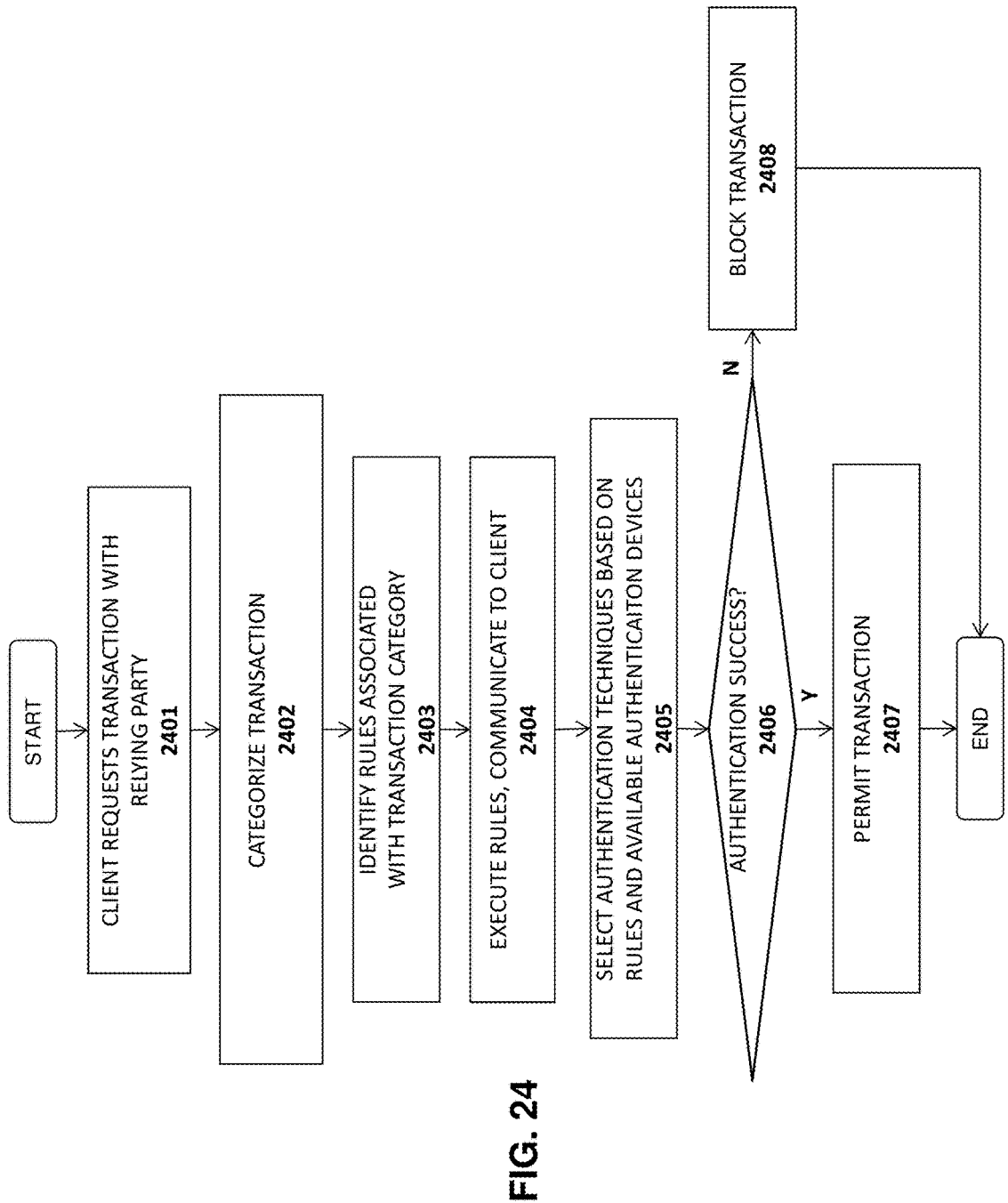
FIG. 24 illustrates one embodiment of a method for adaptively applying an authentication policy.

A method for performing adaptive authentication based on client device capabilities is illustrated in FIG. 24. The method may be implemented on the system illustrated in FIG. 23, but is not limited to any particular system architecture.

At 2401 a client attempts to perform a transaction with a relying party. By way of example, and not limitation, the client may enter payment information for an online purchase or attempt to transfer funds between bank accounts. At 2402, the transaction is categorized. For example, as discussed above, the transaction may be associated with a particular interaction class based on variables such as the amount of money involved or the sensitivity of information involved.

At 2403, one or more rules associated with the category of transaction are identified. Returning to the above example, if the transaction is categorized as a "high value transaction" then a rule associated with this transaction type may be selected. At 2404, the rule(s) associated with the transaction type are executed and, as discussed above, information is sent to the client indicating the authentication requirements to complete the transaction. As discussed above, this may involve identifying specific authentication devices, identifying classes of authentication devices, or merely indicating the particular rule which needs to be implemented (e.g., if the client maintains local copies of the rules).

In any case, at 2405 a set of one or more authentication techniques are selected based on the requirements specified via the rule(s) and the authentication capabilities of the client. If authentication is successful, determined at 2406, then the transaction is permitted at 2407. If not, then the transaction is blocked at 2408 (or additional authentication is requested from the user).

There are numerous benefits realized from the embodiments of the invention described herein. For example, these embodiments reduce the effort required to integrate authentication capabilities at the relying party. For example, instead of writing code to codify an authentication policy, rules can be configured through a simple graphical user interface. All the relying party needs to do to integrate is define a policy for a class of interactions (for example: "Large Money Transfers") and have the integration code use that policy identifier when interacting with the policy engine to determine the correct authentication mechanism to leverage.

Moreover, these embodiments simplify authentication policy administration. By expressing the authentication policy outside of code, this approach allows the organization to easily update their authentication policies without requiring code changes. Changes to reflect new interpretations of regulatory mandates, or respond to attacks on existing authentication mechanisms become a simple change in the policy, and can be effected quickly.

Finally, these embodiments allow for future refinement of authentication techniques. As new authentication devices become available, an organization can evaluate its appropriateness to addressing new or emerging risks. Integrating a newly available authentication device only requires adding the authentication device to a policy; no new code has to be written to deploy the new capability immediately.

G. System and Method for Eye Tracking During Authentication

In general, authentication techniques are robust against spoofing if (a) secret information is used for authentication or (b) it is hard to produce a fake input. Most systems today rely on password-based authentication. Passwords are easy to reproduce, so they need to be kept secure. Consequently, password attacks typically focus on gaining access to a user's password. Recent attacks have demonstrated the vulnerability of servers on which the passwords are stored for verification.

In contrast to password-based authentication, when using biometrics for authentication, the biometric information typically is public. For example, a fingerprint can be retrieved from (almost) any object touched by the user. Similarly, a user's face is typically not hidden and hence can be seen and captured by anyone and is often published on social networks.

In the real world, we can rely on our own recognition abilities when we see a person, because it is hard to "produce" another person having the same biometric characteristics. For example, it is still hard to "produce" another person having the same face and mannerisms. This is why governments include pictures of the face in passports, ID cards, drivers licenses and other documents. In the virtual world, however, we don't have to "produce" another person with the same face in order to spoof the system, but only something that the computer would recognize such as a picture of the face. In other words, "[t]he moral is that biometrics work well only if the verifier can verify two things: one, that the biometric came from the person at the time of verification, and two, that the biometric matches the master biometric on file" (see Reference 1 from the list of references provided prior to the claims of the present specification).

In the past, research on automatic face recognition has focused on reliable recognition of faces using still images and video. See, e.g., Reference 2 below. Several relatively robust face recognition techniques exist and systems are commercially available today (see Reference 3). However, little attention has been paid to "liveness" detection, i.e., "verification . . . that the biometric matches the master biometric on file." In several use cases, spoofing protection is either not required or it is still being performed by humans (e.g., for law enforcement applications).

The ubiquity of cameras in computing devices such as notebooks and smart phones on one hand, and the weakness of passwords as the most prevalent authentication method on the other hand, drive the adoption of biometric authentication methods in general, and face recognition in particular. The first large scale "trial" of face recognition as an authentication method was done in Google Android 4 (aka, "Ice Cream Sandwich") and was based on still image recognition. These techniques can be fooled easily with photographs (See Reference 4). Even improved methods which include some sort of liveness detection in Android 4.1 (aka, "Jelly Bean") can easily be spoofed by presenting two photos in a sequence, one with open eyes and an electronically modified one with closed eyes on a computer display to the camera (see Reference 5).

Though it can be argued that this weakness is due to resource limitations on mobile devices, it also appears that commercial software available for PCs and even the research of anti-spoofing detection is not yet very mature.

The assignee of the present application performed tests with PC-based face recognition software which confirms this finding:

Cogent BioTrust 3.00.4063, operated on a Windows 7® based Samsung Series 5® Notebook, performs no liveness check at all, even with security settings set to "high." A simple face image, displayed on a normal computer monitor was sufficient to successfully spoof the system.

KeyLemon 2.6.5, operated on a Macbook Air® performs simple blink tests as liveness check. It can be successfully spoofed by displaying a sequence of 3 images: (1) a real image of the face (e.g., created by a web cam); (2) a modification of the real image, where the eyes have been re-colored to look as if they are closed; (3) the real image again.

Anti-Spoofing detection is not part of standard tests such as the NIST biometric vendor tests when comparing different algorithms. See, e.g., References 6-8. One of the first known public competitions, organized by several researchers in 2011 (see Reference 9) showed early success of some algorithms, but it was based on videos with a resolution of 320×240 pixels. Typical computing devices provide resolutions of the front-facing cameras of at least 640×480 pixel.

Figure 25:
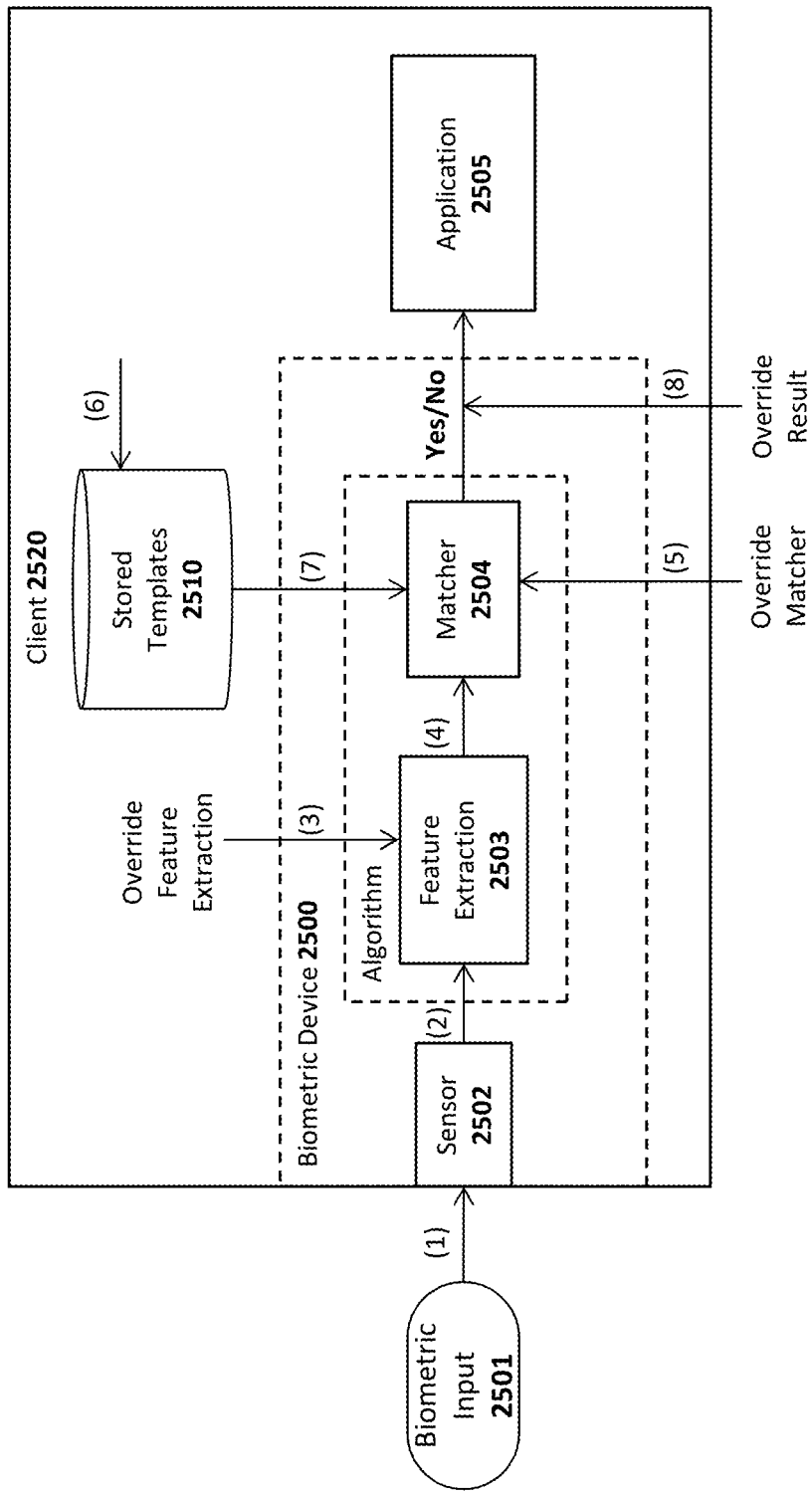
FIG. 25 illustrates an exemplary client equipped with a biometric device.

FIG. 25 illustrates an exemplary client 2520 with a biometric device 2500 for performing facial recognition. When operated normally, a biometric sensor 2502 (e.g., a camera) reads raw biometric data from the user (e.g., snaps a photo of the user) and a feature extraction module 2503 extracts specified characteristics of the raw biometric data (e.g., focusing on certain facial features, etc). A matcher module 2504 compares the extracted features with biometric template data 2510 stored in a secure storage on the client 2520 and generates a score and/or a yes/no response based on the similarity between the extracted features and the biometric template data 2510. The biometric template data 2510 is typically the result of an enrollment process in which the user enrolls a facial image or other biometric data with the device 2500. An application 2505 may then use the score or yes/no result to determine whether the authentication was successful.

There are multiple potential points of attack in order to spoof a facial recognition system (see References 10, 11), identified in FIG. 25 as (1)-(8). There are well known protection mechanisms for ensuring the integrity of the biometric templates (6) (e.g., by using electronic signatures) and protecting the integrity of feature extraction (3), feature vector (4), the matcher (5) and its final result (8) (e.g., by applying a combination of (a) white box encryption methods, (b) code obfuscation and (c) device binding).

Protection mechanisms against replaying old captured data to the feature extraction unit (2) are (at least theoretically) covered by the approach of the Trusted Computing Group and by potential extensions to ARM TrustZone. Basically, the approach is to add cryptographic protection mechanisms (e.g. HMAC or electronic signatures) to the sensor and encapsulate the sensor in a tamper proof way, similar to the protection mechanisms used in current smart card chips. The feature extraction engine could then verify the integrity of the incoming data.

While the embodiments of the invention described below utilize eye tracking techniques to confirm the "liveness" of the user, in one embodiment, these techniques are combined with one or more existing techniques for detecting fake biometrics (see Reference 1). This is an area of ongoing research. Existing research has identified four different classes of protection approaches for fake biometrics (see Reference 12):

1. Data-driven characterization
    a. Still Images
        i. Detect resolution degradation by re-scanning images analyzing 2D Fourier spectrum (Reference 13)
        ii. Exploiting different reflection characteristics of real faces versus image prints. The theory of this is based on the Lambertian reflectance properties (Reference 14)
        iii. Exploiting different micro texture of real face and image prints (Reference 15) due to printing defects.
        iv. Exploiting quality degradation and noise addition on printed images combined with other methods (Reference 16).
    b. Videos
        v. Each camera sensor has its own characteristics and re-capturing a video displayed on a monitor causes artifacts. This can be used to detect spoofing (Reference 12).
        vi. In the case of spoofing with images, there is a face-background dependency (Reference 17).
        vii. In the case of spoofing attacks, faces typically show more rigid motion (Reference 18).
    c. Combinations of Still Images and Videos (Reference 12).
2. User behavior modeling (Reference 12).
3. User interaction need (Reference 12).
4. Additional devices (Reference 12).

The most effective non-intrusive mechanisms based solely on existing sensor technology seem to be based on a combination of Motion, Texture, and Liveness detection. See Reference 9.

Textural Differences

The impact on printing and re-scanning a picture may be detected. It is intuitively clear that the quality of an image doesn't improve by printing and re-scanning it. The research in Reference 15 shows that differences can be algorithmically detected by analyzing micro textures: "A close look at the differences between real faces and face prints reveals that human faces and prints reflect light in different ways because a human face is a complex non rigid 3D object whereas a photograph can be seen as a planar rigid object."

This algorithm has been tested against the images included in the NUAA Photograph Imposter Database. The performance has been reported to be at 16.5 ms in average to process an image on a 2.4 GHz Intel Core 2 Duo CPU with 3 GB of RAM using un-optimized C++ code.

Infrared Instead of Visual Light

It is difficult to display images or videos in infrared spectrum. As a result liveness detection based on capturing thermal patterns of faces as proposed in Reference 19 would be more robust than capturing patterns in visual light. Unfortunately infrared sensors are expensive and not included in typical notebooks, tablets or smart phones.

Optical Flow Based Methods

Real faces are 3 dimensional objects. Faces are typically moving in normal conversations. The 2D motion of the central face parts, i.e., the parts with less distance to the camera is expected to be higher compared to the 2D motion of face regions with greater distance from the camera (References 20, 21, 22). For this type of detection a sequence of at least 3 consecutive images is required.

The research in Reference 21 is part of the SART-2 project, a Biometric security system for mobile workstations.

Motion Pictures Instead of Still Images

In Reference 23, a blinking-based liveness detection method is described. This method seems to be pretty robust against simple photo based spoofing attacks. In addition to recognizing the face, the method locates the eyes and checks whether closing the eyes is visible in the observed image sequence. As seen from the Android 4.1 large scale trial, this method is obviously not very robust against "photoshop" attacks. See Reference 5.

In general, in order to spoof such motion picture based systems the attacker must generate a small image sequence and must present the sequence to the sensor. In a world with powerful image editors, free video editors, and tablet PCs this is relatively easy to achieve.

Such methods are characterized as "publicly known interactions," i.e., the attacker knows the required interactions in advance and can prepare a matching image sequence.

In Reference 23, the context of the scene and eye-blink is included in the analysis. Performance measured on Intel Core2 Duo 2.8 GHz, 2 GB RAM is approximately 50 ms per video frame (20 fps).

Challenge Response Methods

In the context of biometrics, a challenge response is defined as: A method used to confirm the presence of a person by eliciting direct responses from the individual. Responses can be either voluntarily or involuntarily. In a voluntary response, the end user will consciously react to something that the system presents. In an involuntary response, the end user's body automatically responds to a stimulus. A challenge response can be used to protect the system against attacks.

(National Science & Technology Council's Subcommittee on Biometrics)

Multimodal Systems

Multimodal systems have been proposed to improve the robustness of biometric methods against spoofing attacks, noisy data etc. See Reference 25.

The effect of simulated spoofing attacks to such multimodal systems is analyzed in Reference 26. The main result is that not all fusion schemes improve the robustness against spoofing attacks, meaning that in some fusion schemes it is sufficient to spoof only a single biometric method in order to spoof the entire multimodal system. The analysis of existing schemes with real spoofing attacks lead to similar results. See Reference 27.

In general, there are three different classes of multimodal systems:

1) Systems where successfully spoofing a single trait is sufficient to spoof the entire system. Optimizing a multimodal system for small FRRs typically leads to such results.
2) Systems where:
   a) more than one trait has to be spoofed in order to successfully spoof the entire system; and
   b) spoofing any one trait in this multimodal system is no more complex than spoofing the same trait in a single modal system.
3) Systems where
   a) more than one trait has to be spoofed in order to successfully spoof the entire system; and
   b) spoofing any one trait in this multimodal system is more complex than spoofing the same trait in a single modal system. The embodiments of the invention described below fall into this category.

One embodiment of the invention performs eye-tracking as part of an authentication process to measure the response to varying regions of interest randomly arranged and displayed on the screen. For example, a sequence of random screen layouts mixing text, empty regions, images and video clips may be presented to the user to non-intrusively induce user's eye-movement. Concurrently, eye-tracking techniques are used to verify that the eyes are reacting to the screen layout in an expected manner. This information may then be combined with face recognition techniques to verify that the expected face is still present. Moreover, as discussed above, the eye tracking and facial recognition techniques may be combined with other techniques (e.g., location-based authentication, non-intrusive user presence detection, fingerprint scanning, etc) to arrive at a sufficient level of assurance that the legitimate user is in possession of the device.

Reading a Web page or other content type does not involve a smooth sweeping of the eyes along the contents, but a series of short stops (called "fixations") and quick "saccades". The resulting series of fixations and saccades is called a "scanpath". Scanpaths are useful for analyzing cognitive intent, interest, and salience (see current WikiPedia article for "Eye Tracking" at en.wikipedia.org/wiki/Eye_tracking). A "heatmap" is an aggregate representation showing what areas a group of people fixated when viewing a webpage or email (see Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).

Figure 26A:
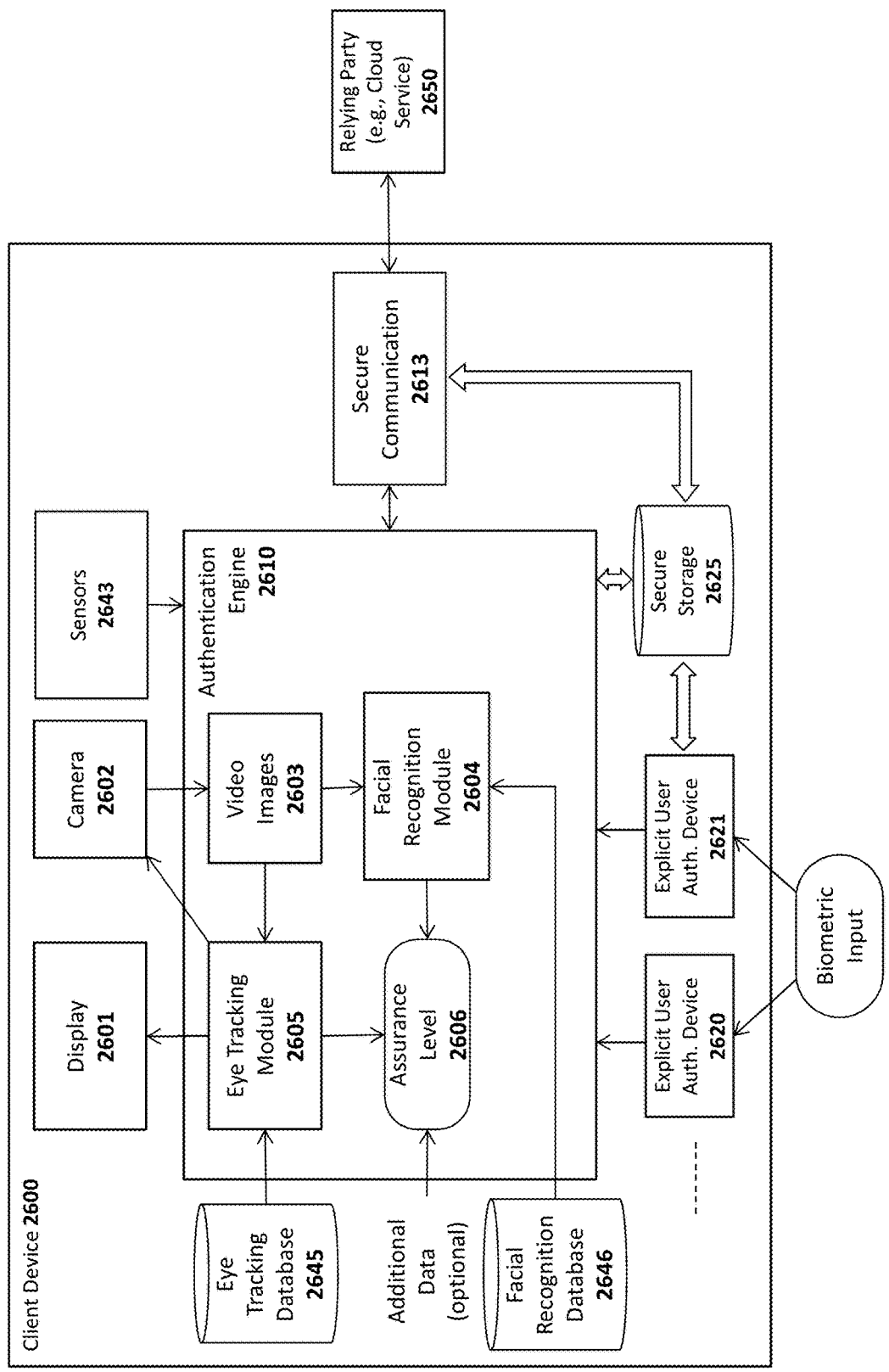
FIG. 26A illustrates one embodiment of an authentication engine including an eye tracking module and a facial recognition module.

As illustrated in FIG. 26A, one embodiment of the invention comprises an authentication engine 2610 on a client device 2600 which includes a facial recognition module 2604 for performing facial recognition and an eye tracking module 2605 for performing the eye tracking operations described herein. In one embodiment, the facial recognition module 2604 and eye tracking module 2605 analyze sequences of video images 2603 captured by a camera 2602 on the device to perform their respective operations.

To perform its facial recognition operations, the facial recognition module 2604 relies on facial recognition templates stored within a secure facial recognition database 2646. In particular, as discussed above, matching logic within the facial recognition module 2604 compares facial features extracted from the video images 2603 with facial template data stored in the facial recognition database 2646 and generates a "score" based on the similarity between the extracted features and the facial template data. As previously discussed, the facial template data stored in the database 2646 may be generated by an enrollment process in which the user enrolls a facial image or other biometric data with the device 2600. The score generated by the facial recognition module 2604 may then be combined with scores from other authentication modules (e.g., such as eye tracking module 2605 discussed below) to form an assurance level 2606, representing the assurance that the legitimate user is initiating the current transaction. In one embodiment, each score must reach a particular threshold value to generate a sufficient assurance level 2606 for a particular transaction. In one embodiment (assuming the thresholds are reached), the scores may be added together or combined using other mathematical formulae (e.g., the scores may be weighted, averaged, added together, or combined in any other way).

To perform eye tracking analysis, the eye tracking module 2605 relies on eye tracking templates stored within a secure eye tracking database 2645. Although illustrated as a separate database, the eye tracking database and facial recognition database may actually be the same secure database. In one embodiment, an eye tracking template specifies the text, graphics, pictures, videos and/or blank regions which are to be displayed for the user on the client device's display 2601

Figure 28A:
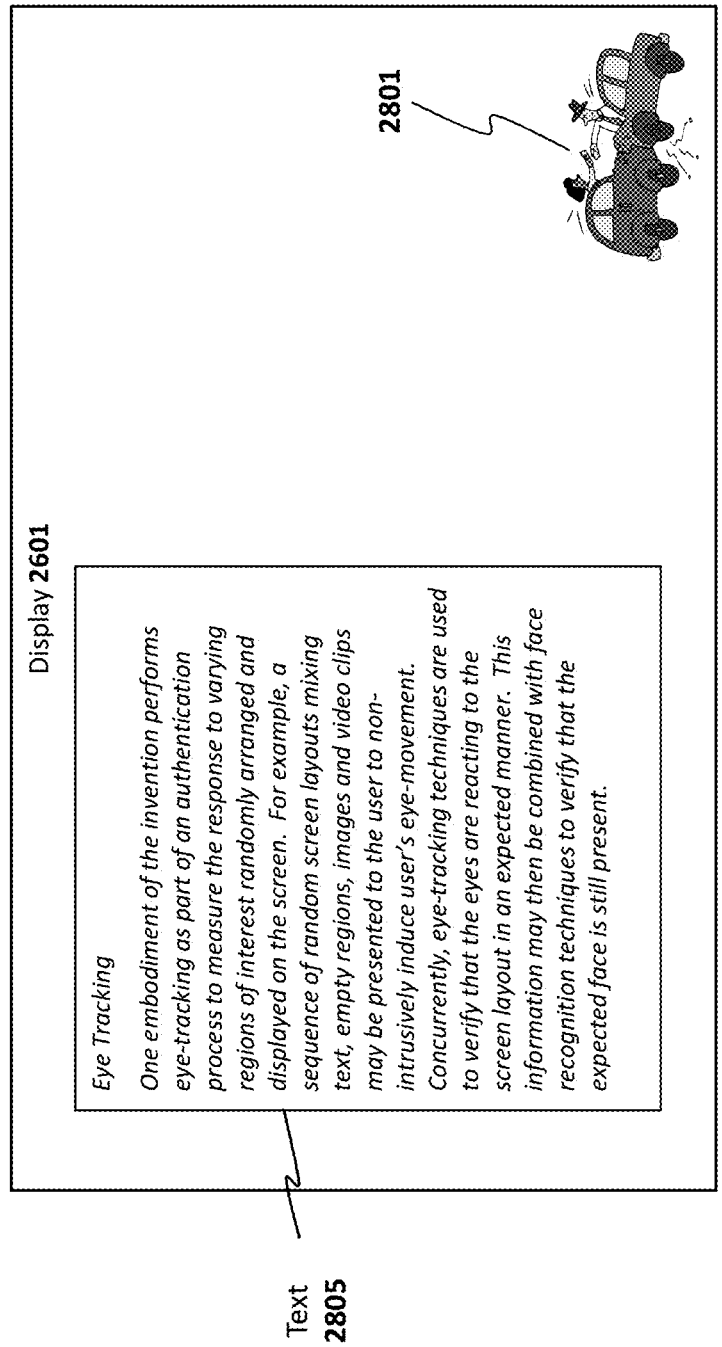
FIGS. 28A-B illustrate exemplary text, graphics, photos, videos, blank regions and other content which may be displayed to an end user.
Figure 28B:
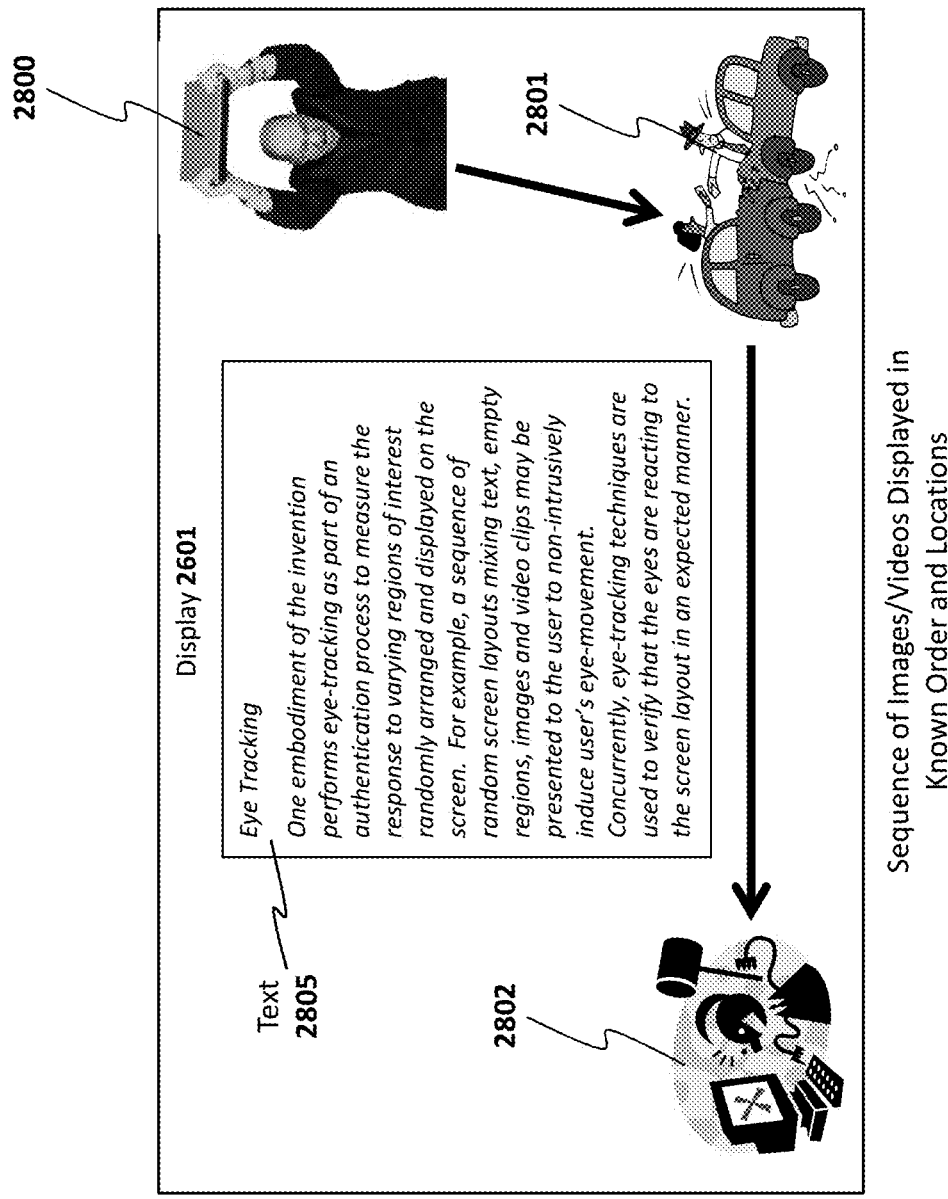

(some examples of which are shown in FIGS. 28A-B below) and potentially the order in which the content is to be displayed. In addition, the eye tracking template includes data specifying the expected motion characteristic of a user's eyes in response to the content displayed to the user (e.g. in form of a heatmap, see below). Matching logic within the eye tracking module 2605 compares the expected motion of the user's eyes with the actual motion (captured from the video images) to arrive at a "score" based on the similarity between the expected motion and the actual motion. As mentioned, the score may then be combined with scores from other authentication modules (e.g., such as facial recognition module 2604) to form an assurance level 2606. The eye tracking template data stored in the database 2646 may be compiled using recorded eye movements of other users and/or of the actual user of the device in response to each displayed Web page or other displayed image. For example, as with the facial recognition template, the eye tracking template may be generated as part of an enrollment process in which the user enrolls his/her eye motion with the device 2600.

In one embodiment, the eye tracking module 2605 determines the correlation between the images being displayed (which may include text, graphics, video, pictures, and/or blank regions) and the user's eye movement. For example, if a motion video is displayed in the lower right corner of the display, the vast majority of users will direct their attention to this region. Thus, if the eye tracking module 2605 detects that the user's eyes have moved to this region within a designated period of time (e.g., 2 seconds), then it will detect a high correlation between the user's eyes and the template, resulting in a relatively high score. In contrast, if the user's eyes do not move to this region (or do not move at all), then the eye tracking module 2605 will detect a low correlation and corresponding low score.

As illustrated in FIG. 26A, various other explicit user authentication devices 2620-2621 and sensors 2643 may be configured on the client device 2600. These authentication devices and sensors may provide additional authentication data (if necessary) to be used by the authentication engine 2610 when generating the assurance level 2606 (i.e., in addition to the eye tracking and facial recognition described herein). For example, the sensors may include location sensors (e.g., GPS) to determine the location of the client device 2600. If the client device is in an expected location, then the authentication engine may use this data to increase the assurance level 2606. By contrast, if the client device is in an unusual location (e.g., another country), then this may negatively impact the assurance level 2606. In this manner, authentication data may be generated non-intrusively (i.e., using sensor data collected without explicit input from the end user).

In addition, another non-intrusive technique involves the authentication engine 2610 monitoring the time which has passed since the last explicit user authentication. For example, if the user has authenticated using a fingerprint or other biometric device 2620-2621 or has entered a password recently (e.g., within 10 minutes), then it will use this information to increase the assurance level 2606. By contrast, if the user has not explicitly authenticated for several days, then it may require more rigorous authentication by the facial recognition module 2605 and eye tracking module 2605 (e.g., it may require a higher correlation with the template data than usual to increase the assurance level to an acceptable value for the current transaction).

In one embodiment, secure storage 2625 is a secure storage device provided for storing the authentication keys associated with each of the authenticators and used by the secure communication module 2613 to establish secure communication with the relying party (e.g., a cloud service 2650 or other type of network service).

Figure 26B:
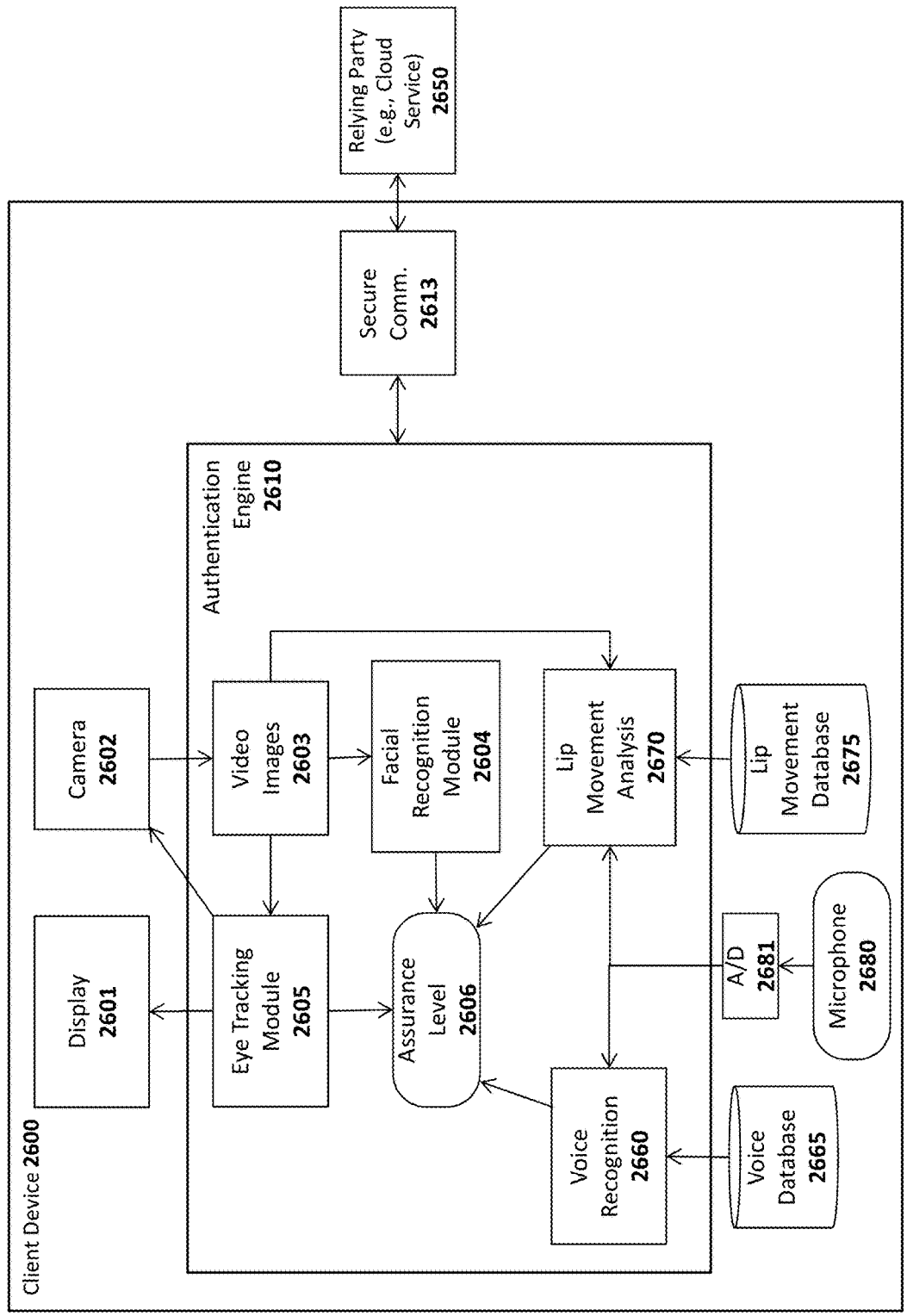
FIG. 26B illustrates one embodiment of an authentication engine including a speech recognition module and lip movement analysis module in combination with an eye tracking module and a facial recognition module.

FIG. 26B illustrates another embodiment in which the authentication engine 2610 includes a voice recognition module 2660 and a lip movement analysis module 2670 in addition to (or in lieu of) the facial recognition module 2604 and eye tracking module 2605. In one embodiment, the user's voice is captured via a microphone 2680 and the analog voice signal is converted to a digital signal via an analog to digital (A/D) converter 2681. The voice recognition module 2660 compares the digital voice signal to a voice print of the user stored within a voice database 2665. In one embodiment, the voice print is generated during a training/enrollment process in which the user is prompted to speak certain words or phrases. Upon receiving the digitized audio signal resulting from the spoken words/phrases, the voice recognition module 2660 generates the voice print by capturing specific characteristics of the user's voice (e.g., spectral characteristics, phonetic-based categorization, etc), and storing the results within the voice database 2665. The voice recognition module 2660 may utilize various voice recognition techniques when generating the voice print and comparing the voice print to a captured voice signal including, but not limited to techniques based on frequency estimation, hidden Markov models, Gaussian mixture models, pattern matching algorithms, neural networks, matrix representation, Vector Quantization, and decision trees.

In one embodiment, the user is prompted to speak a particular sequence of words and/or phrases displayed on the display 2601 of the client device. These may be the same words/phrases or similar words/phrases as those used during the enrollment process so that the voice recognition module 2660 can compare similar voice characteristics to those captured in the voice print.

In response to its analysis, the voice recognition module 2660 generates a "score" or other value indicating the extent to which the captured voice and the voice print are similar or dissimilar. These results are then used by the authentication engine 2610 to increase or decrease the assurance level 2606. For example, if there is a 97% chance that the legitimate user has spoken the indicated words/phrases, then the assurance level 2606 may be increased. By contrast, if there is a 97% chance that the legitimate user was not the one speaking the words/phrases, then the assurance level 2606 may be decreased.

In addition, one embodiment also includes a lip movement analysis module 2670 which performs an analysis of the motion of the user's lips as the user speaks the words/phrases. For example, the lip movement analysis module 2670 may compare the video images 2603 of the user as the user is speaking the words/phrases and determine the extent to which the audio stream captured via the microphone 2680 matches the video stream. If the lips of the user are out of sync with the captured audio stream, then this may indicate that the current user is spoofing the system (e.g., playing back a recording of the legitimate user's voice). To determine whether synchronization exists, the lip movement analysis module 2670 may be trained to associate certain phonetics and volume levels with certain lip/mouth positions and/or movements over time. For example, it would be expected that periods when the user's mouth is open (i.e., lips are separated) would result in a larger volume than when the user's mouth is closed (lips are together). Similarly, it would be expected that vowel sounds would be heard during times when the user's lips are separated and consonants during times when the user's lips are together.

In addition, in one embodiment, the lip movement analysis module 2670 may compare the lip movements captured in the video images 2603 with reference lip-movements of the user stored within a lip movement database 2675. As with the voice prints, the reference lip movements may be captured during an enrollment process in which images of the user speaking certain words/phrases are recorded, and relevant data extracted and stored within the database 2675.

In one embodiment, a score or other value is generated by the lip movement analysis module 2670 to indicate a correlation between the lip movements of the user captured on video 2603 and those which would be expected. For example, if the audio and video appear to be in sync, then the lip movement analysis module 2670 may generate a relatively higher score than if the audio and video appear to be out of sync. Similarly, the lip movement analysis module 2670 may generate a relatively higher score if the lip movements detected in the video images 2603 have a high correlation to the reference lip movements stored in the lip movement database 2675.

In one embodiment, the analysis of the voice recognition module 2660, lip movement analysis module 2670, facial recognition module 2604 and/or eye tracking module 2605 may be combined to generate the assurance level 2606, providing a likelihood that the legitimate user is in possession of the client device 2600. Embodiments of the invention may be implemented with any one of these modules or any combination of these modules to generate the assurance level 2606. This assurance level 2606 may then be used in combination with various other authentication techniques described herein.

While several components from FIG. 26A are not illustrated in FIG. 26B to avoid obscuring the additional features of this embodiment (e.g., sensors 2643, eye tracking database 2645, facial recognition database 2646, explicit user authentication devices 2620-2621, secure storage 2625, etc) these components may be considered to be included in the embodiment of FIG. 26B.

Figure 27:
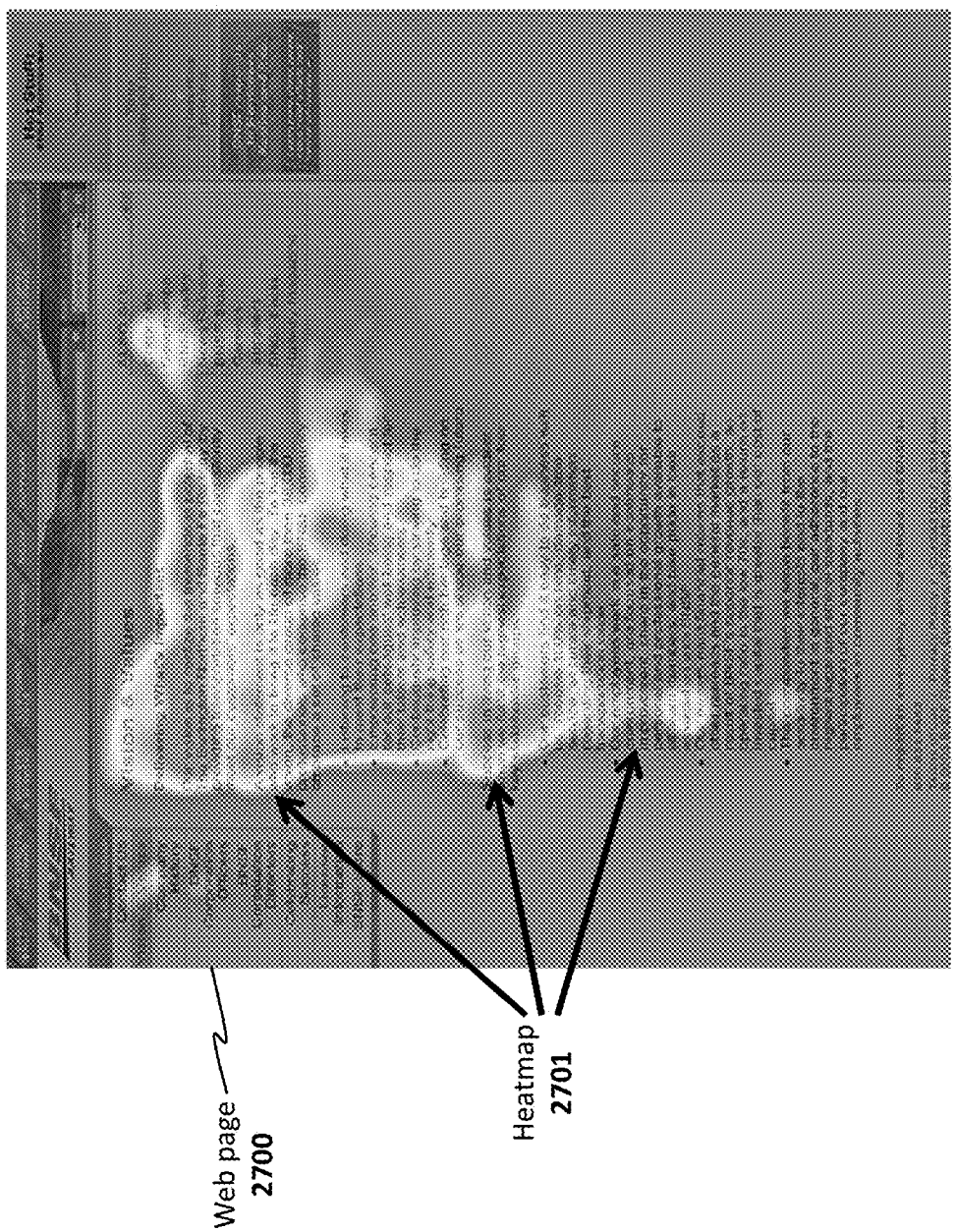
FIG. 27 illustrates an exemplary heatmap for a Web page employed in one embodiment of the invention.

An exemplary "heatmap" generated for a Web page is illustrated in FIG. 27. The color coding represents the regions of the Web page on which users fixed their eyes while viewing. Red indicates the highest amount of fixation (meaning that users tended to view these regions more frequently), followed by yellow (indicating less fixation), blue (indicating still less fixation), and then no color (indicating no fixation or fixation below a threshold amount).

When designing web pages, eye tracking and heatmap analysis is performed as part of the usability analysis. Research (see, e.g., References 29, 30) has shown that Web users spend 80% of their time looking at information above the page fold. Although users do scroll, they allocate only 20% of their attention below the fold. Web users spend 69% of their time viewing the left half of the page and 30% viewing the right half. A conventional layout is thus more likely to make sites profitable.

Spoofing attacks like presenting a still face image or a video displayed on a monitor can be detected by the eye tracking module 205 as the scanpath would most probably not correlate to the screen layout. Different types of Eye-Tracking methods are available: specialized equipment with high accuracy and software based methods using standard web cams (see Reference 33).

FIG. 28A illustrates an exemplary grouping of text 2805 and an image and/or video 2801 displayed on the client device display 2601. In one embodiment, the grouping is integrated into a Web page. However, the underlying principles of the invention are not limited to a Web-based organization. The grouping could also be part of a Screen Saver or other applications. In one embodiment, the text 2805 and image/video 2801 are displayed concurrently. In another embodiment, the text is displayed first, followed by the image/video 2801. In either case, the expectation is that the user's eyes would be directed to the lower right corner of the display 2601 (where the image/video 2801 is displayed).

FIG. 28B illustrates another example which includes a text region 2805 and three image/video elements 2800-2802. In one embodiment, the image/video element 2800 is displayed first, followed by image/video element 2801, followed by image/video element 2802. In such a case, the user's eyes should move from the upper right corner of the display, to the lower right, and then to the lower left.

In one embodiment, the particular image/video elements 2800-2802 and other content types are randomly selected by the eye tracking module 2605, thereby making it harder to anticipate and spoof. In addition, the particular location in which the different image/video elements 2800-2802 are selected randomly. In such a case, the eye motion template may specify a particular mode of operation for displaying content, but will not specify the actual content o the actual location(s). Rather, the content and the locations are selected by the eye tracking module 2605 which will then assume that the user's eyes should gravitate towards the content being displayed and generate a correlation and score based on the extent to which this is detected.

In addition, rather than generating its own content, the eye tracking module 2605 may use existing content such as an existing Web page of the relying party 2650 or images stored locally on the device. For example, if the relying party is a financial institution and the user is attempting to enter into a financial transaction, then the Web page normally displayed during the transaction may be displayed. In such a case, the eye tracking module 2605 may retrieve a heatmap for the Web page (such as shown in FIG. 27) from the eye tracking database 2645 and determine whether a correlation exists to the heatmap and the locations being viewed by the end user.

In summary, the embodiments described herein may present a sequence of random screen layouts mixing text, empty regions, images and video clips and continuously track the user's eyes producing the captured scanpath. A correlation is then made between the captured scanpath and the expected scanpath. In addition, one embodiment of the invention may then re-verify that the face is still recognized.

Not all people are equally attracted by the same images or image sequences. For example some people are attracted by technology more than they are by animals, text, known or unknown human faces or bodies, mystic symbols, or even mathematical formulas. With this in mind, one embodiment of the eye tracking module 2605 learns the person specific characteristics of eye-movement triggered by different types of images. The degree of similarity of the measured characteristic from the video images 2603 and the reference data (stored in the eye tracking database 2645) is then used to generate the assurance level 2606 (i.e., the certainty that the legitimate user's eyes are following "challenge" images, video, and other content displayed on the display 2601).

Figure 29B:
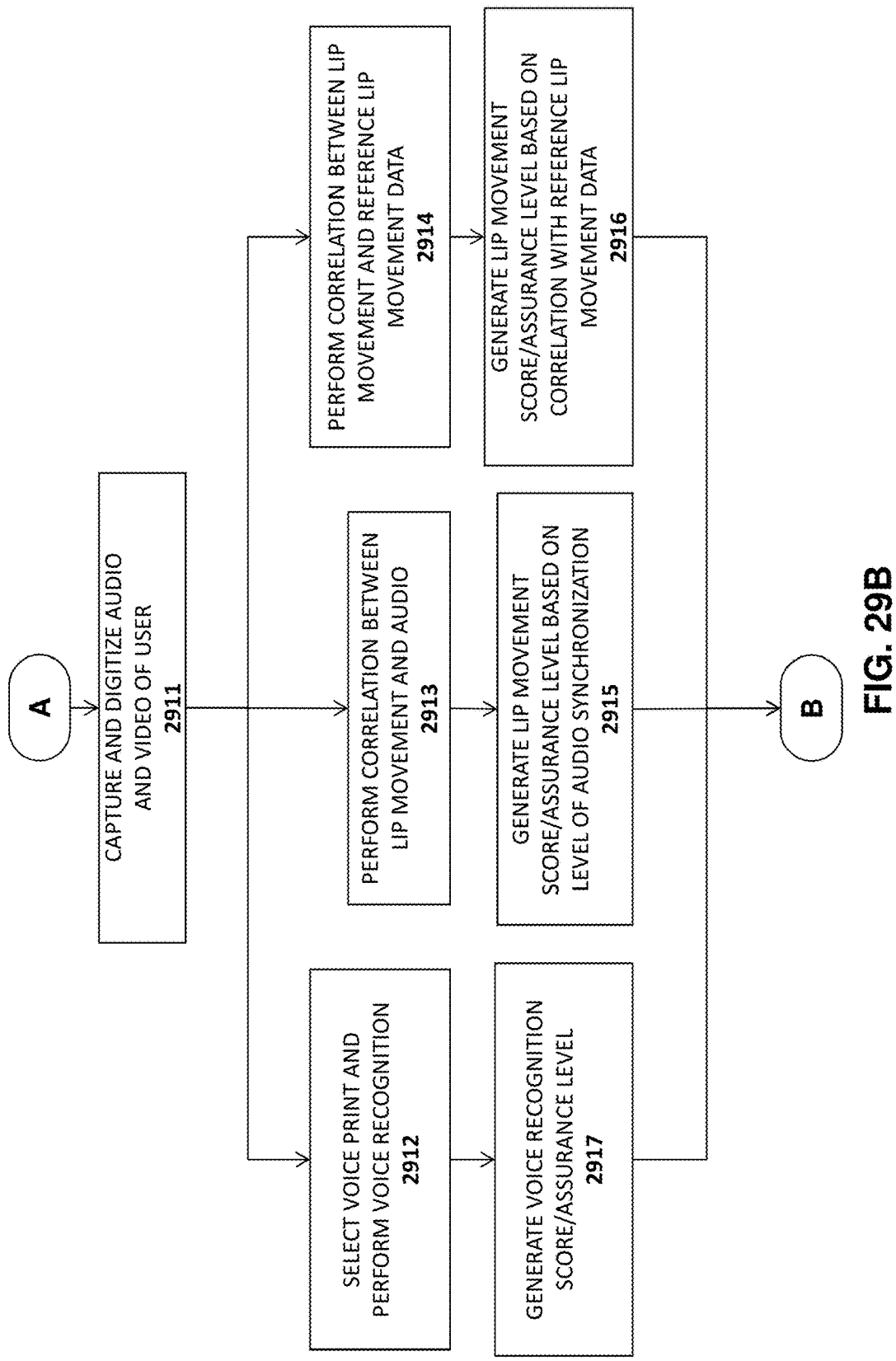

A method in accordance with one embodiment of the invention is illustrated in FIGS. 29A-B. The method may be implemented within a system architecture such as shown in FIG. 26A, but is not limited to any particular system architecture.

Turning first to FIG. 29A, at 2901 a particular eye tracking template is selected for the given user and/or transaction. At 2902 a sequence of images of the user's face are captured while displaying content according to the template. For example, the template may specify the types of content, the location of the content, and the timing for displaying the content. Alternatively, the template may only generally specify a type of eye-tracking and the eye tracking module 2605 may determine how, where and when to display the content.

Regardless of how the content is selected and displayed, at 2903, facial recognition is performed and, at 2904, eye tracking analysis is performed using the captured sequence of images. At 2905 a facial assurance level is generated based on the correlation between the captured images and the facial templates. Similarly, at 2906, an eye tracking assurance level is generated based on the correlation between the motion of the user's eyes and the expected motion of the user's eyes.

FIG. 29B illustrates a sequence of voice recognition operations and lip movement correlation operations which may be performed in parallel with the operations of FIG. 29A. Alternatively, the operations in FIGS. 29A-B may be performed sequentially, in any order, until an acceptable assurance level has been reached.

At 2911, audio and video of a current user in possession of the client device is captured and digitized. At 2912, a particular voice print is selected from the voice database (e.g., one previously recorded for the user during an enrollment process) and voice recognition operations are performed. At 2917, a score/assurance level indicating a correlation between the current user's voice and the voice print is generated. At 2913, a correlation between the digitized audio and the lip movements of the video captured for the current user is determined and, at 2915, a score/assurance level is generated based on the level of synchronization. At 2914, a correlation is performed between the captured lip movements in the video and reference lip movement data collected during an enrollment process of the legitimate user. At 2916, a score/assurance level is generated indicating the extent to which the captured lip movements match the reference lip movements. Following 2917, 2915, and/or 2916, the resulting scores are combined with the results from 2905 and 2906 to generate an final assurance level at 2907. As mentioned, if the combined results are sufficient at 2907, then the transaction is permitted at 2909. If not, then additional authentication techniques may be required at 2908.

Although illustrated in FIGS. 29A-B as parallel operations 2903/2905 and 2904/2906, the facial recognition operations 2903/2905 may be performed first and the eye tracking operations 2904/2906 may then be performed only if the facial recognition operations result in a high correlation/assurance level (or vice-versa). Similarly, the voice recognition operations 2912 and lip movement operations 2912/1913, 2915/2916 may be performed in parallel or in sequence (e.g., until an acceptable assurance level has been reached).

At 2907, a determination is made as to whether the combined results of the facial authentication and eye tracking is sufficient to allow the current transaction to proceed. If so, then the transaction is permitted at 2909. If not, then at 2908, the transaction is disallowed or additional authentication techniques are requested to raise the level of assurance. For example, at this stage, the user may be asked to swipe a finger on a fingerprint sensor or to enter a PIN associated with the user's account. If the additional authentication techniques are sufficient, determined at 2910, then the transaction is permitted at 2909.

H. System and Method for Collecting and Utilizing Client Data for Risk Assessment During Authentication Some types of authenticators are very trustworthy, and others are not. Thus, there is a range of assurance that relying parties can have regarding authenticators and certain types of client data may be used for risk assessment (e.g., to adjust that assurance up or down). For example, if the remote authenticator has a secure element or trusted execution environment (TEE), then the authentication can be securely signed with an attestation key. The attestation key stays inside the secure element and is inaccessible by any external entities. The actual authentication operation is also performed inside the secure element. Using the attestation key signature, the relying party can know for sure that a remote authenticator is responsible for the authentication attempt.

If the remote authenticator lacks a secure element, then attestation signing has to be done in software, which opens the door for an attack. One way to mitigate this is to store the attestation key in a software-protected "whitebox". The attestation key cannot leave the whitebox and performs signing on the authentication attempt. However, since the code doing the authentication and the whitebox doing the attestation signature are decoupled (and the whitebox is software based), this is less trustworthy than using a secure element or trusted execution environment (TEE).

Finally, lacking all of the above, the entire authentication operation may be done completely in software. This is the least secure, since both the authentication code and the attestation key itself may be compromised.

In any of the above examples, it would beneficial if the relying party could collect client data to determine the specific manner in which authentication is being performed so that the client risk can be assessed when performing authentication (e.g., when generating an assurance level as discussed below).

By improving risk assessment via additional data, one embodiment of the invention averts fraudulent transactions by collecting client data and assessing the risk associated with each client. The level of risk associated with the client may then be used to specify the authentication techniques which must be used to authenticate the user for a particular transaction. To assess risk, one embodiment of the invention determines (1) the types of data which are useful for risk calculations, (2) how to obtain additional data that the Web browser cannot provide securely, and (3) how to do it in a way that does not compromise the user's privacy.

One of the biggest reasons that viruses, worms, and malware infect computers is because the operating system has not been recently updated to close potential vulnerabilities. These vulnerabilities in the operating system, once they are made known to the public, are very easy to exploit by criminals. The longer that a system has gone without an update, the more potential vulnerabilities exist to exploit and the greater the risk that a password may be compromised by malicious code. Web browsers do not allow web sites to access the update history of a user's computer. If they did, web sites could identify potential victims based on vulnerabilities that are known to be on their system. Consequently, one embodiment of the invention runs as a secure agent, executed as a native application (rather than a browser plug-in) which collects client data to determine the current operating system version and/or how recently the operating system has been updated.

One defense against malicious code, once it has infected the user's computer, is anti-virus software (for example, Windows® Defender®). Even though the malicious code has already infiltrated the system, antivirus software will at least alert the user that something bad has occurred, thereby limiting the eventual damage inflicted. The user can change account passwords and verify recent transactions. However, if no antivirus software is installed, or antivirus software is installed but has not been run recently, there is a higher chance that the user is unaware that malicious code exists on their computer. Transactions that occur on that computer would be at a higher risk of fraud. Web browsers will not reveal if antivirus software is installed on a computer. Thus, in one embodiment, the native agent application locates and collects client configuration data to determine whether antivirus software has been installed and, if so, how recently it has been updated and/or executed.

Another defense, especially against worms, is a firewall. If a software firewall is installed and enabled on a user's machine, the number of entry points for attack is greatly reduced. Open ports that would normally service any request coming over the wire from random Internet hosts are neutered. Thus, even if a service that is listening to a port has an unpatched security hole, the risk is eliminated because no communication is allowed to access it. On the other hand, a computer running without a software firewall has a much greater potential to be infected by a worm, especially if it has not been recently updated. Web browsers, through port scanning, can indirectly detect firewalls with limited success. Consequently, in one embodiment, the native agent application locates and collects firewall configuration data to determine whether a firewall is installed and, if so, how recently it has been updated.

If a user's computer is physically stolen, a significant amount of information can be gathered by criminals and used to commit fraud. If a user's machine is password protected and preferably the entire hard drive encrypted to that password, the risk of information being leaked because of a burglary is lessened. If not, a higher level of risk can be assessed. Thus, in one embodiment, the native agent application determines whether the hard drive content has been encrypted and uses this information as part of its risk assessment of the client.

In addition, as discussed above, if the client uses a secure element or trusted execution environment (TEE) for performing authentication, then the relying party can have a high assurance that the authentication provided by the client is legitimate. If the remote authenticator lacks a secure element, then a software-protected "whitebox" may be used for protecting attestation data (e.g., the attestation key). However, as mentioned, since the code doing the authentication and the whitebox doing the attestation signature are decoupled (and the whitebox is software based), this is less trustworthy than using a secure element or trusted execution environment (TEE). Finally, lacking all of the above, the entire authentication operation may be done completely in software (which, as mentioned, is the least secure manner of operation). One embodiment of the invention allows the relying party to collect the above client data to determine the specific manner in which authentication is being performed so that the client risk can be assessed when performing authentication.

Figure 30:
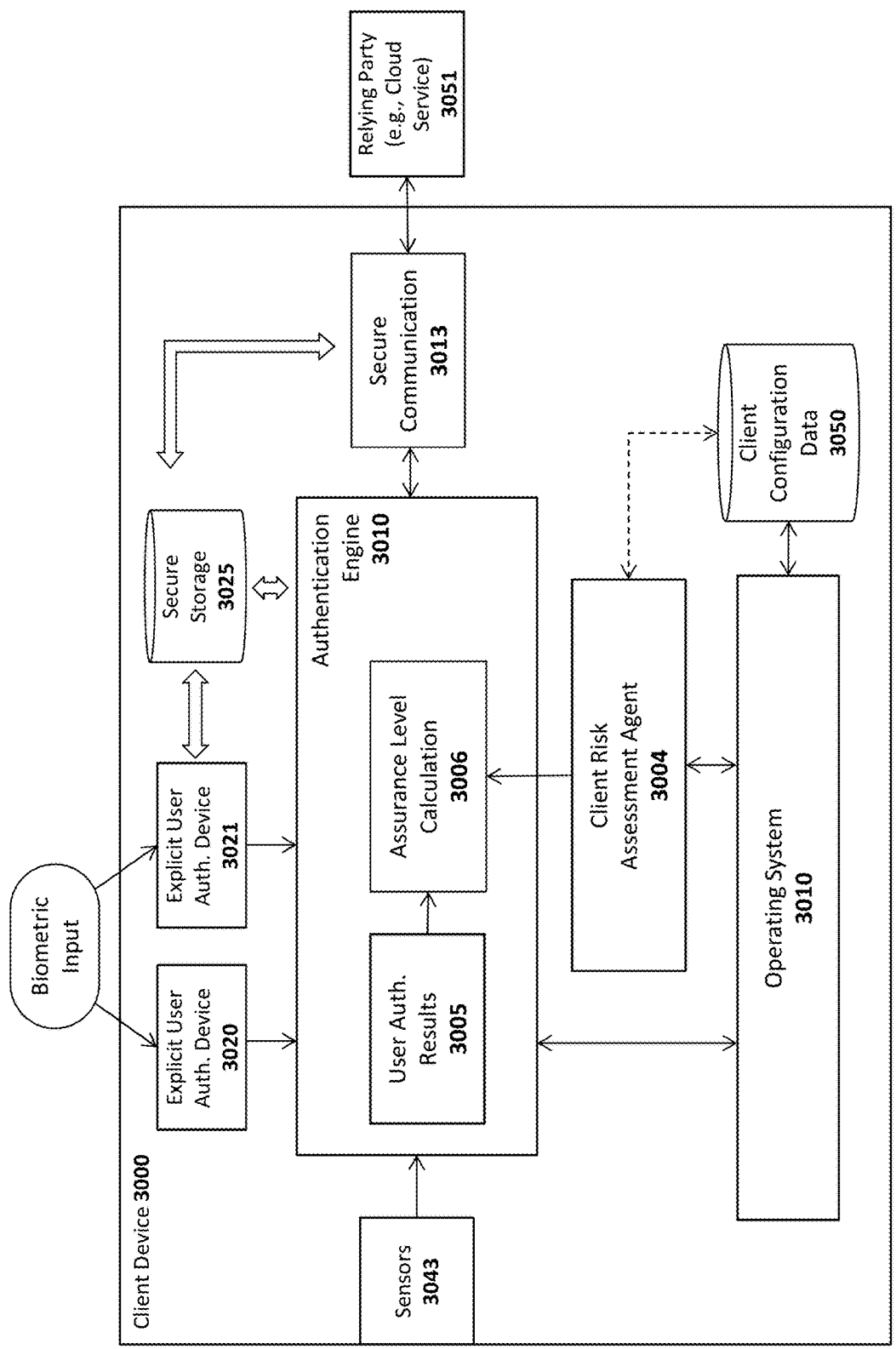
FIG. 30 illustrate different architectural arrangements within which embodiments of the invention may be implemented.

As illustrated in FIG. 30, in one embodiment of the invention, a client device 3000 includes a client risk assessment agent 3004 which collects various types of client configuration data 3050 and responsively calculates a risk level for the client 3000. In one embodiment, the client risk assessment agent 3004 is a native code agent application designed to run directly within the native operating system (OS) 3010 of the client 3000. Consequently, the client risk assessment agent 3004 does not suffer from the limitations associated with browser plugins and other types of program code which are limited in their ability to access client data for security reasons. In other words, the client risk assessment agent 3004 is permitted to collect data that HTML and Javascript code running in the browser context are not permitted to access. Thus, even though the authentication engine 3010 may be implemented within the browser context, it will have access to the additional risk analysis provided by the client risk assessment agent 3004 (although it should be noted that the authentication engine 3010 need not be implemented within the browser context while still complying with the underlying principles of the invention).

In one embodiment, the authentication engine 3010 includes an assurance level calculation module 3006 for calculating an assurance level corresponding to a likelihood that the legitimate user is in possession of the client device 3000. It may then use this assurance level to determine whether to complete a pending transaction with a remote relying party 3051 over a network (e.g., such as a financial transaction, an online purchase, an access to confidential information in the user's account, etc). In one embodiment, the relying party 3051 may specify the level of assurance required for a given transaction. For example, for a financial transaction involving the transfer of a significant amount of money, the relying party 3051 may require a relatively higher assurance level than, for example, a transaction involving access to a user's email account. Although illustrated as a single entity, the "relying party" may comprise a Website or other online service equipped with separate secure transaction servers for performing the underlying authentication techniques described herein.

In one embodiment, the assurance level calculation module 3006 transmits the assurance level (e.g., specified as a value, percentage, code, etc) to the relying party 3051, without disclosing any confidential user information collected by the client risk assessment agent 3004, thereby protecting the user's privacy. In another embodiment, the assurance level calculation module 3006 knows the assurance level required for the current transaction, determines whether the assurance level is sufficiently high, and transmits an indication of whether the transaction is permitted or denied to the relying party 3051, once again, without disclosing the user's private information to the relying party 3051.

In one embodiment, the communication between the client device 3000 and relying party 3051 is secured via a secure communication module 3013, which may encrypt outgoing communication using a first key and decrypt incoming communication using a second key. In a symmetric key encryption scheme the first and second keys are the same. In an asymmetric key encryption scheme, the keys are different. However, the underlying principles of the invention are not limited to any particular type of encryption.

In one embodiment, the assurance level calculation module 3006 determines the assurance level based on current user authentication results 3005 in addition to the risk data provided by the client risk assessment agent 3004. In particular, the user authentication results 3005 may include the results of a current or recent explicit user authentication via one or more explicit user authentication devices 3020-3021. This may include, for example, fingerprint authentication via a fingerprint device, facial recognition authentication via a camera and facial recognition hardware/software, voice recognition via a microphone and voice recognition hardware/software, retinal scanning using a camera and associated hardware/software, a password/PIN entry by the end user via a keypad, and/or various other types of explicit user authentication devices and/or techniques.

In one embodiment, a secure storage 3025 cryptographically protects the biometric reference data records for each user authentication device 3020-3021 (e.g., wrapping the data using a symmetric key to make the storage 3025 secure). While the secure storage 3025 is illustrated outside of the secure perimeter of the authentication device(s) 3020-3021, in one embodiment, each authentication device 3020-3021 may have its own integrated secure storage to cryptographically protect the biometric reference data records.

In addition to explicit user authentication, one embodiment of the authentication engine 3010 collects data from sensors 3043 to be used by the assurance calculation module 3006 to generate the assurance level. By way of example, the sensors 3043 may include location sensors such as GPS sensors to indicate a current location of the user. If the client device 3000 is in an expected location such as the user's work or home, then this increases the likelihood that the user is the legitimate user. By contrast, if the user is in an unexpected location such as a foreign country which the user has not previously visited, then this increases the likelihood that the user is not the legitimate user. Thus, in one embodiment, the assurance calculation module 3006 will tend to increase the assurance level if the user is in an expected location and decrease the assurance level if the user is in an unexpected location.

Various additional sensors 3043 such as temperature sensors, humidity sensors and accelerometers may be used to collect data relevant to user authentication. For example, the temperature/humidity sensors may provide a current temperature/humidity which may be compared against the known temperature/humidity for the location specified by the location sensor. If the values are significantly different, then this may indicate that the client device 3000 is being spoofed. The comparison of the asserted location and the temperature/humidity may be done at a remote server such as the secure transaction server(s) 4632 described below with respect to FIGS. 46A-B. In another embodiment, accelerometers on the device may be used to measure the gait of the user and compare these measurements against the known gait of the user. If the gaits match (within a specified threshold), then this increases the likelihood that the legitimate user is in possession of the client device 3000.

Figure 31:
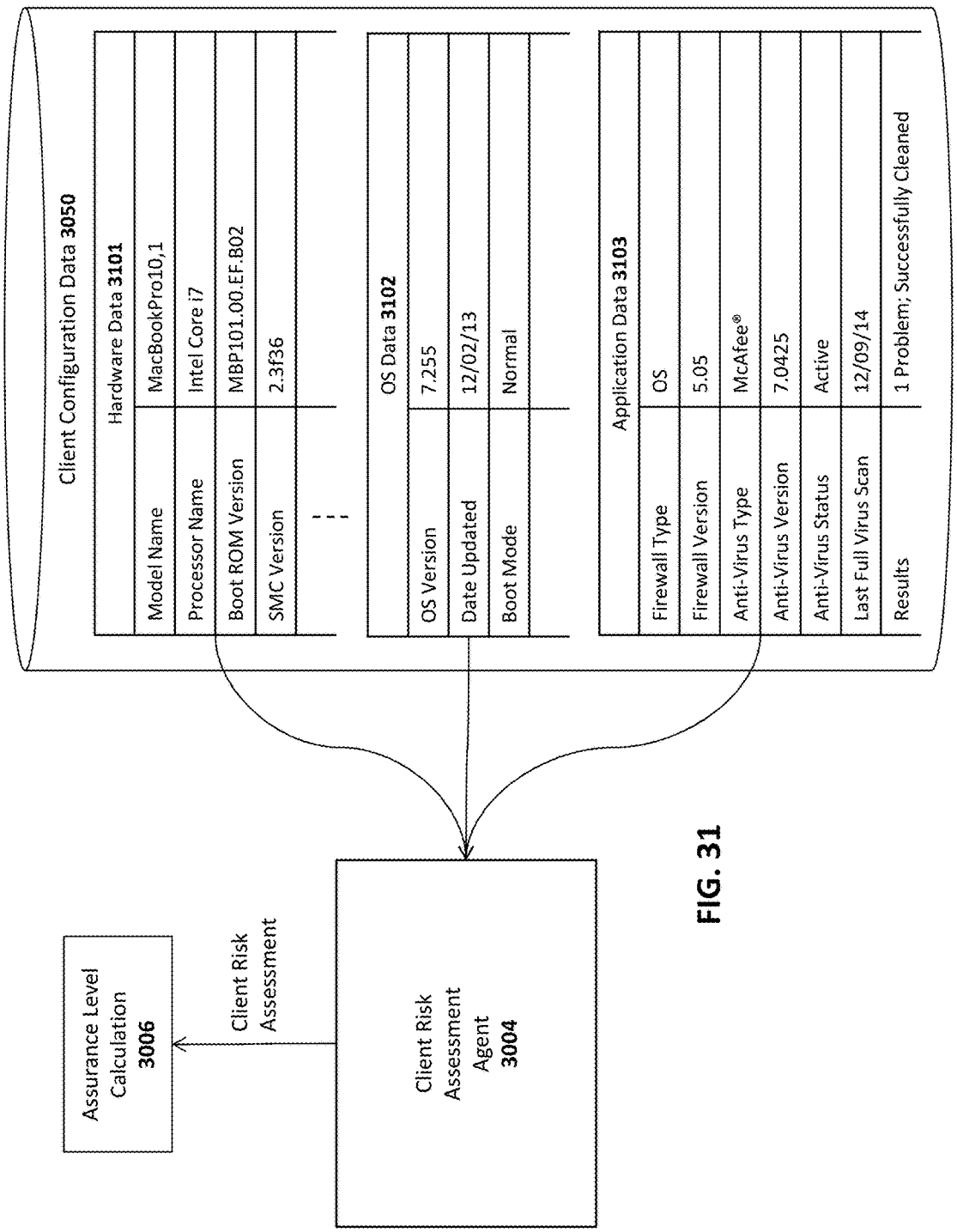
FIG. 31 illustrates one embodiment of a client architecture including a client risk assessment agent.

As illustrated in FIG. 31, various types of client configuration data relevant to determining risk may be collected and used including, for example, hardware data 3101, operating system data 3102 and application data 3103. By way of example, and not limitation, the hardware data 3101 may include the client device model, processor name/type, boot ROM version, and management controller version. The operating system data 3102 may include the current operating system version, the date that the OS was updated, and the current boot mode (e.g., boot from hard drive). The application data 3103 may include an indication as to whether a firewall is active, the firewall type and version, an indication as to whether anti-virus software is installed along with the current version and updates to the virus definition files, an indication as to whether the anti-virus software is active (e.g., actively monitoring the client device during runtime), an indication of the last complete and/or partial virus scan, and the results of recent virus scans. In addition, the application data 3103 or OS data 3102 may include an indication as to whether the data is stored on the user's persistent storage device (e.g., hard drive, Flash memory, etc) in an encrypted or otherwise secure manner.

As mentioned, in one embodiment, the assurance level calculation module 3006 factors in both the risk assessment data provided by the client risk assessment agent 3004 and the user authentication results 3005 to arrive at an assurance level that the legitimate user is attempting the current transaction. By way of example, and not limitation, if the client configuration data 3050 indicates that the current client does not have an active firewall or virus detection software, then it may report to the assurance calculation module 3006 that the client represents higher risk than a client which does have these features enabled. Similarly, if the virus detection software has not been updated or executed recently (e.g., within a threshold time period), then the client risk assessment agent 3004 may report a heightened risk to the assurance level calculation module 3006. The risk level may be specified in a variety of ways while still complying with the underlying principles of the invention. For example, the risk level may be based on a percentage (e.g., 0%=least risk, 100%=greatest risk, and all numbers in-between representing different levels of intermediate risk) or a numerical value on a scale (e.g., 1=least risk, 10=highest risk, and all numbers in-between representing different levels of intermediate risk).

Regardless of how the risk data is provided, in one embodiment, the assurance level calculation module 3006 determines the level of authentication required based on the risk data provided by the client risk assessment agent 3004. For example, if the client risk assessment indicates a relatively high risk value (e.g., 9 or 10 out of 10), then the assurance level calculation module 3006 may require a more reliable and/or explicit user authentication such as PIN/password entry and/or fingerprint scan to authenticate the user for the current transaction. By contrast, if the client risk assessment indicates a relatively low risk (e.g., a 1 or 2 out of 10), then the assurance level calculation module 3006 may require a non-intrusive user authentication such as location-based authentication and/or reliance on a recent explicit user authentication for the current transaction.

It should be noted that data in FIG. 31 is arranged in a table format in for simplicity. The actual client configuration data 150 may be stored in various different formats including binary files, hierarchical file system arrangements, linked lists, and OS registry formats, to name just a few. The underlying principles of the invention are not limited to any particular configuration data format.

As indicated in FIG. 30, in one embodiment, the client risk assessment agent 3004 is provided with access to the client configuration data 3050 through the OS (e.g., by making appropriate calls to the application programming interface (API) exposed by the OS). In another embodiment, the client risk assessment agent 3004 accesses the client configuration data 3050 directly from the underlying file system in which the data is stored. In one embodiment, the client risk assessment agent 3004 is provided with secure access to the underlying configuration data. Various security features may be implemented to ensure the security of the configuration data 3050 such as chain of trust technology and Secure Enclaves.

One consideration with allowing additional risk information to be provided to web sites is that the rational for why the browser does not provide this information in the first place is not ignored. Certainly, malicious web sites could make good use of this information and web browser developers have a good reason for leaving this information out of reach. Thus, as mentioned, in one embodiment, the underlying client configuration data 3050 is not directly provided to the relying party 3051. Rather, in one embodiment, the client risk data is assessed directly on the client device by the client risk assessment agent 3004 and a risk value is provided to the assurance level calculation. All the relying party 3051 needs to know is whether authentication was successful (if an assurance level was specified ahead of time) and/or the current assurance level. In this manner, the client's configuration data 3050 is protected from disclosure.

Figure 32:
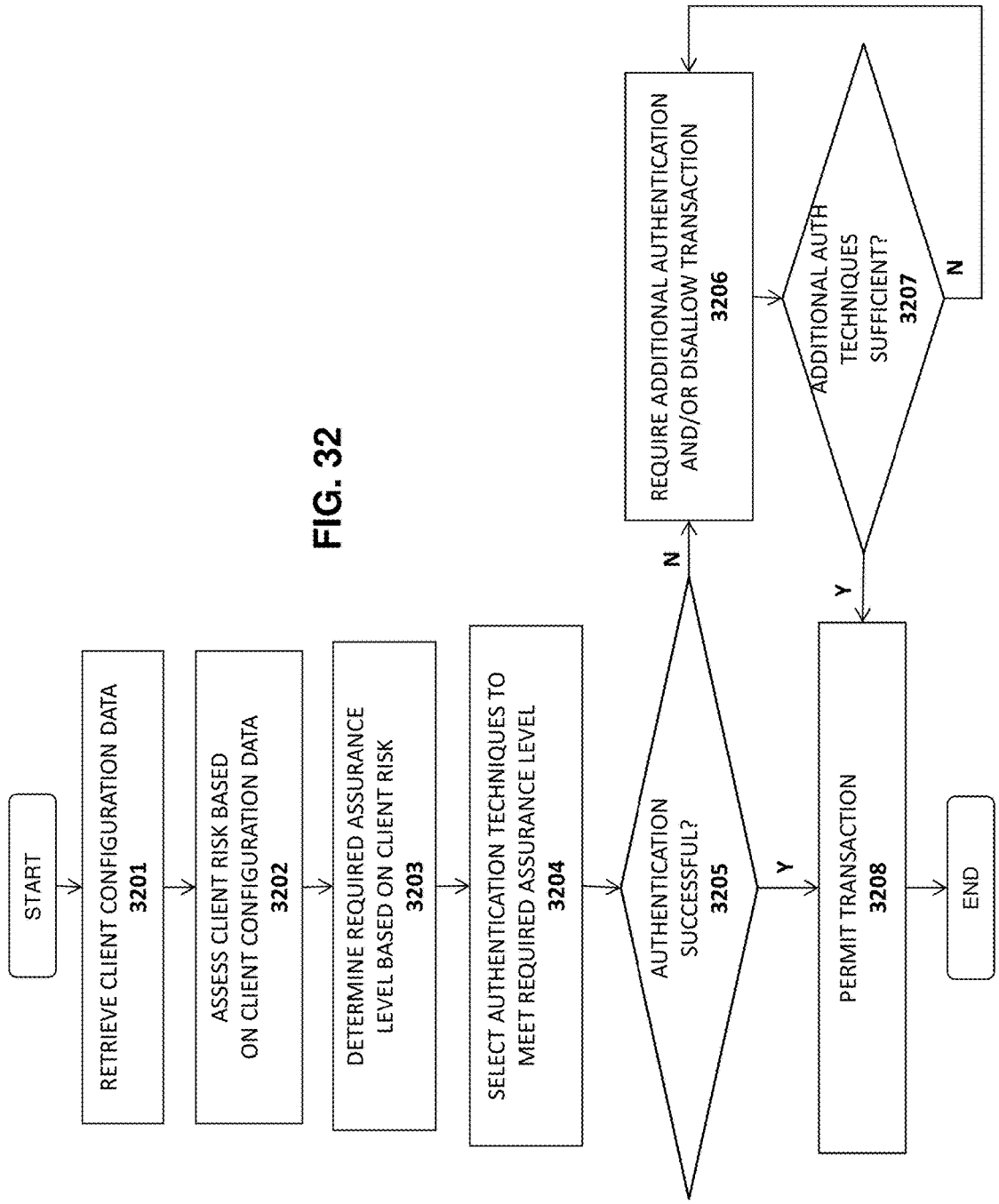
FIG. 32 illustrates exemplary types of client configuration data used by the client risk assessment agent.

One embodiment of a method for assessing client risk during authentication is illustrated in FIG. 32. The method may be implemented on the architecture shown in FIGS. 30-31 but is not limited to any particular system architecture.

At 3201, the client configuration data related to client risk is retrieved. This may include, for example, the existence and current status of firewall or virus detection software and/or the current version of the operating system (e.g., how recently the OS was updated). At 3202, the client configuration data is assessed to determine a risk value for the client (e.g., a percentage, numerical value, or other data capable of specifying a risk level). At 3203, using the client risk assessment, the assurance level is determined. In one embodiment, higher risk values require higher assurance levels (e.g., a risk value of 10 might require an assurance level of above 90%). In another embodiment, the assurance level itself is calculated based on the assessed risk. For example, as mentioned above, the risk value may be included as one of many variables (including prior or current user authentications) to determine the current assurance level.

At 3204, authentication techniques are selected which, if completed successfully, would raise the assurance level to an acceptable level for the current transaction. For example, if the risk is high, then explicit user authentication may be required. If the risk is low, then a prior recent authentication or a non-intrusive authentication may be sufficient.

At 3205, a determination is made as to whether the authentication was successful. If so, then the transaction is permitted at 3208. If not, then at 3206, one or more additional authentication techniques may be required or the transaction may be disallowed. For example, if the current assurance level is insufficient, the user may be asked to enter a secret previously provided to the relying party 3051 or may provide other/additional authentication. If the additional authentication techniques are sufficient, determined at 3207, then the transaction is permitted at 3208. If not, then the transaction is disallowed at 3206.

I. System and Method for Performing Authentication for a Local Transaction

The embodiments of the invention described herein include techniques for authenticating a user for a local transaction initiated through a local secure transaction device. By way of example, the local transaction may be a withdrawal, transfer, or other user-initiated operation and the secure transaction device may be an ATM or other local device capable of executing financial transactions. Similarly, the local transaction may involve completing a payment to purchase goods or services at a retail store or other retail location equipped with a local secure transaction device.

Figure 33:
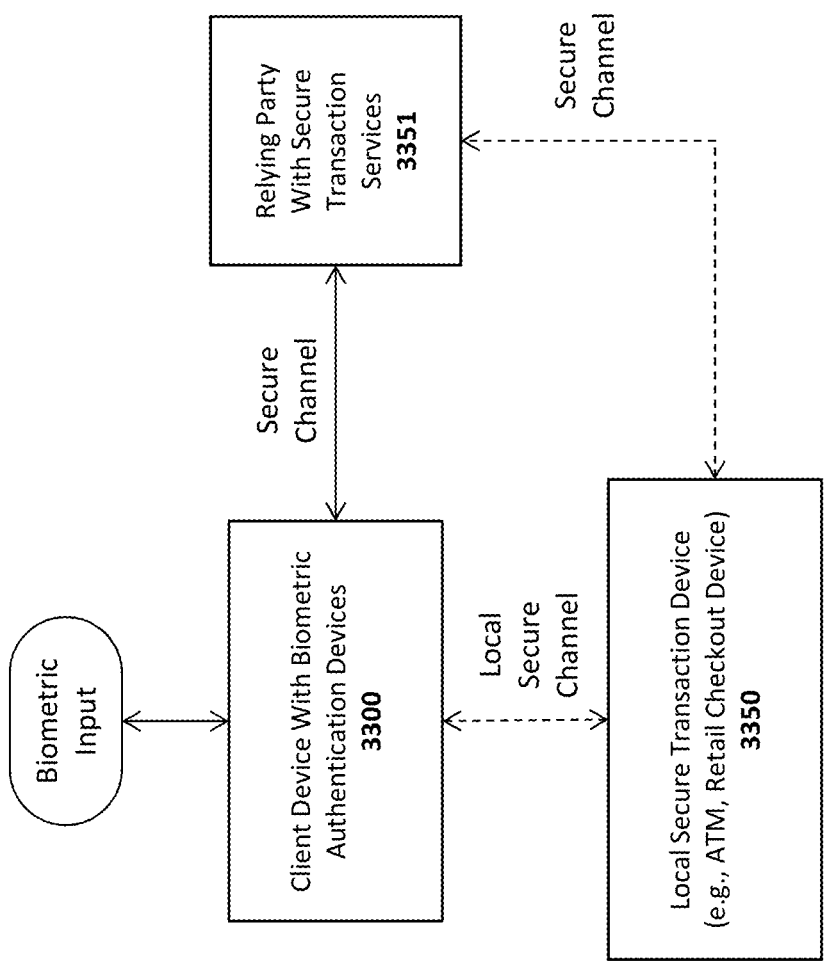
FIG. 33 illustrates one embodiment of a method for performing client risk assessment during authentication.

As illustrated in FIG. 33, in one embodiment, a client device 3300 with biometric authentication devices and associated software authenticates over a network to a relying party with secure transaction services 3351 to perform a transaction on a local secure transaction device 3350. In particular, when the user of client device 3300 wishes to perform a transaction locally with secure transaction device 3350, it initiates a series of authentication transactions with the relying party 3351 (examples of which are described below). For example, the user may be required to swipe a finger on a fingerprint reader on the client device 3300 and/or enter a PIN or other secret code via a client keypad. The results of the authentication may then be transmitted from the client device 3300 to the relying party 3351 without transmitting the user's private data (e.g., the fingerprint data, PIN, or any other private user data), thereby protecting the user's privacy.

In response to a successful authentication, the relying party 3351 may transmit a signal to the local secure transaction device 3350 to perform an operation. For example, if the local secure transaction device is an ATM, the signal may instruct the ATM to dispense a specified amount of cash. If the local secure transaction device 3350 is a retail checkout device then an indication of successful payment may be transmitted and the user's account may be debited.

In addition, as shown in FIG. 33, a local secure communication channel may be established between the client device 3300 and the local secure transaction device 3350 to supplement the user authentication process. The local secure channel may be established using wireless communication interfaces on the client device 3300 and local secure transaction device 3350 utilizing various wireless communication technologies such as near field communication (NFC), Bluetooth, or WiFi (e.g., an 802.11x channel), to name a few. For example, when in the vicinity of the location secure transaction device 3350, the client device 3300 may perform a near-field communication (NFC) handshake via its wireless interface with the wireless interface of the local secure transaction device 3350 and establish the local secure channel to exchange data during authentication.

The mere existence of the local secure channel comprises authentication data because it establishes the current location of the client device 3300. Consequently, this information may be used by the relying party 3351 as proof of the current location of the client device 3300 during the authentication process. In one embodiment, the relying party 3351 may compare the location provided by the local secure transaction device 3350 with the current GPS location reported by the client device 3300 to confirm that the two location values match.

In addition, the relying party 3351 may transmit a secret code or other authentication data to the client device 3300, which the client device 3300 may then relay to the local secure transaction device 3350 over the local secure channel to authenticate the client device. For example, in one embodiment, the relying party 3351 transmits a barcode to the client device 3300 and a corresponding code to the local secure transaction device. The local secure transaction device 3350 may then read the barcode (e.g., from the display of the client device 3300) using a barcode scanner or camera to perform authentication (i.e., comparing the code received from the relying party with the code read from the barcode). Alternatively, the local secure transaction device 3350 may transmit the code read from the barcode to the relying party, which will then confirm that the codes match. Conversely, the relying party 3351 may transmit a secret code or other authentication data to the local secure transaction device 3350 which will then relay the data to the client device 3300 for authentication. Thus the local secure channel may be used to exchange data for a variety of authentication techniques.

As mentioned, in one particular embodiment, the local secure transaction device 3350 is an ATM device. ATM machines are vulnerable devices, because their input/output controls (e.g., card-readers, keyboards, screens, cameras, etc) are exposed for the "outside world" and they are readily available for tampering. For example, debit card records and pins can be easily stolen with low-tech devices, such as hidden magnetic stripe readers, mirrors, and video cameras. In one embodiment, remote authentication techniques involving communication between the client 3300 and relying party 3351 are used to provide significantly improved authentication for ATM machines. When integrated with this remote authentication, an ATM itself doesn't need to have legacy input/output controls, such as card-reader, touch-screen or keyboard. All it requires is a network connection and a slot to dispense cash. The authentication per se can be performed on the customer's client device 3300 equipped with the biometric authentication devices.

In one embodiment, for a cash withdrawal, the user would enter the vicinity of the ATM machine and initiate the remote authentication application to authenticate to the relying party 3351. The user would then enter the amount for withdrawal and swipe her finger using the fingerprint sensor on the mobile device (or user any other type of authentication as discussed below). When the user's presence and authenticity are confirmed with the relying party 3351, a specified amount of money is dispensed from the ATM's slot.

This embodiment not only provides stronger authentication, but it also converts complex and expensive ATMs into simple and reliable money dispensers that are significantly cheaper to build and maintain. These new ATM's may be used for a long time. They will not require frequent updates, because all updates to the biometrics-related authentication features are introduced directly on the client devices 3300 and/or the relying party's secure transaction servers 3351.

Figure 34:
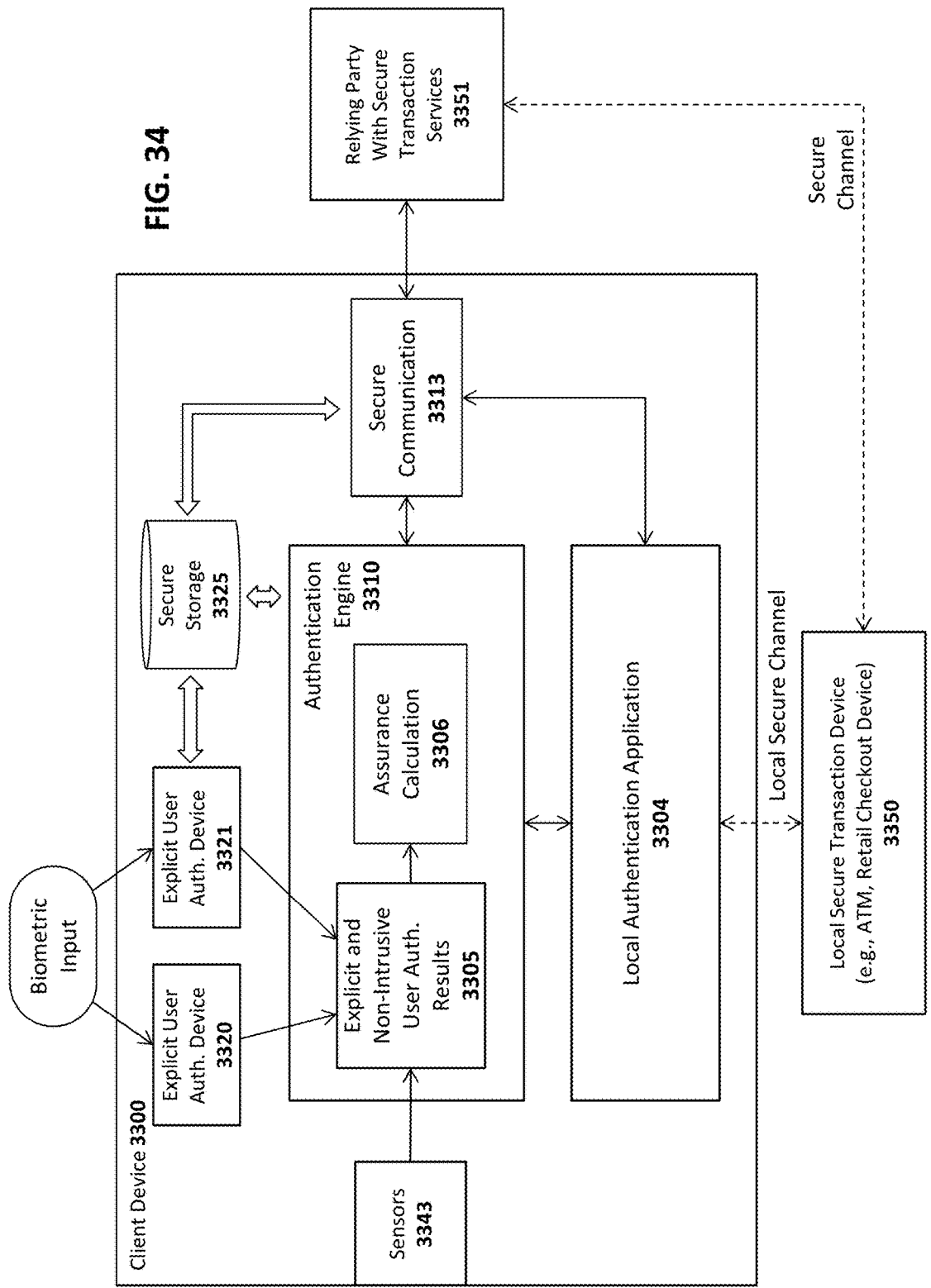
FIG. 34 illustrates one embodiment of a client performing a secure transaction with a local device.

Additional architectural details of one embodiment of the invention are illustrated in FIG. 34. As illustrated, the client device 3300 of this embodiment includes a local authentication application 3304 which communicates with both the local secure transaction device 3350 and relying party 3351 to coordinate the various local authentication techniques described herein. In one embodiment, the local authentication application 3304 establishes the local secure channel with the local secure transaction device 3350 and an authentication engine 3310 performs remote authentication with the relying party to verify that the legitimate user is in possession of the client device 3300.

In one embodiment, the authentication engine 3310 performs authentication by entering into a series of transactions with the secure transaction servers of the relying party as described in the co-pending patent applications mentioned above. For example, these transactions may include an enrollment process in which a user enrolls with biometric devices of a client to generate biometric template data (e.g., by swiping a finger, snapping a picture, recording a voice, etc). Enrollment may be under the direction of the secure transaction servers of the relying party or may be done autonomously by the user. The user may then register the biometric devices with the secure transaction servers over the network and subsequently authenticate with those servers using data exchanged during the registration process (e.g., encryption keys provisioned into the biometric devices).

In one embodiment, the authentication engine 3310 includes an assurance level calculation module 3306 for calculating an assurance level corresponding to a likelihood that the legitimate user is in possession of the client device 3300. It may then use this assurance level to determine whether the relying party 3351 should authorize a local transaction at the local secure transaction device 3350 (e.g., such as a financial transaction, a retail purchase, an access to confidential information in the user's account, etc). In one embodiment, the relying party 3351 may specify the level of assurance required for a given transaction. For example, for a financial transaction involving the transfer of a significant amount of money, the relying party 3351 may require a relatively higher assurance level than, for example, a transaction involving access to a user's account.

In one embodiment, the assurance level calculation module 3306 transmits the assurance level (e.g., specified as a value, percentage, code, etc) to the relying party 3351, without disclosing any confidential user information, thereby protecting the user's privacy. In another embodiment, the assurance level calculation module 3306 knows the assurance level required for the current transaction, determines whether the assurance level is sufficiently high, and transmits an indication of whether the transaction is permitted or denied to the relying party 3351, once again, without disclosing the user's private information to the relying party 3351.

In one embodiment, the communication between the client device 3300 and relying party 3351 is secured via a secure communication module 3313, which may encrypt outgoing communication using a first key and decrypt incoming communication using a second key. In a symmetric key encryption scheme the first and second keys are the same. In an asymmetric key encryption scheme, the keys are different. However, the underlying principles of the invention are not limited to any particular type of encryption.

In one embodiment, the assurance level calculation module 3306 determines the assurance level based, at least in part, on current user authentication results 3305 which may include the results of a current or recent explicit user authentication via one or more explicit user authentication devices 3320-3321. This may include, for example, fingerprint authentication via a fingerprint device, facial recognition authentication via a camera and facial recognition hardware/software, voice recognition via a microphone and voice recognition hardware/software, retinal scanning using a camera and associated hardware/software, a password/PIN entry by the end user via a keypad, and/or various other types of explicit user authentication devices and/or techniques.

In one embodiment, a secure storage 3325 cryptographically protects the biometric reference data records for each user authentication device 3320-3321 (e.g., wrapping the data using a symmetric key to make the storage 3325 secure). While the secure storage 3325 is illustrated outside of the secure perimeter of the authentication device(s) 3320-3321, in one embodiment, each authentication device 3320-3321 may have its own integrated secure storage to cryptographically protect the biometric reference data records.

In addition to explicit user authentication, one embodiment of the authentication engine 3310 collects data from sensors 3343 to be used by the assurance calculation module 3306 to generate the assurance level. By way of example, the sensors 3343 may include location sensors such as GPS sensors to indicate a current location of the user. If the client device 3300 is in an expected location such as the known vicinity of the local secure transaction device 3350, then this increases the likelihood that the user is the legitimate user. By contrast, if the GPS reading indicates that the user is not in the vicinity of the local secure transaction device 3350, then this indicates that the user initiating the transaction is not the legitimate user. Thus, in one embodiment, the assurance calculation module 3306 will tend to increase the assurance level if the user is in an expected location and decrease the assurance level if the user is in an unexpected location.

Various additional sensors 3343 such as temperature sensors, humidity sensors and accelerometers may be used to collect data relevant to user authentication. For example, the temperature/humidity sensors may provide a current temperature/humidity which may be compared against the known temperature/humidity for the location specified by the location sensor. If the values are significantly different, then this may indicate that the client device 3300 is being spoofed. The comparison of the asserted location and the temperature/humidity may be done at a remote server such as the secure transaction server(s) used by the relying party 3351. In another embodiment, accelerometers on the device may be used to measure the gait of the user and compare these measurements against the known gait of the user. If the gaits match (within a specified threshold), then this increases the likelihood that the legitimate user is in possession of the client device 3300.

The local authentication application 3304 may be implemented in a variety of ways while still complying with the underlying principles of the invention. For example, in one embodiment, the local authentication application 3304 is designed specifically for the relying party 3351. For example, if the relying party is a banking institution (e.g., Wells Fargo®), then the local authentication application 3304 may be an application specifically designed by/for that bank. In another embodiment, the same local authentication application 3304 may be shared among a variety of relying parties, for example, as a universal local authentication application. Moreover, while illustrated in FIG. 34 as separate logical components, the authentication engine 3310 shown in FIG. 34 may be integrated within the local authentication application 3304. In another embodiment, the local authentication application 3304 may be a Web browser or an application executed within the Web browser context (e.g., when the user enters the vicinity of the local secure transaction device 3350 or connects to the relying party web page to initiate the transaction).

The local authentication application 3304 may perform a variety of local functions depending on the implementation required by the relying party. For example, in one embodiment, the local authentication application 3304 receives the secret code (or other authentication data) provided by the relying party 3351 and securely transmits the secret code to the local secure transaction device 3350 for authentication (e.g., via a barcode or using other communication techniques as discussed above). Alternatively, in one embodiment, the user may manually enter the secret code in the local secure transaction device 3350. Similarly, authentication data such as a secret code received by the local secure transaction device 3350 may be relayed to the local authentication application 3304 which then relays the authentication data to the authentication engine 3310 and/or relying party 3351 (e.g., as proof of the location of the client device 3300).

Figure 35:
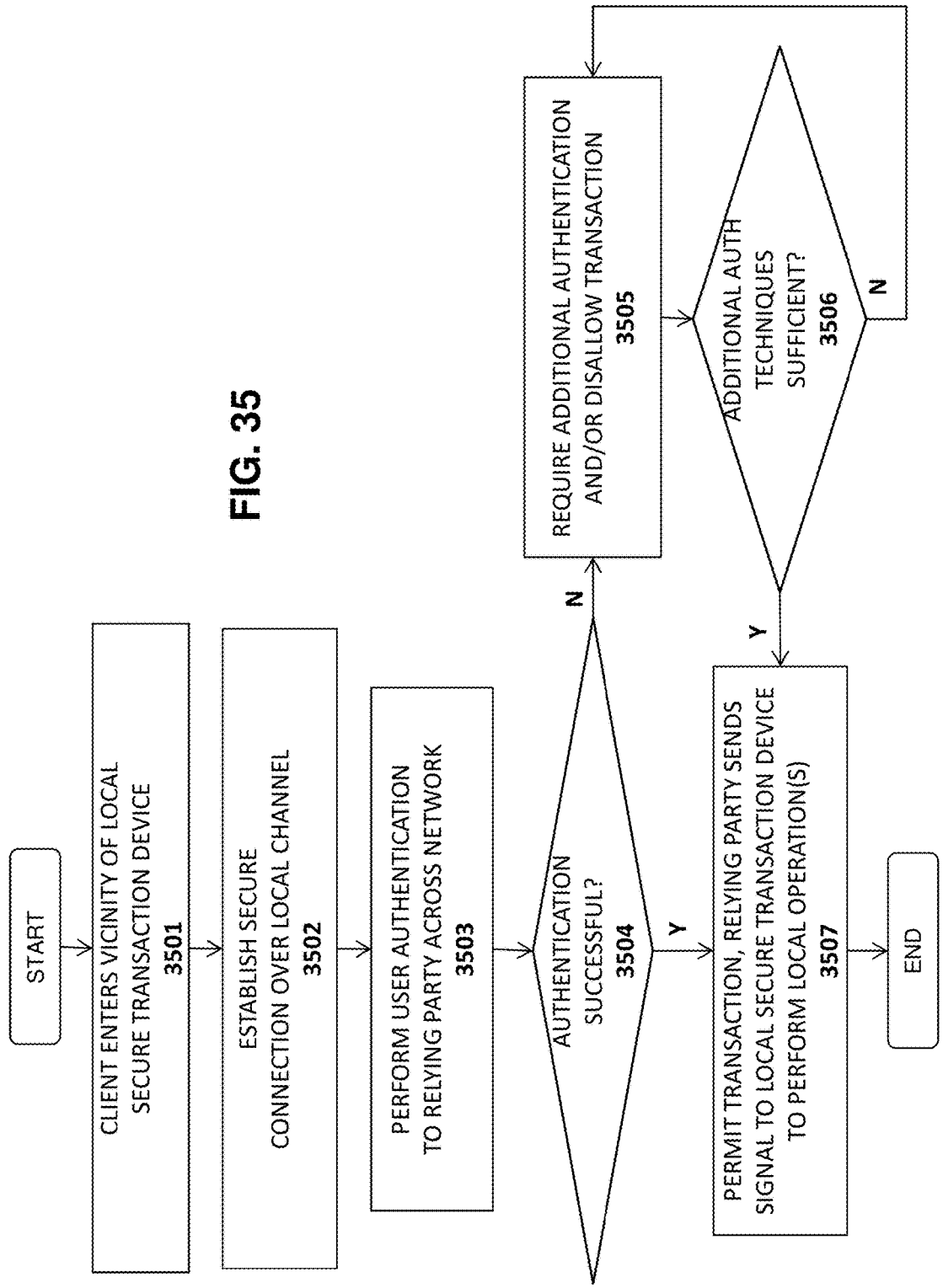
FIG. 35 illustrates one embodiment of a client architecture for performing a secure transaction with a local device.

One embodiment of a method for performing authentication of a client device is illustrated in FIG. 35. The method may be implemented on the architecture shown in FIGS. 33-34 but is not limited to any particular system architecture.

At 3501, the client enters the vicinity of the local secure transaction device (e.g., an ATM) and, at 3502, a secure connection is established with the local secure transaction device over a local channel. As mentioned, the local channel may be implemented using near field communication, Bluetooth, Wifi, or any other type of protocol supported by both the client device and the local secure transaction device. Operation 3502 may not be required in some embodiments. For example, when the client device is capable of authenticating with the relying party with a high level of assurance that the legitimate user is in possession of the client device and if the client device is capable of verifying its current location to the relying party, then the local channel may not be necessary.

At 3503, the client device authenticates with the relying party over the network. Any available techniques for generating an assurance level that the legitimate user is in possession of the device may be used for this operation. For example, the user may perform explicit authentication by swiping a finger on a biometric fingerprint device, capturing a facial image for facial recognition, and/or entering a secret code. Alternatively, non-intrusive authentication techniques may be performed such as determining whether the user has explicitly authenticated with the client device recently (e.g., within a specified time period) and/or using sensor data such as location data, temperature/pressure data, and/or accelerometer data.

Regardless of how the assurance level is generated, the results of the authentication may be provided to the relying party over the network in a manner which protects the user's privacy (e.g., without providing data that specifically identifies the client device). For example, as previously mentioned, the assurance level itself and/or an indication of the success or failure of authentication may be provided to the relying party, without disclosing any confidential user information.

If authentication is successful, determined at 3504, then at 3507 the local transaction is permitted. In one embodiment, this involves the relying party transmitting a signal instructing the local secure transaction device to perform one or more operations. For example, if the local secure transaction device is an ATM, then the operations may include dispensing a user-specified amount of cash. If the local secure transaction device is a debit device (e.g., at a retail store or other location where the user is making a purchase), then the signal transmitted by the relying party may confirm payment for the transaction (and debit the user's account accordingly). It should be noted that these are merely illustrative examples. Various alternative applications may be employed while still complying with the underlying principles of the invention.

If the authentication at 3504 is unsuccessful (e.g., because an acceptable assurance level was not reached), then at 3505, the transaction is denied and/or one or more additional authentication techniques may be required. For example, the user may be required to provide additional authentication using one or more additional techniques (e.g., entering a secret code if the initial authentication was a fingerprint, etc). If the additional techniques are sufficient, determined at 3506, then the transaction is permitted at 3507. If not, then the transaction is again denied and/or additional authentication techniques are attempted.

J. User Confirmation for Online Transactions

There are various scenarios where completing a transaction with a relying party may require approval from one or more other users. By way of example, and not limitation, a parent may want to approve a financial transaction initiated by a child, a commander may need to approve a transaction initiated by a soldier, a manager may need to approve a business transaction initiated by an employee, and a cryptographic key management system may require multiple users to approve a particular transaction before it can be committed.

Figure 36:
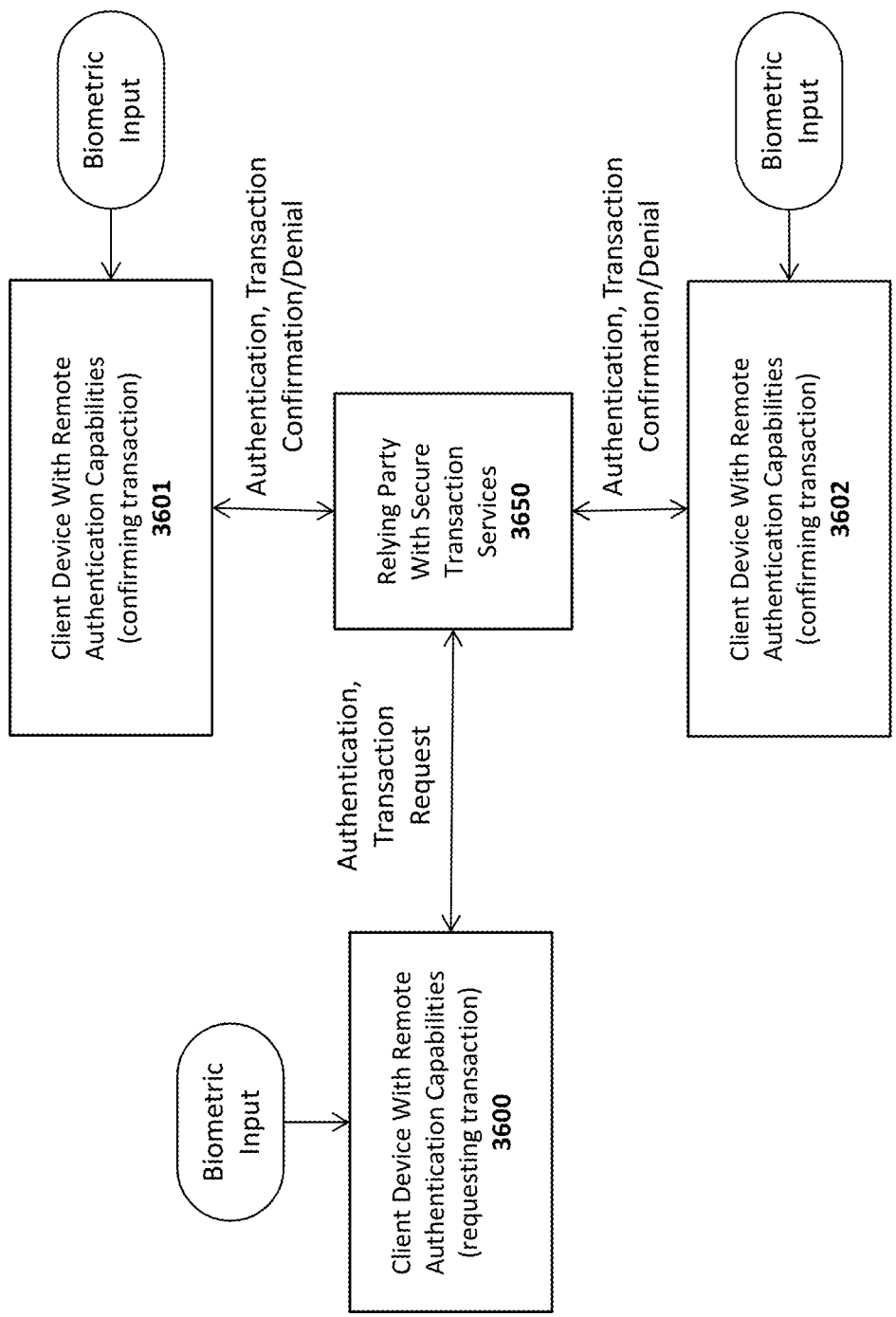
FIG. 36 illustrates one embodiment of a method for performing a secure transaction with a local device.

One embodiment of the invention uses the techniques described herein for providing strong authentication of users over a network to enable multi-user confirmation applications. One such example is illustrated in FIG. 36 which shows a client device with remote authentication capabilities 3600 controlled by a user attempting to initiate a transaction with a relying party with secure transaction services 3650 (hereinafter simply referred to as "relying party"). In one embodiment, the user of client device 3600 authenticates with the relying party 3650 using one or more of the remote authentication techniques described herein (e.g., providing biometric input such as swiping a finger on a fingerprint sensor, entering a PIN or password, etc).

In the illustrated embodiment, other client devices 3601-3602 have users who are registered with the relying party as "approvers" for the user of client device 3600. Thus, for certain types of transactions (e.g., financial transactions involving amounts over a specified threshold), the relying party may require approval from the users of client devices 3601-3602. As discussed below, the remote authentication techniques described herein are employed as part of the approval process.

In one embodiment, in response to a successful authentication by the user of client device 3600, notification generation logic at the relying party 3650 sends a notification the other client devices 3601-3602 with users registered as "approvers" indicating that the user of client device 3600 is attempting to complete a transaction. The notification may be sent in a variety of ways in accordance with the underlying principles of the invention. For example, if the client devices 3601-3602 are mobile devices, then a push notification may be sent to the client devices 3601-3602. Alternatively, or in addition, the notification may be sent via email, text message (e.g., SMS), instant message, or any other technology capable of delivering a message to the client devices 3601-3602.

In one embodiment, the notification includes details of the transaction being attempted by the user of client device 3600. For example, if the transaction is a financial transaction, then the notification may include the particular amount of money being processed and the type of financial transaction being performed (e.g., withdrawal, transfer between accounts, etc). Alternatively, the notification may include a link such as a hyperlink or other type of pointer directing the users of client devices 3601-3602 to an approval service on the relying party. Upon selection of the link, the users of client devices 3601-3602 may be provided with details of the transaction (e.g., in a Web page or other useful format for providing information).

In one embodiment, upon responding to the notifications and reviewing the details of the transaction, the users of client devices 3601-3602 may confirm the request by performing remote authentication with the relying party (e.g., using the multi-factor authentication techniques described herein) and indicating an approval of the transaction.

Figure 37:
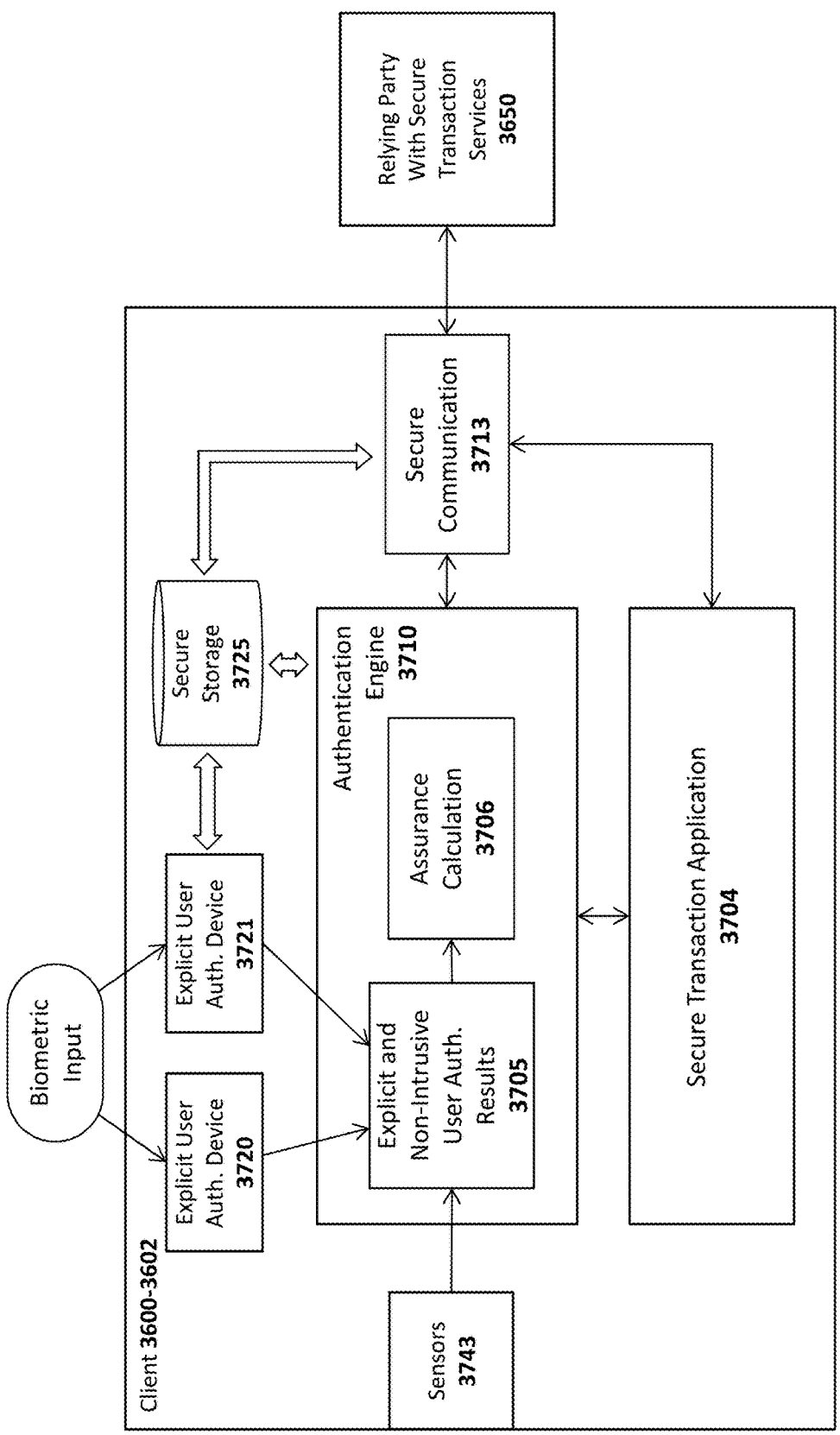
FIG. 37 illustrates one embodiment of a system for user confirmation of online transactions.

Additional architectural details of a client device 3600-3602 employed in one embodiment of the invention are illustrated in FIG. 37. In particular, the client devices 3600-3602 of this embodiment includes a secure transaction application 3704 for communicating with the relying party 3650 and coordinating the transaction approval techniques described herein. The secure transaction application 3704 may be a stand-alone application which interfaces with the authentication engine 3710 via a secure application programming interface (API). Alternatively, the secure transaction application 3704 may be implemented as a mobile device app or a Web browser plugin.

In addition to coordinating the user confirmation process described herein, in one embodiment, the secure transaction application 3704 ensures that the text displayed to each user is the actual text related to the transaction. For example, the application 3704 may display text within a secure window and ask the user to provide authentication to confirm the transaction. The application may initiate a timer and periodically verify the content of the current window being displayed to the user (e.g., by generating a signature on the content). The period of verification may be randomly chosen. Thus, the application continually ensures that each user sees the valid transaction details in the window (thereby ensuring that the transaction text has not been modified by a "man in the middle" attack). If the application detects that the content has been tampered with it prevents the confirmation of the transaction from being generated.

In one embodiment, after the a user provides valid authentication (e.g., swipes a finger on the fingerprint sensor), the client device identifies the user and generates a token (cryptographic signature) with the transaction details (e.g., the displayed text) and a random challenge provided from the relying party (e.g., the token may be a signature over the transaction details and a nonce). This allows the relying party 3650 ensure that the transaction details have not been modified between the server and the client. In one embodiment, the application 3704 sends the generated token and username to the relying party, which then identifies the user with the username and verifies the token. If verification succeeds, a confirmation message is sent to the client and the transaction is processed.

The above techniques may be implemented for both the transaction request/confirmation originating from the client device 3600 and for the approval transactions originating from the users of client devices 3601-3602.

Returning to FIG. 37, in one embodiment, authentication may be performed via an authentication engine 3710 on the client devices 3600-3602 designed to perform a series of transactions with the relying party 3650 to remotely authenticate each user. For example, as described in the co-pending applications an authentication framework and associated authentication techniques may be employed in which a user enrolls with biometric devices 3720-3721 of a client to generate biometric template data (e.g., by swiping a finger, snapping a picture, recording a voice, etc); registers the biometric devices with one or more relying parties 3650 over a network (e.g., Websites or other relying parties equipped with secure transaction services); and subsequently authenticates with those relying parties 3650 using data exchanged during the registration process (e.g., encryption keys provisioned into the biometric devices). In one embodiment, "registration" with relying parties includes exchanging symmetric or asymmetric keys with the relying party for each user authentication device 3720-3721 and storing the keys within a secure storage 3725 associated with each authentication devices 3720-3721. A secure key provisioning protocol such as the Dynamic Symmetric Key Provisioning Protocol (DSKPP) may be used to share keys with the client over a secure communication channel (see, e.g., Request for Comments (RFC) 6063). However, the underlying principles of the invention are not limited to any particular key provisioning protocol.

During the authentication phase, the keys are used, for example, to generate signatures, verify signatures, and/or encrypt communication between the clients 3600-3602 and the relying party 3650. Once authenticated, the user is permitted to perform one or more online transactions. In addition, in one embodiment, sensitive information such as fingerprint data and other data which may uniquely identify the user may be retained locally on the user's client device (e.g., smartphone, notebook computer, etc) to protect the user's privacy.

In one embodiment, the authentication engine 110 includes an assurance level calculation module 3706 for calculating an assurance level corresponding to a likelihood that the legitimate user is in possession of the client device 100. It may then use this assurance level to determine whether the relying party 3650 should authorize a current transaction. In one embodiment, the relying party 3650 may specify the level of assurance required for a given transaction. For example, for a financial transaction involving the transfer of a significant amount of money, the relying party 3650 may require a relatively higher assurance level than, for example, a transaction involving no exchange of money or mere access to a user information.

In one embodiment, the assurance level calculation module 106 transmits the assurance level (e.g., specified as a value, percentage, code, etc) to the relying party 3650, without disclosing any confidential user information, thereby protecting the user's privacy. In another embodiment, the assurance level calculation module 3706 knows the assurance level required for the current transaction, determines whether the assurance level is sufficiently high, and transmits an indication of whether the transaction is permitted or denied to the relying party 3650 (without disclosing the user's private information to the relying party 3650).

In one embodiment, the communication between the client devices 3600-3602 and relying party 3650 is secured via a secure communication module 3713, which may encrypt outgoing communication using a first key and decrypt incoming communication using a second key. In a symmetric key encryption scheme the first and second keys are the same. In an asymmetric key encryption scheme, the keys are different. However, the underlying principles of the invention are not limited to any particular type of encryption.

In one embodiment, the assurance level calculation module 3706 determines the assurance level based, at least in part, on current user authentication results 3705 which may include the results of a current or recent explicit user authentication via one or more explicit user authentication devices 3720-3721. This may include, for example, fingerprint authentication via a fingerprint device, facial recognition authentication via a camera and facial recognition hardware/software, voice recognition via a microphone and voice recognition hardware/software, retinal scanning using a camera and associated hardware/software, a password/PIN entry by the end user via a keypad, and/or various other types of explicit user authentication devices and/or techniques.

In one embodiment, the secure storage 3725 cryptographically protects the biometric reference data records for each user authentication device 3720-3721 (e.g., wrapping the data using a symmetric key to make the storage 3725 secure). While the secure storage 3725 is illustrated outside of the secure perimeter of the authentication device(s) 3720-3721, in one embodiment, each authentication device 3720-3721 may have its own integrated secure storage to cryptographically protect the biometric reference data records.

In addition to explicit user authentication, one embodiment of the authentication engine 3710 performs non-intrusive authentication by collecting data from sensors 3743 to be used by the assurance calculation module 3706 to generate the assurance level. By way of example, the sensors 3743 may include location sensors such as GPS sensors to indicate a current location of the user. If the client devices 3600-3602 are in an expected location such as the known vicinity (e.g., a "home" or "office" location), then this increases the likelihood that the user is the legitimate user. By contrast, if the GPS reading indicates that the user is not at an expected location, then this indicates that the user initiating the transaction is not the legitimate user. Thus, in one embodiment, the assurance calculation module 3706 will increase the assurance level if the user is in an expected location and decrease the assurance level if the user is in an unexpected location.

Various additional sensors 3743 such as temperature sensors, humidity sensors and accelerometers may be used to collect data relevant to user authentication. For example, the temperature/humidity sensors may provide a current temperature/humidity which may be compared against the known temperature/humidity for the location specified by the location sensor. If the values are significantly different, then this may indicate that the client devices 3600-3602 are being spoofed. The comparison of the asserted location and the temperature/humidity may be done at a remote server such as the secure transaction server(s) used by the relying party 3650. In another embodiment, accelerometers on the device may be used to measure the gait of the user and compare these measurements against the known gait of the user. If the gaits match (within a specified threshold), then this increases the likelihood that the legitimate user is in possession of the client device 3600-3602.

Another non-intrusive authentication technique comprises measuring an amount of time which has elapsed since the last successful user authentication. For example, if the user has very recently performed an explicit user authentication (e.g., swiping a finger on a fingerprint reader just a few minutes earlier), then this will tend to indicate that the legitimate user is still in possession of the client device (thereby resulting in a high baseline assurance level). By contrast, if the last explicit authentication has been several hours or several days earlier, then a new explicit user authentication may be required to reach an acceptable assurance level.

Figure 38:
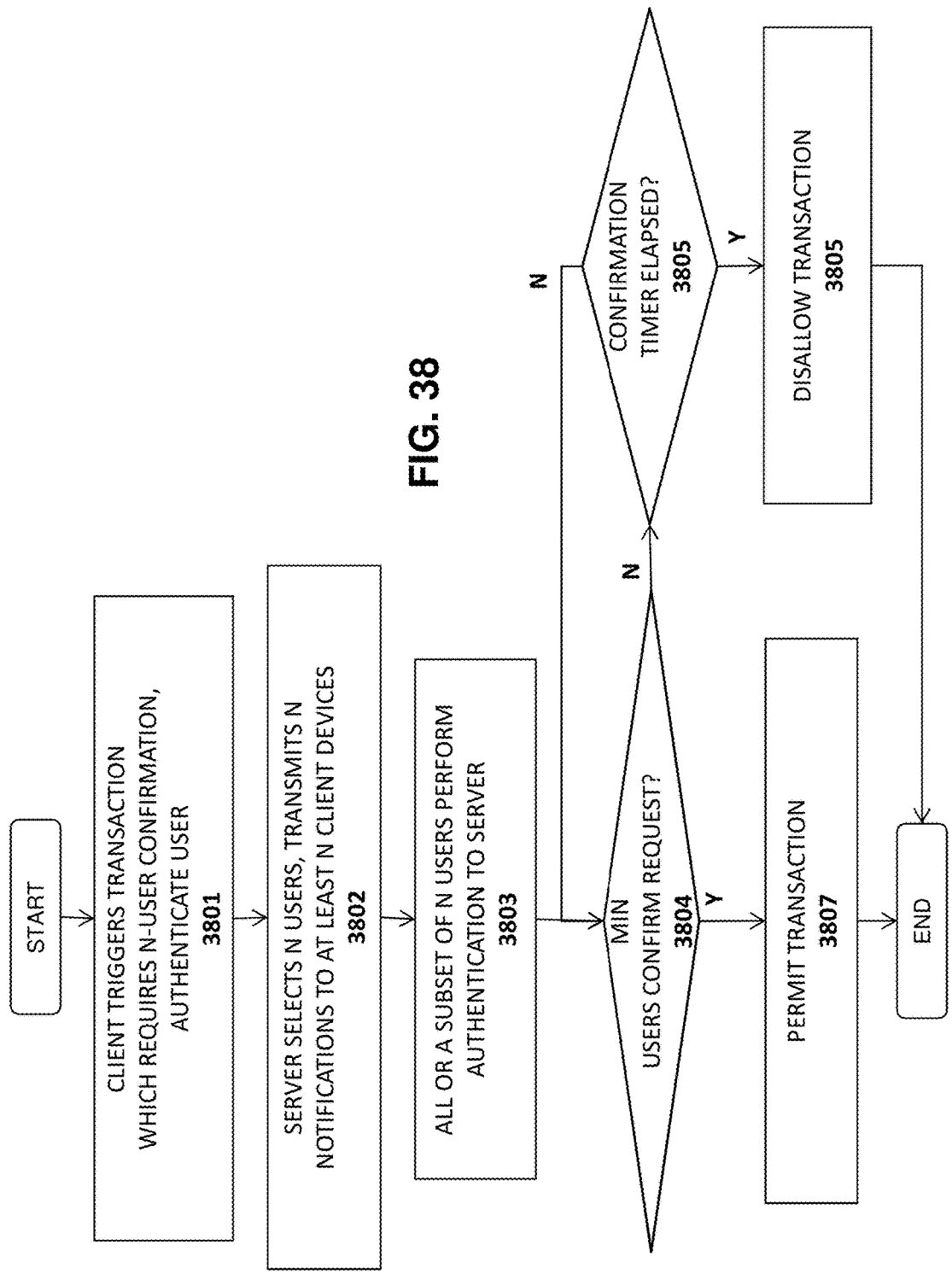
FIG. 38 illustrates details of one embodiment of a client used in a system for user confirmation of online transactions.

A method in accordance with one embodiment of the invention is illustrated in FIG. 38. At 3801, the user of a client triggers a transaction which requires a confirmation by N other users. For example, the user's account at the relying party may indicate that certain types of transactions initiated by the user (or all transactions) require confirmation by one or more other users. For example, the user's account may identify the user as a minor, requiring authorization by one or more parents or guardians. The user is also authenticated at 3801 by implementing one or more of the authentication techniques described herein.

At 3802, the server selects N other users who must confirm the transaction triggered by the user. For example, upon detecting the initiation of the transaction by the user, the relying party may query its user database to determine that the transaction requires confirmation and the identity of the users who can confirm the transaction. In one embodiment, a subset of all of the users who are capable of confirming the transaction may actually confirm the transaction. For example, if the user is a minor with two parents then, in one embodiment, the notification may be sent to both parents, but a confirmation by either parent will allow the transaction to proceed. Similarly, there may be 10 users who are authorized to confirm a business transaction, but only 2 confirmations are required to allow the transaction to proceed.

In one embodiment, a push notification may be sent to the client devices of those users who can confirm the transaction (e.g., if the users have client devices capable of receiving push notifications). Alternatively, or in addition, the notification may be sent via email, text message (e.g., SMS), instant message, or any other technology capable of delivering a message to the client devices. In one embodiment, a user may be registered with the server to receive confirmation messages through two or more communication channels. For example, a user may receive both a push notification and an email containing the confirmation request.

Regardless of how the confirmation request is sent, at 3803 all or a subset of the N users perform authentication with the server as part of the confirmation process. Any remote authentication techniques may be employed to authenticate the users and confirm the transaction. For example, a user may confirm a transaction by providing biometric data to a biometric device on the client which has been previously registered with the relying party (e.g., swiping a finger on a fingerprint scanner). As mentioned above, the details associated with the transaction may be provided to the users via a secure transaction application capable of securely displaying text and other information (i.e., ensuring that when a user confirms the transaction, he/she has viewed the actual, unaltered text describing the transaction).

Once a minimum specified number of users have confirmed the request, determined at 3804, then the transaction is permitted at 3807. One embodiment of the method starts a confirmation timer to measure the amount of elapsed time since the confirmation requests were sent. Once the confirmation timer has reached a threshold value (e.g., a few hours, a day, etc.), determined at 3805, the transaction is disallowed at 3806. Until the timer threshold is reached, the method waits at 3804 for the minimum specified number of users to confirm the request.

K. System and Method for Delegating Trust

Existing authentication systems do not allow new authenticators to be enabled using registered authenticators on trusted clients. For example, if a user has a fingerprint sensor on her phone which she has registered with number of websites and then she installs a voice authenticator on her phone, she has no way to automatically register her voice authenticator with all the websites she was using with fingerprint sensor. Rather, in this case, the user must step through the same enrollment and registration process to register the voice authenticator with the relying party. Similarly, if the user purchases a new device with a new set of authenticators, the user must re-enroll and reregister all of the new authenticators with the server.

The embodiments of the invention described below allow a user to easily enable and register the authenticator(s) on a new client device using a trusted client device that is already enabled and registered with one or more relying parties. In particular, these embodiments may be used to enable new authenticators, enable new client devices, and keep the registrations in sync between multiple client devices.

Figure 39:
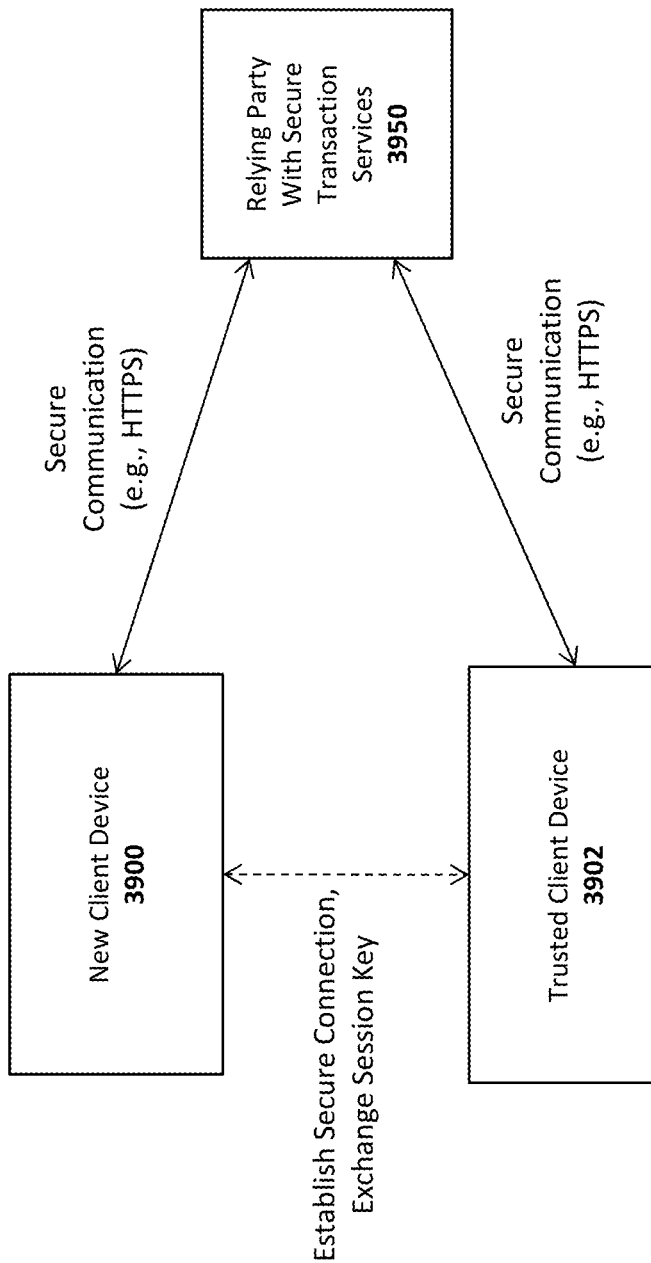
FIG. 39 illustrates one embodiment of a method for user confirmation of online transactions.

FIG. 39 provide a high level overview of trust delegation in accordance with one embodiment of the invention. A trusted device 3902, i.e., a device which has an authenticator which is registered with one or more relying parties 3950, establishes a secure connection with the user's new client device 3900. The particular manner in which the secure connection is established is not pertinent to the underlying principles of the invention. Various techniques may be used such as near field communication (NFC), Bluetooth, Wifi Direct, using a quick response (QR) code and establishing an HTTPS connection. In one embodiment, the devices may exchange a large random token (LRT) needed for a secure connection and may establish a connection by providing the captured LRT to an online service and bootstrap a secure communication via the service.

In one embodiment, once the secure connection is established between the trusted client device 3902 and new client device 3900, a secure protocol is implemented (described in detail below) to transfer and integrate the registration data from the trusted device to the new device. Once the registrations have been transferred, another secure protocol is implemented (e.g., HTTPS in one embodiment) between the new client device 3900 and relying parties 3950 to verify the registrations.

While the embodiments described herein focus on transferring authentication data used for authentication transactions with a relying party 3950, the relying party may not be required for complying with the underlying principles of the invention. For example, the trusted device 3902 may establish a secure connection to provide authentication data to the new client device 3900 without any relying party involved in the system (e.g., to provide authentication data for authenticating locally with the new client device 3900).

Figure 40:
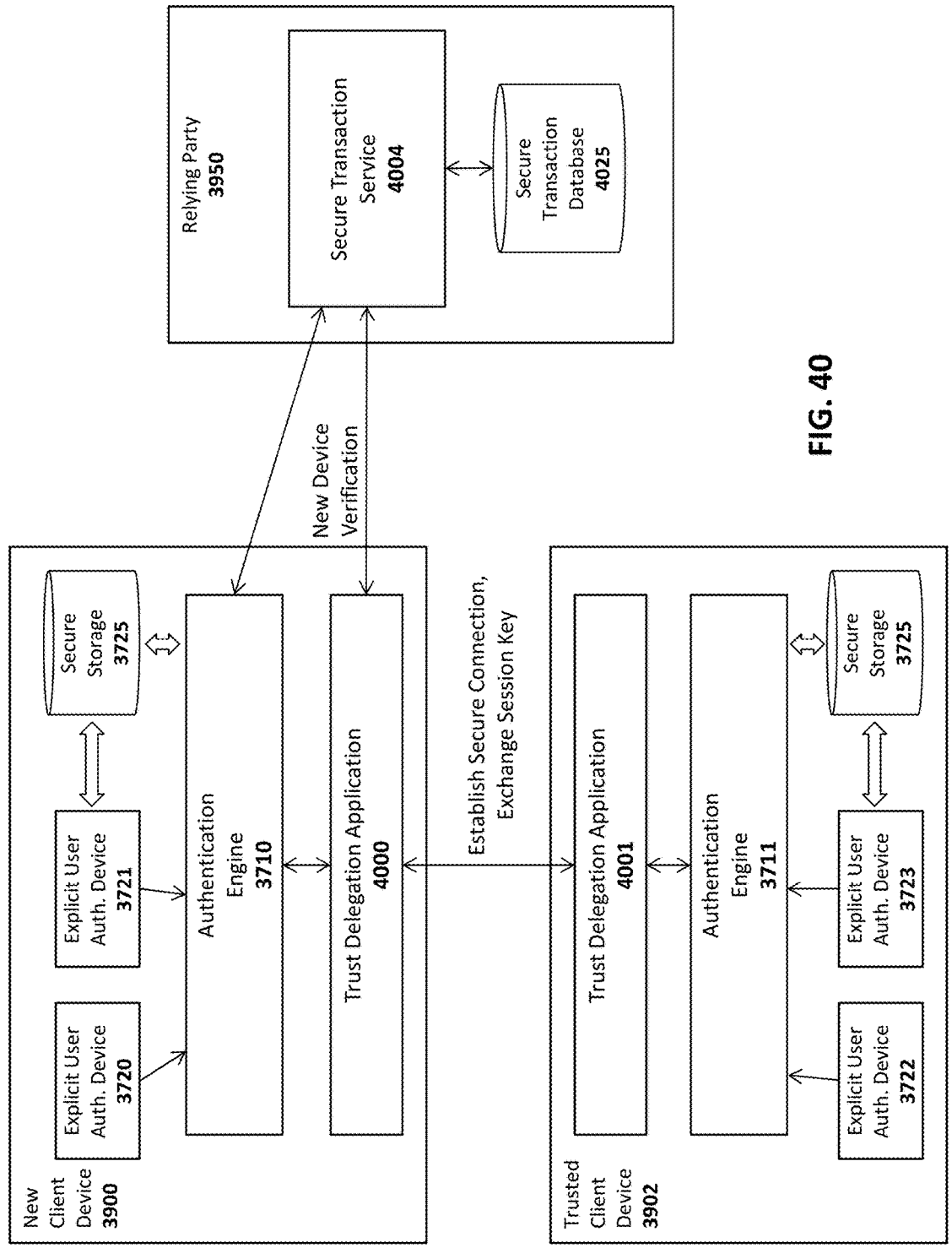
FIG. 40 illustrates one embodiment of a system for delegating trust to a new client device from a trusted client device.

As illustrated in FIG. 40, a trust delegation module 4000-4001 may be executed on the new device 3900 and trusted device 3902, respectively, to establish the secure connection, exchange the registrations, and verify the registrations with a secure transaction service 4004 on each relying party 3950. As used herein, a "trusted authenticator" is an authenticator that a user has already registered with one or more relying parties. A new "new authenticator" is one which the user wishes to enable with all the relying party registrations currently being used with the trusted authenticator. Thus, the authentication engine 3711 is considered a trusted authenticator if it has previously registered one or more user authentication devices 3720-3721 with a relying party. The goal of one embodiment is to turn the authentication engine 3710 of the new device 3900 from a new authenticator into a trusted authenticator. A "trusted device" is one which has a trusted authenticator and a "new device" is one which has a new authenticator.

Trust delegation refers to the process of enabling the new authenticator using a trusted authenticator. Thus, the preconditions of trust delegation are: the user has a trusted device; the user has a new device; the user wants to delegate trust from trusted device to new device.

Returning to FIG. 40, in one embodiment, the user initiates the trust delegation application 4000 on the new client device 3900 and the trust delegation application 4001 on the trusted client device to establish the initial secure connection. In one embodiment, the trust delegation applications may be mobile device apps, specifically designed to perform the trust delegation operations described herein. In another embodiment, the trust delegation applications may be browser plugins executed in response to the user indicating that he/she wishes to perform trust delegation (e.g., via a web page with embedded Javascript or other applet or executable program code). Moreover, the trust delegation applications 4000-4001 may be software modules within a larger application such as an authentication application designed to manage authentications with relying parties. It should be noted, however, that the underlying principles of the invention are not limited to any particular implementation of the trust delegation applications 4000-4001.

In one embodiment, to approve the trust delegation operations on the trusted device 3902, the user locally authenticates with the authentication engine 3711 on the trusted device (e.g., providing biometric input to a user authentication device 3722-3723). Similarly, in one embodiment, the user may locally authenticate with the authentication engine 3710 on the new client device 3900. These two authentication steps may provide authorization for the trust delegation applications 4000-4001 to perform the delegation process.

As mentioned, the trust delegation applications 4000-4001 may utilize any of the communication interfaces available on their respective client devices 3900, 3902 to establish a secure connection (e.g., Bluetooth interfaces for a Bluetooth connection, NFC interfaces for an NFC connection, etc).

Once the secure connection is established, in one embodiment, the trust delegation application 4001 of the trusted client 3902 provides data indicating the number of keys (N) on the trusted client which are registered with relying parties. In response, in one embodiment, the trust delegation application 4000 generates N new device key pairs (ND_Uauth) including one private key (ND_Uauth.priv) and one public key (ND_Uauth.pub) and sends the N new device pubic keys to the trust delegation application 4001 on the trusted device 3902.

In one embodiment, the trust delegation application 4001 then signs each of the N new device public keys with its corresponding trusted device private key (TD_Uauth.priv) to generate a signature (TD_Uauth.sig) associated with each of the N new device public keys. In one embodiment, the "corresponding" private key is the private key associated with a particular registration with a corresponding relying party. The trust delegation application 4001 may also insert a timestamp into the generated signature which may subsequently be used by the relying party to verify exactly when the trust delegation occurred. In one embodiment, the trust delegation application 4001 of the trusted client 3902 then transmits each of the generated signatures along with other registration data associated with each relying party to the trust delegation application 4000 on the new client 3900. The data for each relying party may include, one or more relying party ID codes (e.g., application ID codes identifying services at the relying party), user names registered for the user at the relying party, key ID codes used by the relying party to locate the appropriate keys during authentication, and any other data relevant to the authentication process.

In one embodiment, once the trust delegation application 4000 receives the signatures and other registration data, it integrates this data into the local secure storage device 3725 so that it may be subsequently used when the new client device 3900 connects to the relying party 3950.

In one embodiment, after the registration data base been stored in the local secure storage 3725, a series of bootstrapping operations may be performed by the trust delegation application 4000 to leverage the delegated registrations on the new client device 3900 with relying parties (e.g., websites, services, etc) that had previously been registered with the trusted client device 3902. Alternatively, the described bootstrapping operations may be performed by the authentication engine 3710 itself (via direct communication with the secure transaction service 4004 as shown in FIG. 40). The underlying principles of the invention remain the same regardless of which particular software component on the new client device 3900 performs the operations.

In particular, in one embodiment, the secure transaction service 4004 of the relying party 3950 detects that there are registrations on the new client device 3900 using the remote authentication protocol supported by the secure transaction service 4002 and trust delegation application 4000. In one embodiment, the user may initially be asked by the secure transaction service 4004 to perform biometric authentication or other form of authentication (e.g., entering a secure code) from the new client device 3900. In addition, at this stage, the secure transaction service 4004 may verify the timestamp inserted into the signature(s) and ensure that the timestamp is not older than a threshold amount of time.

Assuming that the user successfully provides biometric or other authentication data at an acceptable assurance level, the trust delegation application 4000 and/or the new authenticator 3710 prepare a response including the following three assertions:

1. An attestation over the new device public key associated with the relying party (ND_Uauth.pub). In one embodiment, the attestation comprises a signature generated over the public key (e.g., using a public key of the relying party).

2. An assertion using the new device private key associated with the relying party (ND_Uauth.priv). In one embodiment, to generate the assertion, the private key is used to generate a signature over content known by the relying party (e.g., such as a random challenge sent from the relying party). Because the relying party is provided with the public key (in step 1), it can decrypt the content, thereby verifying that the private key was used to encrypt the content.

3. The signature previously generated by the trusted client device and associated with the new device public key for this particular relying party (TD_Uauth.sig) along with the key ID used by the relying party (TD_Uauth.keyid) to locate the public key (e.g., so that it may use the key ID to query its secure transaction database 4025 to retrieve the public key).

In one embodiment, all of the above data is then transmitted to the secure transaction service 4004 of the relying party in a remote authentication response.

In one embodiment, after receiving the above assertions, the secure transaction service 4004 may perform the following verifications:

1. Locate the trusted device's public key (TD_Uauth.pub) using the key ID;

2. Verify the signature generated by the trusted device (TD_Uauth.sig) using the trusted device's public key (TD_Uauth.pub);

3. Verify the signature generated by the new device's private key (ND_Uauth.sig) using the new device's public key (ND_Uauth.pub); and 4. Verify the attestation over the new device public key associated with the relying party (ND_Uauth.pub). In one embodiment, this verification is performed using the private key of the relying party.

Figure 41:
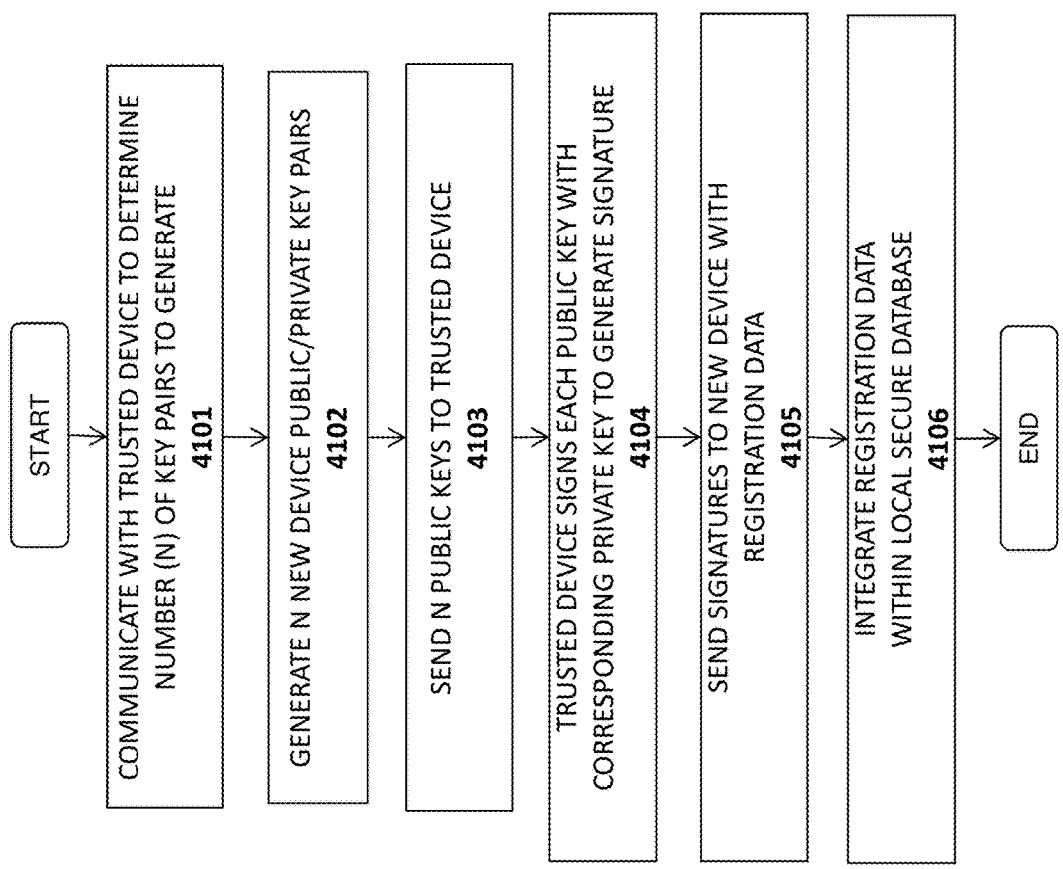
FIG. 41 illustrates additional details for one embodiment of a system for delegating trust to a new client device from a trusted client device.
Figure 42:
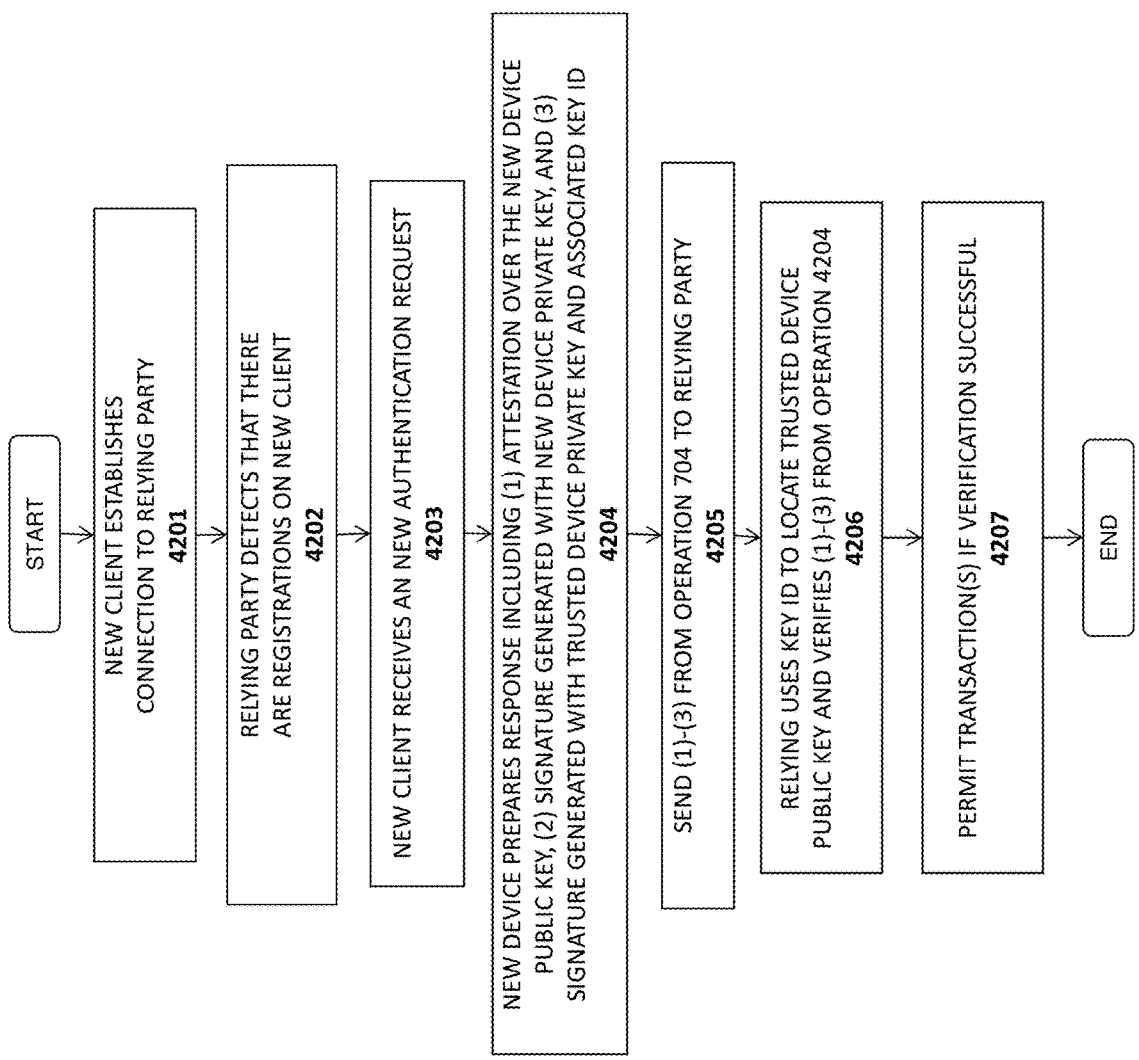
FIG. 42 illustrates one embodiment of a method for delegating trust to a new client device from a trusted client device.

One embodiment of a method for securely transferring registration data from a trusted device to a new device is illustrated in FIG. 41 and one embodiment of a method for verifying the registration data with the relying party is illustrated in FIG. 42. While these methods may be implemented within the context of the system architectures shown in FIGS. 39-40, the underlying principles of the invention are not limited to any particular system architecture.

Turning first to FIG. 41, at 4101, the new devices establishes a secure communication channel with the trusted device and determines the number (N) of key pairs to generate. As mentioned, this may be the number of key pairs registered by the trusted device with relying parties.

At 4102, the new device generates N new public/private key pairs. In an alternate implementation which utilizes symmetric keys, the new device may generate a single (symmetric) key to be shared with the relying party. At 4103, the N public keys are sent to the trusted device and, at 4104, the trusted device signs each public key with a corresponding private key to generate a signature. At 4105, the signatures are sent to the new device with other registration data for the relying party (e.g., key IDs, application IDs, etc). Finally, at 4106, all of the registration data and signatures are integrated within the local secure database(s) used by the authentication engine.

Turning now to FIG. 42, at 4201 at new client (having already performed the delegation operations from FIG. 41) establishes a secure connection with the relying party. At 4202, the relying party detects that there are existing registrations which have been delegated to the new device. In response, at 4203, the relying party makes an authentication request to the new device. The user may then authenticate using one or more biometric or other authentication techniques. As discussed above, at 4204, the new device prepares a response which includes an attestation over the new device public key, a signature generated with the new device private key (e.g., over a challenge), and the signature generated with the trusted device's private key and the associated key ID. At 4205 all of the data in the response is transmitted to the relying party and, at 4206, the relying party verifies the data contained in the response (see above for details of one embodiment). If the verification is successful, then at 4207 the transaction being attempted by the user is permitted.

The techniques described herein may be used to delegate trust between two authenticators on different devices (as described above). In addition, in one embodiment, these techniques may be used to delegate trust between two authenticators on the same device. In this case, the secure connection between two devices does not need to be established but all of the other operations may be performed between the two authenticators within the device.

Moreover, it should be noted that some of the operations involved can be implemented in various ways. For example the secure protocol for delegating trust may be initiated by trusted device rather than the new device. In either case, the new device (or, more specifically, the authenticator on the new device) may generate a number of new key pairs (ND_Uauth) and the authenticator on the trusted device may sign the public keys of these key pairs.

L. System and Method for Privacy-Enhanced Data Synchronization

Current systems exist for synchronizing data between multiple client devices using cloud services. When a user creates a new document on a device (e.g., snaps a picture, creates a word processing document, etc) or modifies an existing document, a cloud service to which the user is subscribed will typically store a copy of the new/modified document "in the cloud." When the user accesses the cloud service from a second device (e.g., a computer at work or a another device used by a different family member), the cloud service may be configured to synchronize the device.

One problem which exists is that data is frequently stored in the cloud service in an unencrypted format thereby making the data vulnerable to various types of cyber attacks and queries by federal agencies.

The embodiments of the invention described below provide a set of protocols and techniques which allow data to be synchronized among devices in a privacy-enhanced manner. Using these protocols and techniques, cloud services never have access to data in plaintext (e.g., unencrypted format), thereby preserving the user's privacy.

As an initial matter, it should be noted that the techniques described below for synchronizing data among devices do not rely on the advanced authentication techniques described herein. For example, these synchronizing techniques may be employed outside of the context of a system for remote user authentication as described for other embodiments of the invention. However, these synchronization techniques may be used to perform synchronization for these remote user authentication embodiments. For example, in one embodiment, the registration data for each Website or other online service visited by the user may be synchronized among multiple devices using these synchronization techniques.

As used herein, a "circle" means a network of devices trusted by a user and "circle-id" means an identifier identifying a circle (e.g., one which cannot be easily guessed). A "circle-cloud" means an online service which is used to store information about circles and trust-chains (defined below) and acts as a communication hub for client devices. In one embodiment, the circle-cloud does not store any confidential data (at least not in an unencrypted format). The term "d.pub" refers to a device's public key, "d.priv" refers to the device's private key and d.pub/d.priv refers to an asymmetric public/private key pair of a device d. In one embodiment, d.priv never leaves device d. The "trust-chain" means the persistent data stored on the circle-cloud containing information about devices trusted by user and their relationships. A "circle-channel" means a secure communication channel provided by the circle-cloud that is used by two (or more) devices to exchange and synchronize data between them.

Figure 43:
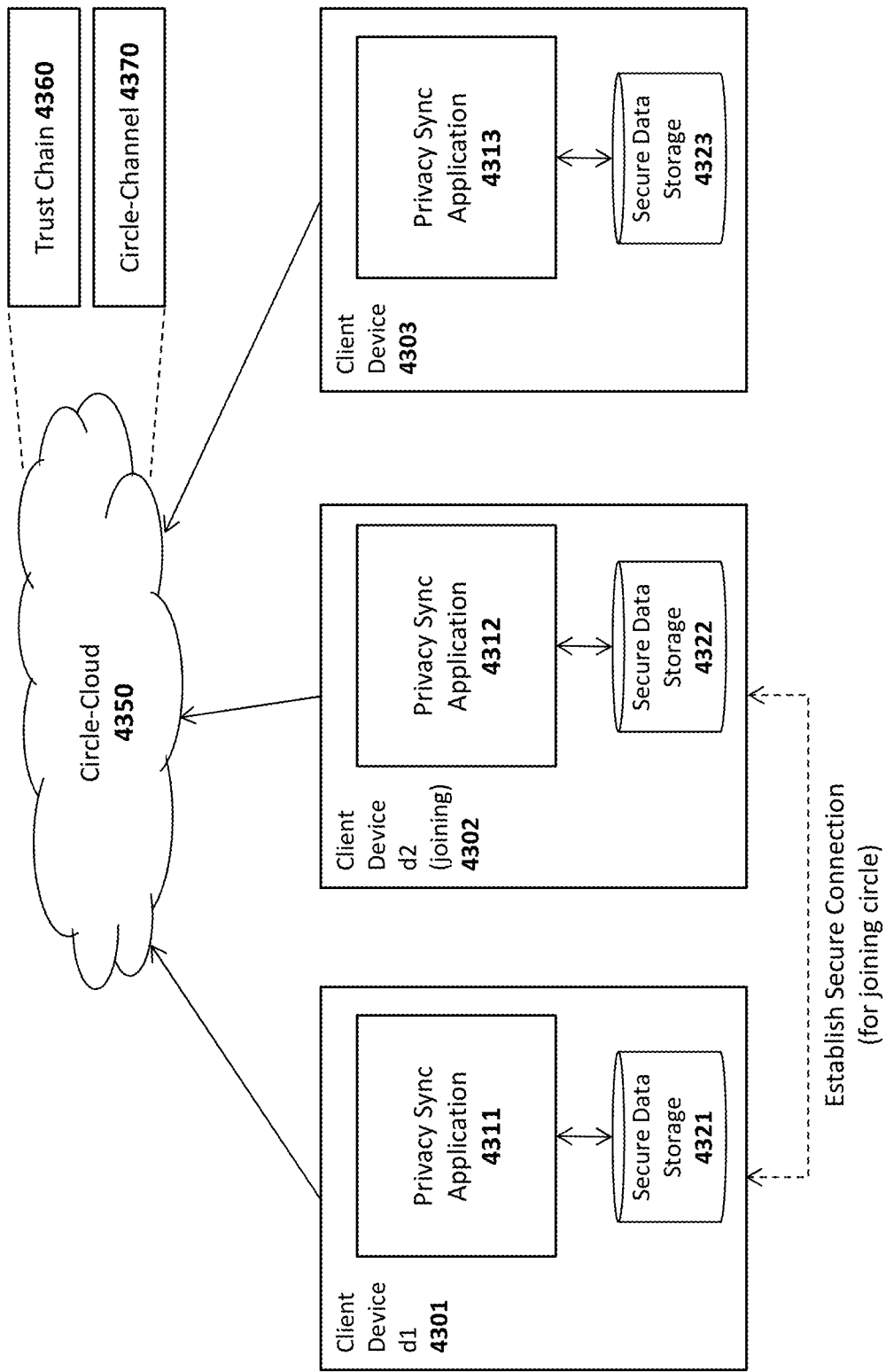
FIG. 43 illustrates one embodiment of a system for synchronizing private data between devices.

One embodiment of the invention comprises a protocol and associated techniques for allowing a new user device to (a) join a circle and (b) subsequently synchronize with the circle. These embodiments will be described with respect to FIG. 43 which shows a three client devices 4301-4303 each with a privacy sync application 4311-4313, respectively, for implementing the protocols and techniques described herein and secure data storage 4321-4332, respectively, for storing data used for joining and synchronizing. Device 4301 is sometimes referred to herein as device d1, device 4302 is sometimes referred to as device d2, and device 4303 is sometimes referred to as device d3.

In one embodiment the joining and synchronizing are performed through a circle cloud 4350 which includes a plurality of storage servers. A trust chain 4360 within the circle cloud 4350 maintains data defining trust relationships between the devices 4301-4303 as described below. The circle channel 4370 comprises a secure communication channel provided by the circle-cloud that is used by two or more devices to exchange and synchronize data.

a. Joining the Circle

A device 4302 (d2) joins an existing network of devices 4301 (d1) and 4303 (d3) that belong to the user (i.e., the "circle" of trusted devices). A device 4302 can join an existing circle only if another device 4301, which is already part of that circle, authorizes it.

Figure 44:
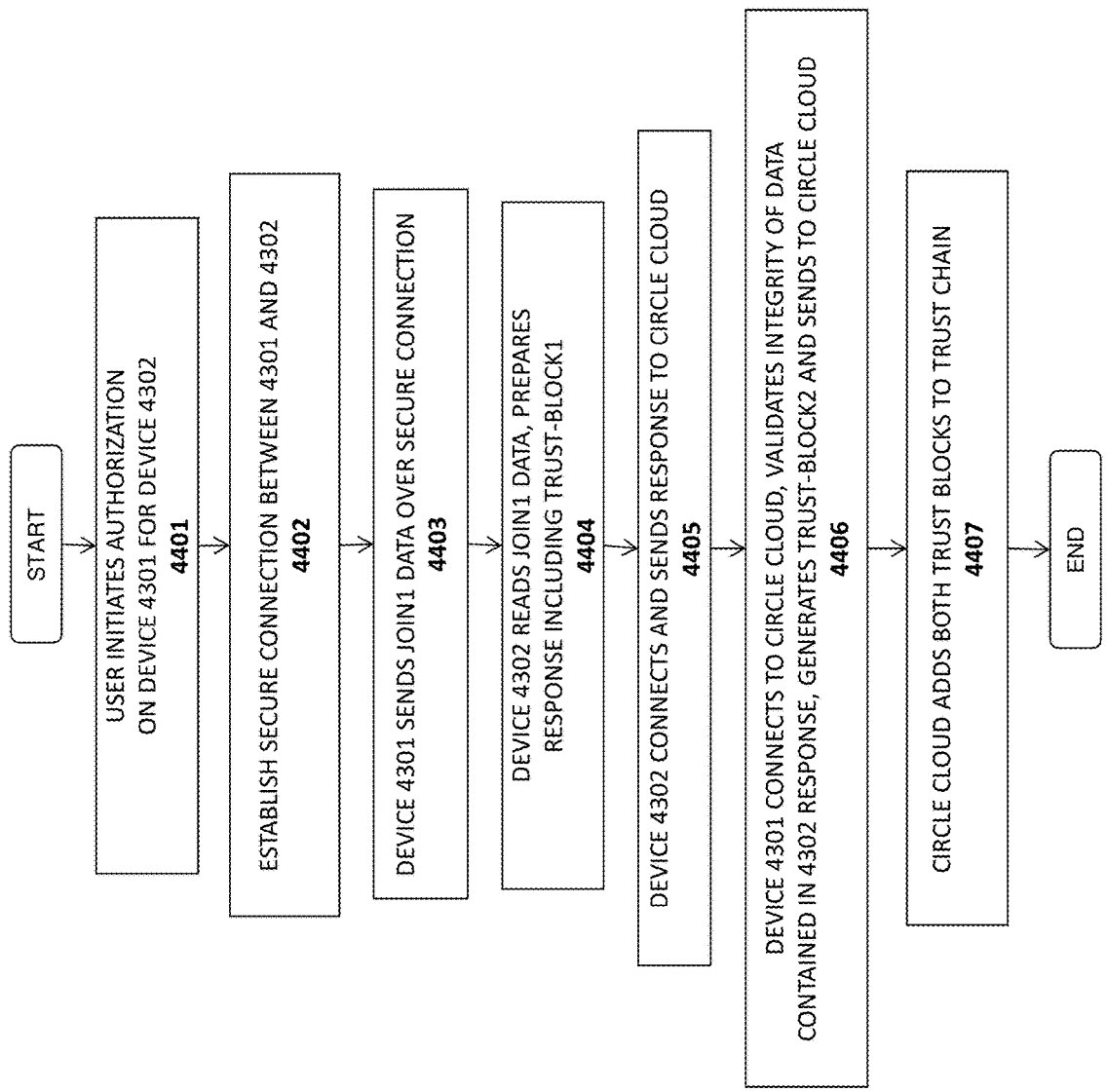
FIG. 44 illustrates one embodiment of a method for adding a device to a trust circle.

One embodiment of a method for authorizing a new device 4302 using a trusted device 4301 is illustrated in FIG. 44. At 4401 a user authorizes the new device 4302 on an existing trusted device 4301. For example, in one embodiment, the user may initiate its privacy sync application 4311 on the trusted device 4301 and the privacy sync application 4312 on the new client device 4302.

At 4402, in one embodiment, the privacy sync applications 4311-4312 cause the devices 4301-4302 to establish a secure connection. Various techniques may be used to establish the secure connection such as near field communication (NFC), Bluetooth, Wifi Direct, using a quick response (QR) code and establishing an HTTPS connection.

At 4403, device 4301 sends secure data to the new device 4302, referred to herein as "join1_data." In one embodiment, the join1_data includes the following fields: {d1.pub, sk.sym, circle-id}, where d1.pub is the public key of device 4301, sk.sym is a randomly-generated session key generated by device 4301, and the circle-id is a unique identification code identifying the circle which device 4302 is joining.

At 4404, device 4302 reads the join1_data and prepares a response which may include the following:

HMAC (sk.sym, d2.pub|T)|d2.pub|T where T is a timestamp trust-block1=S(d2.priv, d1.pub)|d1.pub|d2.pub Note that HMAC stands for Hash-Based Message Authentication Code. In the above embodiment, the HMAC is generated by concatenating the public key of device 4302 with a timestamp and protecting the integrity of the result with sk.sym using HMAC or a similar algorithm. In addition, trust-block1 includes a signature generated with device 4302's private key over device 4301's public key. In one embodiment, the trust-block1 entry also includes a timestamp (T).

Returning to FIG. 44, At 4405 device 4302 securely connects to the circle-cloud 4350 and transmits the response which includes the HMAC and trust-block1. The circle-cloud 4350 stores the data received by device 4301 and waits for device 4301 to connect.

At 4406, device 4301 connects to the circle cloud using the circle-id, validates the integrity of the data contained in device 4302's response from operation 4405, and generates trust-block2. In particular, in one embodiment, device 4301 reads and validates the integrity of d2.pub and T using sk.sym (e.g., using sk.sym to decrypt d2.pub and T). Device 4301 then signs d2.pub using its own private key, d1.priv and generates trust-block2=S(d1.priv, d2.pub)|d2.pub|d1.pub, which comprises a signature generated over d2.pub with d1 priv. In one embodiment, trust-block2 also includes a timestamp (T). The device 4301 then sends the above data including trust-block2 to the circle cloud 4350.

At 4407, the circle-cloud 4350 adds both trust-blocks to trust-chain 4360. In one embodiment, after the above operations, device 4302 joins the circle associated with circle-id. All devices 4301, 4303 in this circle trust device 4302 and device 4302 trusts all of these devices. Note that any trusted device can authorize a new device using the techniques described herein.

b. Sync with Circle

During this process the devices 4301-4303, belonging to the same circle, sync data between them. There can be different application-specific sub-protocols implemented on top of this process. For example, an online cloud storage application may want to keep user's data synchronized on all devices and keep the encrypted copy on circle-cloud. Another application may propagate messages to the devices in the circle. For example, in one embodiment, registration data used by one device to authenticate with a remote relying party may be synchronized across all devices in the circle. Various other applications and sub-protocols may be implemented while still complying with the underlying principles of the invention. All such sub-protocols may use the foundational process blocks described below.

Trust-Chain

As demonstrated in the "Join the Circle" process (FIG. 44), what goes into trust-chain 4360 a proof which asserts that device2 is trusted by device1. Thus, a trust-chain 4360 is a chain of authorization blocks each of which asserts a trust relationship between two devices. In one embodiment, a trust-chain is commutative, meaning that if device 4301 trusts device 4302 then device 4302 trusts device 4301. The trust-chain 4360 is considered to be broken if there is a block asserting that device 4301 trusts device 4302 and there is no block asserting that device 4302 trusts device 4301. In one embodiment, the trust-chain 4360 is also transitive, meaning that if device 4301 trusts device 4302 and device 4302 trusts device 4303 then device 4301 trusts device 4303. In one embodiment, the trust-chain is circle-id specific and it does not contain any confidential information about devices.

In one embodiment, the trust chain 4360 comprises a plurality of trust blocks and each block includes the following data: {di.pub, dj.pub, S(di.priv, dj.pub), S(dj.priv, di.pub)}—i.e., the public keys of each device and a signature generated using the private key of each device over the public key of each other device.

The above assertion means that device device di trusts device dj and vice versa. In one embodiment, the trust-chain 4360 is used by devices 4301-4302 to determine and verify which devices are in the circle. After the devices verify that they are in the same circle, they may use the circle-channel 4370 to synchronize encrypted data between them.

In one embodiment, to determine whether device di is in the same circle as device dj the following operations are performed: (a) construct a directional graph where each node is a device in trust-chain and each arrow corresponds to a block in trust-chain and (b) determine if there is a direct path connecting di and dj.

Circle-Channel

Figure 45:
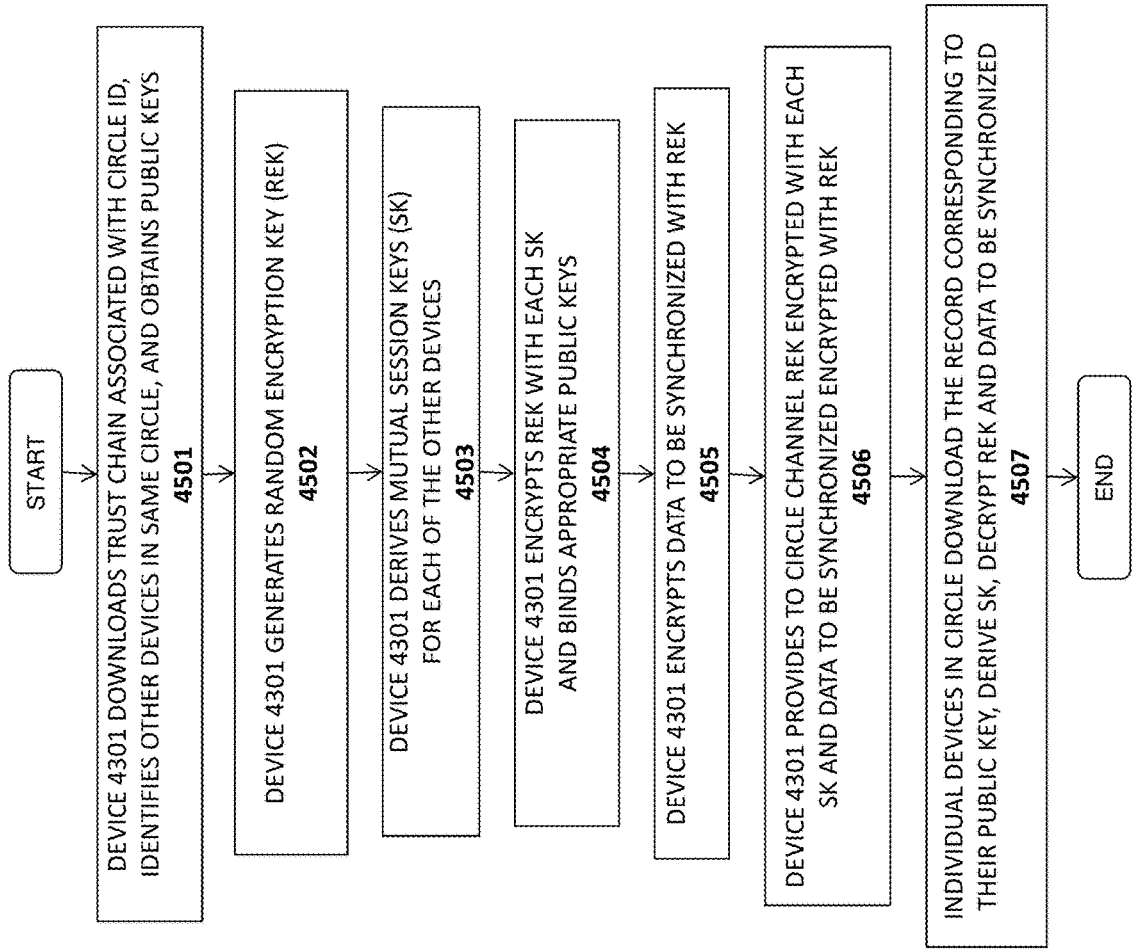
FIG. 45 illustrates one embodiment of a method for synchronizing data between devices.

In one embodiment, the process illustrated in FIG. 45 is implemented to synchronize data between other devices in the same circle. In the illustrated example, device 4301 (d1) is the device that has new data and wants to send to other devices. At 4501, device 4301 downloads the trust-chain 4360 associated with the circle-id, identifies the other devices in the same circle from the trust-chain (e.g., devices 4302-4303), and obtains the public keys of the other devices in the same circle using the trust-chain.

At 4502, the device 4301 generates a random encryption key (REK) (e.g., using known techniques for random number generation). At 4503, device 4301 derives mutual session keys (SK) for each of the other devices in the circle. In one embodiment, device 4301 derives the SKs using the Diffie-Hellman key exchange algorithm with respect to each of the other others devices. Diffie-Hellman is a well known algorithm which allows two parties that have no prior knowledge of each other to jointly establish a shared secret key. In the instant case, for example, if a first device has a key pair and provides its public key to a second device, then the second device can automatically derive a new key (SK in the instant application) independently using its private key and the first device's public key (and vice versa). In one embodiment, device 4301 uses these techniques to generate a different SK for each other device 4302, 4303.

At 4504, the device 4301 encrypts REK with each derived SK for each device and binds the appropriate public keys with them. For example, for a device d1 which generates SKi and SKj for devices di and dj, respectively, it uses the session keys to encrypt REK as follows:

{d1.pub, di.pub, E(SKi, REK)} (for device di)
{d1.pub, dj.pub, E(SKj, REK)} (for device dj)

In at the end of the process, each of the devices di and dj are able to decrypt REK using their respective session keys (which have been independently derived by each device using Diffie-Hellman as discussed above).

At 4505, device 4301 encrypts the data to be synchronized with REK—i.e., E(REK, data-to-be-synced). As mentioned, any data may be synchronized in this manner such as multimedia files, productivity document, and/or client configuration data (e.g., relying party registration data as discussed above), to name a few.

At 4507, device 4301 provides to the circle channel the REK encrypted with each SK and the data to be synchronized, encrypted with REK:

[{d1.pub, di.pub, E(SKi, REK)}, {d1.pub, dj.pub, E(SKj, REK)}, . . . ] E(REK, data-to-be-synced)

After the data has been provided to the circle-channel, at 4506 individual devices in the same circle download the record corresponding to their public key (e.g., {d1.pub, di.pub, E(SKi, REK)} for device di), derive the same SK (e.g., SKi), decrypt REK and use REK to decrypt the data to be synchronized.

In one embodiment, a "join circle" operation as described above may require user authentication on both device1 and device2. When this protocol is implemented using the remote authentication techniques described herein, a user may be required to, for example, "swipe" a finger to authenticate on both devices to initiate and complete the "join circle" process. By contrast, in one embodiment, syncing data between devices as described may not require user authentication.

The protocol and associated techniques described herein allow networks of devices to be built that trust each other. Significantly, all data transmitted to and from the cloud and stored within the cloud is encrypted. Consequently, data may be synchronized among the plurality of devices without storing any confidential data on cloud, resulting in improved user privacy protection.

The embodiments of the invention described above implement a private synchronization protocol for device synchronization where the participating cloud storage cannot view any of the user's data in plaintext (i.e., data is encrypted in the cloud). These embodiments includes various novel and beneficial features including, but not limited to:

A system and method implementing a device synchronization protocol where device has a public and private key for authorizing other devices.

A system and method which implement a trust-chain to indicate trust relationships between devices within the same circle.

A system and method where devices use Diffie-Hellman or similar key exchange algorithms to generate mutual session keys and encrypt data with those keys.

A system and method where a hash of a circle-id is stored in a circle-cloud instead of on the device itself.

A system and method where circle-cloud uses a challenge response protocol to authenticate a device before allowing it to put any data in circle's circle-channel.

A system and method where a permanent circle group key is used to encrypt the syncing data An application which uses the described private synchronization protocols to share user's data (documents, files, photos, etc) among multiple devices and stores the encrypted backup of data on the cloud.

A system and method where the device's private key (d.priv) and all operations that use this key are implemented inside an authenticator for remotely authenticating a user over a network.

An application which uses the described private synchronization protocols in combination with the embodiments of the invention for performing user controlled trust delegation to a new device to share authenticator registrations among a user's devices.

An application which uses the described private synchronization protocols in combination with the embodiments of the invention for performing user controlled trust delegation to a new device to share new registrations among a user's devices where a user doesn't need to authenticate with an authenticator every time when a new registration is being delegated to other devices.

A set of authenticators belonging to the same user and forming a circle, where these authenticators are using the private synchronization protocols described above to sync authentication key pairs in order to share registrations of a single authenticator with other authenticators belonging to the same circle.

M. Exemplary System Architectures

It should be noted that the term "relying party" is used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement. These distinctions are specified in FIGS. 46A-B discussed below which show that the "relying party" may include Websites 4631 and other network services 4651 as well as the secure transaction servers 4632-4633 for performing the authentication techniques on behalf of the websites and network services.

Figure 46A:
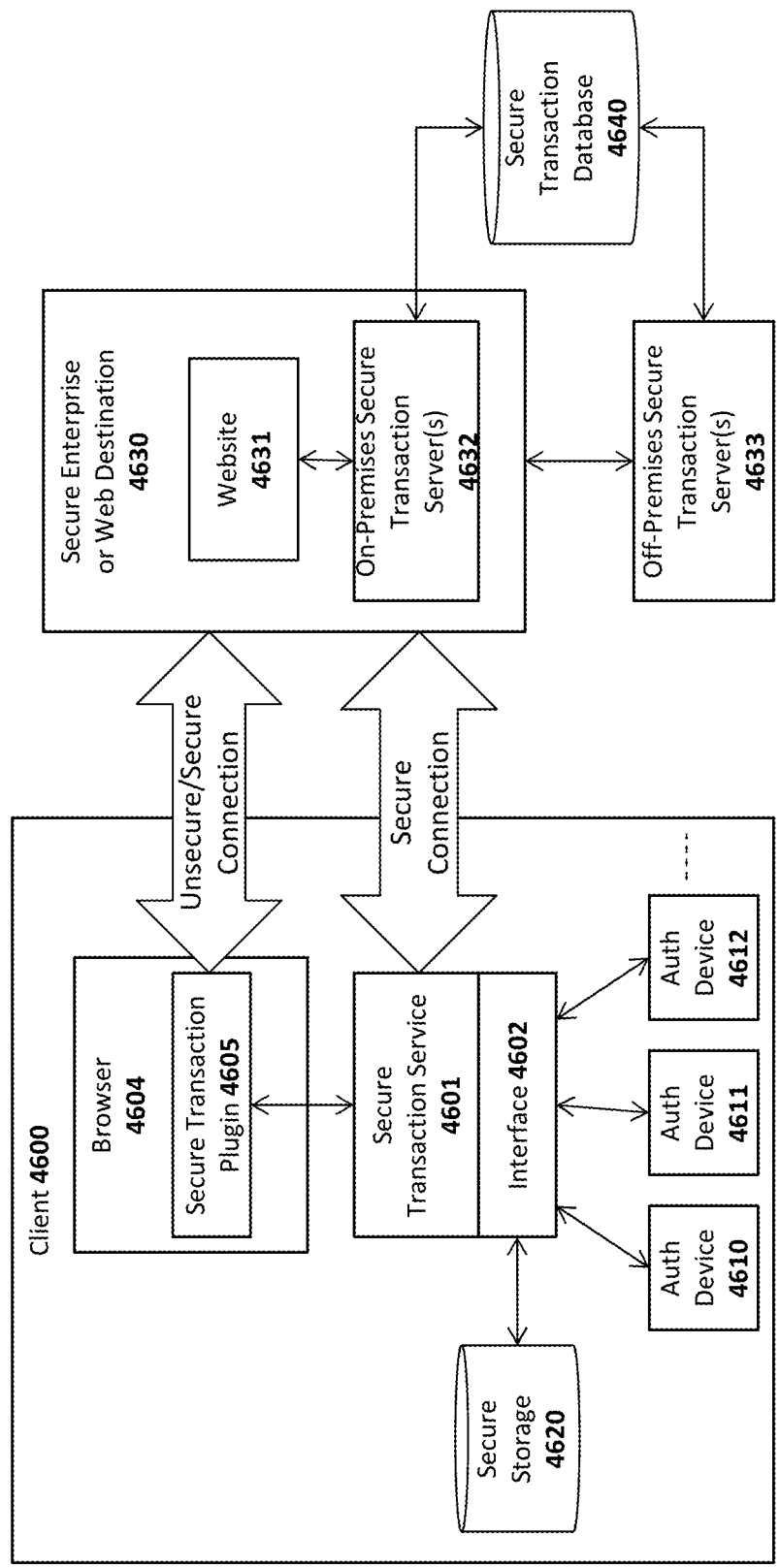
FIGS. 46A-B illustrate different exemplary architectural arrangements within which embodiments of the invention may be implemented.
Figure 46B:
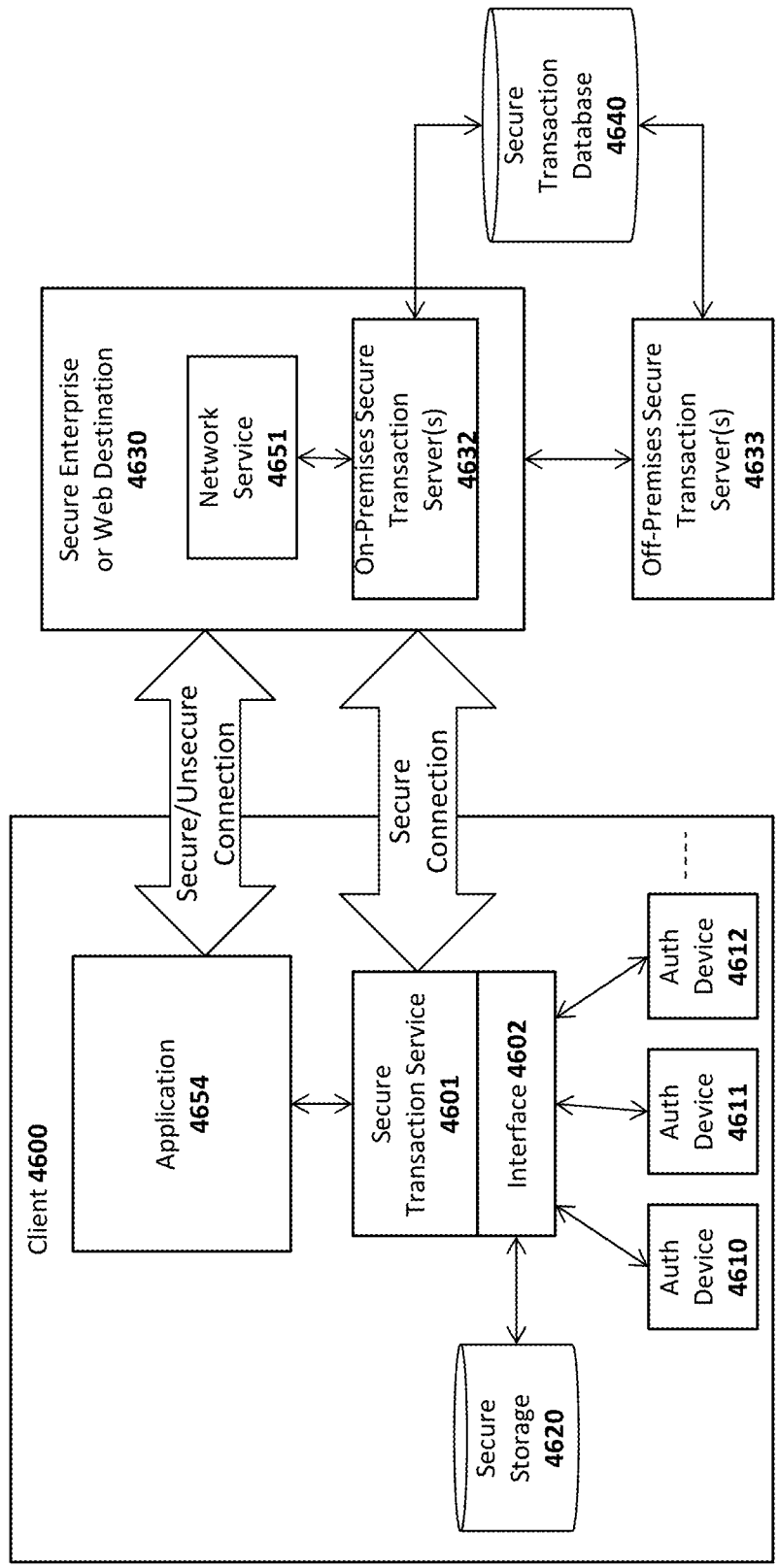

In particular, FIGS. 46A-B illustrate two embodiments of a system architecture comprising client-side and server-side components for authenticating a user. The embodiment shown in FIG. 46A uses a browser plugin-based architecture for communicating with a website while the embodiment shown in FIG. 46B does not require a browser. The various advanced authentication techniques and associated applications described herein may be implemented on either of these system architectures. For example, the authentication engines within client devices described above (e.g., 230) may be implemented as part of the secure transaction service 4601 including interface 4602. It should be noted, however, that the embodiments described above may be implemented using logical arrangements of hardware and software other than those shown in FIGS. 46A-B.

Turning to FIG. 46A, the illustrated embodiment includes a client 4600 equipped with one or more authentication devices 4610-4612 for enrolling and authenticating an end user. As mentioned above, the authentication devices 4610-4612 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll the biometric devices by providing biometric data (e.g., swiping a finger on the fingerprint device) which the secure transaction service 4601 may store as biometric template data in secure storage 4620 (via interface 4602).

While the secure storage 4620 is illustrated outside of the secure perimeter of the authentication device(s) 4610-4612, in one embodiment, each authentication device 4610-4612 may have its own integrated secure storage. Additionally, each authentication device 4610-4612 may cryptographically protect the biometric reference data records (e.g., wrapping them using a symmetric key to make the storage 4620 secure).

The authentication devices 4610-4612 are communicatively coupled to the client through an interface 4602 (e.g., an application programming interface or API) exposed by a secure transaction service 4601. The secure transaction service 4601 is a secure application for communicating with one or more secure transaction servers 4632-4633 over a network and for interfacing with a secure transaction plugin 4605 executed within the context of a web browser 4604. As illustrated, the Interface 4602 may also provide secure access to a secure storage device 4620 on the client 4600 which stores information related to each of the authentication devices 4610-4612 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 4630 over a network such as the Internet.

In addition to enrollment of devices, the secure transaction service 4601 may then register the biometric devices with the secure transaction servers 4632-4633 over the network and subsequently authenticate with those servers using data exchanged during the registration process (e.g., encryption keys provisioned into the biometric devices). The authentication process may include any of the authentication techniques described herein (e.g., generating an assurance level on the client 4600 based on explicit or non-intrusive authentication techniques and transmitting the results to the secure transaction servers 4632-4633).

As discussed below, certain types of network transactions are supported by the secure transaction plugin 4605 such as HTTP or HTTPS transactions with websites 4631 or other servers. In one embodiment, the secure transaction plugin is initiated in response to specific HTML tags inserted into the HTML code of a web page by the web server 4631 within the secure enterprise or Web destination 4630 (sometimes simply referred to below as "server 4630"). In response to detecting such a tag, the secure transaction plugin 4605 may forward transactions to the secure transaction service 4601 for processing. In addition, for certain types of transactions (e.g., such as secure key exchange) the secure transaction service 4601 may open a direct communication channel with the on-premises transaction server 4632 (i.e., co-located with the website) or with an off-premises transaction server 4633.

The secure transaction servers 4632-4633 are coupled to a secure transaction database 4640 for storing user data, authentication device data, keys and other secure information needed to support the secure authentication transactions described below. It should be noted, however, that the underlying principles of the invention do not require the separation of logical components within the secure enterprise or web destination 4630 shown in FIG. 46A. For example, the website 4631 and the secure transaction servers 4632-4633 may be implemented within a single physical server or separate physical servers. Moreover, the website 4631 and transaction servers 4632-4633 may be implemented within an integrated software module executed on one or more servers for performing the functions described below.

As mentioned above, the underlying principles of the invention are not limited to a browser-based architecture shown in FIG. 46A. FIG. 46B illustrates an alternate implementation in which a stand-alone application 4654 utilizes the functionality provided by the secure transaction service 4601 to authenticate a user over a network. In one embodiment, the application 4654 is designed to establish communication sessions with one or more network services 4651 which rely on the secure transaction servers 4632-4633 for performing the user/client authentication techniques described in detail below.

In either of the embodiments shown in FIGS. 46A-B, the secure transaction servers 4632-4633 may generate the keys which are then securely transmitted to the secure transaction service 4601 and stored into the authentication devices within the secure storage 4620. Additionally, the secure transaction servers 4632-4633 manage the secure transaction database 4640 on the server side.

An exemplary series of transactions for performing authentication device discovery, enrollment, registration, and authentication are shown in FIGS. 47-51. Some aspects of these transactions have been employed in the OSTP protocol mentioned above (see the OSTP Framework (Mar. 23, 2011) for additional details, which is incorporated herein by reference). An understanding of the basic operation of these transactions will provide a context in which embodiments of the invention may be implemented.

Figure 50:
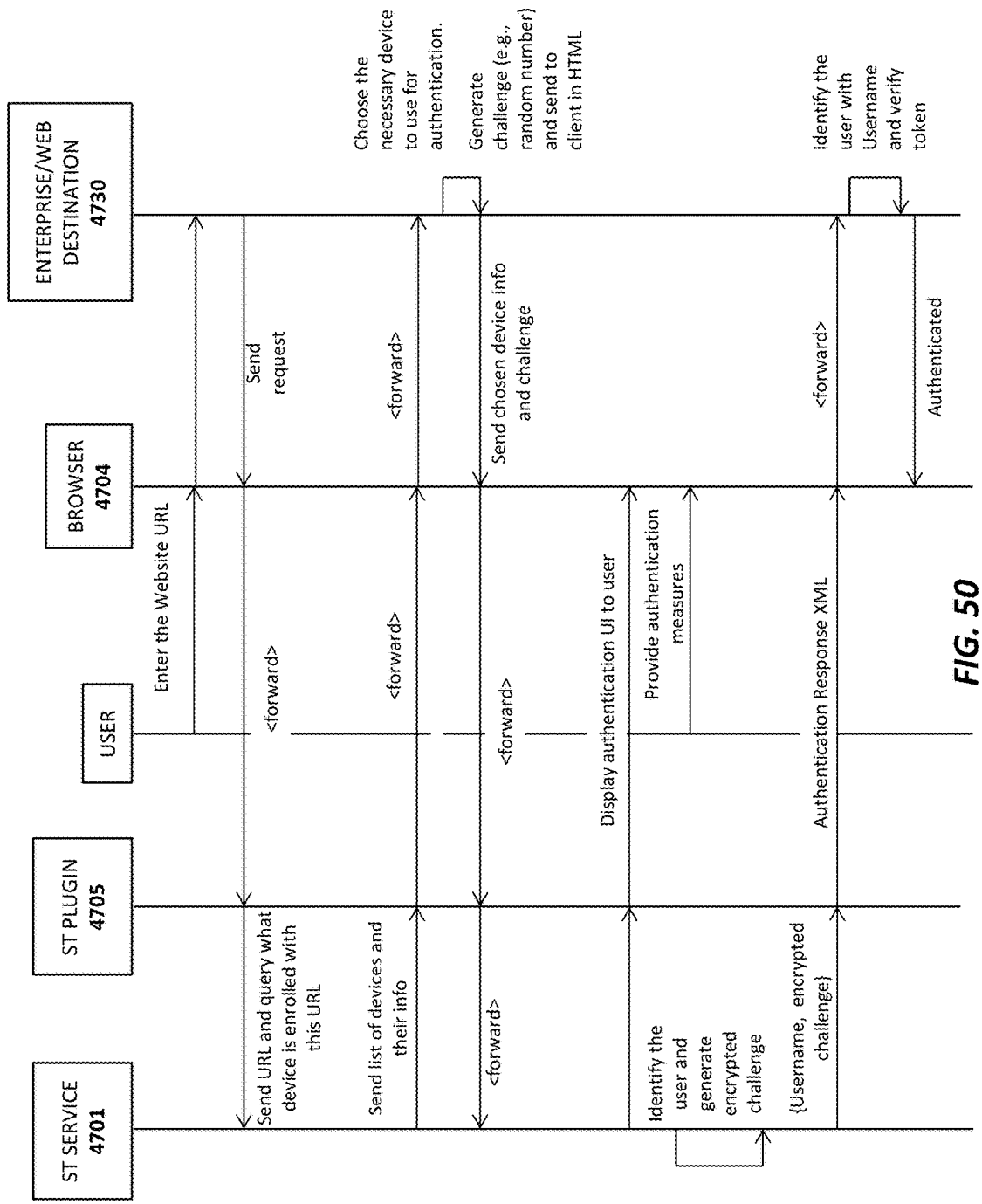
FIG. 50 is a transaction diagram showing how user authentication may be implemented within an authentication framework.
Figure 51:
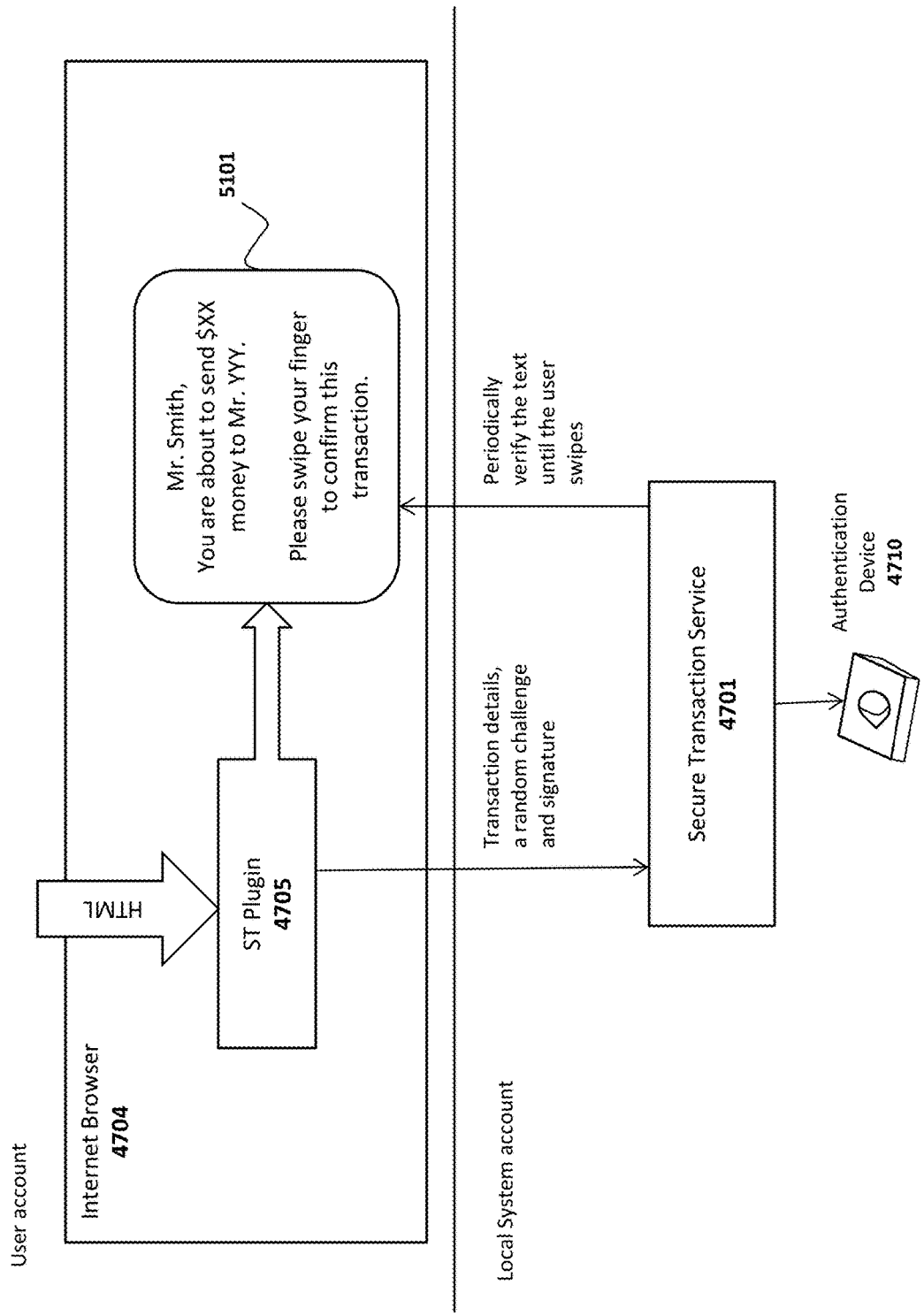
FIG. 51 is a transaction diagram showing how details of a transaction may be verified.

The operations described below include detection of authentication devices (FIG. 47); enrollment of the user with the authentication devices (FIG. 48); registration of authentication devices (FIG. 49); user authentication with the registered authentication devices (FIG. 50); and implementation of secure transactions following authentication (FIG. 51).

Figure 47:
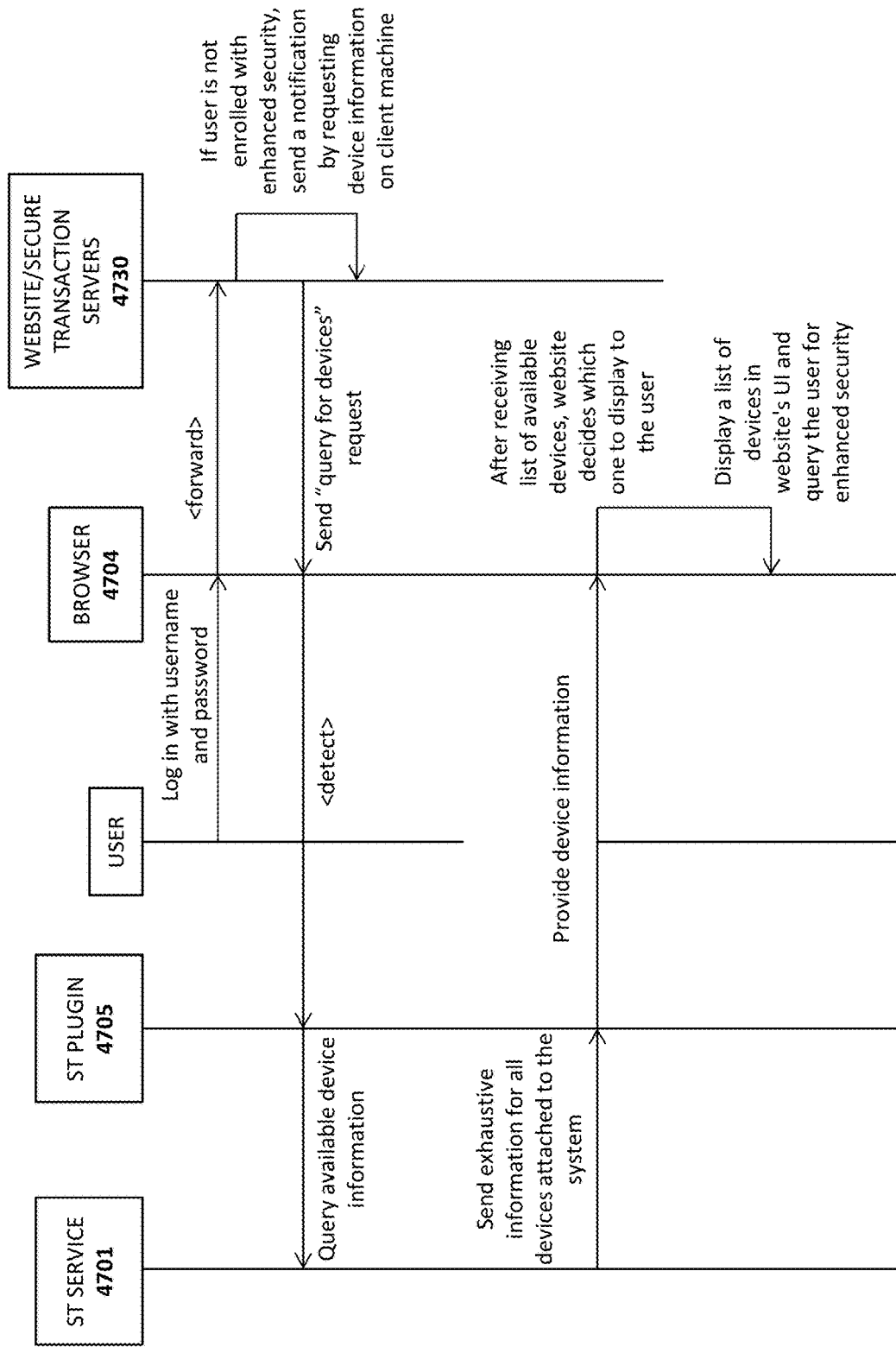
FIG. 47 is a transaction diagram showing how authentication devices on a client device may be discovered.

FIG. 47 illustrates a series of transactions for detecting authentication devices on the client machine. After device detection is successfully completed, the server 4730 possesses exhaustive information about the authentication devices attached to the client and will be able to assess which device(s) are most appropriate to use with the enhanced security infrastructure. Only the server 4730 filters the list of authentication devices. The user will be provided with this list and may choose one (or combination) of authentication devices to use for further authentication and implementation of secure transactions.

In operation, the user authenticates with username and password in browser and logs in to web site. This is the only time that the user will be required to provide a user name and password. The server 4730 determines that the user is not currently using enhanced security (e.g., by querying the secure transaction database 4720) and provides a suggestion to the user to change to enhanced security.

In one embodiment, the server 4730 includes a "query for devices" tag in an HTML page which the secure transaction plugin 4705 detects. In response to detecting the tag, the secure transaction plugin 4705 reroutes the request to the secure transaction service 4701 which then prepares exhaustive information about all authentication devices attached to the system including security characteristics of the devices. In one embodiment, the information is packaged in an XML format prior to transmission using a pre-specified data schema.

The secure transaction plugin 4705 receives this information from the secure transaction service 4701 and, in one embodiment, passes the information to the web page's JavaScript via a registered callback. It then chooses how to display the information in the browser 4704. The list, filtered by the website, may be shown to the user and the user may select one or a combination of authentication devices.

Figure 48:
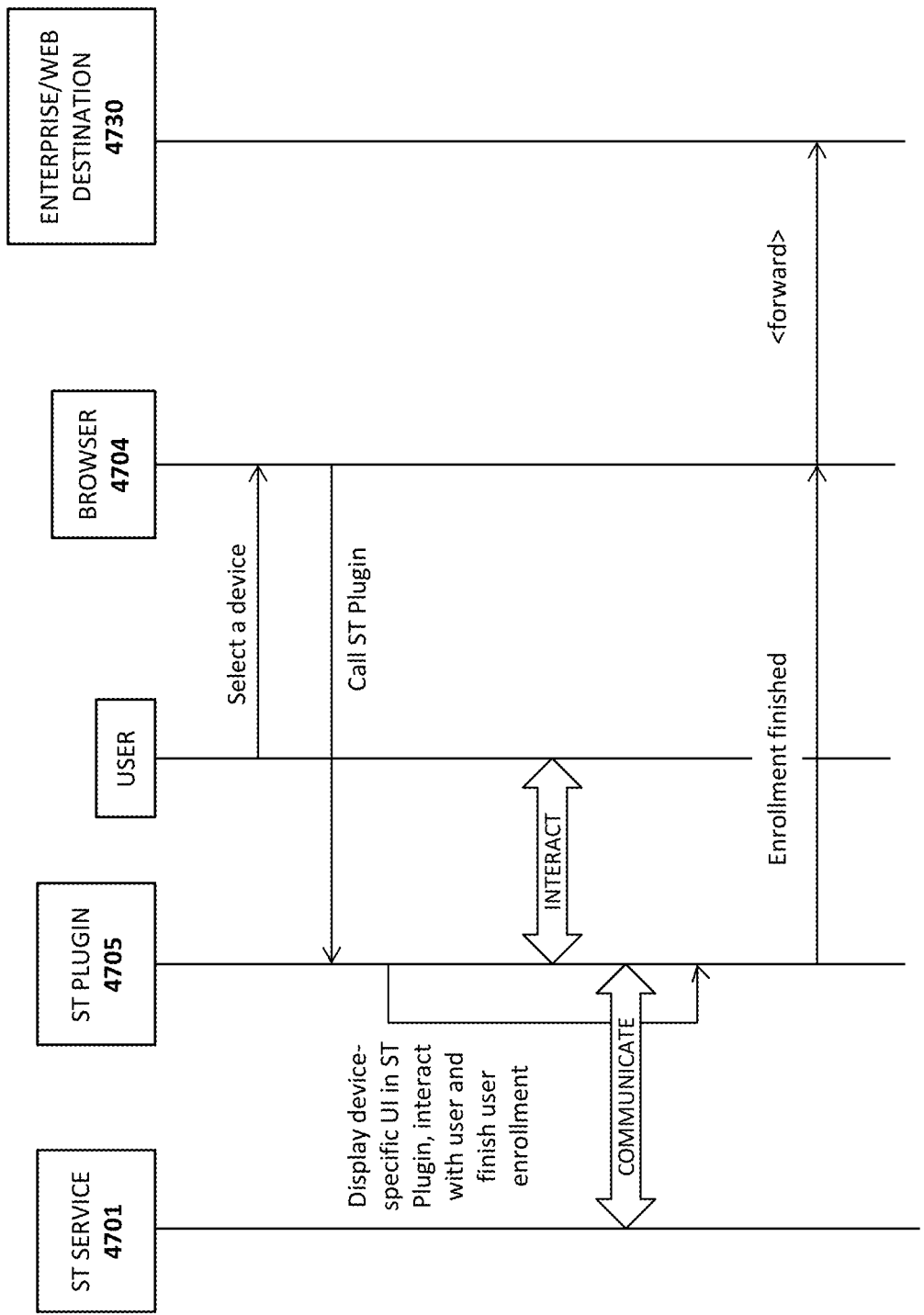
FIG. 48 is a transaction diagram showing how a user may enroll with authentication devices.

FIG. 48 illustrates a series of transactions to enroll the user with the authentication devices. In one embodiment, enrollment is a prerequisite for using the enhanced security provided by the embodiments of the invention described herein. Enrollment involves taking a biometric reading of the user (e.g., a fingerprint, voice sample, etc) so that the same authentication device can be used to authenticate the user during a subsequent transaction. The enrollment operation may be done solely on the client, without interaction with the server 4730. The user interface(s) provided for enrollment may be displayed in the browser extension or may be displayed in a separate application or mobile device app.

The enrollment operation may be initiated as soon as devices are detected. The user may choose to use one or a group of discovered devices for enhanced security. In operation, the user may select a device from the displayed device list in the browser, application or mobile device app. For the browser-based implementation illustrated in FIG. 48, the secure transaction plugin 4705 displays a device-specific enrollment graphical user interface (GUI). The secure transaction plugin 4705 transmits the device identifier and an enrollment request to secure transaction service 4701 and waits for completion. If the user is already enrolled with an authentication device on the client, the user may only need to verify their identity (i.e., they will not be required to enroll again). If the user is not currently enrolled, then the secure transaction service 101 starts the enrollment process by activating the physical authentication device (e.g., via the device interface 4702). The user then interacts with the secure transaction plugin 4705 GUI and follows the specified enrollment steps (e.g., swiping a finger, speaking into a microphone, snapping a picture, etc). Once complete, the user will be enrolled with the authentication device. Significantly, once a user is enrolled with a device, they may use this enrollment to register or authenticate with any website or network service as described herein.

Figure 49:
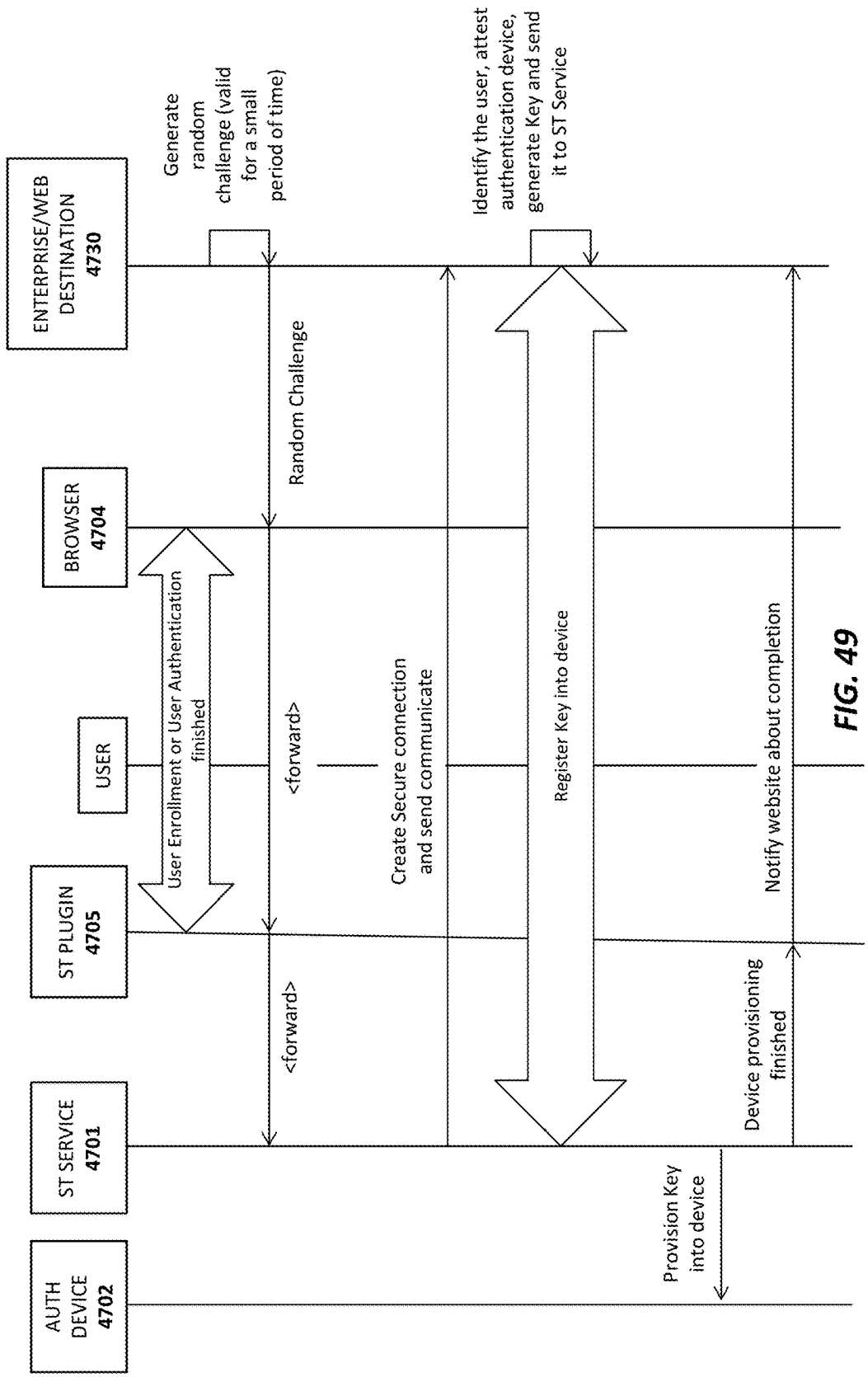
FIG. 49 is a transaction diagram showing how keys may be registered into authentication devices.

FIG. 49 illustrates a series of transactions for registration of authentication devices. During registration, a key is shared between the authentication device and one of the secure transaction servers 4732-4733. The key is stored within the secure storage 4720 of the client 4700 and the secure transaction database 4720 used by the secure transaction servers 4732-4733. In one embodiment, the key is a symmetric key generated by one of the secure transaction servers 4732-4733. However, in another embodiment discussed below, asymmetric keys may be used. In this embodiment, the public key may be stored by the secure transaction servers 4732-4733 and a second, related private key may be stored in the secure storage 4720 on the client. Moreover, in one embodiment (also discussed below), the key(s) may be generated on the client 4700 (e.g., by the authentication device or the authentication device interface rather than the secure transaction servers 4732-4733).

A secure key provisioning protocol such as the Dynamic Symmetric Key Provisioning Protocol (DSKPP) may be used to share the key with the client over a secure communication channel (see, e.g., Request for Comments (RFC) 6063). However, the underlying principles of the invention are not limited to any particular key provisioning protocol.

Turning to the specific details shown in FIG. 49, once the user enrollment or user authentication is complete, the server 4730 generates a randomly generated challenge (e.g., a cryptographic nonce) that must be presented by the client during device registration. The random challenge may be valid for a limited period of time. The secure transaction plugin detects the random challenge and forwards it to the secure transaction service 4701. In response, the secure transaction service initiates an out-of-band session with the server 4730 (e.g., an out-of-band transaction) and communicates with the server 4730 using the key provisioning protocol. The server 4730 locates the user with the user name, validates the random challenge, validates the device's authentication code if one was sent, and creates a new entry in the secure transaction database 4720 for the user. It may also generate the key, write the key to the database 4720 and send the key back to the secure transaction service 4701 using the key provisioning protocol. Once complete, the authentication device and the server 4730 share the same key if a symmetric key was used or different keys if asymmetric keys were used.

FIG. 50 illustrates a series of transactions for user authentication with the registered authentication devices. Once device registration is complete the server 4730 will accept a token generated by the local authentication device as a valid authentication token.

Turning to the specific details shown in FIG. 50, which shows a browser-based implementation, the user enters the uniform resource locator (URL) of the server 4730 in the browser 4704. In an implementation which uses a stand alone application or mobile device app (rather than a browser), the user may enter a network address for a network service or the application or app may automatically attempt to connect to the network service at the network address.

For a browser-based implementation, the website embeds a query for registered devices in the HTML page. This may be done in many ways other than embedding the query in an HTML page, such as through Javascript or using HTTP headers. The secure transaction plugin 4705 receives the URL and sends it to secure transaction service 4701, which searches the looks into the secure storage 4720 (which, as discussed, includes a database of authentication device and user information) and determines whether there is a user enrolled within this URL. If so, the secure transaction service 4701 sends a list of provisioned devices associated with this URL to the secure transaction plugin 4705. The secure transaction plugin then calls the registered JavaScript API and passes this information to the server 4730 (e.g., the website). The server 4730 chooses the appropriate device from the sent device list, generates a random challenge and sends the device information, and argument back to the client. The website displays the corresponding user interface and asks for authentication from the user. The user then provides the requested authentication measure (e.g., swiping a finger across the fingerprint reader, speaking for voice recognition, etc). The secure transaction service 4701 identifies the user (this step can be skipped for devices which don't support storing users), obtains the username from the database, generates an authentication token using the key and sends this information to the website via the secure transaction plugin. The server 4730 identifies the user from the secure transaction database 4720 and verifies the token by generating the same token on the server 4730 (e.g., using its copy of the key). Once verified, the authentication process is complete.

FIG. 51 illustrates a secure transaction following authentication for a browser-based implementation. The secure transaction is designed to provide stronger security for certain types of transactions (e.g., financial transactions). In the illustrated embodiment, the user confirms each transaction prior to committing the transaction. Using the illustrated techniques, the user confirms exactly what he/she wants to commit and commits exactly what he/she sees displayed in the GUI. In other words, this embodiment ensures that the transaction text cannot be modified by a "man in the middle" to commit a transaction which the user did not confirm.

In one embodiment, the secure transaction plugin 4705 displays a window 5101 in the browser context to show the transaction details. The secure transaction server 4701 periodically (e.g., with a random interval) verifies that the text that is shown in the window is not being tampered by anyone.

The following example will help to highlight the operation of this embodiment. A user chooses items for purchase from a merchant site and selects "check out." The merchant site sends the transaction to a service provide which has a secure transaction server 4732-4733 implementing one or more of the embodiments of the invention described herein (e.g., PayPal). The merchant site authenticates the user and completes the transaction.

The secure transaction server 4732-4733 receives the transaction details (TD) and puts a "Secure Transaction" request in an HTML page and sends to client 4700. The Secure Transaction request includes the transaction details and a random challenge (e.g., a random nonce). The secure transaction plugin 4705 detects the request for transaction confirmation message and forwards all data to the secure transaction service 4701. In an embodiment which does not use a browser or plugin, the information may be sent directly from the secure transaction servers to the secure transaction service on the client 4700.

For a browser-based implementation, the secure transaction plugin 4705 displays a window 5101 with transaction details to the user (in a browser context) and asks the user to provide authentication to confirm the transaction. In an embodiment which does not use a browser or plugin, the secure transaction service 4701 or application 4754 may display the window 5101. The secure transaction service 4701 starts a timer and verifies the content of the window 5101 being displayed to the user. The period of verification may be randomly chosen. The secure transaction service 4701 ensures that user sees the valid transaction details in the window 5101. If it detects that the content has been tampered with it prevents the confirmation token from being generated.

After the user provides valid authentication (e.g., swipes a finger on the fingerprint sensor), the device identifies the user and generates a token (cryptographic signature) with the transaction details and the random challenge (i.e., the token is calculated over the transaction details and the nonce). This allows the secure transaction server 4732-4733 to ensure that the transaction details have not been modified between the server and the client. The secure transaction service 4701 sends the generated token and username to the secure transaction plugin 4705 which forwards the token to the secure transaction server 4732-4733. The secure transaction server 4732-4733 identifies the user with the username and verifies the token. If verification succeeds, a confirmation message is sent to the client and the transaction is processed.

System and Method for a Secure Query Policy to Determine Client Authentication Capabilities As mentioned, one embodiment of the invention implements a query policy in which a secure transaction server transmits a server policy to the client indicating the authentication capabilities accepted by the server. The client then analyzes the server policy to identify a subset of authentication capabilities which it supports and/or which the user has indicated a desire to use. The client then registers and/or authenticates the user using the subset of authentication tokens matching the provided policy. Consequently, there is a lower impact to the client's privacy because the client is not required to transmit exhaustive information about its authentication capabilities (e.g., all of its authentication devices) or other information which might be used to uniquely identify the client.

By way of example, and not limitation, the client may include numerous authentication capabilities such as a fingerprint sensor, voice recognition capabilities, facial recognition capabilities, eye/optical recognition capabilities, a trusted platform module (TPM), and smartcard, to name a few. However, for privacy reasons, the user may not wish to divulge the details for all of its capabilities to a requesting server. Thus, using the techniques described herein, the secure transaction server may transmit a server policy to the client indicating that it supports, for example, fingerprint, optical, or smartcard authentication. The client may then compare the server policy against its own authentication capabilities and choose one or more of the available authentication options.

Figure 52:
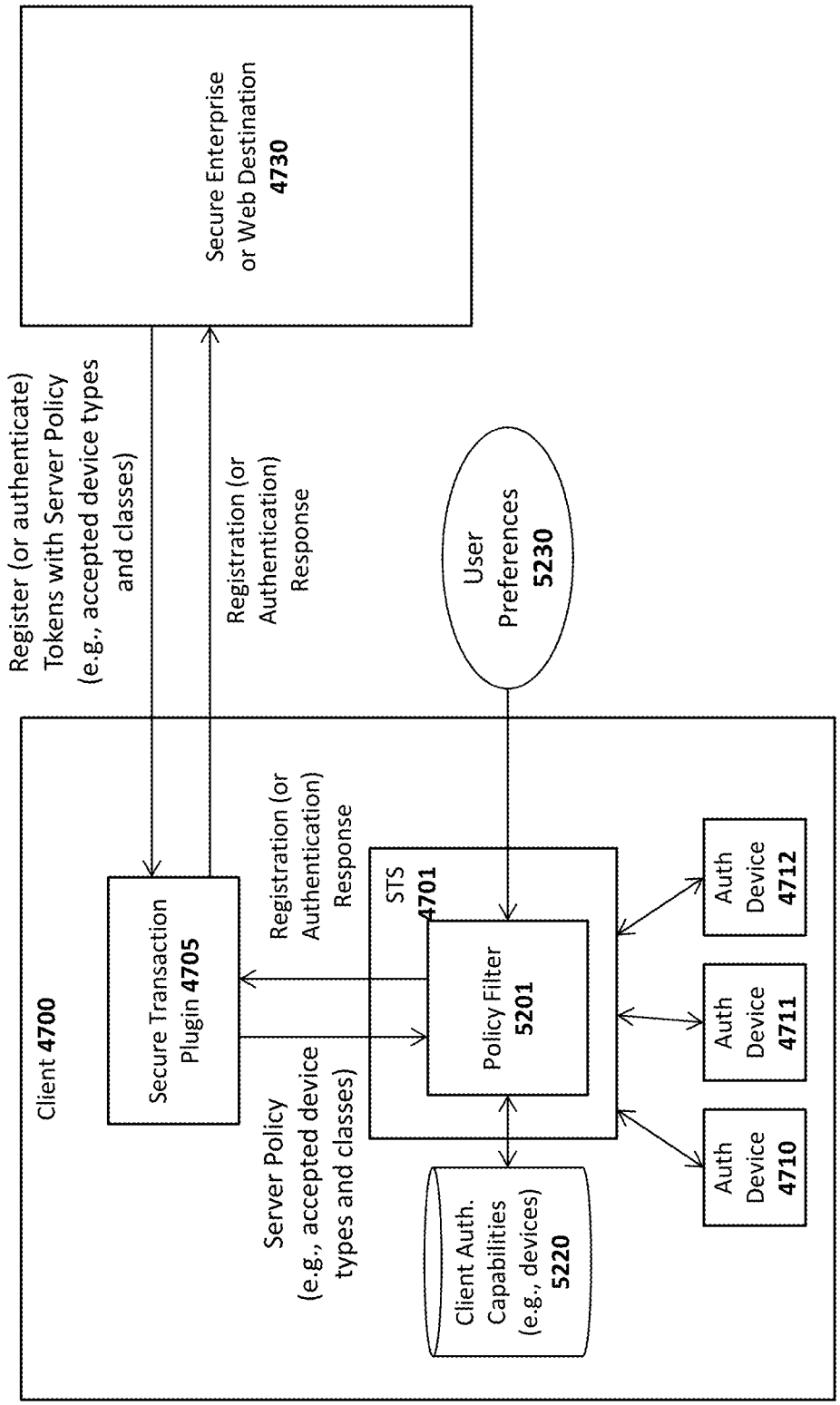
FIG. 52 illustrates a query policy filter implemented in accordance with one embodiment of the invention.

FIG. 52 illustrates one embodiment of a client-server architecture for implementing these techniques. As illustrated, the secure transaction service 4701 implemented on the client 4700 includes a policy filter 5201 for analyzing the policy provided by the server 4730 and identifying a subset of authentication capabilities to be used for registration and/or authentication. In one embodiment, the policy filter 5201 is implemented as a software module executed within the context of the secure transaction service 4701. It should be noted, however, that the policy filter 5201 may be implemented in any manner while still complying with the underlying principles of the invention and may include software, hardware, firmware, or any combination thereof.

The particular implementation shown in FIG. 52 includes a secure transaction plugin 4705 for establishing communication with the secure enterprise or Web destination 4730 (sometimes referred to simply as "server 4730") using techniques previously discussed. For example, the secure transaction plugin may identify a specific HTML tag inserted into the HTML code by a web server 4731. Thus, in this embodiment, the server policy is provided to the secure transaction plugin 4705 which forwards it to the secure transaction service 4701 implementing the policy filter 5201.

The policy filter 5201 may determine the client authentication capabilities by reading the capabilities from the client's secure storage area 5220. As previously discussed, the secure storage 5220 may comprise a repository of all of the client's authentication capabilities (e.g., identification codes for all of the authentication devices). If the user has already enrolled the user with its authentication devices, the user's enrollment data is stored within the secure storage 5220. If the client has already registered an authentication device with a server 4730, then the secure storage may also store an encrypted secret key associated with each authentication device.

Using the authentication data extracted from the secure storage 5220 and the policy provided by the server, the policy filter 5201 may then identify a subset of authentication capabilities to be used. Depending on the configuration, the policy filter 5201 may identify a complete list of authentication capabilities supported by both the client and the server or may identify a subset of the complete list. For example, if the server supports authentication capabilities A, B, C, D, and E and the client has authentication capabilities A, B, C, F, and G, then the policy filter 5201 may identify the entire subset of common authentication capabilities to the server: A, B, and C. Alternatively, if a higher level of privacy is desired, as indicated by user preferences 5230 in FIG. 52, then a more limited subset of authentication capabilities may be identified to the server. For example, the user may indicate that only a single common authentication capability should be identified to the server (e.g., one of A, B or C). In one embodiment, the user may establish a prioritization scheme for all of the authentication capabilities of the client 4700 and the policy filter may select the highest priority authentication capability (or a prioritized set of N authentication capabilities) common to both the server and the client.

Depending on what operation has been initiated by server 4730 (Registration or Authentication), the secure transaction service 4730 performs that operation on the filtered subset of authentication devices (4710-4712) and sends the operation response back to server 4730 via the secure transaction plugin 4705 as shown in FIG. 52. Alternatively, in an embodiment which does not rely on a plugin 4705 component of a Web browser, the information may be passed directly from the secure transaction service 4701 to the server 4730.

Figure 53:
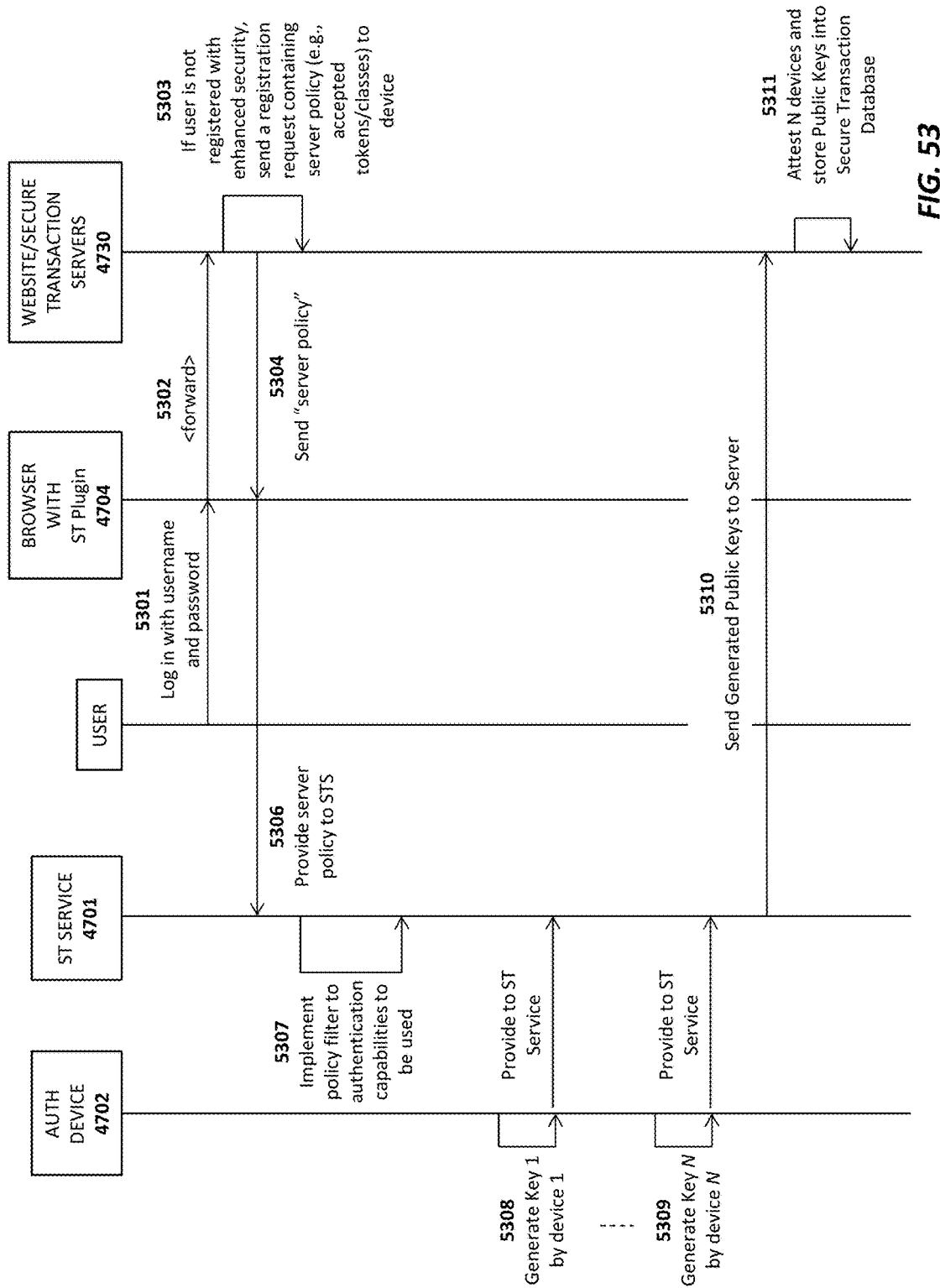
FIG. 53 is a transaction diagram showing how a registration operation with query policy is implemented in one embodiment of the invention.

FIG. 53 illustrates a transaction diagram showing additional details for an exemplary series of registration with query policy transaction. In the illustrated embodiment, the user has not previously registered devices with the server 4730. Consequently, at 5301 the user may enter a user name and password as an initial, one-time authentication step, which is forwarded at 5302 to the server 4730 via the client browser 4704. It should be noted, however, that a user name and password are not required for complying with the underlying principles of the invention.

Because the user has not previously registered with enhanced security, determined at 5303, the server 4730 transmits its server policy to the client at 5304. As mentioned, the server policy may include an indication of the authentication capabilities supported by the server 4730. In the illustrated example, the server policy is passed to the secure transaction service 4701 via transaction 5306.

At transaction 5307, the secure transaction service 4701 compares the server policy with the capabilities of the client (and potentially other information such as device priority scheme and/or user preferences as described above) to arrive at a filtered list of authentication capabilities. The filtered list of devices (4702) then generate keys (5308 and 5309) and then provide public parts of these keys to secure transaction service 4701 which in its turn sends these as registration response back to server 4730. The server attests the authentication devices and stores public keys in secure transaction database. The Token Attestation employed here is the process of validating authentication device identity during registration. It allows server to cryptographically make sure that the device reported by Client is really who it claimed to be.

Alternatively, or in addition, at 5307, the user may be provided with an opportunity to review the list and/or select specific authentication capabilities to be used with this particular server 4730. For example, the filtered list may indicate the option to use authentication with a fingerprint scan, facial recognition, and/or voice recognition. The user may then choose to use one or more of these options when authenticating with the server 4730.

The techniques described above for filtering a server policy at a client may be implemented at various different stages of the series of transactions described above (e.g., during device discovery, device registration, device provisioning, user authentication, etc). That is, the underlying principles of the invention are not limited to the specific set of transactions and the specific transaction ordering set forth in FIG. 53.

Moreover, as previously mentioned, a browser plugin architecture is not required for complying with the underlying principles of the invention. For an architecture which does involve a browser or browser plug-ins (e.g., such as a stand-alone application or mobile device app), the transaction diagram shown in FIG. 53 (and the rest of the transaction diagrams disclosed herein) may be simplified such that the browser 4704 is removed, and the secure transaction service 4701 communicates directly with the server 4730.

System and Method for Efficiently Enrolling, Registering, and Authenticating with Multiple Authentication Devices One embodiment of the invention is capable of enrolling, registering, and authenticating multiple devices at the same time, thereby improving efficiency and the user experience. For example, instead of requesting registration and authentication for a single device at a time, a list of devices may be sent to the client. Symmetric or asymmetric keys may then be registered into multiple devices in one operation, or series of sequential operations executed locally on the client. For authentication, several tokens/devices may be selected concurrently for a given transaction.

Figure 54:
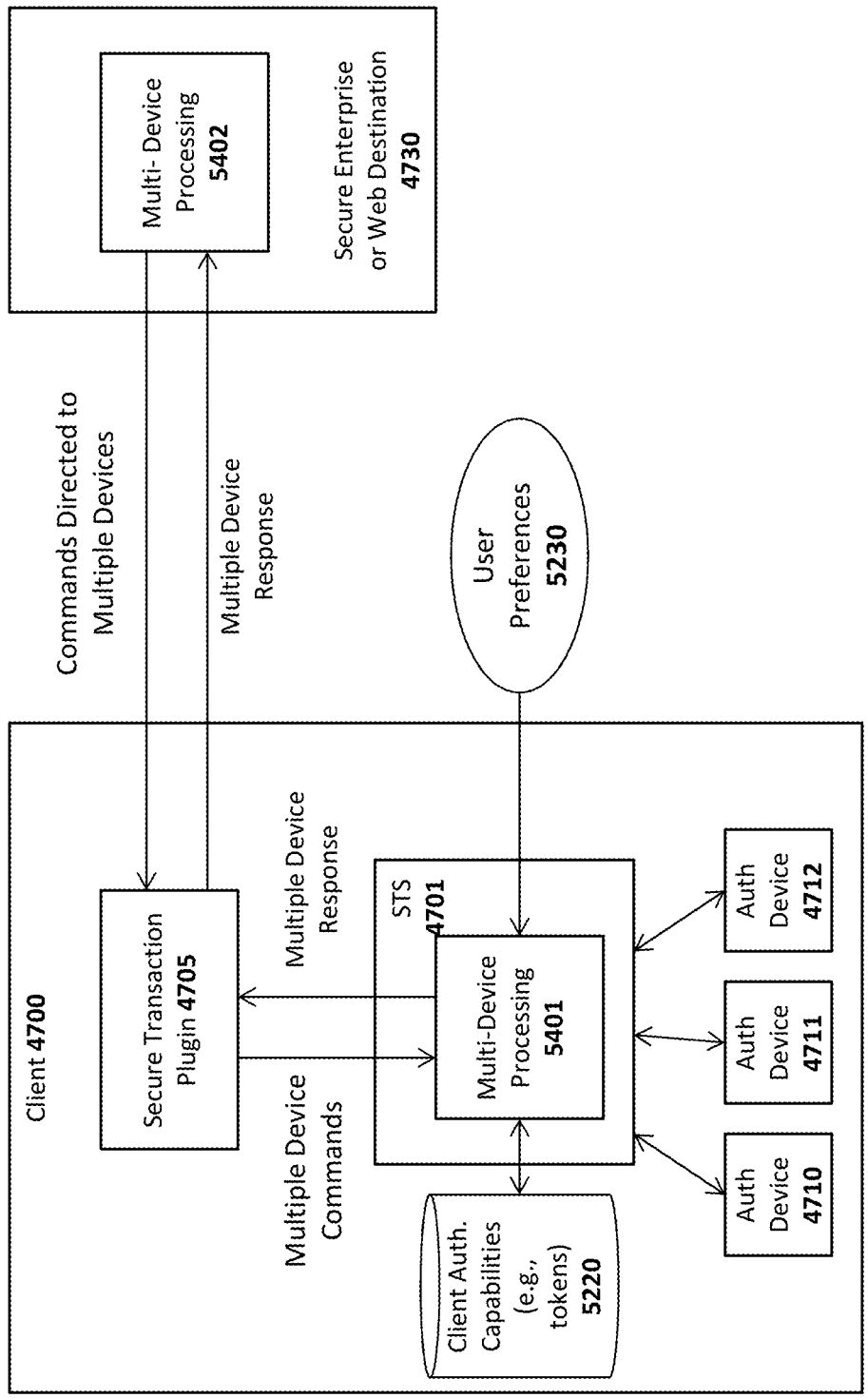
FIG. 54 illustrates one embodiment of an architecture for implementing multiple authentication device processing.

FIG. 54 illustrates one embodiment of a client-server architecture for implementing these techniques. As illustrated, the secure transaction service 4701 implemented on the client 4700 includes multi-device processing logic 5401 for performing specified operations such as enrollment and registration of multiple devices at a time without the need for continual back-and-forth communication with the server 4730 as each device is enrolled/registered. Similarly, the server 4730 includes multi-device processing logic for issuing commands directed to multiple authentication devices. In one embodiment, the multi-device processing logic 5401 is implemented as a software module executed within the context of the secure transaction service 4701. It should be noted, however, that the multi-device processing logic 5401 may be implemented in any manner while still complying with the underlying principles of the invention and may include software, hardware, or firmware components, or any combination thereof.

As in the embodiments described above, the particular implementation shown in FIG. 54 includes secure transaction plugin 4705 for establishing communication with the server 4730 (which, as discussed, may include a Website server 4731 and secure transaction servers 4732-4733). Thus, the server 4730 communicates with the secure transaction service 4701 via the secure transaction plugin 4705. As mentioned, however, a browser-based plugin architecture is not required for complying with the underlying principles of the invention.

The multi-device processing logic 5402 on the server 4730 may communicate commands to be executed by the multi-device processing logic 5401 on the client 4700 which performs the operations on multiple authentication devices 4710-4712. By way of example, the multi-device processing logic 5402 may generate N keys to be registered with each of N authentication devices and then transmit securely to the multi-device processing logic 5401 along with a command to register the N devices. The multi-device processing logic 5401 may then perform the registration concurrently or in a series of sequential operations for all N devices (e.g., for authentication devices 4710-4712) without further interaction with the server. A single response may then be sent to the server 4730 to indicate the completed registration of all N devices.

Figure 55A:
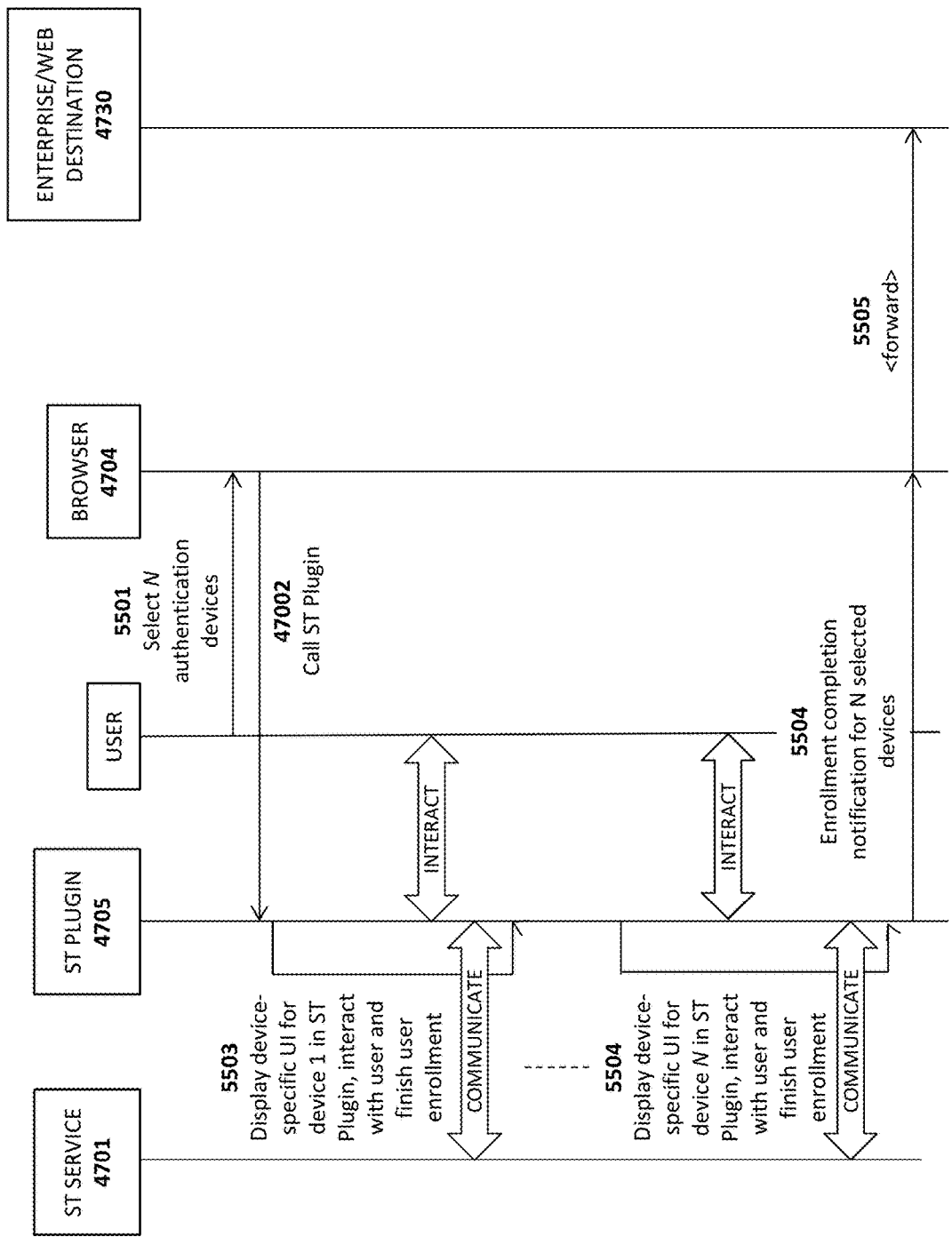
FIGS. 55A-C illustrate three embodiments of the invention for multiple authentication device processing.
Figure 55B:
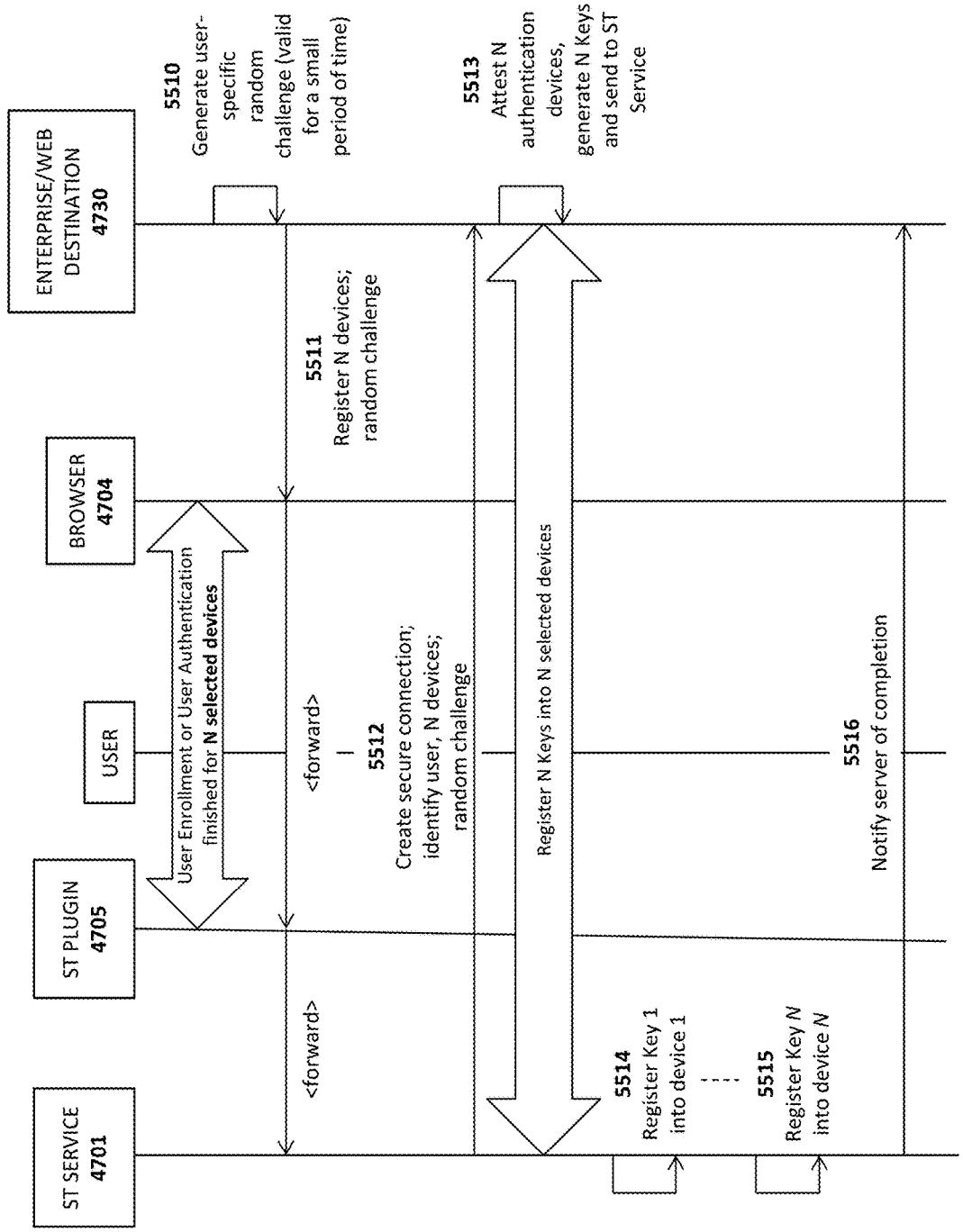
Figure 55C:
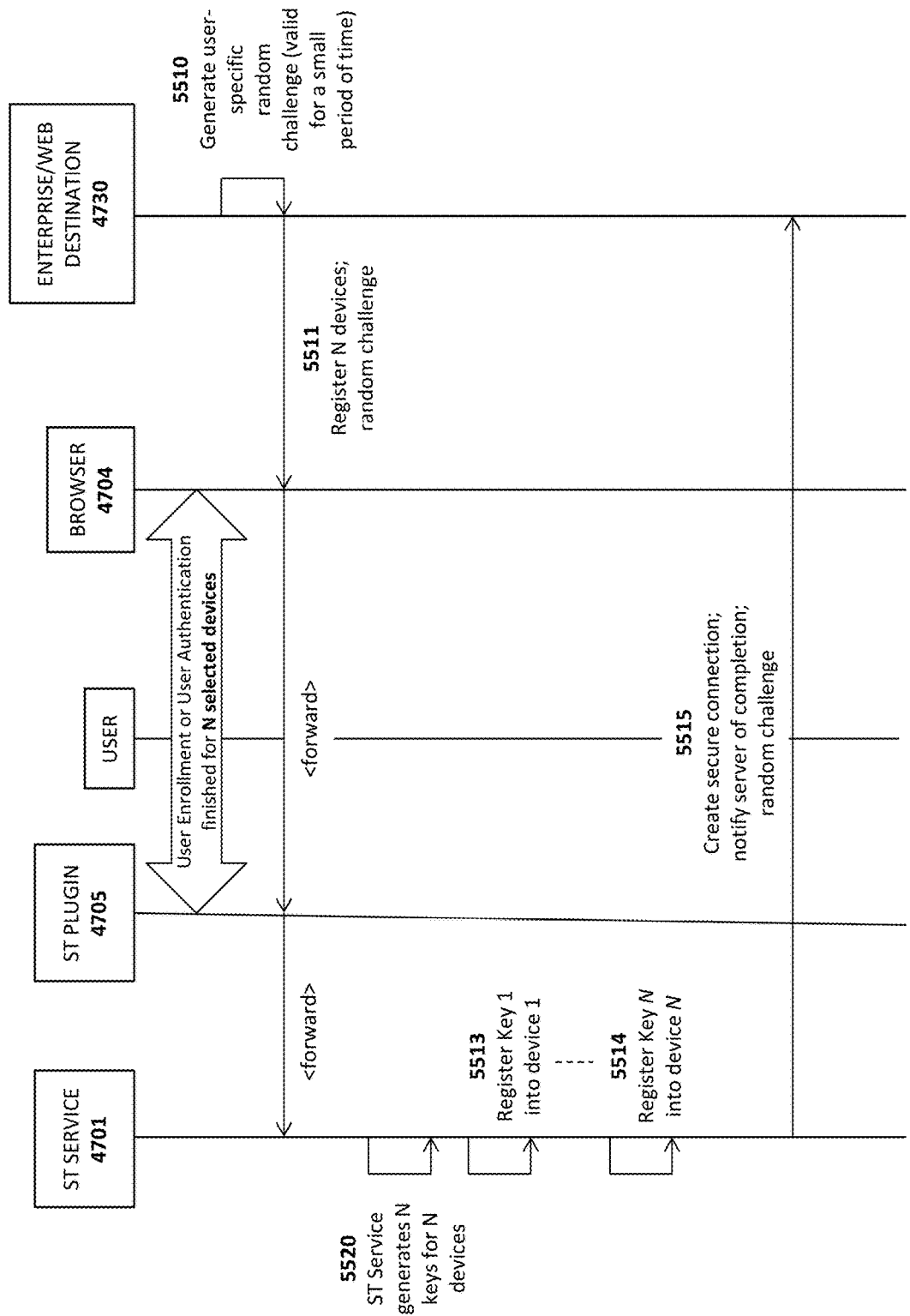

A series of exemplary multiple-device transactions are illustrated in FIGS. 55A-C. FIG. 55A illustrates a multiple-device enrollment process which may be performed without any interaction with the server 4730 (e.g., enrolling the user with authentication devices may be performed under the control of the secure transaction service 4701 on the client). In an alternate embodiment, the server 4730 may transmit a request to the client (now shown) to enroll the user with the N devices. FIGS. 55B-C illustrate two different embodiments for registering multiple devices with the server 4730.

Turning to the enrollment process in FIG. 55A, at 5501, the user indicates a desire to enroll with N authentication devices on the client (representing all or a subset of the available authentication devices). In response, the secure transaction plugin is called at 5502 and, at 5503, a device-specific graphical user interface (GUI) is generated to walk the user through the process or enrolling with authentication device #1. During the enrollment process, the user interacts with the secure transaction plugin as indicated (e.g., by positioning a finger over a fingerprint sensor, speaking into a microphone, snapping a picture with the camera, etc). In one embodiment, enrollment is performed for each of the N devices until enrollment is completed for the Nth device at 5504. A different, device-specific script and/or user interface may be presented to the user to enroll the user with each individual authentication device. As previously discussed, as the user enrolls with each device, the user enrollment data may be stored within the secure storage 720 on the client 4700 and made accessible only through the secure transaction service 4701. Once enrollment for all N devices is complete, a notification may be sent to the server 4730 via transactions 5504-5505.

Regardless of how enrollment is performed, once completed, the transaction diagram shown in FIG. 55B may be used to register the N devices with the server 4730. At 5510 the server 4730 generates a user-specific random challenge which, as previously described, may only be valid for a limited window of time and may comprise a randomly-generated code such as a cryptographic nonce. At 5511, the random challenge is transmitted along with a command to register N authentication devices with the server 4730. At 5512, the secure transaction service 4701 creates a secure connection with the server 4730 and transmits identification data for the N devices, along with the random challenge. In one embodiment, the secure connection is an HTTPS connection. However, the underlying principles of the invention are not limited to any particular secure connection type.

At 5513, the server 4730 attests the N devices, generates a key for each of the N devices, and sends the N keys back to the secure transaction service over the secure connection. In one embodiment, the Dynamic Symmetric Key Provisioning Protocol (DSKPP) is used to exchange keys with the client over the secure connection. However, the underlying principles of the invention are not limited to any particular key provisioning techniques. Alternatively, in an embodiment which does not rely on DSKPP protocol, the keys may be generated in each Authentication Device and then transmitted to server 4730.

At 5514-5515, the multi-device processing logic of the secure transaction service registers each of the N keys into each of the N devices. As previously described, each key may be stored and associated with its respective device within the secure storage 720 on the client. Once registration is complete for each authentication device, a notification is sent to the server over the secure connection at 5516.

In one embodiment, the keys registered into each authentication device are symmetric keys. Thus, an identical copy of each key is stored in the secure storage 720 on the client and the secure transaction database 4720 on the server 4730. In an alternate implementation, asymmetric key pairs may be generated, with one of the keys being maintained as a public key in the secure transaction database 4720 on the server and the private key being stored in the secure storage 720 of the client. It should be noted, however, that the underlying principles of the invention are not limited to any particular type of encryption keys.

An alternate implementation is illustrated in FIG. 55C in which keys are generated on the client rather than the server 4730. In this implementation, after receiving the request to register devices with the random challenge at 5511, the multi-device processing logic of the secure transaction service 4701 generates N keys for each of the N devices at 1120. Once generated, the keys are registered with each of the N devices at 5513-5514 and the registration stored within the secure storage 720 as previously described. Once all keys have been registered, the secure transaction service 4701 provides a notification to the server at 5515 along with the random challenge (to verify the identity of the client). The server 4730 may then store the registration in the secure transaction database 4720 as described above.

System and Method for Processing Random Challenges Within an Authentication Framework One embodiment of the invention improves the manner in which random challenges are generated by the server and processed. In one embodiment, the random challenge comprises a randomly generated code such as a cryptographic nonce. In current systems, after a server transmits a random challenge to the client, if the client does not respond within a specified timeout period, the random challenge is no longer valid and the client will receive an error in response to a subsequent authentication attempt (e.g., the user will swipe a finger on the fingerprint reader and be denied).

In one embodiment of the invention, the client automatically detects that the challenge has expired and transparently requests a new challenge from the server (i.e., without user intervention). The server then generates a new random challenge and transmits it to the client which may then use it to establish secure communication with the server. The end user experience is improved because the user does not receive an error or denial of an authentication request.

Figure 56A:
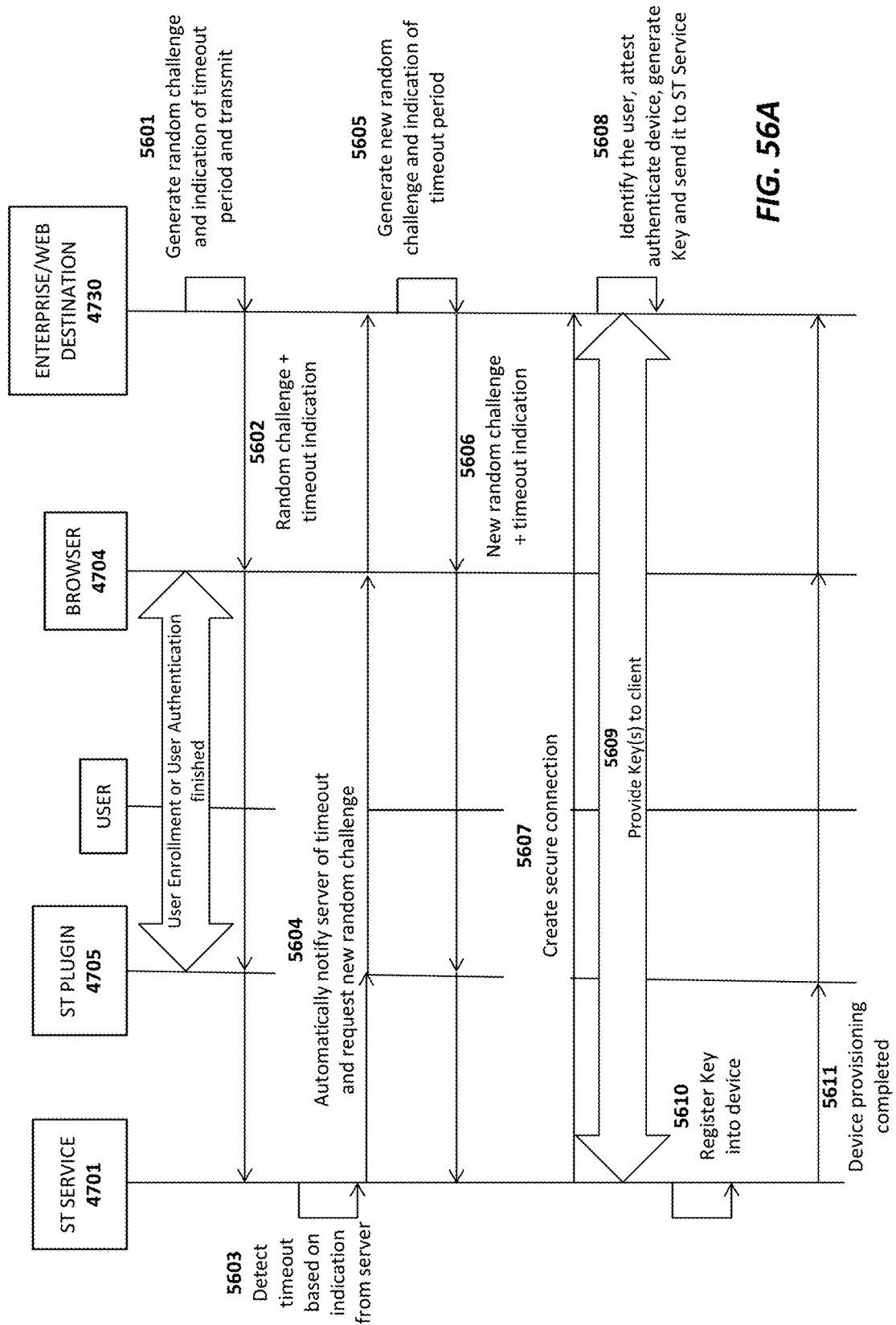
FIG. 56A-B illustrate a transaction diagram for detecting and responding to a random challenge timeout.
Figure 56B:
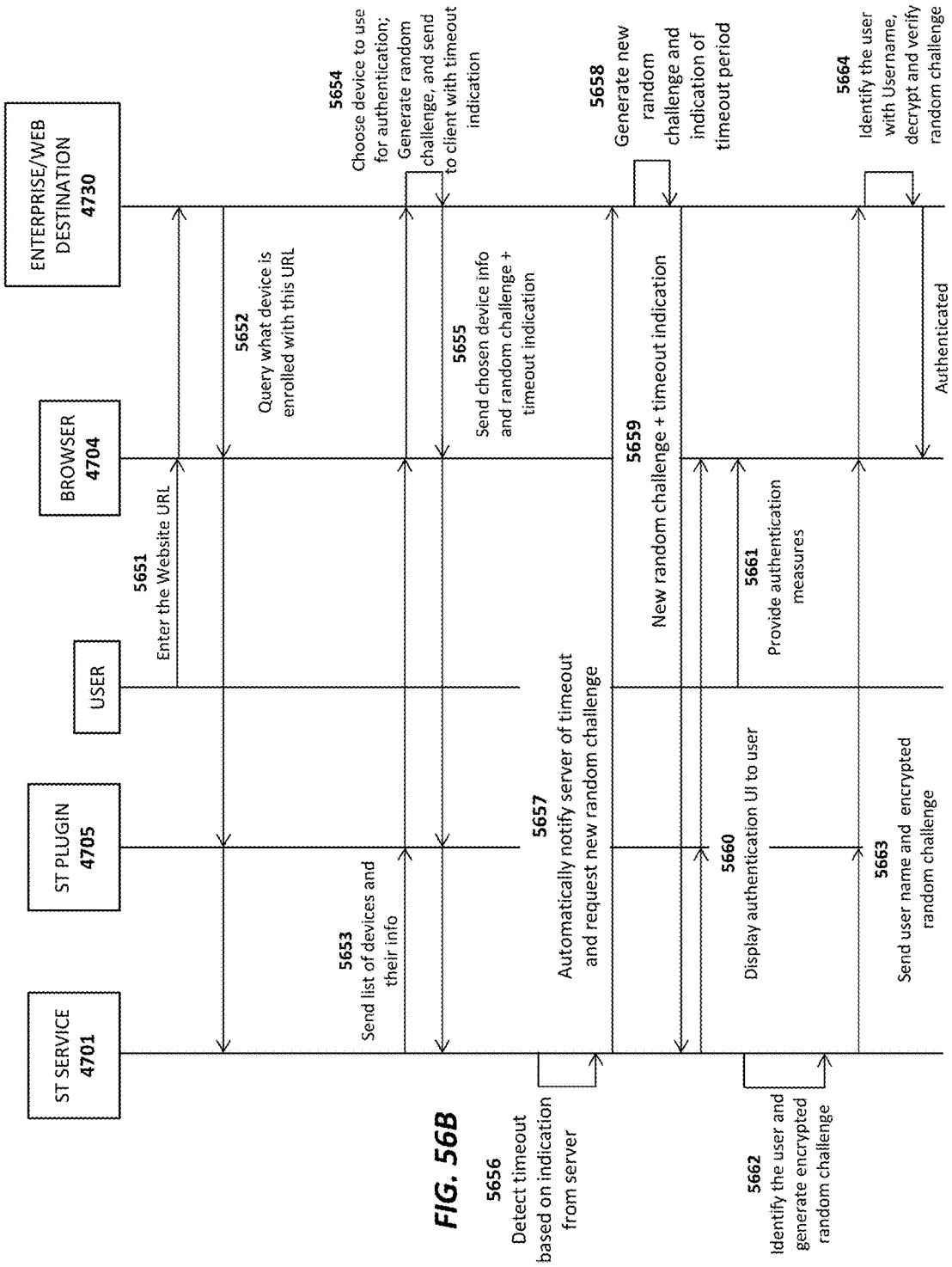

FIG. 56A illustrates one such embodiment which is used within the context of a registration process and FIG. 56B illustrates an embodiment which is used within the context of an authentication process. It should be noted, however, that the underlying principles of the invention may be employed in other contexts than those shown in FIGS. 56A-B. For example, the techniques described herein may be used with any process in which a time-sensitive code is communicated from a server to a client.

Turning first to FIG. 56A, at 5601, the server 4730 generates a random challenge and an indication of a timeout period. In one embodiment, the timeout period comprises a period of time for which the random challenge is considered valid. After the timeout period has elapsed, the random challenge is no longer considered valid by the server 4730. In one embodiment, the timeout period is specified simply as a point in time at which the random challenge will no longer be valid. Once this point in time is reached, the random challenge is invalid. In another embodiment, the timeout period is specified by using a current timestamp (i.e., the time at which the random challenge is generated by the server 4730) and a duration. The secure transaction service 4701 may then calculate the timeout time by adding the duration value to the timestamp to calculate the point in time when the random challenge becomes invalid. It should be noted, however, that the underlying principles of the invention are not limited to any specific technique for calculating the timeout period.

Regardless of how the timeout period is specified or calculated, at 5602 the random challenge and the timeout indication are transmitted to the secure transaction service 4701 (via the browser 4704 and secure transaction plugin 4705 in the illustrated example). At 5603, the secure transaction service 4701 detects that the random challenge has timed out and is no longer valid based on the timeout indication sent from the server 4730. By way of example, the user may have turned off his/her client machine or closed the lid on his/her notebook computer prior to completing the series of transactions. If the transaction is one which requires user interaction, the user may have simply walked away or ignored a message displayed within the GUI.

At 5604, upon detecting that the random challenge is no longer valid, the secure transaction service 4701 transmits a request for a new random challenge to the server 4730 (via the secure transaction plugin 4705 and browser 4704 in the illustrated example). At 5605, the server 4730 generates a new random challenge an a new indication of the timeout period. In one embodiment, the timeout period is the same as in operation 5601 or may be modified. For example, the server 4730 may increase the duration of the timeout period to reduce data traffic with the client or decrease the duration to increase the level of security provided by the random challenge. At 5606, the new random challenge and timeout indication is transmitted to the secure transaction service 4701.

The remainder of the transactions occurs as previously described. For example, the secure transaction service opens a secure connection directly to the server at 5607 in order to perform device registration and key exchange as discussed above with respect to FIG. 49, FIG. 55B, or FIG. 55C. At 5608, the server 4730 identifies the user (e.g., with a user name or other ID), attests authentication device, and generates a key for the device. As mentioned, the key may be a symmetric key or an asymmetric key. At 5609, the keys are transmitted to the secure transaction service 4701 via the secure connection and, at 5610, the secure transaction service 4701 registers the key into the authentication device. At 5611, a notification that registration is complete is transmitted to the server 4730.

Thus, in the embodiment shown in FIG. 56A, the key used for device registration is generated at the server 4730 as in the embodiment shown in FIG. 55B. However, the underlying principles of the invention may also be used in an embodiment in which the key(s) are generated by the secure transaction service 4701 on the client 4700, such as that described above with respect to FIG. 55C.

FIG. 56B illustrates one embodiment of the invention implemented within the context of an authentication process. At 5651, the user enters a particular website URL into the browser 4704 and is directed to the web server 4731 within the enterprise/web destination servers 4730 which includes the secure transaction servers 4732-4733. At 5652, a query is sent back to the secure transaction service (via the browser and plugin) to determine which device(s) are registered with the website's URL. The secure transaction service 4701 queries the secure storage 720 on the client 4700 to identify a list of devices which are sent back to the server 4730 at 5653. At 5654, the server 5654 chooses a device to use for authentication, generates a random challenge and a timeout indication and, at 5655, sends this information back to the secure transaction service 4701.

At 5656, the secure transaction service 5656 automatically detects that the random challenge is no longer valid upon reaching the end of the timeout period. As mentioned above, various different techniques may be employed for indicating and detecting the end of the timeout period (see FIG. 56A and associated text). Upon detecting the expiration of the random challenge, at 5657, the secure transaction service 4701 transparently (i.e., without user intervention) notifies the server 4730 and requests a new random challenge. In response, at 5658, the server 4730 generates a new random challenge and a new indication of the timeout period. As mentioned, the new timeout period may be the same as previously sent to the client or may be modified. In either case, at 5659, the new random challenge and timeout indication are sent to the secure transaction service 4701.

The remainder of the transaction diagram shown in FIG. 56B operates in substantially the same manner as described above (see, e.g., FIG. 50). For example, at 5660, an authentication user interface is displayed (e.g., directing the user to swipe a finger on a fingerprint sensor) and, at 5661, the user provides authentication (e.g., swipes a finger on the fingerprint scanner). At 5662, the secure transaction service verifies the identity of the user (e.g., comparing the authentication data collected from the user with that stored in the secure storage 720) and uses the key associated with the authentication device to encrypt the random challenge. At 5663, the user name (or other ID code) and the encrypted random challenge are sent to the server 4730. Finally, at 5664, the server 4730 identifies the user within the secure transaction database 4720 using the user name (or other ID code), and decrypts/verifies the random challenge using the key stored in the secure transaction database 4720 to complete the authentication process.

System and Method for Implementing Privacy Classes within an Authentication Framework In one embodiment, multiple classes of privacy protection may be predefined, selected and/or modified by the end user. The privacy classes may be defined based on the probability with which a client can be identified using the divulged information. At privacy classes having relatively higher privacy levels, relatively less information about the client device is divulged to perform the authentication techniques described herein. In one embodiment, the user may choose to disclose the least amount of information possible when communicating with different servers (i.e., may choose transactions having the lowest allowable privacy impact for each website or network service).

Figure 57:
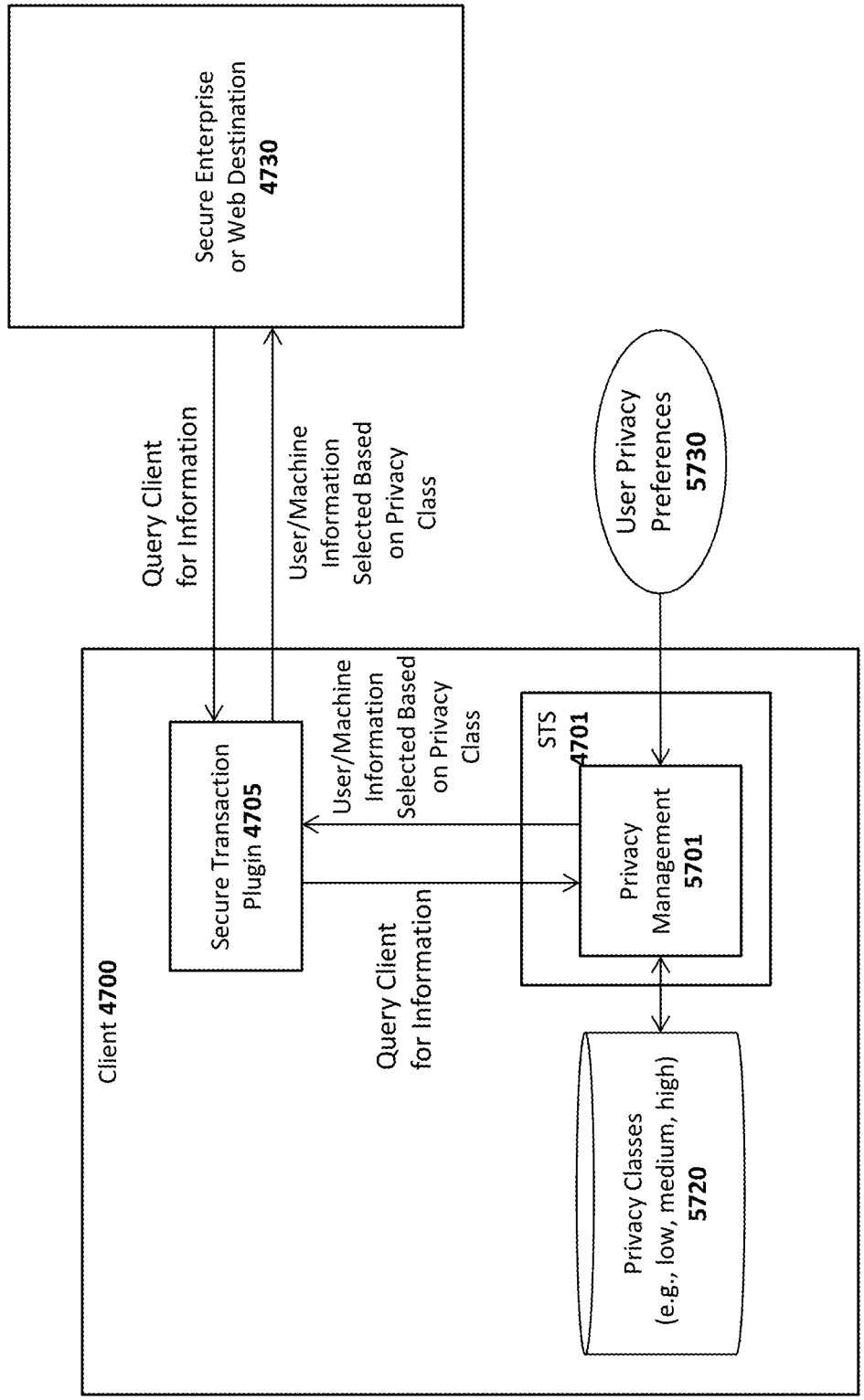
FIG. 57 illustrates an architecture for implementing privacy classes in accordance with one embodiment of the invention.

FIG. 57 illustrates a high level architecture for implementing privacy classes. As illustrated, the secure transaction service 4701 of this embodiment includes privacy management logic 5701 for analyzing queries received from the server 4730 for client information such as information related to authentication devices, implementing a privacy policy in response to such queries, and generating a response containing client information collected based on the particular privacy class in use. In one embodiment, the privacy management module 5701 is implemented as a software module executed within the context of the secure transaction service 4701. It should be noted, however, that the privacy management module 5701 may be implemented in any manner while still complying with the underlying principles of the invention and may include software, hardware, firmware, or any combination thereof.

The privacy classes utilized by the privacy management logic 5701 may be pre-specified and stored on the client 4700 (e.g., within stored within secure storage 5720). In one embodiment, three privacy classes are defined: high privacy impact, medium privacy impact, and low privacy impact. Each privacy class may be defined based on a probability with which the divulged information could be used to uniquely identify a user/client. For example, the information divulged for a low privacy impact transaction may result in a 10% probability of the user or machine being uniquely identified over internet; a medium privacy impact transaction may result in a 50% probability of the user or machine being uniquely identified; and a high privacy impact transaction may result in a 100% probability of the user or machine being uniquely identified. Various other privacy class levels may be defined while still complying with the underlying principles of the invention.

In one embodiment, each relying party (e.g., each website 4731 or service 4751) may specify a required privacy class or other privacy threshold. For example, websites and services requiring a heightened level of security may only allow communication in accordance with the high privacy impact class whereas other websites/services may permit interactions using the medium privacy impact or low privacy impact class. In one embodiment, the query for client information sent from the server 4730 includes an attribute specifying which privacy classes of information should be retrieved (i.e. low, medium, high). Thus, the privacy management logic 5701 will store information for the highest approved privacy class for each relying party. In one embodiment, whenever the relying party asks for information belonging to a higher privacy class than the one already approved, the user will be prompted to permanently approve (or reject) this new privacy class for this relying party. In response to the user's approval, the privacy management logic may store the new association between the relying party (e.g., identified via a URL) and the new privacy class.

While the user preferences 5730 are applied directly to the privacy management logic in FIG. 57 for simplicity, it should be noted that the user may specify preferences via a browser-based graphical user interface (not shown). In such a case, the user would enter privacy setting via a browser window. The secure transaction plugin 4705 would then store the new settings to the privacy management logic 5701, or to a configuration data file accessible by the privacy management logic 5701. In short, the underlying principles of the invention are not limited to any particular mechanism for configuring the privacy management logic.

Various types of client data may be specified at the various privacy class levels including, for example, a machine model identifier, client software information, client capabilities, and various levels of information related to each authentication device configured on the client device (e.g., device ID codes, vendor ID codes, device class ID, etc). Different combinations of this information may be gathered to determine the percentages specified above defining the different privacy classes.

Figure 58:
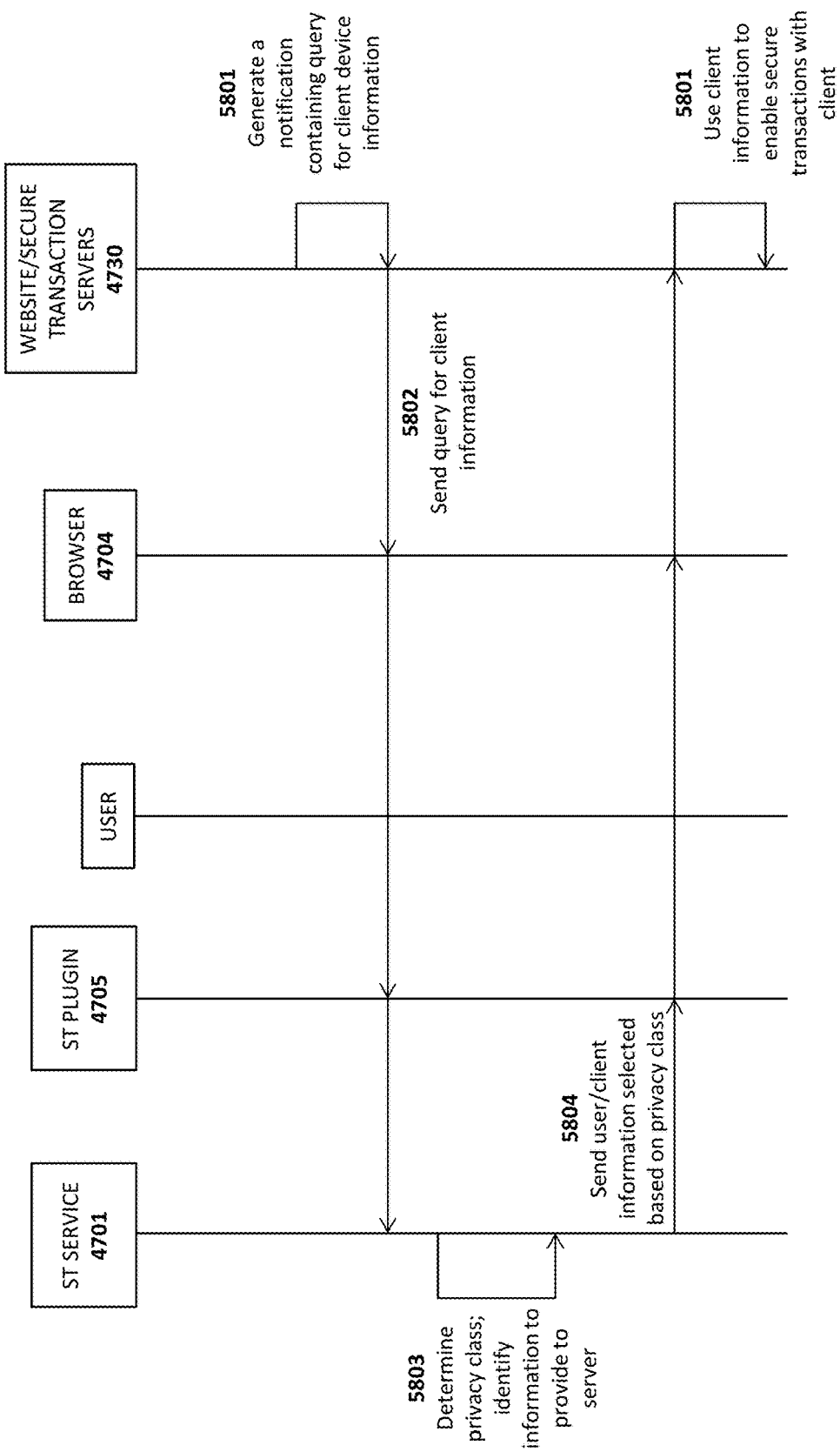
FIG. 58 is a transaction diagram for implementing privacy classes in accordance with one embodiment of the invention.

FIG. 58 illustrates a series of transactions for providing information to a requesting party using defined privacy classes. At 5801 the server 4730 generates a notification containing a query for client device information. At 5802, the query is sent to the client and ultimately received by the secure transaction service 4701. At 5803, the privacy management logic of the secure transaction service determines a privacy class for the response and collects the necessary information. As mentioned above, N different privacy class levels may be defined and the secure transaction service 4701 may choose the one which complies with the requirements of the requesting party while at the same time divulges as little information as possible regarding the client. At 5804, the collected information is sent to the server 4730 and at 5805, the server uses the information for one or more subsequent transactions with the client.

System and Method for Implementing an
Authentication Framework Using Transaction
Signing One embodiment of the invention employs transaction signing on the secure transaction server so that no transaction state needs to be maintained on the server to maintain sessions with clients. In particular, transaction details such as transaction text may be sent to the client signed by server. The server may then verify that the signed transaction responses received by the client are valid by verifying the signature. The server does not need to persistently store the transaction content, which would consume a significant amount of storage space for a large number of clients and would open possibility for denial of service type attacks on server.

Figure 59:
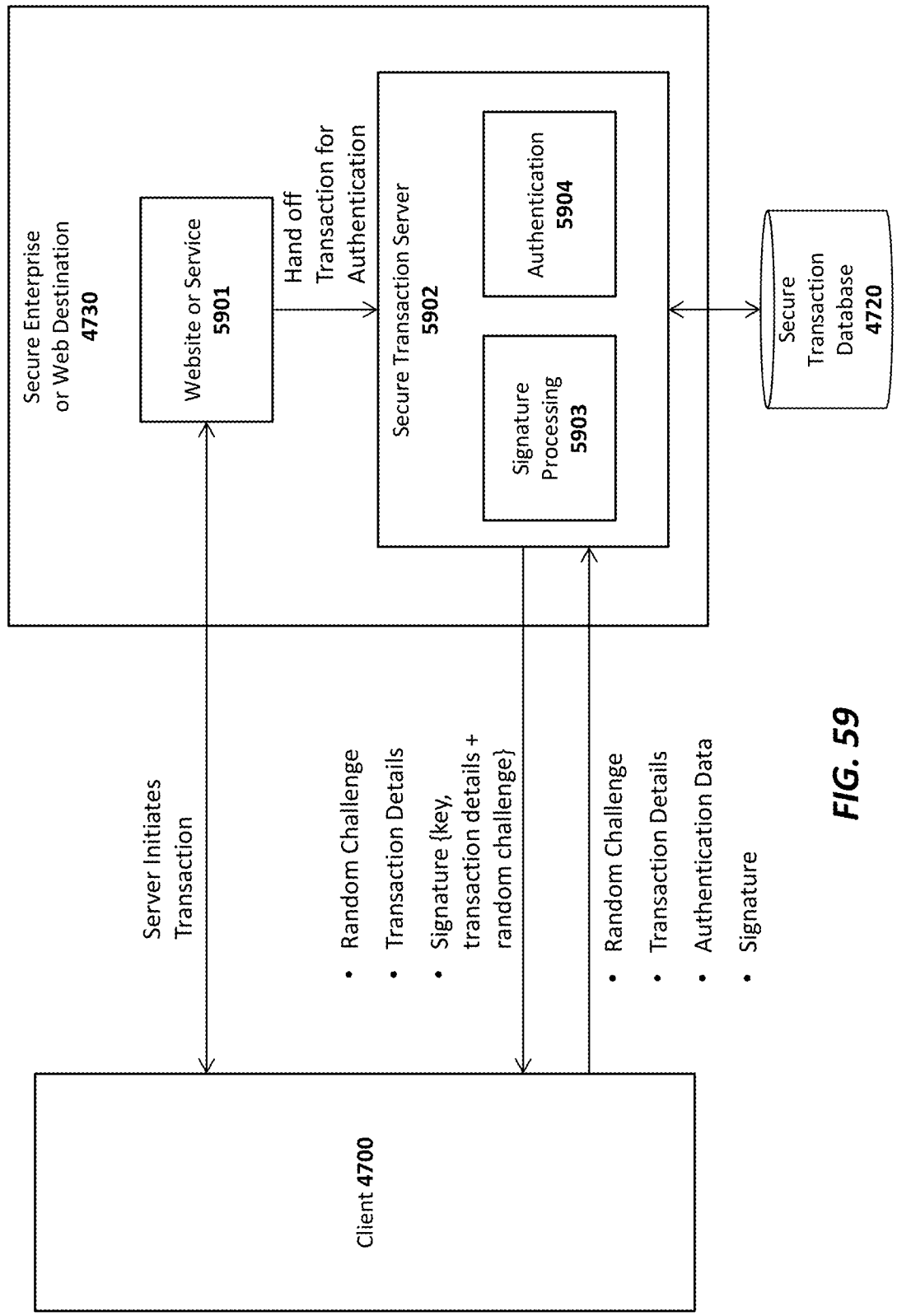
FIG. 59 illustrates one embodiment of an architecture for using signatures to authenticate and a transaction.

One embodiment of the invention is illustrated in FIG. 59 which shows a website or other network service (5901) initiating a transaction with a client 4700. For example, the user may have selected items for purchase on the website and may be ready to check out and pay. In the illustrated example, the website or service 5901 hands off the transaction to a secure transaction server 5902 which includes signature processing logic 5903 for generating and verifying signatures (as described herein) and authentication logic for performing client authentication 5904 (e.g., using the authentication techniques previously described).

In one embodiment, the authentication request sent from the secure transaction server 5902 to the client 4700 includes the random challenge such as a cryptographic nonce (as described above), the transaction details (e.g., the specific text presented to complete the transaction), and a signature generated by the signature processing logic 5903 over the random challenge and the transaction details using a private key (known only by the secure transaction server).

Once the above information is received by the client, the user may receive an indication that authentication is required to complete the transaction. In response, the user may, for example, swipe a finger across a fingerprint scanner, snap a picture, speak into a microphone, or perform any other type of authentication permitted for the given transaction. In one embodiment, once the user has successfully authenticated on the client 4700, the client transmits the following back to the server: (1) the random challenge and transaction text (both previously provided to the client by the server), (2) authentication data proving that the user successfully completed authentication, and (3) the signature.

The authentication module 5904 on the secure transaction server 5902 may then confirm that the user has correctly authenticated and the signature processing logic 5903 re-generates the signature over the random challenge and the transaction text using the private key. If the signature matches the one sent by the client, then the server can verify that the transaction text is the same as it was when initially received from the website or service 5901. Storage and processing resources are conserved because the secure transaction server 5902 is not required to persistently store the transaction text (or other transaction data) within the secure transaction database 4720.

Canonical Authentication System

Even after many years of IT innovations, passwords are still the most widely used authentication method. However, neither users nor service providers handle passwords appropriately, making this form of authentication inherently insecure. On the other hand, more than 1 billion Trusted Platform Modules (TPMs) and more than 150 million secure elements have been shipped; microphones and cameras are integrated in most smart phones and fingerprint sensors and Trusted Execution Environments (TEEs) are on the rise. There are better ways for authentication than passwords or One-Time-Passwords (OTPs).

In 2007, the average user had 25 accounts, used 6.5 passwords and performed logins 8 times a day. Today, things are much worse. An analysis of 6 million accounts showed that 10,000 common passwords would have access to 30% of the accounts (Burnett, 2011). Even when looking at passwords for banking accounts, it can be found that 73% of users shared their online banking password with at least one non-financial site (Trusteer, Inc., 2010), which means that when the non-banking site gets hacked, the banking account is threatened.

Several proposals to replace passwords have been made, including silos of authentication, heterogeneous authentication, and trustworthy client environments.

Silos of Authentication: Current alternative technologies require their respective proprietary server technology. The current authentication architecture therefore consists of silos comprising the authentication method, the related client implementation and the related server technology.

Innovative authentication methods proposed by the research community are not widely deployed, as in addition to the client implementation the complete server software needs to be implemented and deployed. Instead of having a competition for better user verification methods, authentication companies are faced with a battle for the best server technology.

Heterogeneous Authentication: Users may authenticate using standalone PCs, tablets or smart phones. The employer may control some devices while others may be controlled by the user (David A. Willis, Gartner, 2013). Increased adoption of mobile devices and the BYOD trend lead to an increasingly heterogeneous authentication landscape. The one authentication method satisfying all needs seems to be out of reach.

Trustworthy Client Environment: Client side malware may capture and disclose passwords or OTPs. It may alter transactions to be confirmed after being displayed or it can misuse authenticated communication channels to perform unintended actions. Authentication—even with user name and password—needs at least one trustworthy component at the client side.

Today the alternatives to password or OTP-based authentication do not scale. This is primarily due to sub-optimal combinations of authentication building blocks. To address this limitation, one embodiment of the invention identifies canonical building blocks which can be implemented in various different ways and still lead to a well-known and functional authentication system—suitable for integration within existing platform functionality.

Figure 60:
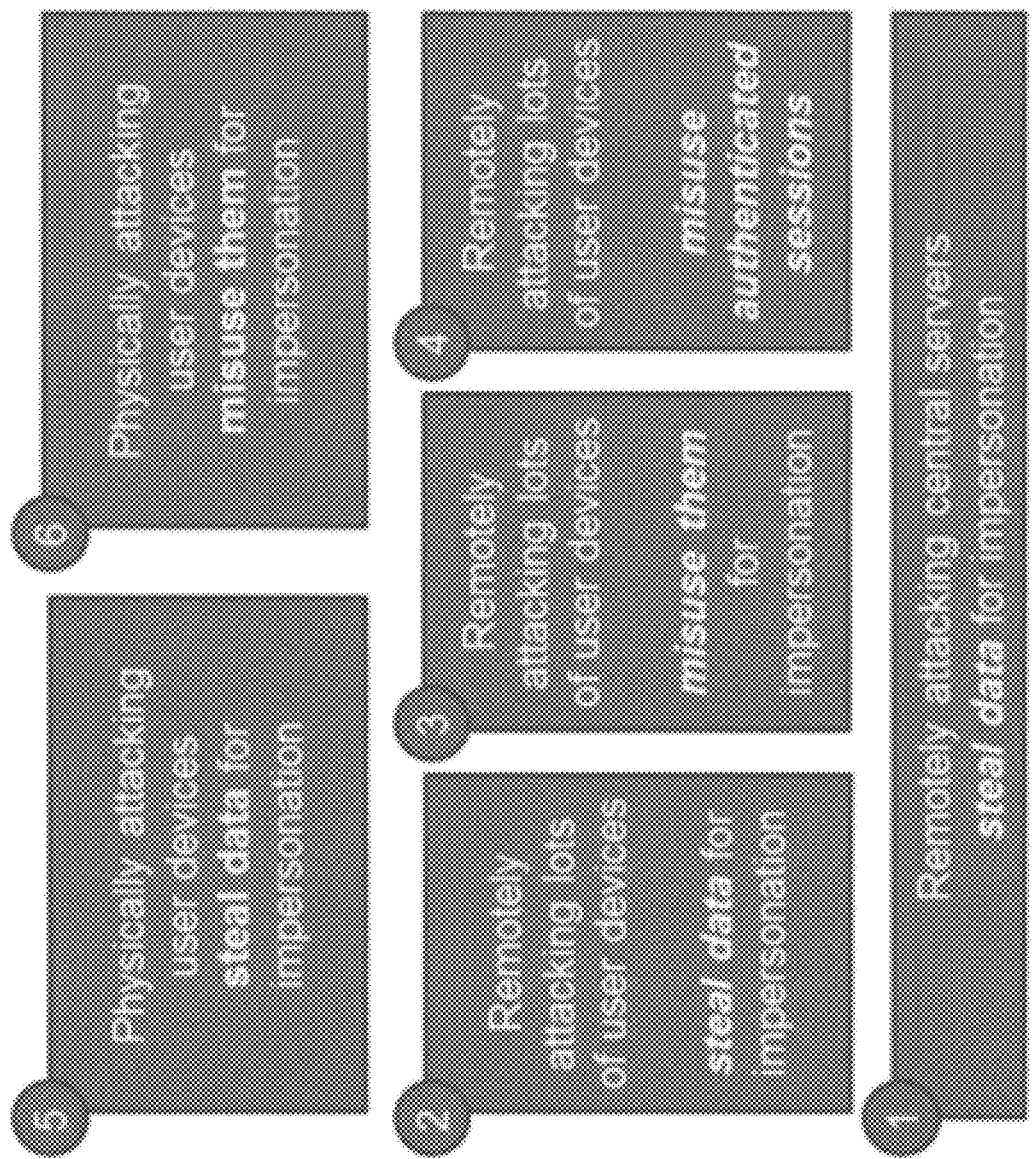
FIGS. 60-61 illustrate exemplary embodiments of a computer system for executing embodiments of the invention.

The recent large-scale attacks on passwords were all focused on the server side. Such attacks are independent from the effort and from the security measures users take. In the attack classification illustrated in FIG. 60, these attacks are labelled with (1). Introducing protection measures against this single threat class will very likely shift the attacker focus to attacks to steal and misuse authentication credentials from user devices (2-4), including stealing and misusing data by impersonating a user (2-3) and misusing authenticated sessions (4). Items (5) and (6) include physical theft of the user's device and stealing data (5) and/or misusing the device for impersonating the user. However, it is very likely that attacks will focus on some kind of scalable attack, i.e. an attack with some fixed cost but the potential of a large number of sellable items. Physically attacking individual devices is possible, but less scalable.

In one embodiment of the invention, instead of storing hashed passwords having relatively low entropy, asymmetric public keys may be stored on the server and the related private key may be stored in the device. Computing the private key from a given public key is very resource consuming as it requires factoring (RSA) or solving the discrete logarithm problem (DSA/ECDSA). The private key at least should be protected against malware attacks. In one embodiment, this is accomplished using Trusted Execution Environments (TEEs) or Secure Elements (SEs) on the client device.

Given that most client devices are always online, instead of extracting the private key, malware may simply attempt to misuse it. In order to protect against such attacks, (a) the access to use the key should be limited to eligible apps and (b) some kind of user interaction which cannot be emulated by malware is required. TrustedUI (GlobalPlatform, 2013) can be used to implement such kind of user interaction. Note that Secure Elements typically do not have a user interface and hence do not provide this kind of protection.

When implementing the protection measures as described above, the authentication is secure. However, attackers may then focus on attacking the App which controls the authenticated session. Existing PC infection rates (APWG, 2014) demonstrate the feasibility of these types of attacks. When having an Authenticator with higher protection than current Mobile Apps, this Authenticator can be used for displaying and retrieving a user's confirmation for a particular transaction. In such a case, infected Apps could lead to (a) malicious transactions being displayed which would be rejected by the user or (b) signed transactions which would be modified after signing, which would be detected by the server. This is the second use-case for the TrustedUI implementation.

In one embodiment, Secure Elements are used to protect against physical key extraction. The underlying chip hardware for SE typically implements state-of-the-art protection measures against physical attacks. (Dr. Sergei Skorobogatov, University of Cambridge, 2011). In addition, in one embodiment, TrustedUI or other dedicated user verification hardware such as Fingerprint sensors may be used to meet the need for physical user interaction.

If an attacker gains physical access to a device, the attacker could try to misuse the key instead of extracting it. In order to protect against such attacks, an effective user verification method is used which has a low false acceptance rate, good anti-spoofing methods and anti-hammering mechanisms (i.e., to effectively limit the number of potential brute-force attempts).

Given that scalable attacks are predominant, one embodiment focuses on counter-measures for physical attacks after implementing the counter-measures for the scalable attacks.

Having good protection for attestation on the client side is beneficial, but in reality the remote party (i.e., the server side) is also interested in understanding the security being used. Consequently, one embodiment of the invention "attests" the client-side security properties to the remote server. In order to be effective, these attestation techniques need to be at least as strong as the client side protection.

For practical solutions, the privacy of attestation is also important. Methods like direct anonymous attestation (DAA) are a good choice. Unfortunately, the original DAA method was too slow when implemented on standard hardware. The improved pairing-based DAA scheme is much faster. It has been adopted by TCG for TPMv2 (Liqun Chen, HP Laboratories and Jiangtao Li, Intel Corporation, 2013).

A typical signature consist of a to-be-signed object controlled by the App and a signature computed using the private key. So to the verifier, any data in the to-be-signed object is only as trustworthy as the App controlling the contents of the to-be-signed object.

Figure 61:
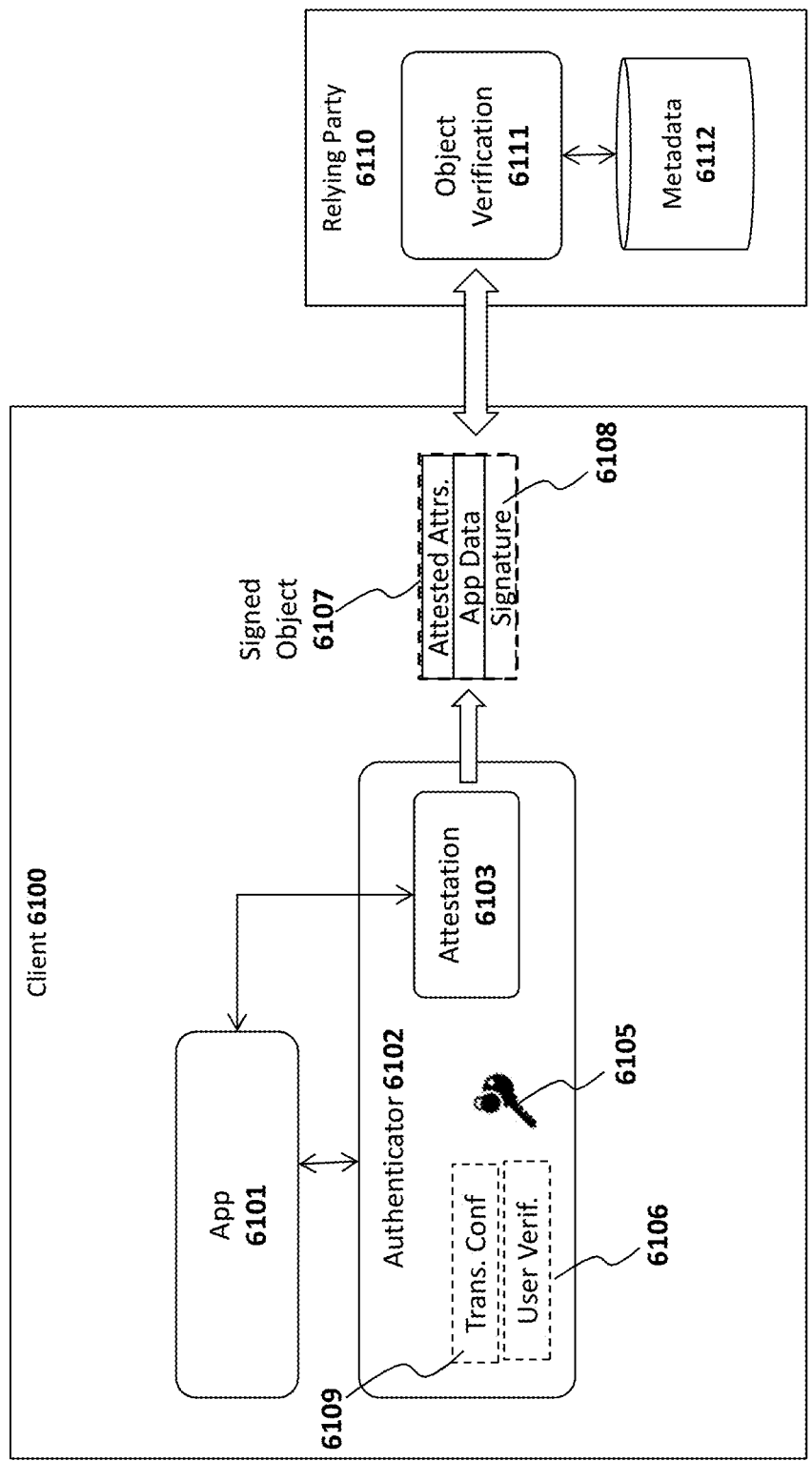

As illustrated in FIG. 61, in one embodiment, the private key 6105 is protected by an attested authenticator 6102, which is more trustworthy than the App 6101. The authenticator may include a transaction confirmation component 6109 (e.g., to allow the user to confirm the text of a confirmation as described herein) and a user verification component 6106 (e.g., to allow for biometric or other type of user authentication). In one embodiment, an attestation module 6103 uses the private key 6105 to generate a signature 6108 over an object which includes authenticator attributes and application data to generate a signed object 6107. As illustrated, in one embodiment, the object to be signed comprises a concatenation of attested attributes of the authenticator and application data. The attested attributes used in the signed object may include, for example, (a) the Transaction Text as confirmed by the user, (b) the actual personal identification number (PIN) length as opposed to the minimal PIN length, or (c) the firmware version of the authenticator implementation.

The illustrated implementation is more secure than existing systems because exclusive control of the key 6105 is granted to the Authenticator 6102 (instead of being granted to the app 6101). In one embodiment, the to-be-signed object, exclusively controlled by the Authenticator 6102 has a "slot" reserved for data controlled by the App 6101 (identified as "App Data" in FIG. 61). As a result, in this embodiment, the App 6101 is not permitted to arbitrarily create any form of to-be-signed objects. Each signed object will look similar, so the object verification module 6111 of the relying party 6110 can trust that the attested attributes were contributed by the trusted Authenticator 6102. In one embodiment, the object verification module 6111 uses the public key and metadata 6112 associated with the authenticator 6102 (e.g., the authenticator type, model and/or version) to verify the signature 6108.

In one embodiment, a set of canonical building blocks are defined that can be used to assemble an authentication system such as shown in FIG. 61. Once particular set of building blocks include:
1. Hardware and/or software to generate cryptographic keys and attest to such keys to a remote party.
2. Hardware and/or software to generate attested signatures.
3. Hardware and/or software to verify a user.
4. Hardware and/or software bind keys to an entity (e.g., restrict "use" access of such keys to a defined set of software applications).

Not all building blocks need to be present. Authentication systems can be built even using only building block #1. The other building blocks can be added as needed. The overall security and usability characteristic depends on the specific implementations of the building blocks used.

Figure 62:
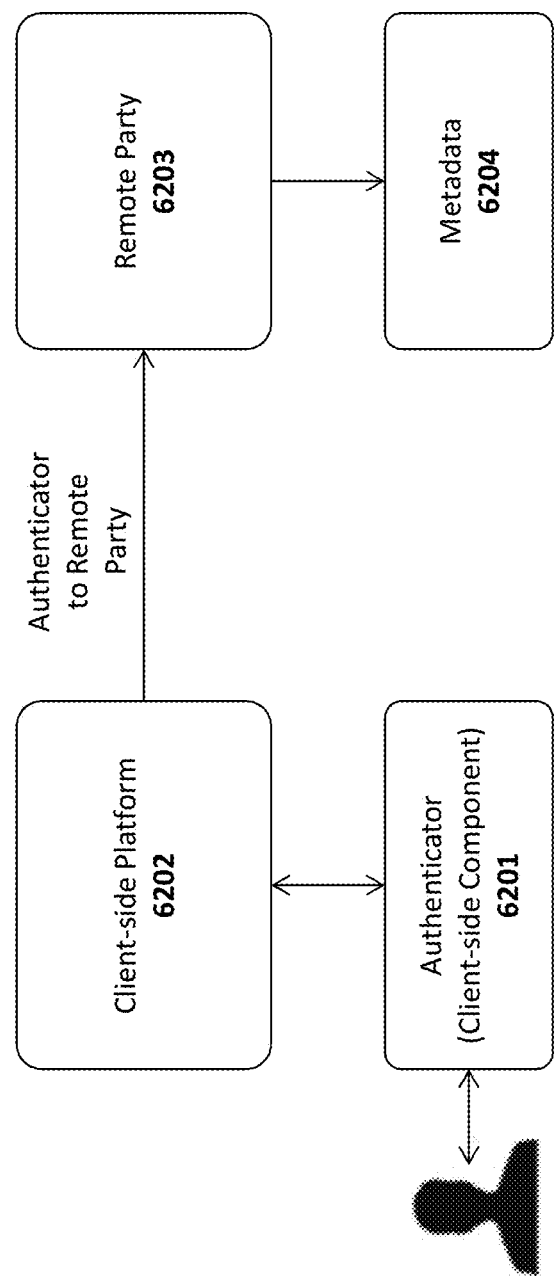
FIG. 62 illustrates one embodiment in which metadata is used by a relying party to authenticate a client.

FIG. 62 illustrates one particular embodiment which includes a client-side authenticator 6201, a client side platform 6202 (e.g., a mobile device using Android OS or Windows OS), a remote party 6203, and metadata 6304. One embodiment of the authenticator 6201 generates the authentication keys and supports attestation of the authentication keys to a remote party 6203. Various attestation methods are supported including those described above. See also FIDO Basic Attestation (Rolf Lindemann, Davit Baghdsaryan and Eric Tiffany, 2014), DAA (Ernie Brickell, Intel Corporation; Jan Camenisch, IBM Research; Liqun Chen, HP Laboratories, 2004), ECDAA (Ernie Brickell, Intel Corporation; Jiangtao Li, Intel Labs).

The remote party has access to metadata 6204 which it uses to verify the attestation object. The authenticator may be implemented as a physically separate entity (e.g. crypto SD-card, USB crypto token, etc), but could also be physically embedded into the client-side platform (e.g. in an embedded secure element, TPM, TEE).

The authenticator 6201 may optionally have the capability of verifying a user. However, the underlying principles of the invention are not limited to any specific user verification method. However, the remote party can learn the user verification method by looking into the attestation object and the metadata 6204.

The embodiments of the invention do not rely on any specific wire-protocol or protocol message encoding. The only requirement is that the assertions generated by the authenticator 6201 such as the attestation object and the attested signature object need to be "understood" by the remote party 6203. The concrete wire format may depend on the specific platform.

This section is intended to give a first impression on how these canonical building blocks could be used.

In current authentication frameworks such as the FIDO UAF specification, the client is quite "heavy". With the approaches described herein, the client can easily be split into two parts: (1) an application software development kit (AppSDK) performing all of the protocol related tasks (which are too specific to be implemented in a platform) and (2) a platform functionality that implements the security related tasks such as binding a key to a set of software applications. With this approach, a client such as the FIDO client being a separate entity disappears.

The following is an example of a FIDO UAF being implemented on an Android platform extended to support these canonical building blocks.

AttestationType: No need to set it explicitly. All Android Apps will know that they can only use the Android-Attestation method (e.g. through a FIDO AppSDK).

AAID: A unique identifier for each class of authenticator (e.g., an "authenticator attestation ID" as described above). Essentially the AAID is reduced to some Android KeyStore Implementation using a user verification method specified when creating the key. The Key Store will lookup the AAID based on the user verification method (and the static knowledge about its own KeyStore crypto implementation).

Username: One embodiment allows the mobile app (through the AppSDK) set the KeyAlias to the concatenation of the keyID and the username if present.

AppID: Is addressed using the appID binding (if supported).

In summary, one embodiment of the invention includes a system for authenticating a client-side authenticator to a remote party, that includes:

(1) a client-side authenticator comprising (i) circuitry and/or program code to generate cryptographic key pairs ("authentication keys") and (ii) circuitry and/or program code attesting the identity of the key generating entity to a remote party.

(2) data regarding the authenticator which at least contains sufficient information to verify the attestation made available to the remote party. This data is referred to as "metadata" above.

(3) circuitry and/or program code to use the generated authentication private key to perform a cryptographic operation to prove possession of the private authentication key to the remote party.

Additionally, the authenticator might be known to restrict the use of the authentication private key to perform cryptographic signature operations on well-defined to-be-signed objects only. This well-define to-be-signed object contains data fields controlled by the authenticator and one or more data fields which are clearly marked to contain arbitrary data (not controlled by the authenticator). The authenticator might indicate such objects by starting them with a magic number MN followed by the well-defined data structure. This signature operation is called "attested signing" herein. This magic number MN can be chosen freely, but it needs to be fixed and well known. One example on how to set this magic number is "ATTESTED_SIGNATURE".

In addition, in one embodiment, the client side authenticator has the ability to verify a user using an arbitrary user verification method and in which the properties of this user verification method are static (i.e. they do not change over time for any authenticator) and described in the Metadata. The user verification method may be arbitrarily complex and even consist of multiple biometric and non-biometric modalities (e.g., PIN or fingerprint, speaker recognition in combination with PIN/Fingerprint, facial recognition, etc.).

Moreover, in one embodiment of the system, (a) the key may only be used for attested signing and (b) the authenticator has the ability to verify a user using a user verification method in which the properties of the user verification method are described in the data fields controlled by authenticator (e.g., in the attested signature). Note the user verification method might be arbitrarily complex and even consist of multiple biometric and non-biometric modalities (e.g., PIN or fingerprint, speaker recognition in combination with PIN/Fingerprint, facial recognition, etc.).

In one embodiment, access to the private authentication key 6105 is limited to a specified set of applications. In addition, the set may be restricted to applications considered equivalent by the platform (e.g. operating system). As an example, access to the authentication key could be restricted by the operating system to the applications signed using the same package signing key as the application which triggered the key generation. Moreover, the set of applications may include applications considered equivalent by the application developer through a list of application facets which are considered equivalent.

In yet another embodiment, the authenticator 6102 supports securely displaying a transaction text and asking the user for confirming (or rejecting) this particular transaction. The transaction text may be cryptographically bound to the attested signature (i.e. a cryptographic hash of the transaction text will be included in one of the fields controlled by the authenticator).

One embodiment of the invention implements the security related tasks of the FIDO UAF/U2F stack (which do not belong to the authenticator) on a platform (e.g. the OS or the web browser) and leaves the implementation of the other protocol handling tasks to the app and thus removes the need to implement specific protocols in the platform (i.e., removing the need of having a FIDO Client).

System and Method for Bootstrapping a User Binding

Today, any user may enroll to a new FIDO authenticator or device having a key store that is being shipped/purchased, including both the legitimate owner and a potential attacker. In general, FIDO authenticators and devices having a key store are bound to a user (i.e., the user enrolls to the authenticator/device) once the user first receives physical access to the device. This is in contrast to smartcards (e.g. EMV banking cards and SIM cards) which are personalized for a user before delivery. This personalization typically includes a user specific personal identification number (PIN).

Sometimes the user has already been identified/vetted before a FIDO authenticator (or device having a key store) is shipped. It would be desirable to leverage the identity vetting performed at a shop (or some other place) and to bind the authenticator to a user before the authenticator actually reaches the user. The embodiments of the invention provide techniques to address this desire.

In one embodiment, it is assumed that some trusted identification system already has access to (a) the user verification reference data (e.g. biometric templates, or a PIN), or (b) to some data from which the user verification reference data can be derived, or (c) to some data which is tied to the user through some other system. For example a copy of the user's facial image taken from a photo-ID card verified in some branch office, or a photo of the user's fingerprint taken from a governmental identification database or through a SIM card tied to the authenticator and bound to the account owner by the mobile network operator (MNO). Approach (a) works for "what-you-know" factors; approach (b) for "what-you-are" factors; and approach (c) works for "what-you-have" factors, as described below.

One embodiment includes some form of secure communication channel to the authenticator allowing a single and initial injection of user verification reference data into the authenticator (i.e., in a state in which there is no other user verification reference data being enrolled by someone). The secure communication channel could be a Trusted Service Manager (TSM) securely talking to a SIM-card based authenticator, or the TSM securely talking to the Trusted Execution Environment (TEE)-based authenticator, or it could be implemented by some secret or private key used by the authenticator for decrypting such data. In any case, one embodiment of the authenticator may include a pre-processing engine, which converts the initial reference data to the form required by the authenticator. Note that this pre-processing may also be done by the trusted system.

Figure 63:
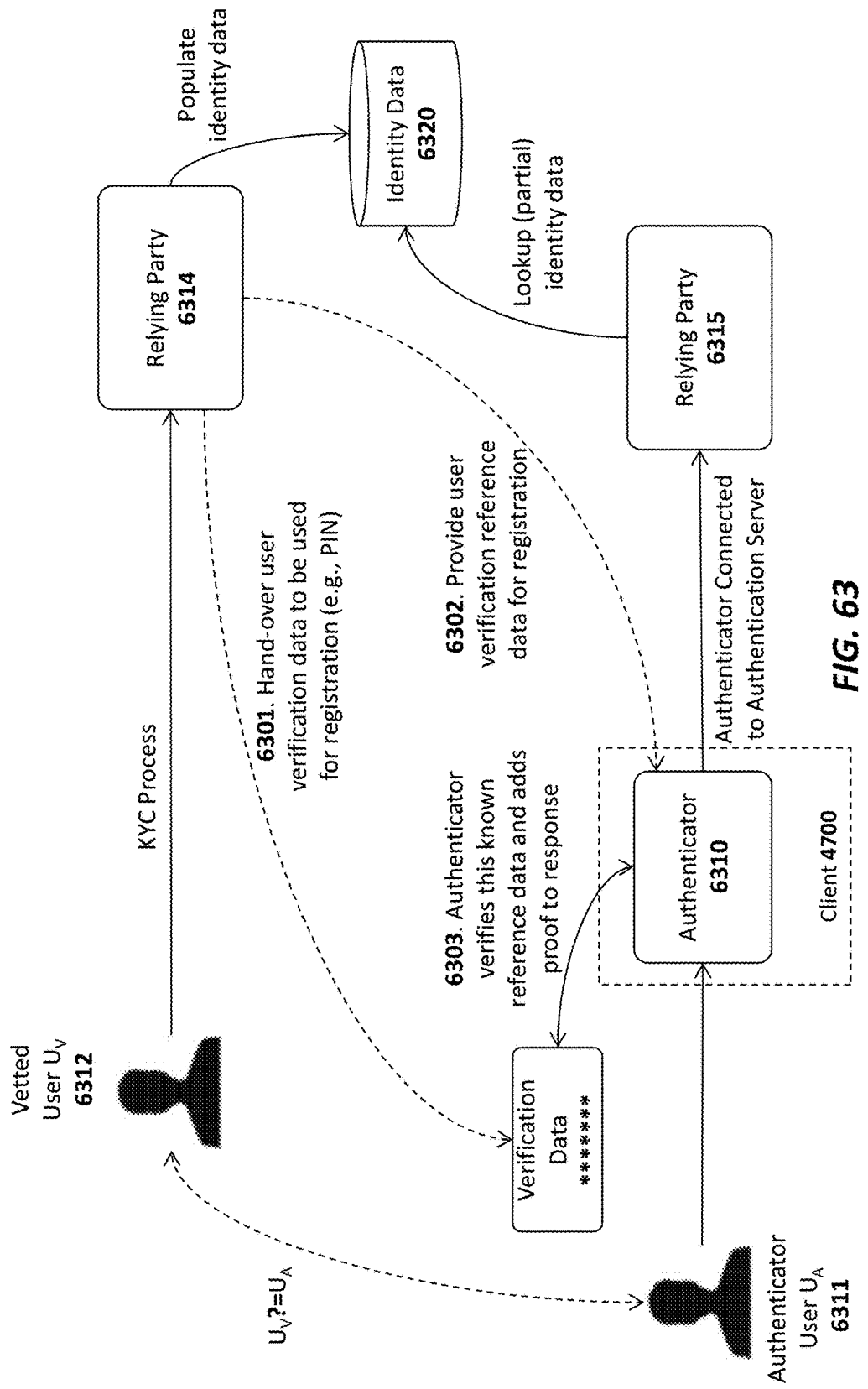
FIG. 63 illustrates one embodiment of an architecture for bootstrapping user binding to an authenticator using data such as a code securely provided to the user.

FIG. 63 illustrates one embodiment of an implementation in which a vetted user Uv initially provides verification of his/her identity to a first relying party 6304. For example, the relying party 6304 may be a brick and mortar store where the user purchases a new mobile device. During this process, a PIN or other identification code may be generated by the relying party 6304 (e.g., generated randomly or selected by the vetted user Uv). This identification code is one form of initial user verification reference data (IUVRD) described herein which is used to verify the identity of the user when registering the user. In addition, the relying party 6314 may store identification data associated with the user and/or client device within an identity database 6320.

Subsequently, at 6301, the user verification data is securely provided to the user 6312. For example, the identification code may be mailed to the user in a tamper resistant or tamper evident (e.g. sealed) envelope. Alternatively, the relying party 6314 may provide the identification code to the user 6314 at the store where the user purchases the device. At 6302, the IUVRD is provided over a secure communication channel from the relying party 6314 to the authenticator 6310 (e.g., at the store and/or encrypted using a key or key pair known by the relying party 6314 and authenticator 6310). In one embodiment, the communication may be encrypted to the authenticator model/instance to prevent misuse. At 6303 the authenticator user UA 6311 is prompted to enter the verification data when registering the authenticator 6310 for the first time with a relying party 6315. In one embodiment, the authenticator 6310 comprises a FIDO authenticator and the relying party 6315 comprises a FIDO server. If the user 6311 enters the correct verification code, then the authenticator 6310 may include this as proof of the identity of the user 6311 in the transactions with the relying party 6315 (e.g., when registering the authenticator 6310 with the relying party). In addition, in one embodiment, the relying party 6315 may perform a lookup in the identity database to confirm the identity of the authenticator 6310 and/or authenticator user UA 6311.

Figure 64:
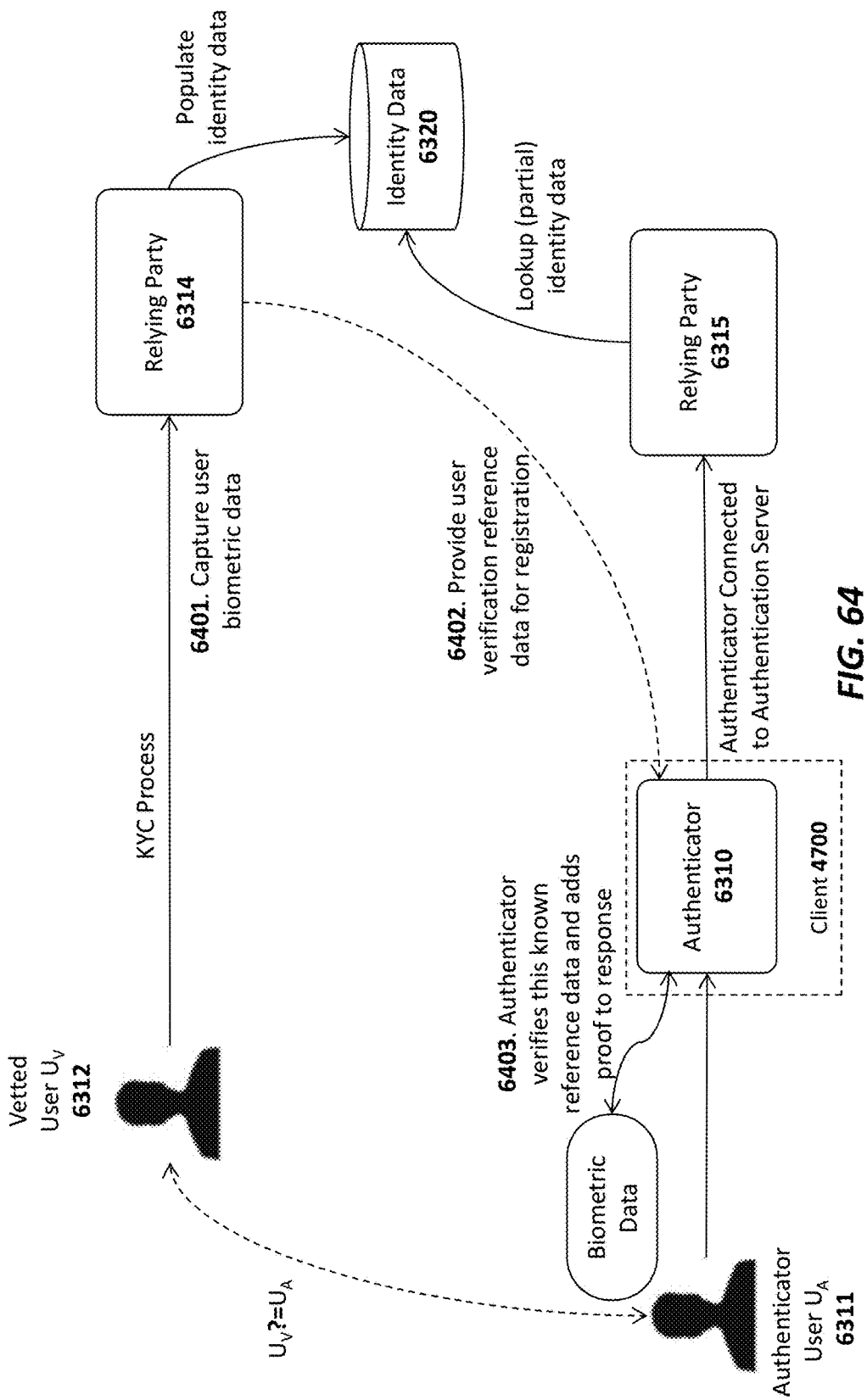
FIG. 64 illustrates one embodiment of an architecture for bootstrapping user binding to an authenticator using biometric data.

FIG. 64 illustrates another embodiment in which biometric data is initially captured as IUVRD during the KYC process between the vetted user Uv 6312 and the relying party 6314. For example, at 6401 an image of the user's face may be captured and facial recognition template may be generated, the user's fingerprint may be captured, and/or or voice recognition may be performed. At 6402, the IUVRD is provided to the authenticator 6310 over a secure communication channel. This may be done, for example, at the store and/or may be encrypted and transmitted over a network to the authenticator 6310 (e.g., using a key or key pair known by the relying party 6314 and authenticator 6310). At 6403, the authenticator user UA 6311 is prompted to collect biometric data such as by analyzing a picture of the user's face, collecting the user's fingerprint, and/or recording the user's voice. The authenticator 6310 compares the collected data against the IUVRD biometric data and, if a match is detected, proof of the user's identify is provided during the registration with the relying party 6315. In addition, the relying party 6315 may perform a lookup in the identity database 6320 initially populated by the relying party 6314 to further verify the identity of the user 6311.

Figure 65:
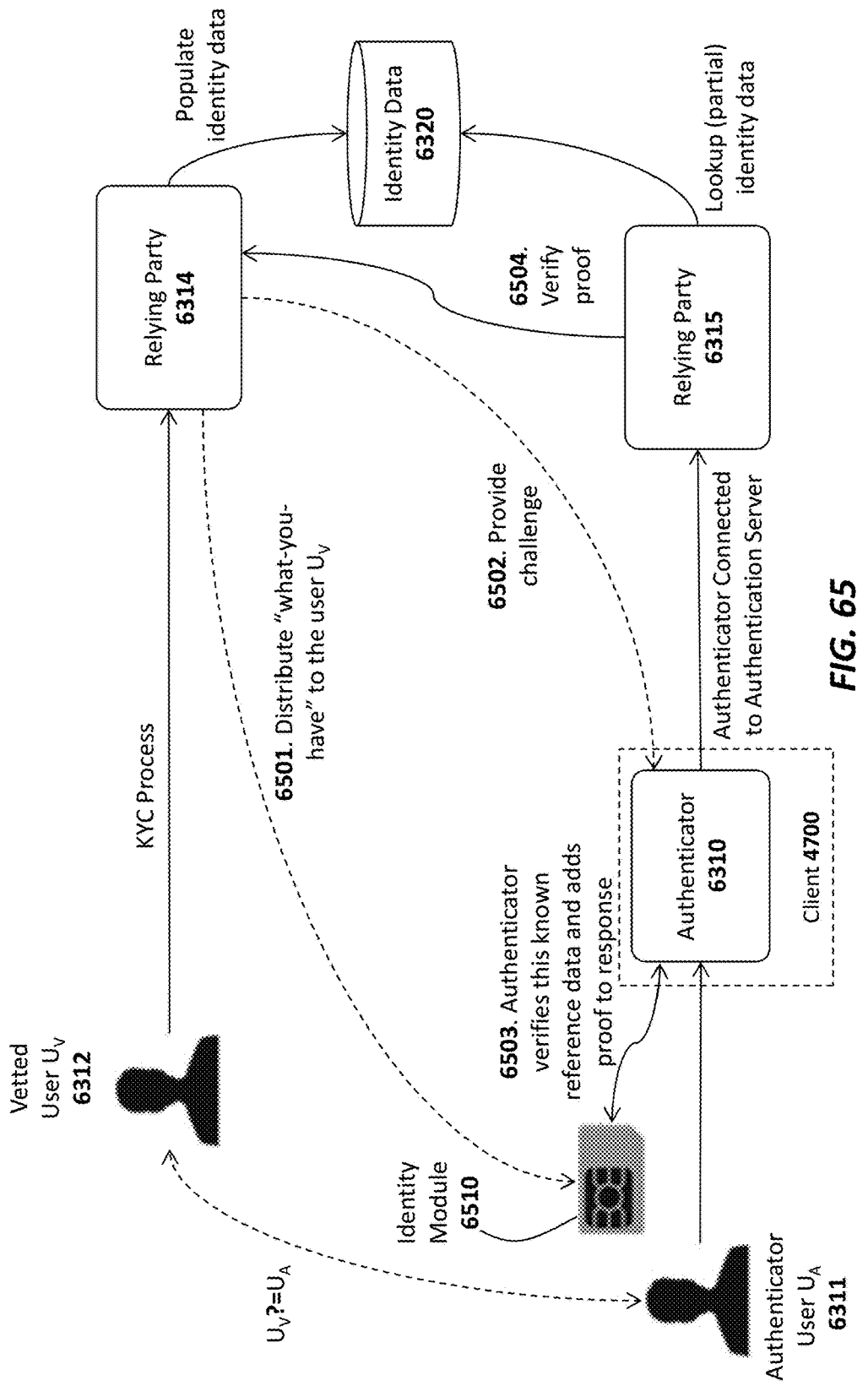
FIG. 65 illustrates one embodiment of an architecture for bootstrapping user binding to an authenticator using a physical device such as a SIM card.

FIG. 65 illustrates yet another embodiment in which, during or following the KYC process, an identity module 6510 is provided to the user 6311 which may contain symmetric keys known by the relying party 6314. In one embodiment, the identity module 6510 comprises a subscriber identity module (SIM) card; however, the underlying principles of the invention are not limited to any particular form of identity module. At 6502, the relying party 6314 provides a challenge to the authenticator 6310 (e.g., a randomly generated nonce). At 6503, the authenticator verifies the existence of the identity module 6510 by using the symmetric key to generate a signature over the random number. It then provides the signature to the relying party 6315 during registration. The relying party 6315 may then verify the identity of the user 6311 by communicating the signature to the relying party 6314, which may use the symmetric key to verify the signature. The relying party 6315 may also perform a lookup in the identity database 6320 as previously described.

One embodiment of the described authenticator 6310 supports a new IUVRD, a one-time-UVRD, and/or a one-time Identity-Binding-Handle (OT-IBH) extension for FIDO registration. This extension includes the encrypted user verification data (or data from which the user verification data can be derived or the hashed or encrypted identity binding handle).

In case of the IUVRD extension, if no user is enrolled already, the authenticator 6310 will use this data as the initial user verification reference data (IUVRD) and treat the user being enrolled with this data. In one embodiment, the authenticator 6310 proceeds as specified in the FIDO specifications (e.g., verifying the user, generating the Uauth key pair specific to the AppID/relying party ID, generating the registration assertion and signing it with the attestation key). Additionally, one embodiment of the authenticator 6310 includes an extension containing a success indicator in the signed registration assertion to indicate that the data has indeed been used by the authenticator (and the relying party 6315 can assume the related user being enrolled to that authenticator). This result indicator could be a simple Boolean value (i.e. extension processed or not) or it could be a cryptographic hash value of the extension passed to the authenticator 6310. The latter is relevant if the extension includes a value encrypted to the authenticator 6310 but not authenticated by the originator (e.g. asymmetric encryption of a PIN). If some user is already enrolled to the authenticator 6310, the authenticator will not process the IUVRD extension and consequently also not include it in the response assertion.

In case of the One-Time-UVRD extension used in one embodiment, the user verification reference data included in the extension is applicable to exactly the registration operation it belongs to. In the case of the OT-IBH extension, the extension includes the nonce and potentially an additional identifier followed by the hash of the handle H concatenated with some nonce and potentially some additional Identifier ID. Stated more formally: OT-IBH=(Nonce, ID, Hash(H-|Nonce|ID)).

The embodiment illustrated in FIG. 65 (sometimes referred to herein as a "what-you-have" implementation) may utilize a One-Time Identity-Binding-Handle Extension (OT-IBH). This concept will be described using the more concrete scenario of a SIM card supporting Extensible Authentication Protocol Authentication and Key Agreement (EAP-AKA, see RFC4187 https://tools.ietf.org/html/rfc4187) authentication to the mobile network operator (MNO).

In this example, relying party 6314 may be a mobile network operator which has already vetted the account owner and issued them a SIM (or personalized an embedded SIM; in general, a "what-you-have" token). The MNO also receives (through the mobile network) a device identifier (e.g., an International Mobile Equipment Identity, IMEI) and authenticates the SIM (and hence the International Mobile Subscriber Identity IMSI tied to it). As a result, the MNO already has a good understanding of the account owner tied to a specific mobile device. If the authenticator is bound to such a mobile device, this existing identity binding may be leveraged for the registration of the authenticator 6310.

The FIDO specifications carefully avoid exposing any global correlation handle through the authenticator 6310. So instead of just letting the authenticator add the IMEI or the IMSI as an extension to the registration assertion or the signature assertion, one embodiment of the invention uses a different approach.

In the OT-IBH approach, the existence of some handle H is assumed which is tied to the user (e.g., through an IMSI or IMEI or both). Such handle H being cryptographically authenticated or encrypted may even be supported (e.g. H=MAC(IMEI|IMSI) or H=Enc(key,IMEI|IMSI)). This handle H is owned by the Mobile Network Operator issuing the SIM.

As this handle H doesn't depend on any specific relying party (RP) H may be considered a global correlation handle. For privacy reasons such global correlation handles should not be known by multiple relying parties. In order to achieve this, one embodiment derives a relying party specific handle from it: Hd=Hash(H|Nonce|IDrp), where IDrp is a relying party identifier and where the nonce and the IDrp are provided by the owner of H. The nonce is some random value and IDrp is some identifier tied to the relying party wanting to leverage the identity binding performed by the MNO.

The derived handle Hd could be issued by the MNO to some RP using a backend service to which the RP would provide some user identifying information IDu (e.g. the MSISDN) which the user could have provided directly or which the RP App could have retrieved through some existing native API on the device.

Figure 66:
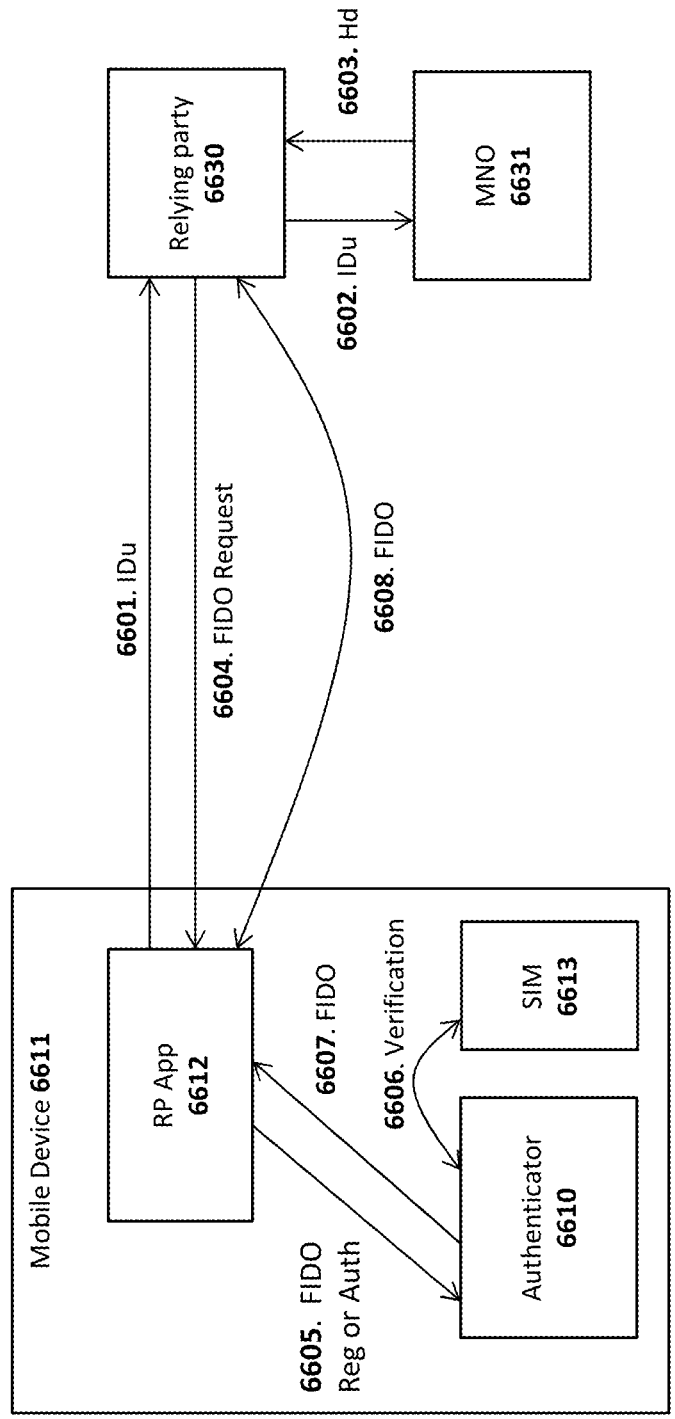
FIG. 66 illustrates one embodiment of the invention utilizing portions of the FIDO protocol.

FIG. 66 illustrates one particular embodiment in which a relying party app 6602 transmits user identifying information (IDu) to the relying party 6630 at 6601. At transaction 6602, the relying party 6630 transmits the identifying information to the MNO 6631 which responds with the relying party specific handle, Hd, at 6603. At 6604, the relying party 6630 transmits a FIDO request to the relying party app 6612. In response, the relying party app 6612 sends a FIDO registration or authentication request to the authenticator 6610 at 6605 and, at 6606, the authenticator performs a verification with the SIM 6613 at 6606. The FIDO transactions at 6607-6608 includes the Hd if verification at 6606 was successful. If verification failed, the Hd will not be included in the FIDO response.

The embodiment described above is more secure compared to using H as bearer token as the authenticator cryptographically binds H to an assertion generated by a specific authenticator. This protects against man in the middle (MITM) attacks and hence allows the lifetime of H to be extended.

This embodiment is also more privacy preserving as the authenticator 6610 will not reveal H; it will just allow an app 6612 to verify H if the app receives access to H through other means such as a contractual relationship to the entity issuing H (e.g., the MNO) or via some API available to the app 6612 on the mobile device 6611 (to which the user grants access permission).

The following exemplary use cases may be implemented. It should be noted, however, that the underlying principles of the invention are not limited to these specific use cases.

Use Case 1:

In some branch office/shop a user may be vetted by an identification system using for example an electronic ID card reader, fingerprint scanner, or camera. The identification system verifies the authenticity of the ID card (if ID cards are being used) and then converts the captured data (captured from the user directly or captured from some trusted credential such as a government-issued ID card) into the format required by the authenticator.

The identification system encrypts the IUVRD data (as described above) and stores it along with the customer order for the authenticator. The order details are sent to a fulfillment center and the authenticator is shipped to the customer.

Once the customer uses the authenticator for the first time, it will automatically trigger the registration of this authenticator to the server providing the order number (or a similar identifier) allowing the server to understand the prospective user. The server will then add the appropriate IUVRD extension to the FIDO registration request and the authenticator will process the registration request as specified above.

Use Case 2:

If the user is at home and orders the authenticator online, the user may provide a scan of his/her photo ID card as proof of identity. The identification system at the server side verifies the integrity of the scan and extracts the IUVRD from it. Proceed as in use Case 1, with the identification system verifying authenticity.

Use Case 3:

Similar to Use Case 2 but using a PIN and a PIN-based authenticator (e.g. based on the SIM) or an authenticator supporting a PIN and some other user verification method(s).

Use Case 4:

Sometimes the device and/or an entity tied to a device (e.g., something the user has such as a SIM card) are already bound to a user (e.g. mobile phone account owner). This binding may already be represented by some generic handle H (e.g., some bearer token, and/or a global correlation handle like the user's phone number or the device IMEI and potentially even encrypted or hashed like MAC(phone#+IMEI) or HMAC(MSN+IMEI), for example, which is owned by one specific relying party (e.g., the MNO). Instead of revealing such handle H to some relying party directly via the authenticator one embodiment allows the relying party to ask the authenticator in a privacy-friendly way whether the authenticator is somehow tied to this handle H. See section OT-IBH for details.

Because at least one embodiment described above works only once for an unused authenticator (unless a reset to factory defaults is performed), it only allows the authenticator vendor (not necessarily the manufacturer) to effectively use it at the beginning. In one common implementation this will be a mobile network operator selling authenticators bound to smartphones. The "One-Time-UVRD" embodiment allows the use of this approach by the authenticator manufacturer at any time and the "Select-UVM" embodiment allows the use of this approach by any RP or potentially limited to specific ones.

Cryptographic Details

Multiple cryptographic implementation options are possible. In one embodiment, a symmetric encryption key for the IUVRD/One-Time-UVRD/OT-IBH is shared between the authenticator and the identification system. In this case the IUVRD/One-Time-UVRD/OT-IBH would be protected by authenticated encryption. Alternatively, an asymmetric encryption/decryption key may be used inside the authenticator combined with an asymmetric public key as trust anchor. The IUVRD/One-Time-UVRD/OT-IBH may be signed by the identification system and then encrypted using the public encryption/decryption key. In both cases it may be assumed that the key is authenticator specific in order to prevent replay attacks to other authenticators.

Privacy Impact

The privacy impact is minimal when the RP is enabled to perform identity binding for its own Uauth key. The IUVRD extension allows the first RP to perform an identity binding to the authenticator if it owns cryptographic material specific to the authenticator.

The One-Time-UVRD extension allows any RP to do an identity binding to the authenticator if it owns cryptographic material specific to the authenticator.

The OT-IBH implementation allows any RP which is provided with access to the handle H through some other existing means (e.g., some native API already available to the App or through some backend-API to the RP "owning" handle H) to cryptographically verify whether the authenticator is indeed bound to it.

In one embodiment, one or more of the following privacy policies are followed. At no time are private Uauth keys exposed outside the authenticator boundary. At no time are user verification reference data enrolled by the user to the authenticator revealed by the authenticator. At no time does the authenticator reveal the number or names of relying parties it is registered to. At no time does the authenticator reveal any global correlation handle. At no time is it possible for any RP to modify user verification reference data for existing keys.

It is possible for the RP to query the authenticator to determine whether it is tied to some user (specified by the extension). However, the user is involved in such a query (through user verification) and—depending on the authenticator model—might also learn the name of the related RP.

System and Method for Sharing Keys Across Authenticators

Motivation

Current FIDO specifications (UAF, U2F and FIDO2/Web Authentication) expect authentication keys (e.g., Uauth keys) to be dedicated to an individual authenticator instance. Users can register multiple authenticators to each account/relying party. If a user loses any (but the last registered) authenticator, they can simply authenticate with one of the remaining authenticators and then register a new/replacement authenticator.

In reality there are two pain points for users. First, if a user loses a last registered authenticator, then the relying parties need to push the user through an account recovery procedure. Account recovery is a painful process, potentially even involving out of band checks. Account recovery is sometimes also a risky process and less secure/trustworthy than FIDO authentication.

In addition to registering the new authenticator, a user also must deregister the lost/stolen authenticator at each relying party individually and register a new authenticator at each relying party. The process of registering a new authenticator or deregistering an old authenticator can be painful as users often have multiple accounts.

The embodiments of the invention described herein address the above issues using a client-side biometric solution.

Approaches

One approach is to keep each Uauth key dedicated to one authenticator and to propose a standardized registration/deregistration API for relying partys for automatically adding/removing authenticators (as described above with respect to certain embodiments). However, standardizing web APIs across relying parties is challenging and requires time. As such, success is not guaranteed.

One embodiment of the invention extends the implementations described above with respect to FIGS. 43-45 to share keys across multiple authenticators.

Traditional FIDO Authenticators

Registering additional authenticators requires one manual operation per relying party. This manual operation might even include multiple steps (e.g. open app, click on register additional authenticator, perform user verification). This is the traditional FIDO model which is known in the art.

Synchronizing Wrapped Uauth Keys via a Cloud Service

In one embodiment of the invention, the user uses different authenticator instances of the same model (e.g., identified by the AAID/AAGUID). According to the FIDO specification, such authenticator would have similar security characteristics—no authenticator provides lower security than claimed in the Metadata Statement. So, for example, the class of authenticators could claim Trusted Execution Environment (TEE) security and some implementations may actually even use a secure element for key protection. More specifically, one authenticator may be bound to a smartphone using TEE for key protection, matcher protection and transaction confirmation display and may use a fingerprint as the user verification method. Another authenticator sharing that AAID might be implemented as a smart card with integrated fingerprint sensor and eInk transaction confirmation display and using a secure element for key and matcher protection.

Additionally these authenticators may allow the user to:

a) Store a copy of the authenticator persistent storage (i.e., private key material and related usernames and AppIDs) in wrapped form on a Cloud service. Only the authenticators belonging to the same user defined group can unwrap these wrapped persistent data blocks.

b) The first authenticator defines this group characterized by the symmetric wrapping key. The user can add additional authenticators to that group, by approving the "join" process on the first authenticator (see, e.g., FIGS. 43-44 and associated text).

Authenticator Cryptographic Details

Figure 67:
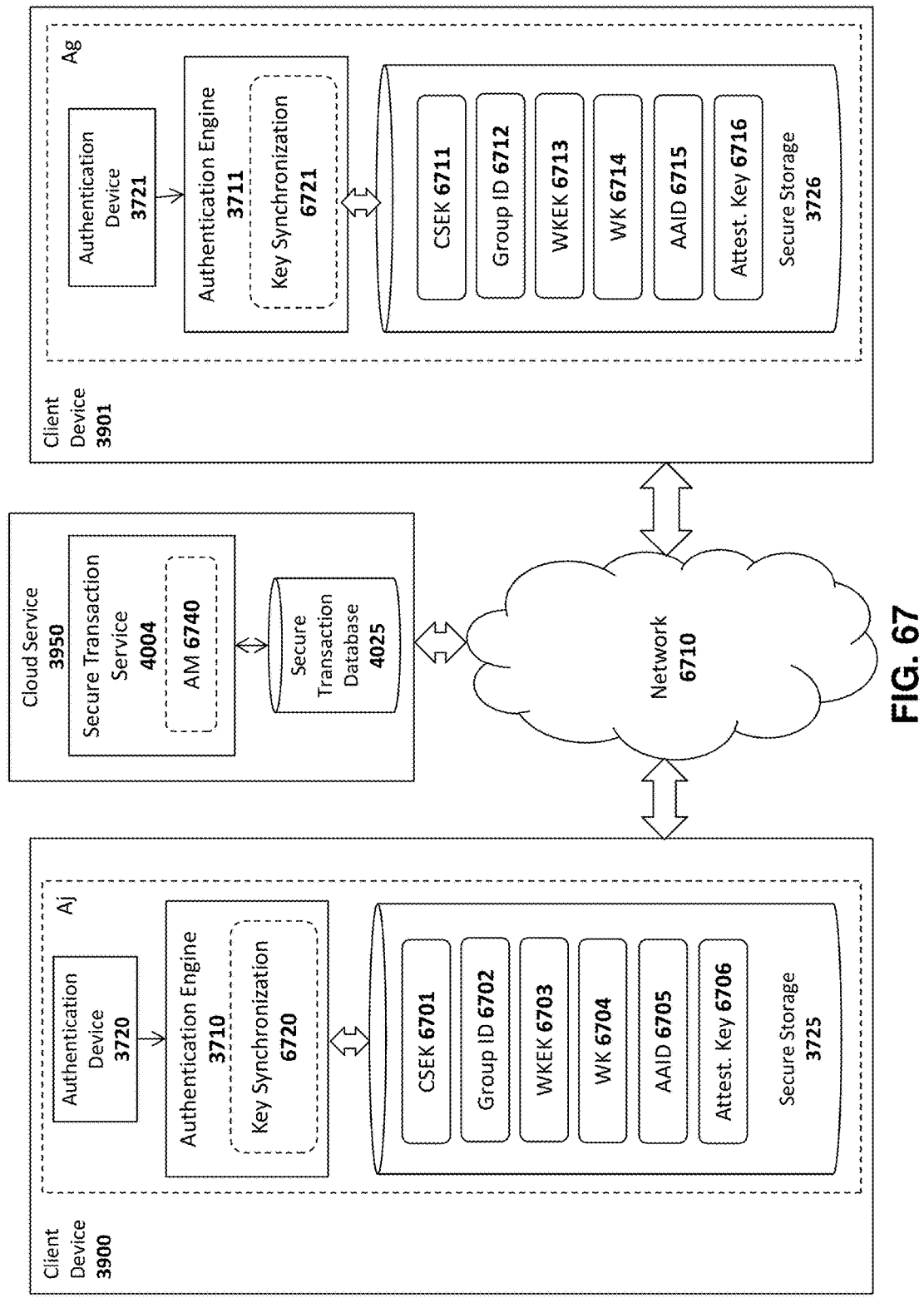
FIG. 67 illustrates one embodiment of the invention for securely sharing cryptographic data.

In one embodiment, the authenticator supports FIDO functions (e.g., it has a FIDO attestation key and supports the generation of FIDO Uauth keys). It should be noted, however, that the underlying principles of the invention are not limited to a FIDO implementation. FIG. 67 illustrates an exemplary embodiment with a first client device 3900 includes an authenticator which is joining a group Aj and a second client device 3901 includes an authenticator which has already joined the group Ag. Each authenticator in Aj, Ag includes a physical authentication device 3720-3721, an authentication engine 3710-3711 with key synchronization logic 6720-6721 for implementing the techniques described herein, and a secure storage 3725-3726 for storing the various types of cryptographic data described herein. While some of the details are not shown, client device 3901 may store all of the same data as client device 3900. As illustrated in FIG. 67, in one embodiment, each authenticator:

a) Has a public Cloud storage access ID encryption key (CSEK) 6701, 6711 (e.g., as a trust anchor).

b) Has a random Group ID (e.g., UUID) 6702, 6712 that is overwritten by each join procedure implemented by key synchronization logic 6720-6721 of the authentication engines 3710-3711.

c) Has an individual asymmetric wrapping key encryption key (WKEK) 6703, 6713. It may be generated by the authenticator 3710-3711 on first use and never made accessible outside the authenticator.

d) Has a symmetric wrapping key (WK) 6704, 6714 which may be generated on first use and overwritten by each join procedure.

e) In one implementation, the key synchronization logic 6720-6721 implements the following join process. There is an API function that can ask an authenticator Aj to join an existing authenticator group. The authenticator to join, Aj, generates a nonce value, asks the user for permission (i.e., triggers a user verification displaying the Join process indicator and the Nonce value in the display), appends to the Nonce value its AAID 6705 and public WKEK 6703 and signs it with its attestation key 6706. This data block is referred to as the "join block" or "trust block."

f) One authenticator in the join group, Ag, receives the join block which is verified by the key synchronization logic 6721. This is possible because the authenticators all know the acceptable public attestation keys (trust anchors) used for signature verification. The authentication engine 3711 displays the nonce, the AAID 6705 and a Join Request indicator in its display. If the user approves the action (e.g., by normal user verification), the key synchronization logic 6721 will encrypt the wrapping key (WK) 6714 and Group-ID 6712 using the public WKEK 6703 received in the join block. This data block is called in the join response block.

g) Aj decrypts the join response block and stores the wrapping key (WK) 6714 and Group-ID 6712.

h) One embodiment supports an API function to retrieve a sync-pull-request (given a Nonce value retrieved from the Cloud service 3950) from an authenticator Aj. The key synchronization logic 6720 on the authenticator Aj returns the concatenation of the server provided Nonce, the Group-ID 6702, and the hash of the internal persistent memory encrypted by the CSEK 6701 (e.g., sync pull request). This function is triggered by an external module (e.g., an ASM, authenticator configuration App). Once the sync-pull-request is received by the Cloud service 3950, the secure transaction service 4004 decrypts the block and compares the state hash with the hash received along with the latest data block. If it differs it returns the sync pull response, i.e., the latest wrapped data block encrypted by WKEK 6703, otherwise it returns "no change" code.

i) Supports an API function to process the sync-pull-response. The key synchronization logic 6720 decrypts the block using its private WKEK 6703 and then unwraps the data using the symmetric wrapping key (WK) 6704. It both operations are successful, the authentication engine 3710 updates its internal persistent storage accordingly. Note that this update procedure supports merging various elements (i.e., the key generated on this authenticator which has not yet been synced to the Cloud 3950).

j) Supports another API function to trigger generation of a sync-push-request in the authenticator. This API function triggers the key synchronization logic 6720 to return a Nonce, the GroupID 6702, the hash of the internal persistent memory concatenated with the wrapped persistent memory all encrypted with the CSEK 6701 (i.e., so the Cloud service 3950 can read the Nonce, the Group-ID 6702, and the hash—but it cannot unwrap the persistent memory containing the private key material). Note that the authenticator first needs to perform a sync-pull with the Cloud 3950 in order to merge-in changes before generating the sync-push-request.

Characteristics

Using the above approach, new authenticators may be readily added to the group with a single operation. The join process can be performed independently from the Cloud service. However, one drawback is that if the user loses his last registered authenticator, a full account recovery needs to be performed, which is burdensome on the user.

Synchronizing Password-Protected Uauth Keys Via a Cloud Service

One embodiment of the invention is similar to the approach described above with one difference being that the symmetric wrapping key (WK) may be derived from a password provided by the user. In particular, step (d) above is supplemented with the ability to overwrite the current WK with a WK derived from a password (e.g., via a dedicated API function). In one embodiment, the password is always entered on the authenticator's secure display.

In addition, in one embodiment, step (h) above is modified as indicated by the bolded portions of the following paragraph. In particular, the key synchronization logic 6720 will return the concatenation of the server provided Nonce, the Group-ID 6702, the WKEK 6703, and the hash of the internal persistent memory first signed by the attestation key 6706 and then encrypted by the CSEK 6701 (sync pull request). This function is triggered by an external module (e.g. ASM, authenticator configuration App). Once received by the cloud service, it decrypts the block, verifies the attestation signature and compares the state hash with the hash received along with the latest data block. This method (in combination with encryption to WKEK) allows the cloud service to restrict access to the wrapped memory block to authenticators having the correct model (e.g., protecting against brute force attacks on the password by other authenticators/attackers). If it differs it returns the sync pull response, i.e., the latest wrapped data block encrypted by WKEK 6703, otherwise it returns "no change" code.

Aside from the differences highlighted above, the remaining operations from (a-j) are performed as previously described.

Characteristics

With the approach described above, it is easy to add a new authenticator to the group with a single operation. If the user loses the last authenticator, he can recover the by providing his password. Brute force attacks on the password are prevented by encrypting the wrapped memory block using the respective authenticated WKEK. However, one drawback is that the Cloud service provider still has access to the wrapped memory block and hence could brute force the password.

Fallback Join-Authenticator in the Cloud

In one embodiment, to address the above limitation, the wrapped data and the CSEK 6701 private key is protected by a special authentication module 6740 used by the Cloud service 3950. This authentication module is a unique kind of authenticator with the following features:

1. It supports multiple users in one hardware box, similar to bound UAF authenticators used by tablets supporting multiple OS accounts.

2. It supports only remote user verification, via another authenticator of exactly that model used at first enrollment.

3. It doesn't allow the user to actually use any Uauth key for authentication, only approving other authenticators joining the group is supported.

As a consequence, this Cloud authenticator module 6740 can be joined to the group like any other authenticator can.

Authenticator Cryptographic Details

One embodiment of the invention is similar to the previous approach but with additional techniques for enrolling with a Cloud service and using a cloud-based join-authenticator. These new techniques are highlighted in bold. In this embodiment, each authenticator:

a) Has a public Cloud storage access ID encryption key (CSEK) 6701, 6711 (e.g., as a trust anchor).

b) Has a random Group ID (e.g., UUID) 6702, 6712 that is overwritten by each join procedure implemented by key synchronization logic 6720-6721 of the authentication engines 3710-3711.

c) Has an individual asymmetric wrapping key encryption key (WKEK) 6703, 6713. It may be generated by the authenticator 3710-3711 on first use and never made accessible outside the authenticator.

d) Has a symmetric wrapping key (WK) 6704, 6714 which may be generated on first use and overwritten by each join procedure.

e) Can be "enrolled" to the Cloud service 3950 in order to create a new partition. One embodiment of this process may comprise a FIDO registration:
  1. The user takes one authenticator Aj and registers it to the cloud service 3950. The user additionally provides his email address to identify his partition.
  2. The cloud-based join-authenticator 6740 creates a "partition" for the registered authenticator Aj. This partition is identified by the related Uauth public key. Each "partition" has its own set of persistent data (including key material).

f) Can be "enrolled" to an existing partition of the cloud service (recovery join):
  1. User enters his/her email address for an existing partition.
  2. The user takes one authenticator Aj and registers it to the cloud service.
  3. Note that this authenticator is not yet approved. The only action the user can trigger is a join process using this authenticator as Aj (and the cloud-based join-authenticator 6740 as Ag). In one embodiment, this process will only succeed if the AAID 6705 of this authenticator is identical to the AAID of the Authenticator originally creating this partition (e.g., AAID 6715).

g) Supports the following join process:
  1. There is an API function that can ask an authenticator to join an existing authenticator group. The authenticator to join (Aj) will generate a nonce value, ask the user for permission (i.e. trigger user verification displaying the Join process indicator and the Nonce value in the display), append to the Nonce value its AAID and public WKEK and sign it with its attestation key. This data block is called "join block" or "trust block."
  2. This function is also supported by the cloud-based join-authenticator 6740.
     a. The user first asks the cloud-based join-authenticator 6740 to join the group (initialized by the authenticator Aj first "enrolled" to the cloud service).
     b. In this case, the cloud-based join-authenticator plays the role of Aj and the user's initial authenticator the role of Ag.
     c. Ag authenticates to the cloud service and calls the Aj.join API function. The cloud service 3950 passes the AAID 6715 of Ag to Aj while calling the API function. Aj responds with the join block (see above).
     d. Ag performs step h below and sends the join-response block to Aj.
     e. Aj stores the Group-ID 6702 and WK 6704 in the related "partition".

h) One authenticator in the join group, Ag, receives the join block and the key synchronization logic 6721 verifies it. This is easily possible as the authenticators all know the acceptable public attestation keys (trust anchors) used for signature verification. Ag displays the nonce, the AAID 6715 and a Join Request indicator in its display. If the user approves the action (by normal user verification), the authenticator will encrypt the wrapping key (WK) 6714 and Group-ID 6712 using the public WKEK 6713 received in the join block. This data block is called in the join response block.

i) Aj will decrypt the join response block and store the wrapping key (WK) 6704 and Group-ID 6702.

j) One embodiment supports an API function to retrieve a sync-pull-request (given a Nonce value retrieved from the Cloud service 3950) from an authenticator Aj. In particular, the key synchronization logic 6720 will return the concatenation of the server provided Nonce, the Group-ID 6702, the WKEK 6703, and the hash of the internal persistent memory first signed by the attestation key 6706 and then encrypted by the CSEK 6701 (sync pull request). This function is triggered by an external module (e.g. ASM, authenticator configuration App). Once received by the cloud service, it decrypts the block, verifies the attestation signature and compares the state hash with the hash received along with the latest data block. This method (in combination with encryption to WKEK) allows the cloud service to restrict access to the wrapped memory block to authenticators having the correct model (e.g., protecting against brute force attacks on the password by other authenticators/attackers). If it differs it returns the sync pull response, i.e., the latest wrapped data block encrypted by WKEK 6703, otherwise it returns "no change" code.

k) Supports an API function to process the sync-pull-response. The key synchronization logic 6720 decrypts the block using its private WKEK 6703 and then unwraps the data using the symmetric wrapping key (WK) 6704. It both operations are successful, the authentication engine 3710 updates its internal persistent storage accordingly. Note that this update procedure supports merging various elements (i.e., the key generated on this authenticator which has not yet been synced to the Cloud 3950).

l) Supports another API function to trigger generation of a sync-push-request in the authenticator. This API function triggers the key synchronization logic 6720 to return a Nonce, the GroupID 6702, the hash of the internal persistent memory concatenated with the wrapped persistent memory all encrypted with the CSEK 6701 (i.e., so the Cloud service 3950 can read the Nonce, the Group-ID 6702, and the hash—but it cannot unwrap the persistent memory containing the private key material). Note that the authenticator first needs to perform a sync-pull with the Cloud 3950 in order to merge-in changes before generating the sync-push-request.

Characteristics

With this approach, adding a new authenticator to the group with a single operation is relatively easy. If the user loses his last authenticator, he can recover the by providing his password. Brute force attacks on the password are prevented by encrypting the wrapped memory block using the respective authenticated WKEK. The cloud service provider would have to break the cloud-based join-authenticator in order to brute force the password. As a consequence the cloud-based join-authenticator should use secure element based security. Its security is reflected by the attestation statement.

Unfortunately, the user cannot revoke individual authenticator members of his/her recovery group.

Fallback Join-Authenticator in the Cloud and Automatic Key Deletion Policy in Authenticators.

This approach supplements the previous approach as follows. Each authenticator (except the cloud-based join-authenticator), will delete its persistent private key storage (WK, WKEK, Uauth keys, etc), except the attestation private key after a configurable time period, unless the authenticator persistent storage is re-synchronized to the cloud storage. As a consequence, the authenticator needs a reliable internal clock/ticker.

The user has the ability to remove individual authenticators from the group via the cloud storage. If an authenticator has been removed, it cannot be synchronized any longer.

Authenticator Cryptographic Details

This approach supplements the previous approach as follows (with key features highlighted in bold). The authenticator supports another API function to retrieve a sync-pull-request (given a Nonce value retrieved from the cloud service) from an authenticator. The authenticator will return the sync pull response, i.e., the concatenation of the server provided Nonce, the Group-ID 6702, WKEK 6703 and the hash of the internal persistent memory first signed by the attestation key and then encrypted by the CSEK 6701 (sync pull request). This function is triggered by an external module (e.g. ASM, authenticator configuration App). Once received by the cloud service 3950, it decrypts the block, verifies the attestation signature and compares the state hash with the hash received along with the latest data block. It returns the sync pull response, i.e. the latest wrapped data block encrypted by WKEK 6703. In one implementation, the cloud service 3950 increments a mismatch counter if the hash doesn't match. Very high counter values indicate increased risk.

In one embodiment, the authenticator supports an API function to process the sync-pull-response. The authenticator decrypts the block using its private WKEK and then unwraps the data using the symmetric wrapping key WK. It both operations are successful, the authenticator updates its internal persistent storage accordingly and resets its internal need-cloud-sync ticker.

Characteristics

With this approach it is easy to add new authenticator to the group with a single operation. If the user loses his last authenticator, he can recover the by providing his password. Brute force attacks on the password are prevented by encrypting the wrapped memory block using the respective authenticated WKEK.

The cloud service provider would have to break the cloud-based join-authenticator in order to brute force the password. As a consequence, the cloud-based join-authenticator should use secure element based security. Its security is reflected by the attestation statement.

In addition, in this particular embodiment, the user can "revoke" individual authenticator members of his recovery group by removing them from the group.

Sensitive Data Migration Card

Figure 68:
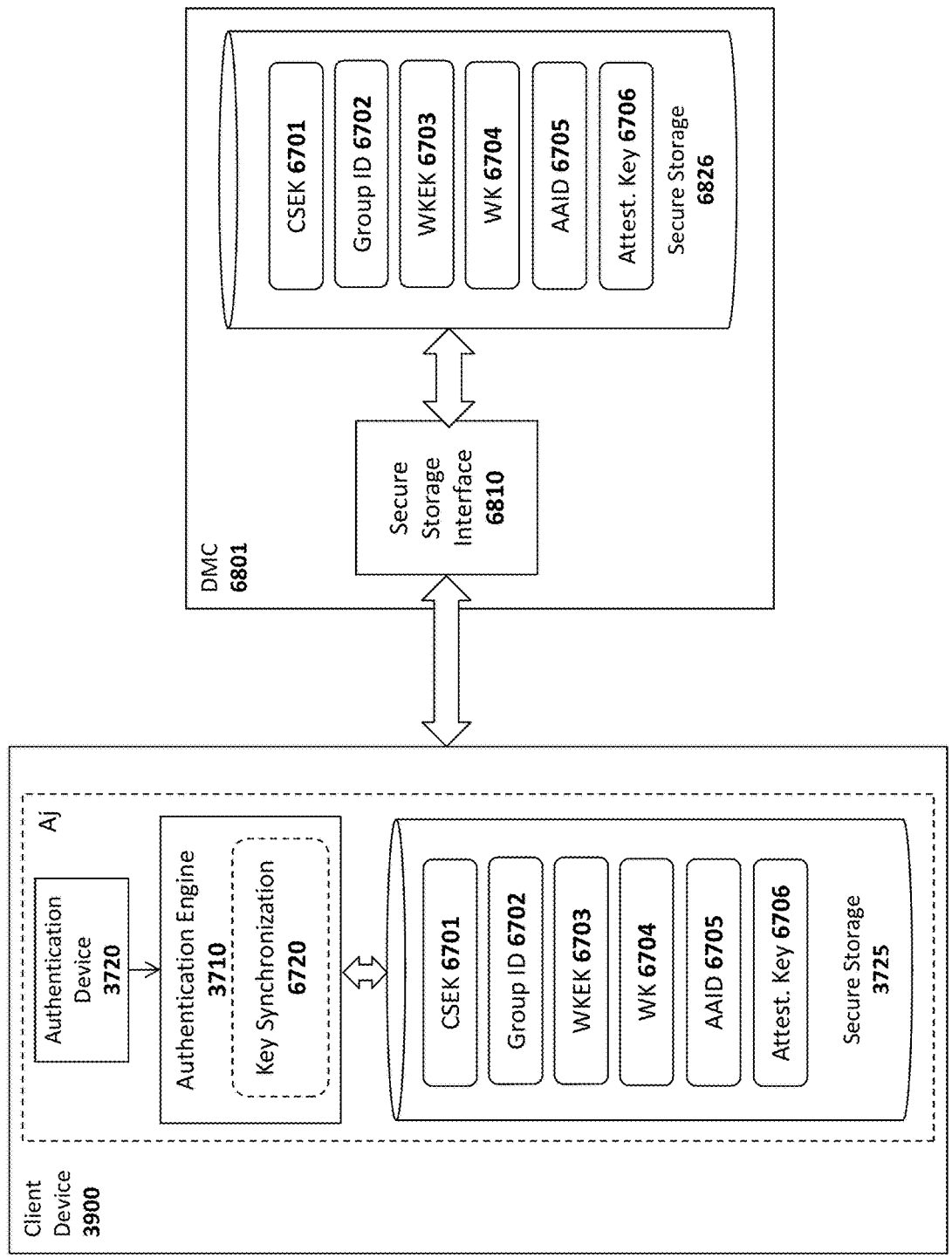
FIG. 68 illustrates one embodiment which utilizes a data migration card (DMC)

Instead of using a Cloud service, one embodiment of the invention uses a dedicated chip card (ICC), illustrated in FIG. 68 as a data migration card (DMC) with secure storage 6826 for storing a protected backup of the all Uauth keys and even all other sensitive data stored in the client device 3900. To "backup" the sensitive data, the user connects via a secure storage interface 6810 of the DMC 6801 to the client device 3900 containing a bound authenticator Aj (or to the authenticator directly). The user confirms to the authenticator Aj that the data is to be backed-up to the DMC 6801. This step erases all existing data on the DMC.

Depending on the settings, the secure storage interface 6810 may remember the authenticator model (AAID, AAGUID) or a model with similar security characteristics (e.g. keys+matcher TEE protected, etc) and will only restore the data to an identical model or model with comparable security characteristics.

In one embodiment, the authenticator Aj will only backup keys to a DMC 6801 with acceptable security characteristics, e.g., having a model configured in the authenticator. The DMC 6801 will only restore keys into authenticators with acceptable security characteristics, e.g., having the same model as the original authenticator. The security mechanisms may be implemented using authenticator/DMC attestation.

In one embodiment, a second authenticator may act as a DMC (e.g. via NFC+BLE). For example, in FIG. 67, all keys stored in secure storage 3725 of client device 3900 may be securely migrated into a the secure storage 3726 of client device 3901.

DMC Cryptographic Details

In one embodiment, the DMC is like a traditional (external) authenticator. Consequently, the DMC and each authenticator supporting it may perform the same key synchronization techniques described above for joining and managing a join block or trust block.

For example, in one embodiment, an authenticator can be "enrolled" to the DMC. This may be accomplished with a FIDO registration in which the user takes one authenticator and registers it to the DMC. The user additionally provides an identifier (e.g. his email address) to identify his partition in the DMC (only required if the DMC supports multiple partitions). Moreover, the DMC may create a "partition" for the registered authenticator (if it supports multiple partitions, otherwise it uses its only pre-configured partition). This partition is identified by the related Uauth public key. Each "partition" has its own set of persistent data (including key material).

An authenticator can also be "enrolled" to an existing partition of the DMC (recovery join). The user enters his identifier (e.g. email address) for an existing partition and registers one authenticator to the DMC. Note that this authenticator is not approved yet. The only action the user can trigger is a join process using this authenticator as Aj (and the DMC is a join-authenticator as Ag). This process will only succeed if the AAID of this authenticator is identical to the AAID of the Authenticator originally creating this partition.

In addition, one embodiment, there is an API function that can ask an authenticator to join an existing authenticator group. This function is also supported by the DMC join-authenticator. The user first asks the DMC join-authenticator to join the group (initialized by the authenticator first "enrolled" to the cloud service. In this case, the DMC join-authenticator plays the role of Aj and the user's initial authenticator the role of Ag. Ag authenticates to the DMC and calls Aj.join API function. The DMC passes the AAID of Ag to Aj while calling the API function. Aj responds with the join block (see above). Ag performs step h below and sends the join-response block to Aj. Aj then stores the Group-ID and WK in the related "partition".

Exemplary Data Processing Devices

Figure 69:
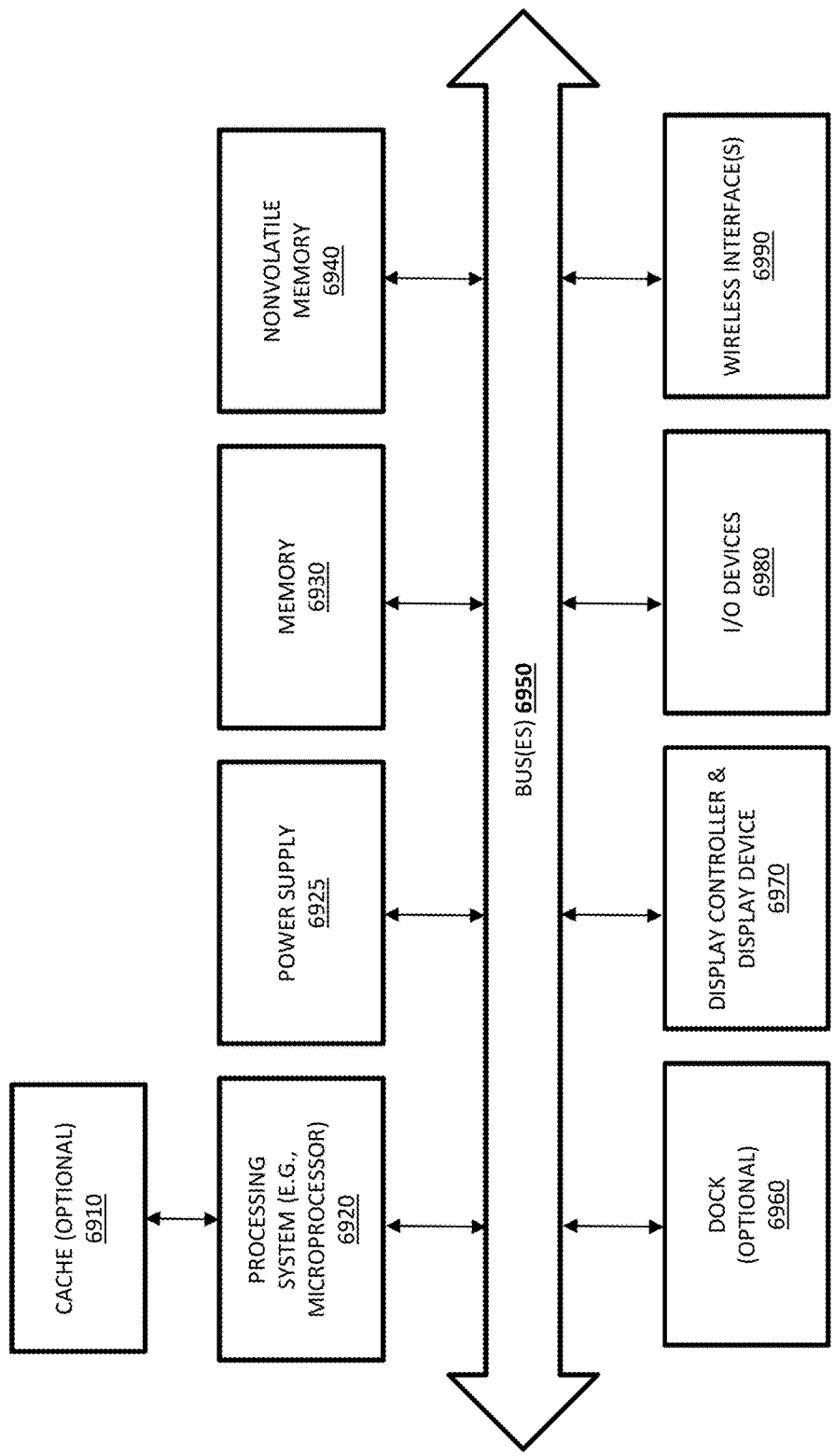
FIG. 69 illustrates a system in accordance with one embodiment of the invention.

FIG. 69 is a block diagram illustrating an exemplary clients and servers which may be used in some embodiments of the invention. It should be understood that while FIG. 69 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 69, the computer system 6900, which is a form of a data processing system, includes the bus(es) 6950 which is coupled with the processing system 6920, power supply 6925, memory 6930, and the nonvolatile memory 6940 (e.g., a hard drive, flash memory, Phase-Change Memory (PCM), etc.). The bus(es) 6950 may be connected to each other through various bridges, controllers, and/or adapters as is well known in the art. The processing system 6920 may retrieve instruction(s) from the memory 6930 and/or the nonvolatile memory 6940, and execute the instructions to perform operations as described above. The bus 6950 interconnects the above components together and also interconnects those components to the optional dock 6960, the display controller & display device 6970, Input/Output devices 6980 (e.g., NIC (Network Interface Card), a cursor control (e.g., mouse, touchscreen, touchpad, etc.), a keyboard, etc.), and the optional wireless transceiver(s) 6990 (e.g., Bluetooth, WiFi, Infrared, etc.).

Figure 70:
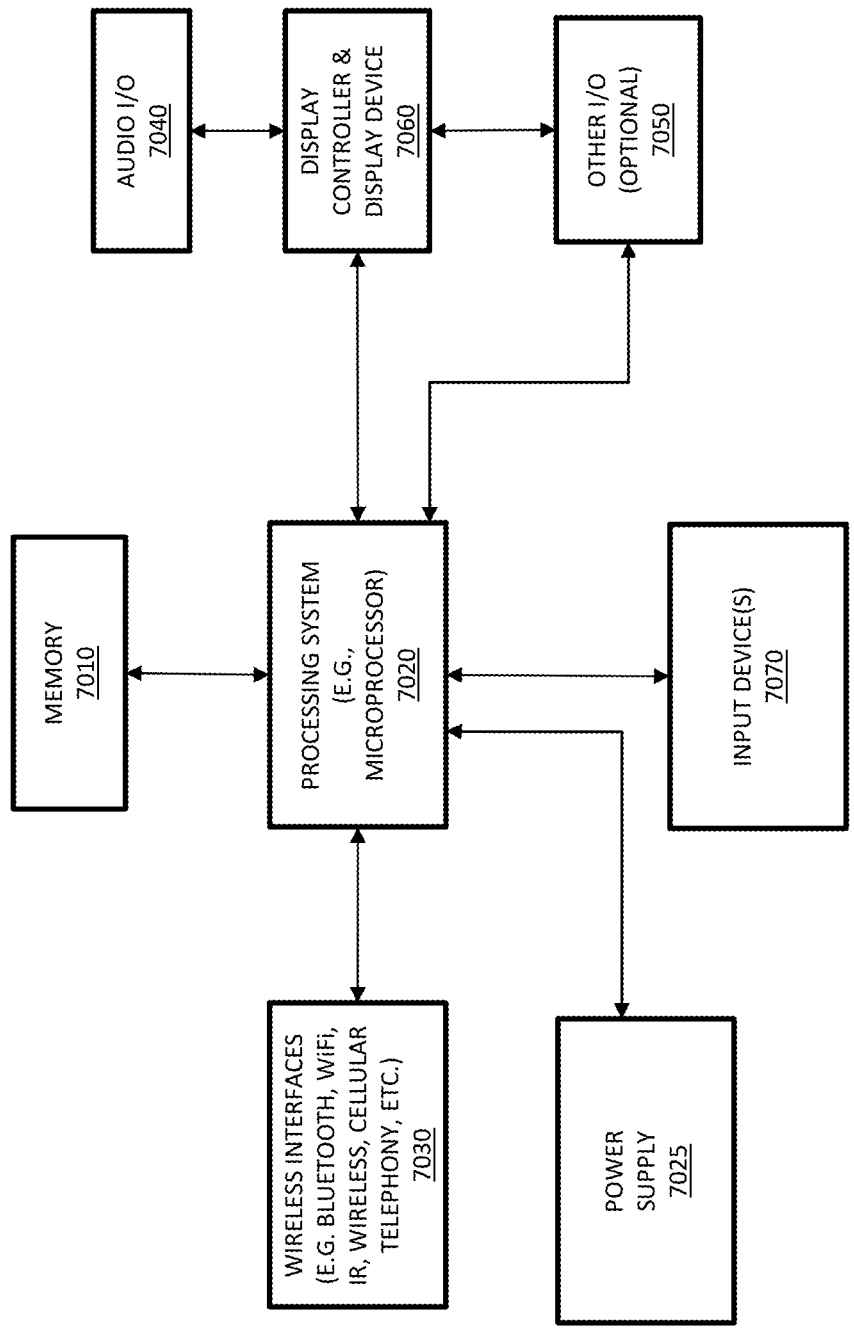
FIG. 70 illustrates a system on a chip (SoC) in accordance with one embodiment.

FIG. 70 is a block diagram illustrating an exemplary data processing system which may be used in some embodiments of the invention. For example, the data processing system 7000 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 7000 may be a network computer or an embedded processing device within another device.

According to one embodiment of the invention, the exemplary architecture of the data processing system 7000 may be used for the mobile devices described above. The data processing system 7000 includes the processing system 7020, which may include one or more microprocessors and/or a system on an integrated circuit. The processing system 7020 is coupled with a memory 7010, a power supply 7025 (which includes one or more batteries) an audio input/output 7040, a display controller and display device 7060, optional input/output 7050, input device(s) 7070, and wireless transceiver(s) 7030. It will be appreciated that additional components, not shown in FIG. 70, may also be a part of the data processing system 7000 in certain embodiments of the invention, and in certain embodiments of the invention fewer components than shown in FIG. 70 may be used. In addition, it will be appreciated that one or more buses, not shown in FIG. 70, may be used to interconnect the various components as is well known in the art.

The memory 7010 may store data and/or programs for execution by the data processing system 7000. The audio input/output 7040 may include a microphone and/or a speaker to, for example, play music and/or provide telephony functionality through the speaker and microphone. The display controller and display device 7060 may include a graphical user interface (GUI). The wireless (e.g., RF) transceivers 7030 (e.g., a WiFi transceiver, an infrared transceiver, a Bluetooth transceiver, a wireless cellular telephony transceiver, etc.) may be used to communicate with other data processing systems. The one or more input devices 7070 allow a user to provide input to the system. These input devices may be a keypad, keyboard, touch panel, multi touch panel, etc. The optional other input/output 7050 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A system comprising:
   first logic and circuitry to generate and store a persistent group identification code (Group-ID) for a group of authenticators sharing a common set of authentication (Uauth) keys, an initial Group-ID to be generated on a first use of a first authenticator and/or following a factory reset of the first authenticator;
   second logic and circuitry of the first authenticator to generate and store an individual asymmetric wrapping key encryption key (WKEK) on a first use of the first authenticator and/or following each factory reset of the first authenticator;
   third logic and circuitry to generate and store a symmetric wrapping key (WK), the symmetric wrapping key to be generated on a first use of the first authenticator and/or following each factory reset of the first authenticator;
   fourth logic and circuitry of the first authenticator to generate a join-block using an authenticator identification code for the first authenticator and the asymmetric WKEK, the join-block usable to join an existing authenticator group, the join block to be sent to a second authenticator;

fifth logic and circuitry of a second authenticator to verify the join-block and generate a join response block responsive to user approval, the join response block generated by encrypting the symmetric WK and Group-ID using the asymmetric WKEK, the join response block to be transmitted to the first authenticator;

sixth logic and circuitry on the first authenticator to decrypt the join response block and store the symmetric WK and Group-ID;

a cloud service in communication with the first authenticator, the cloud service to generate a nonce and securely transmit the nonce to the first authenticator;

seventh logic and circuitry of the first authenticator to generate a sync-pull-request using the nonce, the Group-ID, a Cloud storage access ID encryption key (CSEK), and the asymmetric WKEK, and to transmit the sync-pull request to the Cloud service; and the cloud service to decrypt the sync pull request and compare data contained therein to stored data and to generate a sync pull response including the stored data if the data in the sync pull request is different from the stored data.

2. The system as in claim 1 further comprising:
eighth logic and/or circuitry on the first authenticator to decrypt the sync pull response and to securely store the data contained therein to synchronize with the existing authenticator group.

3. The system as in claim 2 further comprising:
ninth logic and/or circuitry in the first authenticator to trigger generation of a sync-push-request to encrypt a set of data with the CSEK, the set of data including a nonce and the Group-ID.

4. The system as in claim 1 wherein the seventh logic and/or circuitry is to further calculate a hash of internal persistent memory of the first authenticator, the hash signed by an attestation key of the first authenticator and then encrypted with the CSEK.

5. The system as in claim 1 wherein the fourth logic and/or circuitry of the first authenticator is to generate the join-block using a concatenation of a nonce value, an authenticator identification code for the first authenticator, and the asymmetric WKEK, and signed with an attestation key of the first authenticator.

6. The system as in claim 4 wherein the fifth logic and/or circuitry is to generate the join response block encrypting a concatenation of the symmetric WK and Group-ID using the asymmetric WKEK.

7. The system as in claim 1 wherein the seventh logic and circuitry is to generate the sync-pull-request by encrypting a concatenation of the nonce, the Group-ID, and a hash over an internal persistent memory of the first authenticator using the CSEK.

8. The system as in claim 1 further comprising:
a cloud-based join authenticator of the cloud service to initially register the second authenticator by creating a partition for the second authenticator, the partition usable to store key material for the second authenticator; and
the cloud-based join authenticator to allow the first authenticator to be registered using the partition only if the first authenticator shares an authenticator attestation ID with the second authenticator.

9. The system as in claim 1 further comprising:
initially registering a cloud-based join authenticator by authenticating with the cloud service from the first authenticator, sending a join block from the cloud-based join authenticator, and providing a join response block to the cloud-based join authenticator, wherein the cloud-based join authenticator stores the Group-ID and symmetric WK in a created partition.

10. The system as in claim 1 further comprising:
a data migration card to securely store one or more keys on behalf of the second authenticator, the second authenticator to provide the keys to the data migration card only if the data migration card is determined to have an acceptable level of security.

11. The system as in claim 10 further comprising:
the data migration card to restore the one or more keys to a first authenticator, only if the first authenticator has acceptable security characteristics.

12. A method comprising:
generating and storing a persistent group identification code (Group-ID) for a group of authenticators sharing a common set of authorization (Uauth) keys, an initial Group-ID to be generated on a first use of a first authenticator and/or following a factory reset of the first authenticator;

generating and storing an individual asymmetric wrapping key encryption key (WKEK) on a first use of the first authenticator and/or following each factory reset of the first authenticator;

generating and storing a symmetric wrapping key (WK), the symmetric wrapping key to be generated on a first use of the first authenticator and/or following each factory reset of the first authenticator;

generating a join-block using an authenticator identification code for the first authenticator and the asymmetric WKEK, the join-block usable to join an existing authenticator group, the join block to be sent to a second authenticator;

verifying the join-block at the second authenticator and generating a join response block responsive to user approval, the join response block generated by encrypting the symmetric WK and Group-ID using the asymmetric WKEK, the join response block to be transmitted to the first authenticator;

decrypting the join response block and storing the symmetric WK and Group-ID;

generating a nonce at a cloud service and securely transmitting the nonce to the first authenticator;

generating a sync-pull-request at the first authenticator using the nonce, the Group-ID, a Cloud storage access ID encryption key (CSEK), and the asymmetric WKEK, and transmitting the sync-pull request to the Cloud service; and decrypting the sync pull request at the cloud service, comparing data contained therein to stored data, and generating a sync pull response including the stored data if the data in the sync pull request is different from the stored data.

13. The method as in claim 12 further comprising:
decrypting the sync pull response on the first authenticator and securely storing the data contained therein to synchronize with the existing authenticator group.

14. The method as in claim 13 further comprising:
triggering generation of a sync-push-request on the first authenticator to encrypt a set of data with the CSEK, the set of data including a nonce and the Group-ID.

15. The method as in claim 12 further comprising:
calculating a hash of internal persistent memory of the first authenticator, the hash signed by an attestation key of the first authenticator and then encrypted with the CSEK.

16. The method as in claim 12 wherein the first authenticator is to generate the join-block using a concatenation of a nonce value, an authenticator identification code for the first authenticator, and the asymmetric WKEK, and signed with an attestation key of the first authenticator.

17. The method as in claim 15 further comprising:
generating the join response block encrypting a concatenation of the symmetric WK and Group-ID using the asymmetric WKEK.

18. The method as in claim 12 further comprising:
generating the sync-pull-request by encrypting a concatenation of the nonce, the Group-ID, and a hash over an internal persistent memory of the first authenticator using the CSEK.

19. The method as in claim 12 further comprising:
initially registering the second authenticator by a cloud-based join authenticator of the cloud service, by creating a partition for the second authenticator, the partition usable to store key material for the second authenticator; the cloud-based join authenticator to allow the first authenticator to be registered using the partition only if the first authenticator shares an authenticator attestation ID with the second authenticator.

20. The method as in claim 12 further comprising:
initially registering a cloud-based join authenticator by authenticating with the cloud service from the first authenticator, sending a join block from the cloud-based join authenticator, and providing a join response block to the cloud-based join authenticator, wherein the cloud-based join authenticator stores the Group-ID and symmetric WK in a created partition.

21. The method as in claim 12 further comprising:
securely storing one or more keys on a data migration card on behalf of the second authenticator, the second authenticator to provide the keys to the data migration card only if the data migration card is determined to have an acceptable level of security.

22. The method as in claim 21 further comprising:
restoring the one or more keys to a first authenticator from the data migration card only if the first authenticator has acceptable security characteristics.

* * * * *